US009631096B2

(12) United States Patent
Blanchard et al.

(10) Patent No.: US 9,631,096 B2
(45) Date of Patent: Apr. 25, 2017

(54) DYE COMPOSITIONS, METHODS OF PREPARATION, CONJUGATES THEREOF, AND METHODS OF USE

(71) Applicant: CORNELL UNIVERSITY, Ithaca, NY (US)

(72) Inventors: Scott C. Blanchard, New York, NY (US); Roger Altman, New York, NY (US); J. David Warren, New York, NY (US); Zhou Zhou, Rego Park, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 14/373,402

(22) PCT Filed: Jan. 18, 2013

(86) PCT No.: PCT/US2013/022107
§ 371 (c)(1),
(2) Date: Jul. 21, 2014

(87) PCT Pub. No.: WO2013/109859
PCT Pub. Date: Jul. 25, 2013

(65) Prior Publication Data

US 2015/0011731 A1 Jan. 8, 2015

Related U.S. Application Data

(60) Provisional application No. 61/589,028, filed on Jan. 20, 2012, provisional application No. 61/604,057, filed on Feb. 28, 2012, provisional application No. 61/678,417, filed on Aug. 1, 2012.

(51) Int. Cl.

| | |
|---|---|
| ***C09B 23/12*** | (2006.01) |
| ***C09B 23/06*** | (2006.01) |
| ***C09K 11/06*** | (2006.01) |
| ***C09B 23/08*** | (2006.01) |

(52) U.S. Cl.
CPC .............. *C09B 23/12* (2013.01); *C09B 23/06* (2013.01); *C09B 23/083* (2013.01); *C09B 23/086* (2013.01); *C09K 11/06* (2013.01); *C09K 2211/1029* (2013.01)

(58) Field of Classification Search
IPC ........................................................ C09B 23/12
See application file for complete search history.

(56) References Cited

U.S. PATENT DOCUMENTS

| | | | | |
|---|---|---|---|---|
| 5,008,401 | A | 4/1991 | Utsunomiya et al. | |
| RE35,044 | E | 9/1995 | Utsunomiya et al. | |
| 7,750,163 | B2 * | 7/2010 | West .................... | C07D 209/10 548/148 |
| 8,945,515 | B2 * | 2/2015 | Blanchard .......... | A61K 49/0032 424/9.6 |
| 2012/0027689 | A1 | 2/2012 | Blanchard et al. | |

FOREIGN PATENT DOCUMENTS

| | | | |
|---|---|---|---|
| DE | 38 26 697 A1 | 2/1989 | |
| JP | 2006-248180 | 9/2006 | |
| WO | WO 2007/037204 A1 | 4/2007 | |

OTHER PUBLICATIONS

Bamgbelu A. et al., "TDDFT Study of the Optical Properties of Cy5 and its Derivatives", *J. Phys. Chem. A 114*:3551-3555 (2010).

Butrimovich O.V. et al., tom XLIV, No. 1, pp. 146-148 (1986), together with an English-language abstract (2 pages only).

Fan B. et al., "High Performing Doped Cyanine Bilayer Solar Cell", *Organic Electronics 11*:583-588 (2010).

Fan B. et al., Supplementary Materials for, "High Performing Doped Cyanine Bilayer Solar Cell", *Organic Electronics 11*:583-588 (2010) (10 pages).

Funabiki K. et al., "Synthesis of a Novel Heptamethine-Cyanine Dye for Use in Near-Infrared Active Dye-Sensitized Solar Cells With Porous Zinc Oxide Prepared at Low Temperature", *Energy Environ. Sci. 4*:2186-2192 (2011).

Grätzel M., "Dye-Sensitized Solar Cells", *Journal of Photochemistry and Photobiology C: Photochemistry Reviews 4*:145-153 (2003).

Hany R. et al., "Strategies to Improve Cyanine Dye Multi Layer Organic Solar Cells", *Progress in Photovoltaics: Research and Applications 19*:851-857 (2011).

(Continued)

*Primary Examiner* — Nyeemah A Grazier
(74) *Attorney, Agent, or Firm* — Scully Scott Murphy & Presser

(57) ABSTRACT

Dye compounds of the formula (1) wherein A is a protective agent group that has a characteristic of modifying the singlet-triplet occupancy of the shown cyanine moiety, and M is a reactive crosslinking group or a group that can be converted to a reactive crosslinking group. Methods for synthesizing the dye compounds and applications for their use are also described.

(1)

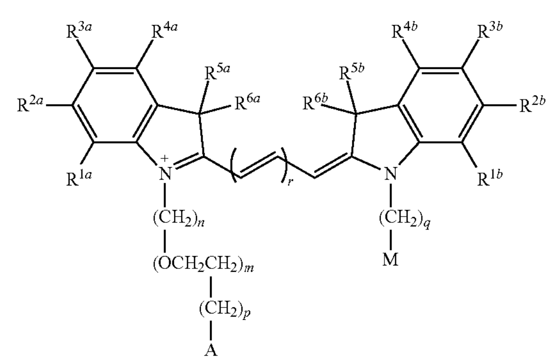

11 Claims, 14 Drawing Sheets

(56) References Cited

OTHER PUBLICATIONS

Hardin B.E., "The Dye Sensitized Solar Cell",-Behind the Scenes of "Sunny Memories", swissnex San Francisco (Apr. 21, 2010) (30 pages).
Kuznetsova V.E. et al., "New Indodicarbocyanine Dyes for the Biological Microchip Technology", Russian Journal of Bioorganic Chemistry 34(1):130-133 (2008), together with an English-language translation.
Kuznetsova V.E. et al., "Water-Soluble Cyanine Dyes for Biological Microchip Technology", *Russian Chemical Bulletin, International Edition 56*(*12*) :2438-2442 (Dec. 2007).
Ma X. et al., "A High-Efficiency Cyanine Dye for Dye-Sensitized Solar Cells", *Tetrahedron 64*:345-350 (2008).
Narayan M.R., "Review: Dye Sensitized Solar Cells Based on Natural Photosensitizers", *Renewable and Sustainable Energy Reviews 16*:208-215 (2012).
Rhee S-W et al., "Key Technological Elements in Dye-Sensitized Solar Cells (DSC)", *Korean J. Chem. Eng. 28*(*7*):1481-1494 (2011).
Smestad G.P. et al., "Demonstrating Electron Transfer and Nanotechnology: A Natural Dye-Sensitized Nanocrystalline Energy Converter", *Journal of Chemical Education 75*(*6*):752-756 (Jun. 1998).
Wu W. et al., "Photovoltaic Properties of Three New Cyanine Dyes for Dye-Sensitized Solar Cells", *Photochemical & Photobiological Sciences 7*:63-68 (2008).
International Search Report dated May 30, 2013 received from International Application No. PCT/US2013/022107.
Altman R.B. et al., "Cyanine Fluorophore Derivatives With Enhanced Photostability", Nature Methods 9(1):68-73 (Jan. 2012), together with Supplementary Data (22 pages total).
Altman R.B. et al., "Enhanced Photostability of Cyanine Fluorophores Across the Visible Spectrum", Nature Methods 9(5):428-429 (May 2012), together with Supplementary Data (5 pages total).
Zheng Q. et al., "Ultra-Stable Organic Fluorophores for Single-Molecule Research", Chem Soc Rev., 43:1044-1056 (2014) (13 pages total), first published online on Nov. 1, 2013.
Zheng Q. et al., "The Contribution of Reactive Oxygen Species to the Photobleaching of Organic Fluorophores", Photochemistry and Photobiology, 90(2):448-454 (Mar./Apr. 2014) (12 pages total).
Zheng Q. et al., "On the Mechanisms of Cyanine Fluorophore Photostabilization", J. Phys. Chem. Lett. 3(16):2200-2203 (Aug. 2012), together with Supplementary Data (20 pages total).

* cited by examiner $$\frac{d(\Delta A)}{dt} = -a_1 e^{(-k_1 t)} + a_2 e^{(-k_2 t)}$$

DYE COMPOSITIONS, METHODS OF PREPARATION, CONJUGATES THEREOF, AND METHODS OF USE

CROSS REFERENCE TO RELATED APPLICATIONS

This application claims the benefit of priority from U.S. Provisional Application No. 61/589,028, filed on Jan. 20, 2012, U.S. Provisional Application No. 61/604,057, filed on Feb. 28, 2012, and U.S. Provisional Application No. 61/678,417, filed on Aug. 1, 2012, which is herein incorporated by reference in its entirety.

GOVERNMENT SUPPORT

This invention was made with government support under grant number GM079238 awarded by the National Institutes of Health. The government has certain rights in the invention.

FIELD OF THE INVENTION

The present invention relates generally to dye compounds, and methods of synthesis and use as labeling reagents, and more particularly, to such dye compounds and methods wherein the dye is a cyanine dye.

BACKGROUND OF THE INVENTION

Fluorescent dyes are relied upon in a wide variety of fields, particularly in vitro and in vivo fluorescence microscopy, such as used in wide-field, scanning confocal, and Total Internal Reflection Fluorescence Microscopy (TIRF) used for whole cell and single-molecule imaging. The use of fluorescent labels with antibodies, DNA probes, biochemical analogs, lipids, drugs, cells and polymers has expanded rapidly in recent years. High-quantum yield, stable fluorescent species are generally preferred in fluorescence microscopy.

Of the dyes commonly used in bioanalytical studies, the cyanine dyes (e.g., Cy3, Cy5, and Cy7) are particularly well known. The cyanine dyes have proven useful in a wide range of applications, including the labeling of a variety of materials (e.g., hydrophilic and hydrophobic surfaces of various materials, including nanoparticles), in microscopic studies of living cells, and in single-molecule imaging, due in large part to their large extinction coefficients (ca. 250,000 $M^{-1}$ $cm^{-1}$ for Cy5) and quantum yield (approximately 0.3 for Cy5). The dyes are also widely used as fluorescent probes in DNA sequencing, cellular analysis (e.g. molecular beacons and single-particle tracking), flow cytometry, and super-resolution imaging.

However, the utility of these dyes is substantially hindered by undesirable photophysical properties that lead to transient and/or permanent dark states. It is believed that these dark states arise via electronic transitions from the singlet ground and/or excited states to triplet dark states. From triplet states, deleterious physical modifications or damage can occur to the dye. In particular, such processes tend to limit photon emission from the fluorophore and often result in stochastic "blinking" events and irreversible photobleaching. Blinking and photobleaching phenomena occur in all fluorescence applications but are particularly pronounced in experiments demanding intense illumination, including confocal imaging of cells and single-molecule fluorescence methods.

It has recently been discovered that certain small organic molecules can favorably affect the intensity and photostability of Cy5 when included in solution during imaging experiments (Rasnik et al. Nature Methods 2006; Aitken et al. Biophys J. 2008; Dave et al. Biophys. J 2009). These compounds are generally referred to as triplet state quenchers (TSQs) as they are thought to operate by reducing the lifetime of triplet dark states that occur with finite probability as a consequence of fluorophore excitation. Some examples of TSQs include Trolox, p-nitrobenzyl alcohol (NBA), β-mercaptoethanol (BME), mercaptoethylamine (MEA), n-propyl gallate, 1,4-diazabicyclo[2.2.2]octane (DABCO), and cyclooctatetraene (COT). As photobleaching is thought to principally occur from triplet excited states, TSQs, by reducing excursions to triplet states, have the propensity to: 1) increase the mean intensity of stochastically emitting fluorophores; 2) reduce the variance in photoemission rate and 3) reduce the probability of photobleaching, thereby extending the duration of time over which photons are emitted.

Despite the potential benefits of their use, TSQs generally have been significantly limited in their use for in vitro and cell-based imaging experiments. At least one significant limitation in the experimental implementation of using TSQs in solution is due to their relatively poor aqueous solubility (generally <2 mM), their varied solubilities in aqueous buffers with distinct ionic strengths, and their potential to disrupt lipid bilayers and biological molecules which can render them toxic to cells and potentially disruptive to the biological activities under investigation. Moreover, the existing methodologies do not permit specific and tailored distances to be maintained between the fluorophore and TSQ, nor do they permit specific binding of a fluorophore-TSQ pair, separated by a specified distance, to a biomolecule or other molecule or material of interest. The ability to select and tailor these distances and binding locations would provide fluorophores that are selectively adjusted in their photophysical properties, which could be modified or optimized to meet the demands of their intended use and the localized molecular environment.

SUMMARY OF THE INVENTION

The present invention provides novel cyanine fluorophore compositions in which a protective agent (e.g., triplet state quencher) and a reactive crosslinking group are attached to the cyanine moiety. By judicious selection of the reactive crosslinking group, the cyanine composition can be facilely and precisely attached to a wide range of molecules or materials of interest that possess one or more groups reactive with the reactive crosslinking group. Moreover, the cyanine compositions may or may not include a linking group of desired length (D) between the cyanine moiety and protective agent, thereby providing a range of cyanine compositions having any of a number of D values, which accordingly provides a range of modifications or augmentations in photophysical effects of the cyanine moiety.

In particular embodiments, the cyanine dye compound has a structure according to the following formula:

(1)

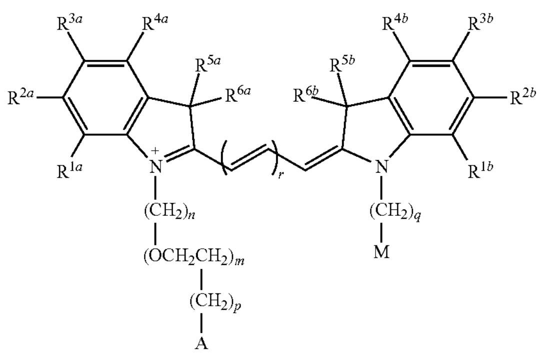

In Formula (1) above, $R^{1a}$, $R^{2a}$, $R^{3a}$, $R^{4a}$, $R^{5a}$, $R^{6a}$, $R^{1b}$, $R^{2b}$, $R^{3b}$, $R^{4b}$, $R^{5b}$, and $R^{6b}$ are independently selected from hydrogen atom, straight-chained or branched hydrocarbon groups having one to six carbon atoms, and hydrophilic groups, wherein the straight-chained or branched hydrocarbon group is optionally substituted with at least one hydrophilic group; A is a protective agent group that has a characteristic of modifying the singlet-triplet occupancy of the shown cyanine moiety, wherein A is optionally substituted with at least one hydrophilic group; M is a reactive crosslinking group or a group that can be converted to a reactive crosslinking group; n is an integer of at least 1 and up to 6; m is 0 or an integer of 1 to 6; p is 0 or an integer of 1 to 6; q is an integer of at least 1 and up to 16; and r is an integer of 1 to 4.

A first provision is made that any two adjacent groups selected from $R^{1a}$, $R^{2a}$, $R^{3a}$, and $R^{4a}$, and/or any two adjacent groups selected from $R^{1b}$, $R^{2b}$, $R^{3b}$, and $R^{4b}$, are optionally interconnected as an unsaturated hydrocarbon bridge. A second provision is made that any $CH_2$ group subtended by n, m, p, or q, and not connected to an oxygen atom or to the indolyl nitrogen atom, may independently be replaced with an amino linking group of the formula —NR—, where R is a hydrogen atom or hydrocarbon group having one to six carbon atoms. A third provision is made that any $CH_2$ group subtended by n, m, p, or q may independently be replaced with a carbonyl group. A fourth provision is made that any one or more $CH_2$ groups subtended by q may be replaced with an —O— linking atom. A fifth provision is made that the ring carbon atom bound to $R^{5a}$ and $R^{6a}$ groups, and/or the ring carbon atom bound to $R^{5b}$ and $R^{6b}$ groups, is optionally replaced with a ring oxygen atom.

In a first particular embodiment of Formula (1), at least one of $R^{1a}$, $R^{2a}$, $R^{3a}$, $R^{4a}$, $R^{5a}$, $R^{6a}$, $R^{1b}$, $R^{2b}$, $R^{3b}$, $R^{4b}$, $R^{5b}$, and $R^{6b}$ is an anionic, cationic, or neutral hydrophilic group or a hydrocarbon group substituted with at least one hydrophilic group. In a second particular embodiment of Formula (1), A is or includes a nitro-substituted aryl group, benzopyran group, cyclic polyene group, or a derivative thereof. In a third particular embodiment of Formula (1), M is or includes a COOR' group, maleimide group, azide group, or guanine group bound by its 6-oxygen atom, wherein R' is H, a hydrocarbon group having 1 to 6 carbon atoms, or an activated organoester group. In a fourth particular embodiment of Formula (1), m is an integer of 1 to 6. In a fifth particular embodiment of Formula (1), $R^{5a}$, $R^{6a}$, $R^{5b}$, and $R^{6b}$ are methyl groups.

The cyanine compositions described herein effectively circumvent undesirable photophysical dye behavior in both bulk and single-molecule contexts in the absence and presence of oxygen. In addition to improving the performance of dyes for fluorescence imaging experiments in vitro, this means of mitigating fluorophore photophysical processes can also be applied to in vivo fluorescence and FRET imaging at both the bulk and single-molecule scale. One embodiment of single-molecule imaging which demands high-illumination intensity and long-lived fluorescence employs a total internal reflection configuration. The present invention can also be applied to molecular imaging where increased illumination intensities are demanded for applications such as high-spatial and -time resolution measurements; cellular imaging where unwanted fluorophore photobleaching often limits the overall time and signal-to-noise ratio of the measurement; super-resolution imaging, which demands robust dye lifetime and blinking kinetics PCR; sequencing and microarray applications that have ever-increasing demands on sensitivity; light-based computer applications where fluorophore photobleaching determines the lifetime of the photoswitch; medical imaging diagnostics based on fluorescence detection; as well as nanoparticles, such as quantum dots, impregnated with dye-protective agent conjugates.

In another aspect, the invention is directed to a convenient and efficient method for synthesizing cyanine dye compounds of the Formula (1). The method advantageously permits independent derivatization of each end of the cyanine dye (i.e., on each indolyl unit), as well as a single step in which both indolyl units are simultaneously attached to a central polyene linker to afford the final product. Thus, by the novel method, any one of a wide variety of protective agent groups (A) can be facilely attached to a first indolyl unit, while any one of a wide variety of reactive crosslinking groups (M) can be independently and facilely attached to a second indolyl unit, thus providing a dye product containing any desired combination of protective agent and reactive crosslinking group upon reaction of the first and second indolyl units with a polyene linker. Moreover, by the method, the distance between the cyanine moiety and protective agent, or between cyanine moiety and reactive crosslinking group, can be precisely tailored by careful selection of a linker group attaching the cyanine moiety with any of these groups. Further, depending on the application, the dye molecule can be rendered substantially hydrophilic by inclusion of one or more hydrophilic (e.g., anionic, cationic, or neutral polar) groups, or moderately or substantially hydrophobic by not including such hydrophilic groups and/or by inclusion of hydrocarbon groups.

In particular embodiments, the method for preparing dye compounds according to Formula (1) includes reacting first and second indolyl derivatives according to the Formulas (2) and (3), respectively, with a dianilide compound according to Formula (4), by the following reaction:

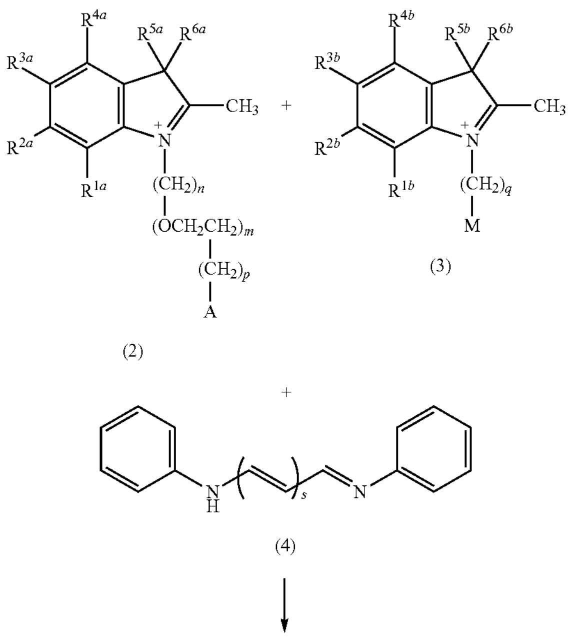

Compound of Formula (1)

In the dianilide compound (4), s is 0 or an integer of at least 1 and up to 3; and r in the product of Formula (1) is dependent on s according to the equation r=s+1;

In the first indolyl derivative according to Formula (2), $R^{1a}$, $R^{2a}$, $R^{3a}$, $R^{4a}$, $R^{5a}$, and $R^{6a}$ are independently selected from hydrogen atom, straight-chained or branched hydrocarbon groups having one to six carbon atoms, and hydrophilic groups, wherein the straight-chained or branched hydrocarbon group is optionally substituted with at least one hydrophilic group; A is a protective agent group that has a characteristic of modifying the singlet-triplet occupancy of the shown cyanine moiety, wherein A is optionally substituted with at least one hydrophilic group; n is an integer of at least 1 and up to 6; m is 0 or an integer of 1 to 6; and p is 0 or an integer of 1 to 6; any two adjacent groups selected from $R^{1a}$, $R^{2a}$, $R^{3a}$, and $R^{4a}$ are optionally interconnected as an unsaturated hydrocarbon bridge; any $CH_2$ group subtended by n, m, or p, and not connected to an oxygen atom or to the indolyl nitrogen atom, may independently be replaced with an amino linking group of the formula —NR—, where R is a hydrogen atom or hydrocarbon group having one to six carbon atoms; and any $CH_2$ group subtended by n, m, or p may independently be replaced with a carbonyl group; and the ring carbon atom bound to $R^{5a}$ and $R^{6a}$ groups is optionally replaced with a ring oxygen atom.

In the second indolyl derivative according to Formula (3), $R^{1b}$, $R^{2b}$, $R^{3b}$, $R^{4b}$, $R^{5b}$, and $R^{6b}$ are independently selected from hydrogen atom, straight-chained or branched hydrocarbon group having one to six carbon atoms, and hydrophilic groups, wherein the straight-chained or branched hydrocarbon group is optionally substituted with at least one hydrophilic group; M includes a reactive crosslinking group or a group that can be converted to a reactive crosslinking group; q is an integer of at least 1 and up to 16; any two adjacent groups selected from $R^{1b}$, $R^{2b}$, $R^{3b}$, and $R^{4b}$ are optionally interconnected as an unsaturated hydrocarbon bridge; any one or more $CH_2$ groups subtended by q, and not connected to an oxygen atom or to the indolyl nitrogen atom, may be replaced with an amino linking group of the formula —NR—, where R is a hydrogen atom or hydrocarbon group having one to six carbon atoms; and any one or more $CH_2$ groups subtended by q may independently be replaced with a carbonyl group; and any one or more $CH_2$ groups subtended by q may be replaced with an —O— linking atom; and the ring carbon atom bound to $R^{5b}$ and $R^{6b}$ groups is optionally replaced with a ring oxygen atom.

The synthetic procedure, described above, may further include synthesizing either or both the first and second indolyl derivatives, as further described below.

The first indolyl derivative (2) can be prepared by the following reaction:

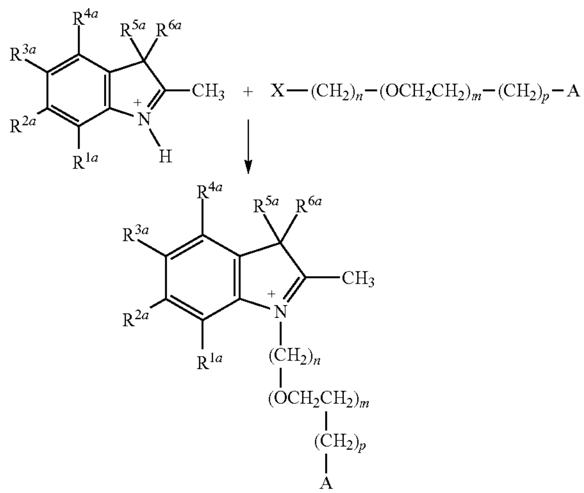

(2)

In the process shown above to synthesize indolyl derivative (2), $R^{1a}$, $R^{2a}$, $R^{3a}$, $R^{4a}$, $R^{5a}$, and $R^{6a}$ are independently selected from hydrogen atom, straight-chained or branched hydrocarbon groups having one to six carbon atoms, and hydrophilic groups, wherein the straight-chained or branched hydrocarbon group is optionally substituted with at least one hydrophilic group; A is a protective agent group that has a characteristic of modifying the singlet-triplet occupancy of the shown cyanine moiety, wherein A is optionally substituted with at least one hydrophilic group; X is a leaving group reactive with the indolyl nitrogen in the manner shown; n is an integer of at least 1 and up to 6; m is 0 or an integer of 1 to 6; and p is 0 or an integer of 1 to 6; any two adjacent groups selected from $R^{1a}$, $R^{2a}$, $R^{3a}$, and $R^{4a}$ are optionally interconnected as an unsaturated hydrocarbon bridge; any $CH_2$ group subtended by n, m, or p, and not connected to an oxygen atom or to the indolyl nitrogen atom, may independently be replaced with an amino linking group of the formula —NR—, where R is a hydrogen atom or hydrocarbon group having one to six carbon atoms; and any $CH_2$ group subtended by n, m, or p may independently be replaced with a carbonyl group; and the ring carbon atom bound to $R^{5a}$ and $R^{6a}$ groups is optionally replaced with a ring oxygen atom;

The second indolyl derivative (3) can be prepared by the following reaction:

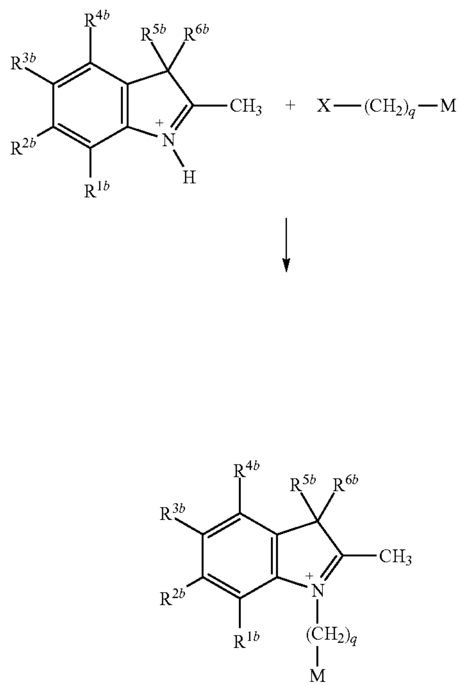

(3)

In the process shown above to synthesize indolyl derivative (3), $R^{1b}$, $R^{2b}$, $R^{3b}$, $R^{4b}$, $R^{5b}$, and $R^{6b}$ are independently selected from hydrogen atom, straight-chained or branched hydrocarbon group having one to six carbon atoms, and hydrophilic groups, wherein the straight-chained or branched hydrocarbon group is optionally substituted with at least one hydrophilic group; M includes a reactive crosslinking group or a group that can be converted to a reactive crosslinking group; X is a leaving group reactive with the indolyl nitrogen in the manner shown; q is an integer of at least 1 and up to 16; any two adjacent groups selected from $R^{1b}$, $R^{2b}$, $R^{3b}$, $R^{4b}$ are optionally interconnected as an unsaturated hydrocarbon bridge; any one or more $CH_2$ groups subtended by q, and not connected to an oxygen atom or to the indolyl nitrogen atom, may be replaced with an amino linking group of the formula —NR—, where R is a hydrogen atom or hydrocarbon group having one to six carbon atoms; and any one or more $CH_2$ groups subtended by q may independently be replaced with a carbonyl group; and any one or more $CH_2$ groups subtended by q may be replaced with an —O— linking atom; and the ring carbon atom bound to $R^{5b}$ and $R^{6b}$ groups is optionally replaced with a ring oxygen atom.

In another aspect, the invention is directed to a method for labeling a molecule or a material of interest (e.g., a biomolecule) with a dye compound described above. The method includes the step of reacting a molecule or material of interest with a dye compound according to Formula (1), wherein M in the dye compound is a crosslinking group reactive with groups on the molecule or material of interest.

In yet another aspect, the invention is directed to a dye-molecule conjugate produced by the above method, wherein the dye-molecule conjugate has the following structure:

(1-1)

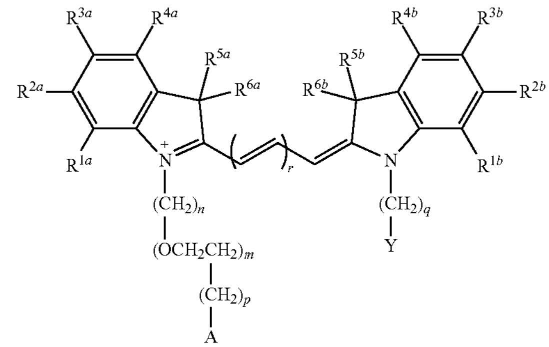

In Formula (1-1), all of the variables are as defined above, except that Y is a molecule or material of interest, such as a biomolecule. In particular embodiments, the biomolecule is a peptide-containing group (e.g., a peptide, dipeptide, oligopeptide, or protein) or a nucleotide-containing group (e.g., a nucleotide, dinucleotide, oligonucleotide, or nucleic acid).

DETAILED DESCRIPTION OF THE INVENTION

Figure 1:
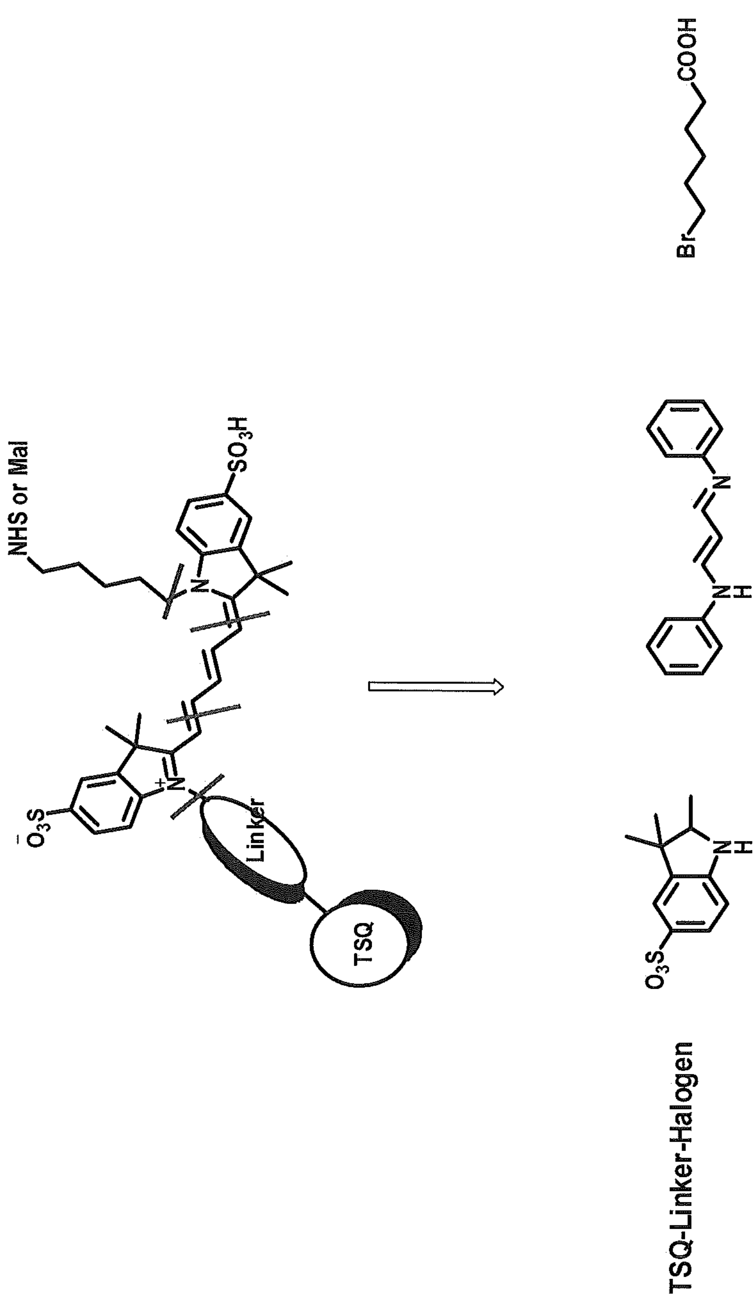
FIG. 1. Drawing showing a general retrosynthetic scheme for producing TSQ-conjugated Cy5 dyes of the invention. The retrosynthetic scheme can be expanded to other dyes (e.g., Cy3 and Cy 7) by selecting a different dianilide having a shorter or longer polyene moiety, respectively, and to a range of TSQ and reactive crosslinking groups, as well as linker structure and length.

As used herein, the term "about" generally indicates within ±0.5, 1, 2, 5, or 10% of the indicated value. For example, in its broadest sense, the phrase "about 100° C." can mean 100° C.±10%, which indicates 100±10° C. or 90-110° C.

The terms "hydrocarbon group" and "hydrocarbon linker", also designated as "R", are, in a first embodiment, composed solely of carbon and hydrogen. In different embodiments, one or more of the hydrocarbon groups or linkers can contain precisely, or a minimum of, or a maximum of, for example, one, two, three, four, five, six, seven, eight, nine, ten, eleven, twelve, thirteen, fourteen, fifteen, sixteen, seventeen, eighteen, nineteen, or twenty carbon atoms, or a number of carbon atoms within a particular range bounded by any two of the foregoing carbon numbers. Hydrocarbon groups or linkers in different compounds described herein, or in different positions of a compound, may possess the same or different number (or preferred range thereof) of carbon atoms in order to independently adjust or optimize the activity or other characteristics of the compound.

The hydrocarbon groups or linkers can be, for example, saturated and straight-chained (i.e., straight-chained alkyl groups or alkylene linkers). Some examples of straight-chained alkyl groups (or alkylene linkers) include methyl (or methylene linker, i.e., —$CH_2$—, or methine linker), ethyl (or ethylene or dimethylene linker, i.e., —$CH_2CH_2$-linker), n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, and n-eicosyl groups (or their respective linker analogs).

The hydrocarbon groups or linkers can alternatively be saturated and branched (i.e., branched alkyl groups or alkylene linkers). Some examples of branched alkyl groups include isopropyl, isobutyl, sec-butyl, t-butyl, isopentyl, neopentyl, 2-methylpentyl, 3-methylpentyl, and the numerous $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, and $C_{20}$ saturated and branched hydrocarbon groups. Some examples of branched alkylene linkers are those derived by removal of a hydrogen atom from one of the foregoing exemplary branched alkyl groups (e.g., isopropylene, —$CH(CH_3)CH_2$—).

The hydrocarbon groups or linkers can alternatively be saturated and cyclic (i.e., cycloalkyl groups or cycloalkylene linkers). Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane). Some examples of cycloalkylene linkers are those derived by removal of a hydrogen atom from one of the foregoing exemplary cycloalkyl groups.

The hydrocarbon groups or linkers can alternatively be unsaturated and straight-chained (i.e., straight-chained olefinic or alkenyl groups or linkers). The unsaturation occurs by the presence of one or more carbon-carbon double bonds and/or one or more carbon-carbon triple bonds. Some examples of straight-chained olefinic groups include vinyl, propen-1-yl (allyl), 3-buten-1-yl ($CH_2$═CH—$CH_2$—$CH_2$—), 2-buten-1-yl ($CH_2$—CH═CH—$CH_2$—), butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, propargyl (2-propynyl), and the numerous $C_7$, $C_8$, $C_9$, $C_{10}$, $C_{11}$, $C_{12}$, and higher unsaturated and straight-chained hydrocarbon groups. Some examples of straight-chained olefinic linkers are those derived by removal of a hydrogen atom from one of the foregoing exemplary straight-chained olefinic groups (e.g., vinylene, —CH═CH—, or vinylidene).

The hydrocarbon groups or linkers can alternatively be unsaturated and branched (i.e., branched olefinic or alkenyl groups or linkers). Some examples of branched olefinic groups include propen-2-yl, 3-buten-2-yl ($CH_2$═CH—CH.—$CH_3$), 3-buten-3-yl ($CH_2$═C.—$CH_2$—$CH_3$), 4-penten-2-yl, 4-penten-3-yl, 3-penten-2-yl, 3-penten-3-yl, 2,4-pentadien-3-yl, and the numerous $C_6$, $C_7$, $C_8$, $C_9$, $C_{10}$, $C_{11}$, $C_{12}$, and higher unsaturated and branched hydrocarbon groups. Some examples of branched olefinic linkers are those derived by removal of a hydrogen atom from one of the foregoing exemplary branched olefinic groups.

The hydrocarbon groups or linkers can alternatively be unsaturated and cyclic (i.e., cycloalkenyl groups or cycloalkenylene linkers). The unsaturated and cylic group can be aromatic or aliphatic. Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group can also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene. Some examples of cycloalkenylene linkers are those derived by removal of a hydrogen atom from one of the foregoing exemplary cycloalkenyl groups (e.g., phenylene and biphenylene).

One or more of the hydrocarbon groups or linkers may or may not also include one or more heteroatoms (i.e., non-carbon and non-hydrogen atoms), such as one or more heteroatoms selected from oxygen, nitrogen, sulfur, and halide atoms, as well as groups containing one or more of these heteroatoms (i.e., heteroatom-containing groups). Some examples of oxygen-containing groups include hydroxy (OH), carbonyl-containing (e.g., carboxylic acid, ketone, aldehyde, carboxylic ester, amide, and urea functionalities), nitro ($NO_2$), carbon-oxygen-carbon (ether), sulfonyl, and sulfinyl (i.e., sulfoxide), and amine oxide groups. The ether group can also be a polyalkyleneoxide group, such as a polyethyleneoxide group. Some examples of nitrogen-containing groups include primary amine, secondary amine, tertiary amine, quaternary amine, cyanide (i.e., nitrile), amide (i.e., —C(O)$NR_2$ or —NRC(O), wherein R is independently selected from hydrogen atom and hydrocarbon group, as described above), nitro, urea, imino, and carbamate, wherein it is understood that a quaternary amine group necessarily possesses a positive charge and requires a counteranion. Some examples of sulfur-containing groups include mercapto (i.e., —SH), thioether (i.e., sulfide), disulfide, sulfoxide, sulfone, sulfonate, and sulfate groups. Some examples of halide atoms considered herein include fluorine, chlorine, and bromine. One or more of the heteroatoms described above (e.g., oxygen, nitrogen, and/or sulfur atoms) can be inserted between carbon atoms (e.g., as —O—, —NR—, or —S—) in any of the hydrocarbon groups described above to form a heteroatom-substituted hydrocarbon group or linker. Alternatively, or in addition, one or more of the heteroatom-containing groups can replace one or more hydrogen atoms on the hydrocarbon group or linker.

In particular embodiments, the hydrocarbon group is, or includes, a cyclic group. The cyclic hydrocarbon group may be, for example, monocyclic by containing a single ring without connection or fusion to another ring. The cyclic hydrocarbon group may alternatively be, for example, bicyclic, tricyclic, tetracyclic, or a higher polycyclic ring system by having at least two rings interconnected and/or fused.

In some embodiments, the cyclic hydrocarbon group is carbocyclic, i.e., does not contain ring heteroatoms (i.e., only ring carbon atoms). In different embodiments, ring carbon atoms in the carbocylic group are all saturated, or a portion of the ring carbon atoms are unsaturated, or the ring carbon atoms are all unsaturated (as found in aromatic carbocyclic groups, which may be monocyclic, bicyclic, tricylic, or higher polycyclic aromatic groups).

In some embodiments, the hydrocarbon group is, or includes, a cyclic or polycyclic group that includes at least one ring heteroatom (for example, one, two, three, four, or higher number of heteroatoms). Such ring heteroatom-substituted cyclic groups are referred to herein as "heterocyclic groups". As used herein, a "ring heteroatom" is an atom other than carbon and hydrogen (typically, selected from nitrogen, oxygen, and sulfur) that is inserted into, or replaces a ring carbon atom in, a hydrocarbon ring structure. In some embodiments, the heterocyclic group is saturated, while in other embodiments, the heterocyclic group is unsaturated (i.e., aliphatic or aromatic heterocyclic groups, wherein the aromatic heterocyclic group is also referred to herein as a "heteroaromatic ring", or a "heteroaromatic fused-ring system" in the case of at least two fused rings, at least one of which contains at least one ring heteroatom). In some embodiments, the heterocyclic group is bound via one of its ring carbon atoms to another group (i.e., other than hydrogen atom and adjacent ring atoms), while the one or more ring heteroatoms are not bound to another group. In other embodiments, the heterocyclic group is bound via one of its heteroatoms to another group, while ring carbon atoms may or may not be bound to another group.

Some examples of saturated heterocyclic groups include those containing at least one oxygen atom (e.g., oxetane, tetrahydrofuran, tetrahydropyran, 1,4-dioxane, 1,3-dioxane, and 1,3-dioxepane rings), those containing at least one nitrogen atom (e.g., pyrrolidine, piperidine, piperazine, imidazolidine, azepane, and decahydroquinoline rings), those containing at least one sulfur atom (e.g., tetrahydrothiophene, tetrahydrothiopyran, 1,4-dithiane, 1,3-dithiane, and 1,3-dithiolane rings), those containing at least one oxygen atom and at least one nitrogen atom (e.g., morpholine and oxazolidine rings), those containing at least one oxygen atom and at least one sulfur atom (e.g., 1,4-thioxane), and those containing at least one nitrogen atom and at least one sulfur atom (e.g., thiazolidine and thiamorpholine rings).

Some examples of unsaturated heterocyclic groups include those containing at least one oxygen atom (e.g., furan, pyran, 1,4-dioxin, and dibenzodioxin rings), those containing at least one nitrogen atom (e.g., pyrrole, imidazole, pyrazole, pyridine, pyrazine, pyrimidine, 1,3,5-triazine, azepine, diazepine, indole, purine, benzimidazole, indazole, 2,2'-bipyridine, quinoline, isoquinoline, phenanthroline, 1,4,5,6-tetrahydropyrimidine, 1,2,3,6-tetrahydropyridine, 1,2,3,4-tetrahydroquinoline, quinoxaline, quinazoline, pyridazine, cinnoline, 5,6,7,8-tetrahydroquinoxaline, 1,8-naphthyridine, and 4-azabenzimidazole rings), those containing at least one sulfur atom (e.g., thiophene, thianaphthene, and benzothiophene rings), those containing at least one oxygen atom and at least one nitrogen atom (e.g., oxazole, isoxazole, benzoxazole, benzisoxazole, oxazoline, 1,2,5-oxadiazole (furazan), and 1,3,4-oxadiazole rings), and those containing at least one nitrogen atom and at least one sulfur atom (e.g., thiazole, isothiazole, benzothiazole, benzoisothiazole, thiazoline, and 1,3,4-thiadiazole rings).

In some embodiments, the hydrocarbon group includes at least one (for example, one, two, three, or four) water-solubilizing (i.e., hydrophilic) groups, which may be charged (i.e., anionic or cationic groups) or neutral hydrophilic groups. Some examples of anionic groups include sulfonate (—$SO_3^-$), sulfate (—$OSO_3^-$), carboxylate, phosphate, phosphonate, and phosphite, as well as ammonium salt, metal salt, and protonated versions of these. Some examples of cationic groups include ammonium groups, which can be represented by the formula —$NR_3^+$, wherein the R groups are independently selected from H atoms and hydrocarbon groups, e.g., all H atoms, or one, two, or three being hydrocarbon groups. Some examples of neutral hydrophilic groups include carboxamide, hydroxy, alkoxy (OR), nitro, ethyleneoxy, diethyleneoxy, polyethyleneoxy, amine, sulfonamide, and halide groups. In particular embodiments, the hydrocarbon groups includes at least one sulfonate group. Some examples of hydrocarbon groups substituted with hydrophilic groups include methylsulfonate, ethyl-2-sulfonate, n-propyl-3-sulfonate, n-butyl-4-sulfonate, n-pentyl-5-sulfonate, n-hexyl-6-sulfonate, carboxymethyl, carboxyethyl, methylphosphonate, ethyl-2-phosphonate, n-propyl-3-phosphonate, n-butyl-4-phosphonate, n-pentyl- 5-phosphonate, n-hexyl-6-phosphonate, 2-hydroxyethyl, 2-hydroxyethylene-oxyethyl, trifluoromethyl, and trifluoromethoxy groups.

The term "cyanine dye", as used herein, refers to any of the dyes, known in the art, that include two indolyl or benzoxazole ring systems interconnected by a conjugated polyene linker. Some particular examples of cyanine dyes are the Cy® family of dyes, which include, for example, Cy2, Cy3, Cy3B, Cy3.5, Cy5, Cy5.5, Cy7, and Cy9. The term "cyanine moiety", as used herein, generally includes the bis-indolyl-polyene or bis-benzoxazolyl-polyene system, but excludes groups attached to the ring nitrogen atoms in the indolyl or benzoxazolyl groups.

The term "protective agent" (PA), as used herein, is a group that has a characteristic of modifying the photophysical properties (particularly, the singlet-triplet occupancy) of the cyanine moiety. Thus, the protective agent may be considered a "quencher" or "triplet state quencher" or "fluorescence modifier". The ability of a molecule to function as a protective agent is often evidenced by its ability to alter the blinking and/or photobleaching characteristics of a fluorophore.

In a first particular embodiment, the protective agent is a benzopyran group. The benzopyran group can be benzopyran itself, or a derivative of benzopyran. The benzopyran group can have the following structural formula:

(A)

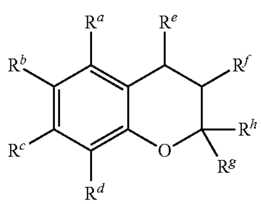

In Formula (A) above, $R^a$, $R^b$, $R^c$, $R^d$, $R^e$, $R^f$, $R^g$, and $R^h$ are independently selected from hydrogen atom, any of the hydrocarbon groups (R), as described above, any of the anionic groups, as described above, or any of the heteroatom groups (e.g., amino, hydroxy, carboxy, and carboxamide) described above, wherein the hydrocarbon group may or may not be heteroatom-substituted and may or may include an anionic group. Moreover, since Formula (A) represents a group, one of $R^a$, $R^b$, $R^c$, $R^d$, $R^e$, $R^f$, $R^g$, and $R^h$ (and more typically, $R^g$ or $R^h$) represents a bond or a heteroatom-containing linking group (e.g., —C(O)NH—) bonded to the cyanine moiety or to a linker bound to the cyanine moiety. In particular embodiments, seven of $R^a$, $R^b$, $R^c$, $R^d$, $R^e$, $R^f$, $R^g$, and $R^h$ are hydrogen atoms, with the remaining group functioning as a bond directly or indirectly to the cyanine moiety. In other embodiments, one, two, three, or four of $R^a$, $R^b$, $R^c$, $R^d$, $R^e$, $R^f$, and $R^g$ are hydrocarbon groups, particularly methyl or ethyl groups, and particularly for $R^a$, $R^c$, $R^d$, and $R^g$. In other particular embodiments, at least one of $R^a$, $R^b$, $R^c$, $R^d$, $R^e$, $R^f$, $R^g$, and $R^h$ independently represents a carboxylate, carboxylic acid, hydroxy, or alkoxy group.

In a particular embodiment of Formula (A), the protective agent is a chromanol group, wherein $R^h$ in Formula (A) is a hydroxy group. The chromanol group has the following structural formula:

(A-1)

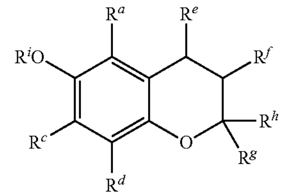

In Formula (A-1), $R^a$, $R^b$, $R^c$, $R^d$, $R^e$, $R^f$, $R^g$, and $R^h$ have any of the meanings provided above, and $R^i$ can be a hydrogen atom, hydrocarbon group, or a bond to the cyanine moiety or to a linker bound to the cyanine moiety. In particular embodiments of Formula (A-1), one, two, three, or all of $R^a$, $R^c$, $R^d$, and $R^g$ are methyl groups. In another embodiment, $R^h$ is a carbonyl, ester, carboxy, amino, amido, or ureido linking group. In other embodiments, $R^g$ and $R^h$ are independently selected from methyl, ethyl, vinyl, allyl, n-propyl, n-butyl, isobutyl, t-butyl, and/or hydrogen (H) groups. In particular embodiments, $R^g$ and $R^h$ are both methyl groups, both hydrogen atoms, or one is methyl and the other hydrogen. In other particular embodiments, $R^g$ is a long chain hydrocarbon group (e.g., of at least 4, 5, 6, 7, 8, 9, 10, 11, 12, 13, 14, 15, or 16 carbon atoms). For example, $R^g$ can be an unsaturated group that results in Formula (A-1) being a tocopherol, or tocotrienol, or derivative thereof.

In a particular embodiment of Formula (A-1), the chromanol group is a Trolox (Tx) group, which has the following formula:

(A-2)

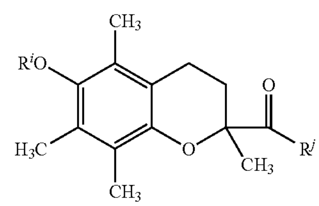

In Formula (A-2), $R^j$ is, in one embodiment, be a non-linker, such as —OH, —OR, or $—NR_2$, where R is independently H or a hydrocarbon group. In the latter embodiment, another portion of the Trolox molecule (e.g., $R^i$) functions to link the Trolox molecule directly or indirectly to the cyanine moiety. In another embodiment, $R^j$ is a bond, either directly or indirectly to the cyanine moiety, or $R^j$ is a heteroatom-containing linker (e.g., —O—, —NR—, or —NRC(O)—) that bonds the Trolox group directly or indirectly to the cyanine moiety.

In a second particular embodiment, the protective agent is a nitro-substituted aromatic (aryl) group in which the aryl group can be monocyclic, bicyclic, tricylic, or a higher polycyclic. Typically, the nitro-substituted aryl group contains one or two nitro groups. Some examples of nitro-substituted aryl groups include o-, m-, and p-nitrophenyl, dinitrophenyl, o-, m-, and p-nitrobenzyl, dinitrobenzyl, nitronaphthalenes, nitrobiphenyls, and nitro derivatives of any of the polycyclic aromatic hydrocarbons described above, as well as derivatives thereof, such as by inclusion of one or more methyl, hydroxyl, hydroxyalkyl, and carboxy groups. Some examples of derivatives of the above nitro-substituted aryl groups include the nitrotoluenes, o-, m-, or p-nitrobenzyl alcohol (NBA), 2,6-dinitrobenzyl alcohol, 3,4-dinitrobenzyl alcohol, halo-substituted nitrobenzyl alcohol, chloroamphenicol, o-, m-, or p-nitrobenzyl amine, and picric acid. The nitro-substituted aryl group is generally bound, either directly or indirectly to the cyanine moiety, by one of its aryl ring carbon atoms or by a heteroatom other than the nitro group, if present.

In a third particular embodiment, the protective agent is a conjugated polyene molecule or group. The conjugated polyene considered herein can be, for example, straight-chained or branched, and either cyclic or acyclic. In different embodiments, the conjugated polyene can contain, for example, two, three, four, five, six, seven, eight, nine, or ten conjugated carbon-carbon double bonds. The conjugated polyene can, in addition, include one or more carbon-carbon triple bonds. In some embodiments, the protective agent contains two or more carbon-carbon triple bonds conjugated with each other. In such a case, the protective can be considered a polyyne.

In a particular embodiment, the conjugated polyene is a cyclic polyene, such as an annulene. The annulenes particularly considered herein are those containing greater than six carbon atoms and/or more than three conjugated carbon-carbon double bonds. The annulene can be aromatic or non-aromatic. Some examples of annulenes particularly considered herein include cyclooctatetraene (i.e., [8]annulene or COT), [10]annulene, [12]annulene, [14]annulene, [16]annulene, and [18]annulene. The annulene may or may not also include one or more carbon-carbon triple bonds. The protective agent may also be a cyclic system containing two, three, four, or more carbon-carbon triple bonds, which is herein referred to as an annulyne. The annulene or annulyne can also be functionalized with any number of hydrocarbon groups, heteroatom-functionalized forms thereof, and heteroatom groups.

In a fourth particular embodiment, the protective agent is a bicyclic, tricyclic, or higher cyclic ring system containing at least two, three, or four ring nitrogen atoms. Some examples of such bicyclic groups include 1,4-diazacyclohexane, 1,4,7-triazacyclononane, and 1,4,7,10-tetraazacyclododecane groups. Some examples of such tricyclic groups include 1,4-diazabicyclo[2.2.2]octane (DABCO), 1,4-diazabicyclo[2.2.1]heptane, 1,5-diazabicyclo[3.2.2]nonane, 1,5-diazabicyclo[3.3.2]decane, 1,5-diazabicyclo[3.3.3]undecane, 1,6-diazabicyclo[4.3.0]nonane, 1,6-diazabicyclo[4.4.0]decane, 1,6-diazabicyclo[4.3.3]dodecane, 1,6-diazabicyclo[4.4.3]tridecane, and 1,6-diazabicyclo[4.4.4]tetradecane groups. The bicyclic, tricyclic, or higher cyclic ring system may or may not be derivatized with one or more other heteroatoms (e.g., oxygen, sulfur, phosphorus, and halide atoms) and/or heteroatom groups (e.g., carbonyl, ester, carboxyl, amino, amido, and the like). The bicyclic, tricyclic, or higher cyclic ring system may or may not also contain alkenyl or alkynyl groups.

In a fifth particular embodiment, the protective agent is a mercaptan (i.e., hydrocarbon group containing a —SH group). The mercaptan (i.e., thiol) can be a group on any of the hydrocarbon groups described above. For example, the thiol can be thiophenol, 1,4-benzenedithiol, 1,3,5-benzentrithiol, a thionaphthol, or a thioanthracenol (e.g., 9-thioanthracenol). In a particular embodiment, the thiol is a mercapto-substituted straight-chained alcohol, such as β-mercaptoethanol, 3-mercaptopropanol, 4-mercaptobutanol, 5-mercaptopentanol, 6-mercaptohexanol, 7-mercaptoheptanol, and 8-mercaptooctanol. In another particular embodiment, the thiol is a mercapto-substituted straight-chained amine, such as β-mercaptoethylamine, 3-mercaptopropylamine, 4-mercaptobutylamine, 5-mercaptopentylamine, 6-mercaptohexylamine, 7-mercaptoheptylamine, and 8-mercaptooctylamine. In the mercaptan groups, the thiol group, hydroxyl group, and/or amino group can be substituted with one or more hydrocarbon groups, thereby resulting, respectively, in a thioether, ether, and secondary or tertiary amino group.

In a sixth particular embodiment, the protective agent is a phenolic derivative. Some examples of phenolic derivatives include the cresols, butylated phenols (e.g., butylated hydroxytoluene, i.e., BHT), naphthols, anthracenols (e.g., 9-anthracenol), and the like. In a particular embodiment, the phenolic derivative is a polyphenol molecule. Some examples of polyphenol molecules include dihydroquinone, catechol, resorcinol, 1,3,5-trihydroxybenzene, gallic acid and esters thereof (e.g., n-propyl gallate and gallic acid esters of glucose or other sugar), pyrogallol, the flavonoids, flavonols, flavones, catechins, flavanones, anthocyanidins, and isoflavonoids. The phenolic derivative can also be an etherified phenol, wherein the etherifying group can be, for example, a hydrocarbon group, particularly an alkyl group, such as a methyl, ethyl, or isopropyl group.

Any of the protective agents described above can also be derivatized with one, two, three, or more water-solubilizing (i.e., hydrophilic) groups, which may be neutral, anionic, or cationic groups, as described above, such as carboxy, carboxamide, sulfonate, sulfate, hydroxy, alkoxy, nitro, phosphate, phosphonate, ethyleneoxy, diethyleneoxy, polyethyleneoxy, sulfonamide, halide, and ammonium groups. Some examples of hydrophilized derivatives of the cyclic polyenes include 1,2-dicarboxycyclooctatetraene, 3-hydroxypropylcyclooctatetrane, sulfonatocyclooctetraene, and 3-sulfonatopropylcyclooctatetraene, wherein the latter derivative is also designated as "SCOT".

The term "reactive crosslinking group", as used herein, is any group that can crosslinkably react with chemical groups of a molecule or material of interest. For example, by including a reactive crosslinking group on the cyanine dye compounds described herein, the cyanine dye compound can be made to attach to a molecule or material of interest by forming a crosslinking bond thereto. Some examples of reactive crosslinking groups include amino-reactive, carboxy-reactive, thiol-reactive, alcohol-reactive, phenol-reactive, aldehyde-reactive, and ketone-reactive groups. Some examples of amino-reactive groups include carboxy groups (—COOR', where R' is H or hydrocarbon group), activated ester groups (—COOR', where R' is a carboxy-activating group, such as deprotonated N-hydroxysuccinimide, i.e., NHS), carbodiimide ester groups (e.g., EDC), tetrafluorophenyl esters, dichlorophenol esters, epoxy (e.g., glycidyl) groups, isothiocyanate, sulfonylchloride, dichlorotriazines, aryl halides, and azide ("N3"), and sulfo-derivatives thereof, and combinations thereof. Some examples of carboxy-reactive groups include amino groups and hydroxyalkyl groups, typically in the presence of a carboxy group activator to form an activated ester. Some examples of thiol-reactive groups include maleimido ("Mal") groups, haloacetamide (e.g., iodoacetamide) groups, disulfide groups, thiosulfate, and acryloyl groups. Some examples of alcohol-reactive and phenol-reactive groups include aldehydes, ketones, haloalkyl, isocyanate, and epoxy (e.g., glycidyl) groups. Some examples of aldehyde-reactive and ketone-reactive groups include phenol, hydrazide, semicarbazide, carbohydrazide, and hydroxylamine groups. Other reactive crosslinking groups include 6-oxyguanine groups and phosphoramidite groups. The term "reactive crosslinking group" can further encompass any larger group (e.g., a hydrocarbon group, such as a cyclic or aromatic hydrocarbon) on which the reactive crosslinking group is attached. For example, a 6-oxyguanine group may include a ring-containing linking moiety attached to the 6-oxy atom for attaching to the linking portion in Formula (1). In other embodiments, the reactive crosslinking group may be derivatized, such as by including any of the hydrophilic groups described above, such as sulfonate (e.g., a sulfo-NHS group), carboxy, hydroxy, or halide groups.

The reactive crosslinking group can also be a group that selectively targets (i.e., binds to and/or reacts with) another molecule. In particular embodiments, the selective targeting group is a group that can engage in an affinity bond. Some examples of reactive crosslinking groups that can engage in an affinity bond are biotin (which forms an affinity bond with avidin or streptavidin); avidin or streptavidin (which forms an affinity bond with a biotin molecule); an antibody or fragment thereof that can specifically bind to a molecule bearing an epitope reactive with the antibody; a peptide, oligopeptide, or lectin that can specifically bind to another biomolecule; or a nucleic acid, nucleoside, nucleotide, oligonucleotide, or nucleic acid (DNA or RNA strand) or vector that specifically binds to a complimentary strand.

The reactive crosslinking group may originate from a group (i.e., precursor) that can be converted to a reactive crosslinking group. For example, a carboxylic acid group can be converted, by methods well known in the art, to an activated ester group.

In some embodiments, any of one or more classes or specific types of protective agents described above is excluded. In other embodiments, any of one or more classes or specific types of reactive crosslinking groups described above is excluded.

In a first aspect, the invention is directed to cyanine dye compounds of the following formula:

(1)

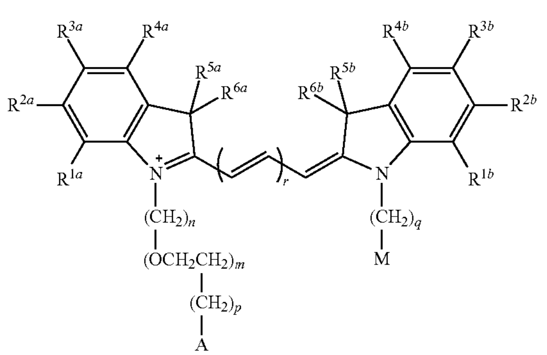

In Formula (1) above, $R^{1a}$, $R^{2a}$, $R^{3a}$, $R^{4a}$, $R^{5a}$, $R^{6a}$, $R^{1b}$, $R^{2b}$, $R^{3b}$, $R^{4b}$, $R^{5b}$, and $R^{6b}$ (the R groups) are independently selected from hydrogen atom, straight-chained or branched hydrocarbon groups having one to six carbon atoms, and hydrophilic groups, such as anionic, cationic, or neutral hydrophilic groups, as described above. The straight-chained or branched hydrocarbon groups may or may not (i.e., can optionally) include any of the anionic, cationic, or neutral hydrophilic groups described above, and may or may not be heteroatom-substituted with any of the heteroatoms or heteroatom $R^{2a}$, $R^{3a}$, $R^{4a}$, $R^{5a}$, groups described above. In one particular embodiment, all of $R^{1a}$, $R^{2a}$, $R^{3a}$, $R^{4a}$, $R^{5a}$, $R^{6a}$, $R^{1b}$, $R^{2b}$, $R^{3b}$, $R^{4b}$, $R^{5b}$, and $R^{6b}$ are hydrogen atoms. In another particular embodiment, one, two, three, four, or more of the R groups are straight-chained or branched hydrocarbon groups, with the remainder being independently selected from H atoms and hydrophilic groups. In some embodiments, one, two, three, four, or more of $R^{1a}$, $R^{2a}$, $R^{3a}$, $R^{4a}$, $R^{1b}$, $R^{2b}$, $R^{3b}$, and $R^{4b}$ are straight-chained or branched hydrocarbon groups, with the remainder being independently selected from H atoms and hydrophilic groups. In other embodiments, one, two, three, or all four of $R^{5a}$, $R^{6a}$, $R^{5b}$, and $R^{6b}$ are straight-chained or branched hydrocarbon groups, with the remainder being independently selected from H atoms and hydrophilic groups.

The group "A" in Formula (1) is a protective agent group that has a characteristic of modifying the singlet-triplet occupancy of the shown cyanine moiety. Group A can be any of the protective agents described above, and is optionally substituted with at least one anionic, cationic, or neutral hydrophilic group.

The group "M" in Formula (1) is a reactive crosslinking group or a group that can be converted to a reactive crosslinking group. Group M can be any of the reactive crosslinking groups or precursors thereof, described above.

The subscript n in Formula (1) is an integer of at least 1 and up to 6, or an integer of precisely 1, 2, 3, 4, 5, or 6. In different embodiments, n is an integer of at least 1 and up to 2, 3, 4, 5, or 6, or at least 2 and up to 3, 4, 5, or 6, or at least 3 and up to 4, 5, or 6, or at least 4 and up to 5 or 6.

The subscript m in Formula (1) is 0 or an integer of 1 to 6, or an integer of precisely 1, 2, 3, 4, 5, or 6. In different embodiments, m is an integer of at least 1 and up to 2, 3, 4, 5, or 6, or at least 2 and up to 3, 4, 5, or 6, or at least 3 and up to 4, 5, or 6, or at least 4 and up to 5 or 6.

The subscript p in Formula (1) is 0 or an integer of 1 to 6, or an integer of precisely 1, 2, 3, 4, 5, or 6. In different embodiments, m is an integer of at least 1 and up to 2, 3, 4, 5, or 6, or at least 2 and up to 3, 4, 5, or 6, or at least 3 and up to 4, 5, or 6, or at least 4 and up to 5 or 6.

The subscript q in Formula (1) is an integer of at least 1 and up to 16. In different embodiments, q is an integer of 1, 2, 3, 4, 5, 6, 7, 8, 9, 10, 11, 12, 13, 14, 15, or 16, or q is an integer within a range bounded by any two of the foregoing values.

The subscript r in Formula (1) is an integer of 1 to 4, or an integer of precisely 1, 2, 3, or 4 or within a range therein. When r is 1, the cyanine compound corresponds to a Cy3 derivative. When r is 2, the cyanine compound corresponds to a Cy5 derivative. When r is 3, the cyanine compound corresponds to a Cy7 derivative. When r is 4, the cyanine compound corresponds to a Cy9 derivative.

In Formula (1), any two adjacent groups selected from $R^{1a}$, $R^{2a}$, $R^{3a}$, and $R^{4a}$, and/or any two adjacent groups selected from $R^{1b}$, $R^{2b}$, $R^{3b}$, and $R^{4b}$, may or may not be interconnected as an unsaturated hydrocarbon bridge. Typically, the unsaturated hydrocarbon bridge contains three, four, or five carbon atoms, to result in a five-, six-, or seven-membered fused ring, respectively. The unsaturated hydrocarbon bridge may or may not have one or more ring carbon atoms replaced with a heteroatom, and may or may not have one or more of its hydrogen atoms substituted one or more heteroatom-containing groups. In some embodiments, two of $R^{1a}$, $R^{2a}$, $R^{3a}$, and $R^{4a}$ are engaged in a bridging group while none of $R^{1b}$, $R^{2b}$, $R^{3b}$, and $R^{4b}$ are engaged in a bridging group, while in other embodiments, none of $R^{1a}$, $R^{2a}$, $R^{3a}$, and $R^{4a}$ are engaged in a bridging group while two of $R^{1b}$, $R^{2b}$, $R^{3b}$, and $R^{4b}$ are engaged in a bridging group, while in other embodiments, two of $R^{1a}$, $R^{2a}$, $R^{3a}$, and $R^{4a}$ are engaged in a bridging group and two of $R^{1b}$, $R^{2b}$, $R^{3b}$, and $R^{4b}$ are engaged in a bridging group. When two bridging groups are present, the bridging groups may be the same or different.

For example, in a particular set of embodiments, $R^{3a}$ and $R^{4a}$ are interconnected, and $R^{3b}$ and $R^{4b}$ are separately interconnected as butadienyl linking groups, to provide a cyanine dye with two tricyclic ring systems, as shown by the following formula:

(1-1)

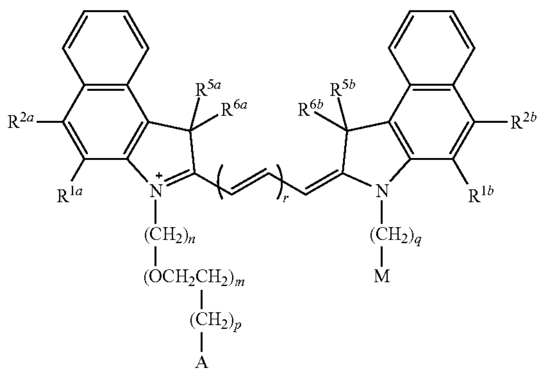

In Formula (1) or (1-1), any $CH_2$ group subtended by n, m, p, or q, and not connected to an oxygen atom or to the indolyl nitrogen atom, may independently be replaced with an amino linking group of the formula —NR—, where R is a hydrogen atom or hydrocarbon group having one to six carbon atoms. Some examples of linking portions containing amino replacements include those having the following formulas:

$-(CH_2)_n-(OCH_2CH_2)_m-NH-A$ $-(CH_2)_n-(OCH_2CH_2)_m-NH-(CH_2)_{p-1}-A$ $-(CH_2)_n-NH-A$ $-(CH_2)_n-NH-(CH_2)_{p-1}-A$ $-NH-(CH_2)_{n-1}-(OCH_2CH_2)_m-(CH_2)_p-A$ $-NH-(CH_2)_{n-1}-(OCH_2CH_2)_m-NH-A$ $-NH-(CH_2)_{n-1}-(OCH_2CH_2)_m-NH-(CH_2)_{p-1}-A$ $-NH-(CH_2)_{n-1}-NH-A$ $-NH-(CH_2)_{n-1}-NH-(CH_2)_{p-1}-A$ $-(CH_2)_{q-1}-NH-M$ $-NH-(CH_2)_{q-1}-M$ $-NH-(CH_2)_{q-2}-NH-M$ $-(CH_2)_{q-2}-NH-CH_2-M$

In Formula (1), any $CH_2$ group subtended by n, m, p, or q may independently be replaced with a carbonyl group. Some examples of linking portions containing carbonyl replacements include those having the following formulas:

$-(CH_2)_n-(OCH_2CH_2)_m-C(O)-A$ $-(CH_2)_n-(OCH_2CH_2)_m-C(O)-(CH_2)_{p-1}-A$ $-(CH_2)_n-C(O)-A$

-continued $-(CH_2)_n-C(O)-(CH_2)_{p-1}-A$ $-C(O)-(CH_2)_{n-1}-(OCH_2CH_2)_m-(CH_2)_p-A$ $-(CH_2)_{q-1}-C(O)-M$ $-C(O)-(CH_2)_{q-1}-M$ $-C(O)-(CH_2)_{q-2}-C(O)-M$ $-(CH_2)_{q-2}-C(O)-CH_2-M$ In the above exemplary linking groups, carbonyl and amine groups may also be in the same linking group, either positioned adjacent to each other (thereby forming a carboxamide group) or positioned on either side of an alkylene linking moiety. If positioned adjacent to an oxygen atom, the linking group contains an ester group. In different embodiments, an ester group or carboxamide may be included or excluded in the linker group.

In Formula (1), any one or more $CH_2$ groups subtended by q may be replaced with an —O— linking atom. Some examples of linking portions containing oxide replacements include those having the following formulas:

$-(CH_2)_{q-1}-O-M$ $-O-(CH_2)_{q-1}-M$ $-O-(CH_2)_{q-2}-O-M$ $-(CH_2)_{q-2}-O-CH_2-M$ $-(CH_2)_{q-3}-O-CH_2CH_2NH-M$

In Formula (1), the ring carbon atom bound to $R^{5a}$ and $R^{6a}$ groups, and/or the ring carbon atom bound to $R^{5b}$ and $R^{6b}$ groups, is optionally replaced with a ring oxygen atom. If both sides of the cyanine moiety are configured with this replacement, the cyanine compound can have the following formula:

(1-2)

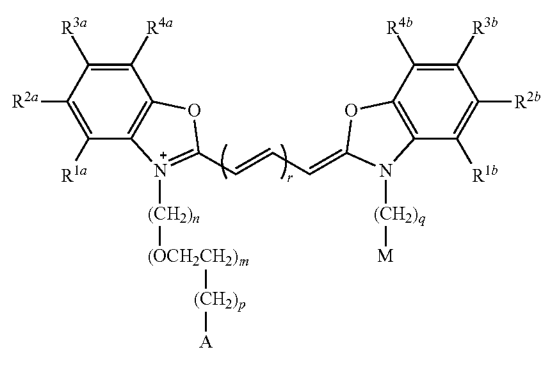

The cyanine dye compounds described herein can have any of the absorption and emission characteristics known for members of this class of dyes. In different embodiments, the cyanine compound can emit at a wavelength of precisely, about, at least, or above, for example, 500, 520, 540, 560, 580, 600, 620, 640, 660, 680, 700, 720, 740, 760, 780, or 800 nm, or within a range bounded by any two of the foregoing values. In particular embodiments, a "red-shifted fluorophore" is preferred. The red-shifted fluorophore is characterized by exhibiting an emission wavelength greater than 594 nm. Such fluorophores are particularly useful in FRET and small molecule FRET (i.e., smFRET) methods. As understood in the art, the absorption wavelength is generally shorter than the emission wavelength. The impinging electromagnetic radiation (i.e., which is absorbed by the fluorophore) can be in a dispersed form, or alternatively, in a focused form, such as a laser. When two or more fluorophores are used (e.g., attached to a biomolecule, as in FRET and smFRET methods), one of the fluorophores functions as a donor fluorophore and the other functions as an acceptor fluorophore. In some embodiments, it is preferred for a protective agent to bind to or be in close proximity with either the acceptor fluorophore or the donor fluorophore, but not both.

In another aspect, the invention is directed to methods for synthesizing dye compounds of the Formula (1) and its sub-formulas (e.g., Formulas 1-1 and 1-2). The method generally involves the following reaction scheme:

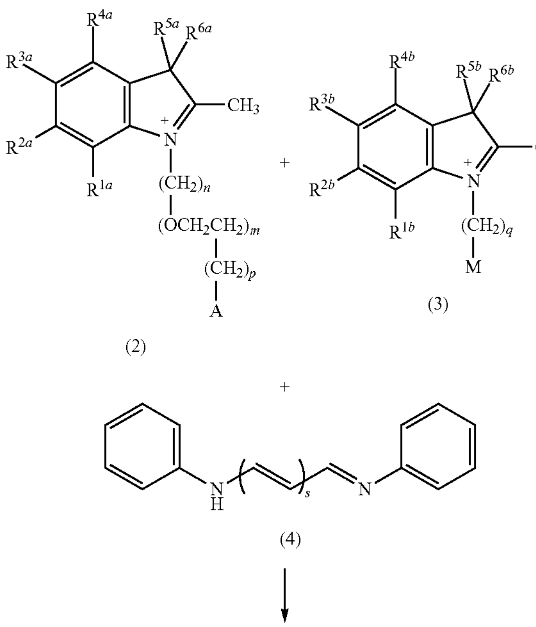

(2) (3) (4)

Compound of Formula (1)

In the above scheme, the variables shown in indolyl derivatives (2) and (3) are all as defined above. In the dianilide compound (4), the subscript s is 0, or an integer of at least 1 and up to 3. The subscript s is related to the subscript r in Formula (1) by the equation r=s+1 (or s=r−1). The above reaction is preferably conducted in the presence of a carboxylic acid, typically as a solvent, and at or below a boiling temperature of the solvent used, or precisely, about, at least, or up to, for example, 100° C., 110° C., 120° C., 130° C., 140° C., or 150° C., or a temperature within a range bounded by any two of the foregoing exemplary temperatures. The reaction medium preferably further includes the anhydride and/or salt of the carboxylic acid, typically with the carboxylic acid in a higher amount, such as 20:1, 10:1, 5:1, or 2:1 of carboxylic acid to the anhydride. For example, in particular embodiments, the reaction medium is acetic acid in the presence of acetic anhydride and potassium acetate. The foregoing reaction medium is particularly useful for reactants and product that is substantially water soluble. In other embodiments, particularly where the reactants and product may be less water soluble or appreciably hydrophobic, a less hydrophilic solvent or reaction medium, such as acetone or ethyl acetate, may be used. The reaction time is typically at least or up to 1, 2, 3, 4, 5, 6, 7, or 8 hours, depending on the temperature and solvent employed and type of reactants used.

The synthetic process may also further include synthesizing either or both of the indolyl derivatives (2) and (3), as further described below.

The first indolyl derivative (2) may be synthesized by, for example, the following reaction scheme:

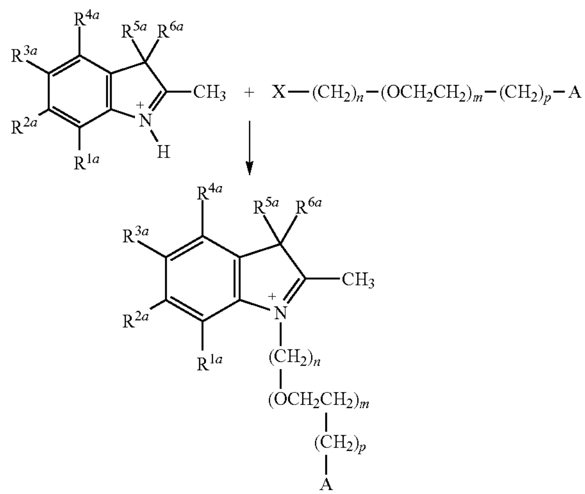

(2)

In the above reaction to synthesize the first indolyl derivative (2), the groups $R^{1a}$, $R^{2a}$, $R^{3a}$, $R^{4a}$, $R^{5a}$, and $R^{6a}$ are independently selected from hydrogen atom, straight-chained or branched hydrocarbon groups having one to six carbon atoms, and hydrophilic groups, wherein the straight-chained or branched hydrocarbon group is optionally substituted with at least one hydrophilic group, as provided above. Group A is a protective agent group that has a characteristic of modifying the singlet-triplet occupancy of the shown cyanine moiety, wherein A is optionally substituted with at least one hydrophilic group, as provided above. Group X is a leaving group reactive with the indolyl nitrogen in the manner shown. The leaving group X can be, for example, a bromo, iodo, or triflate group. The subscript n is an integer of at least 1 and up to 6; the subscript m is 0 or an integer of 1 to 6; and the subscript p is 0 or an integer of 1 to 6. As also provided above, any two adjacent groups selected from $R^{1a}$, $R^{2a}$, $R^{3a}$, and $R^{4a}$ are optionally interconnected as an unsaturated hydrocarbon bridge; any $CH_2$ group subtended by n, m, or p, and not connected to an oxygen atom or to the indolyl nitrogen atom, may independently be replaced with an amino linking group of the formula —NR—, where R is a hydrogen atom or hydrocarbon group having one to six carbon atoms; and any $CH_2$ group subtended by n, m, or p may independently be replaced with a carbonyl group; and the ring carbon atom bound to $R^{5a}$ and $R^{6a}$ groups is optionally replaced with a ring oxygen atom.

The above reaction to synthesize the first indolyl derivative (2) can be conducted under any of the conditions (e.g., reaction medium and temperature) known in the art to be useful in the reaction of an electrophilic carbon and indolyl nitrogen. Particularly when hydrophilic reactants and product are considered, the above reaction (i) is preferably conducted in a hydrophilic reaction medium, preferably with inclusion of a polar aprotic solvent, such as tetramethylene sulfone, N-methylpyrrolidone, or dimethoxyethane (DME). Typically, the reaction is conducted at or below a boiling temperature of the solvent used, or precisely, about, at least, or up to, for example, 80° C., 90° C., 100° C., 110° C., 120° C., 130° C., 140° C., or 150° C., or a temperature within a range bounded by any two of the foregoing exemplary temperatures. The reaction time is typically at least or up to 4, 5, 6, 7, 8, 10, 12, 14, 16, 18, or 20 hours, depending on the temperature and solvent employed and type of reactants used.

The second indolyl derivative (3) may be synthesized by, for example, the following reaction scheme:

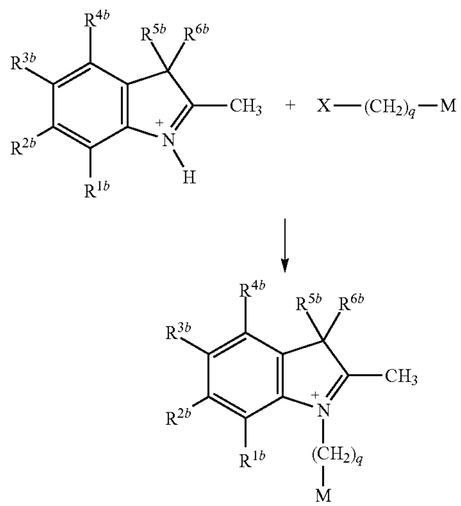

(3)

In the above reaction to synthesize indolyl derivative (3), the groups $R^{1b}$, $R^{2b}$, $R^{3b}$, $R^{4b}$, $R^{5b}$, and $R^{6b}$ are independently selected from hydrogen atom, straight-chained or branched hydrocarbon group having one to six carbon atoms, and hydrophilic groups, wherein the straight-chained or branched hydrocarbon group is optionally substituted with at least one hydrophilic group, as provided above. Group M includes a reactive crosslinking group or a group that can be converted to a reactive crosslinking group, as provided above. X is a leaving group reactive with the indolyl nitrogen in the manner shown, as provided above. Subscript q is an integer of at least 1 and up to 16, as provided above. As also provided above, any two adjacent groups selected from $R^{1b}$, $R^{2b}$, $R^{3b}$, and $R^{4b}$ are optionally interconnected as an unsaturated hydrocarbon bridge; any one or more $CH_2$ groups subtended by q, and not connected to an oxygen atom or to the indolyl nitrogen atom, may be replaced with an amino linking group of the formula —NR—, where R is a hydrogen atom or hydrocarbon group having one to six carbon atoms; any one or more $CH_2$ groups subtended by q may independently be replaced with a carbonyl group; any one or more $CH_2$ groups subtended by q may be replaced with an —O— linking atom; and the ring carbon atom bound to $R^{5b}$ and $R^{6b}$ groups is optionally replaced with a ring oxygen atom.

The above reaction to synthesize the second indolyl derivative (3) can be conducted under any of the conditions (e.g., reaction medium and temperature) known in the art to be useful in the reaction of an electrophilic carbon and indolyl nitrogen, as provided above under the discussion for step (i). All of the conditions, including reaction media, temperatures, and reaction times, provided above for synthesizing the first indolyl derivative (2) apply herein for synthesizing the second indolyl derivative (3).

The reactants for synthesizing indolyl derivatives (2) and (3), such as the indolyl reactants and reactive molecules containing A and M, can either be obtained commercially, or may be synthesized by methods well known in the art, as further described in the Examples infra.

The reactants for synthesizing indolyl derivatives (2) and (3), such as the indolyl reactants and reactive molecules containing A and M, can either be obtained commercially, or may be synthesized by methods well known in the art, as further described in the Examples infra.

In some embodiments, M in compound (3) is selected as a COOH group to provide a precursor form of Formula (1), having the following formula:

(1a)

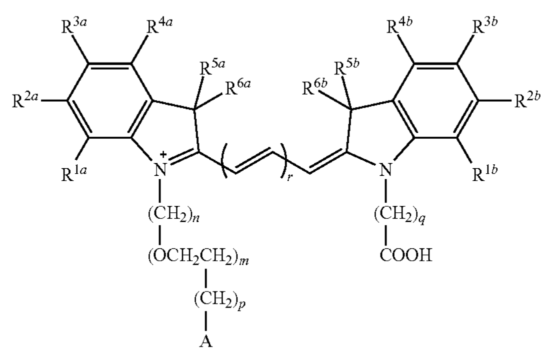

The precursor compound of Formula (1a) can be prepared by the following reaction scheme:

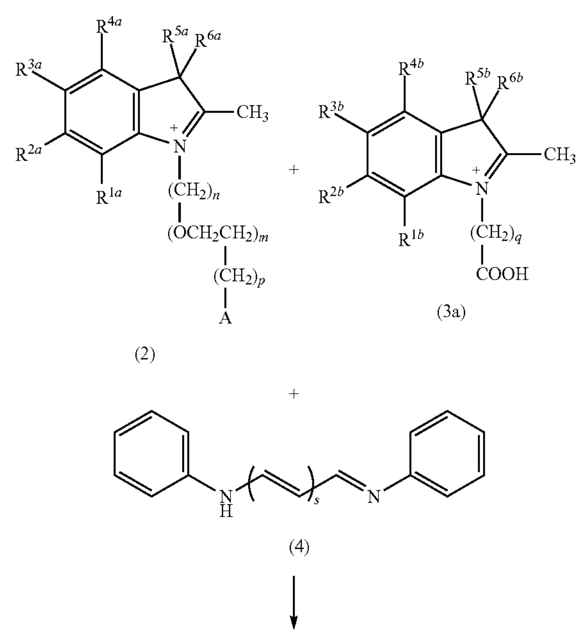

(2) (3a) (4)

-continued (1a)

The precursor compound of Formula (1a) can then be converted to an active crosslinkable form by reacting the shown COOH group with a group that contains a reactive crosslinking group, or by converting the shown COOH group to an activated organoester group. Such reactions are well known in the art. For example, the shown COOH group can be converted to a CO-NHS group by reacting a compound of Formula (1a) with dipyrrolidino(N-succinimidyloxy)carbenium hexafluorophosphate (HSPyU) in the presence of a suitable tertiary amine (e.g., diisopropylethylamine, DIEA) in a polar aprotic solvent. In turn, if desired, the resulting CO-NHS group can be reacted with an amino-derivatized molecule that contains a different reactive crosslinking group, such a maleimide group, in order to include any of a variety of reactive crosslinking groups as M.

In a similar manner, group A in Formula (1) or sub-formulas thereof may be a reactive crosslinking group that is later reacted with a molecule containing a protective agent, wherein the molecule containing the protective agent contains groups reactive with the group A. The reaction to attach a protective agent A should, of course, not interfere with placement or retention of the group M. For example, it is envisaged that M could be or include a group not reactive with an amino group (e.g., a maleimide group), while A includes an NHS-activated carboxy group that can later be crosslinked with an amino-containing protective agent molecule.

In another aspect, the invention is directed to a method for labeling a molecule of interest with any of the cyanine dye compositions described above. The term "molecule of interest" can be a molecule, particularly a biomolecule, or alternatively, a material, such as a polymer, or the surface of a bulk solid, such as a plastic, glass, cellulosic material, biological tissue, or polysiloxane. In the method, the group M in Formula (1) is selected as a reactive crosslinking group that crosslinkably reacts with a group in the molecule of interest. For example, M may be selected as an activated ester group if M is to be reacted with a molecule of interest containing an amino group, or M may be selected as a maleimide group if M is to be reacted with a molecule of interest containing a mercapto group, or M may be selected as an amino group if M is to be reacted with a molecule of interest containing an activated ester group, or M may be selected as a thiol group if M is to be reacted with a molecule of interest containing a maleimide group, or M may be selected as a cyclic ether group, such as an epoxy or glycidyl group, if M is to be reacted with silanol groups on a glass or ceramic substrate, or M may be selected as a metal-binding group (e.g., a mercaptan or phosphino group) in order for M to form an attractive (dative) bond with the surface of a metal or quantum dot nanoparticle. Moreover, depending on the composition of M, any of a number of bis-reactive crosslinkers may be used for crosslinking the a cyanine dye composition described above. For example, an amino-amino coupling reagent can be employed to link M as an amino group with an amino group of the molecule of interest. Some examples of amino-amino coupling reagents include diisocyanates, alkyl dihalides, dialdehydes, disuccinimidyl suberate (DSS), disuccinimidyl tartrate (DST), and disulfosuccinimidyl tartrate (sulfo-DST), all of which are commercially available. As another example, an amino-thiol coupling agent can be employed to link M as a thiol group with an amino group of the molecule of interest, or to be link M as an amino group with a thiol group of the molecule of interest. Some examples of amino-thiol coupling reagents include succinimidyl 4-(N-maleimidomethyl)-cyclohexane-1-carboxylate (SMCC), and sulfosuccinimidyl 4-(N-maleimidomethyl)-cyclohexane-1-carboxylate (sulfo-SMCC). In an analogous manner, a thiol-thiol coupling agent can be employed to link M as thiol group with a thiol group of the molecule of interest. As an additional example, a diamino linker can be employed to link M as an activated ester with an activated ester on the molecule of interest.

After reaction, the dye-molecule composition can have the following structure:

(1-1)

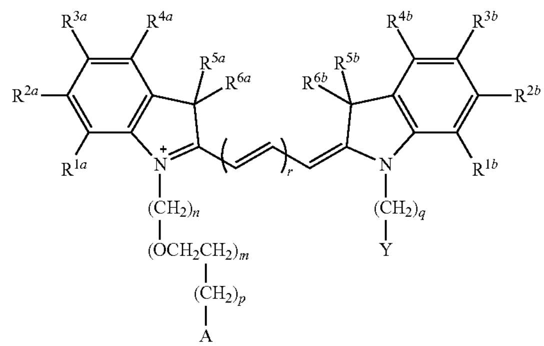

In Formula (1-1), all of the variables, except for Y, are as described above. The variable Y is any molecule or material of interest. The variable Y may also include remnants of the reactive crosslinking group, depending on the crosslinking chemistry employed. In particular embodiments, Y is a biomolecule. In a first embodiment, the biomolecule is a peptide-containing molecule. The peptide-containing molecule can be, for example, a peptide, dipeptide, oligopeptide (e.g., tripeptide, tetrapeptide, pentapeptide, hexapeptide, and higher peptides), or a protein, such as an antibody, antibody fragment, epitope, enzyme, or lectin. In a second embodiment, the biomolecule is a nucleobase-containing molecule. The nucleobase-containing molecule can be, for example, a nucleobase, nucleoside, dinucleoside, oligonucleoside (e.g., trinucleotide, tetranucleoside, and higher nucleosides), nucleotide, dinucleotide, oligonucleotide (e.g., trinucleotide, tetranucleotide, and higher nucleosides) and nucleic acids, which may be, DNA or RNA chains, fragments, vectors, or plasmids. In a third embodiment, the biomolecule is a sugar molecule, such as a monosaccharide, disaccharide, oligosaccharide, (e.g., trisaccharide, tetrasaccharide, and higher saccharides), or a polysaccharide. In a fourth embodiment, the biomolecule is a hormone or neurotransmitter. In some embodiments, the biomolecule has a molecular weight of up to 100, 200, 500, or 1000 kD. In other embodiments, the biomolecule has a molecular weight of at least, above, or up to 1000, 2000, 5000, or 10,000 kDa.

In some embodiments, the biomolecule on which the cyanine dye of Formula (1) or sub-formula thereof is attached is a fluorescent protein. The fluorescent protein can be, for example, a green fluorescent protein (GFP) and its mutated allelic forms (e.g., blue, cyan, and yellow fluorescent proteins) and red fluorescent protein (RFP), and genetic variants thereof. Another example of a fluorescent protein is mCherry and genetic variants thereof. Positions containing tyrosine, tryptophan, or thenylalanine are preferred so that the introduction of non-natural, aromatic amino acid would have minimal perturbation to the system while having the maximal beneficial effect. Residues must also be within 1-20 Å to promote proximity effects. Specific residue to be targeted Tyr203 in the active site of the protein. Selection efforts may also be necessary to screen for secondary mutations that ensure folding and stability of the protein (Reference is made to Hiem R, Cubitt A B, Tsien R Nature Vol. 373(6516) pg. 663-4 (1995), which is incorporated herein by reference in its entirety).

In some embodiments, Y in Formula (1-1) is a microparticle or nanoparticle on which the cyanine composition is to be attached. The microparticle or nanoparticle can be composed of, for example, an organopolymer, polysiloxane, quantum dot, or metallic composition, as long as the particle possesses suitable groups for attaching to the cyanine dye composition of Formula (1).

The cyanine compositions described herein can be used in any method or technology in which fluorophores are used. In a particular embodiment, the cyanine dye compositions described herein are applied to fluorescence-based assay methods, such as PCR and ELISA assay methods. In more particular embodiments, the fluorophore compositions described herein are applied to FRET methods, and more particularly, smFRET methods. These methods are well known in the art. Particular reference is made to R. Dave, et al., *Biophysical Journal*, vol. 96, March 2009, pp. 2371-2381; Stryer L. Annu Rev. Biochem. Vol. 47 pg. 819-46 (1978); Forster T. (Ann Physik (1959); Roy R. Hohng S, Ha T. Nature Methods Vol. 5(6) pg. 507-516 (2008). Weiss SR Science Col. 283(5408) pg. 1676-83 (1999), all of which are incorporated herein in its entirety.

A significant advantage of the compositions described herein is that the position of one or more protective agents can be adjusted and fixed relative to one or more fluorophores. By this feature, one or more photophysical characteristics of the fluorophore can be suitably adjusted, optimized, or tuned to suit a particular application. Some photophysical characteristics include, for example, fluorescence lifetime, absorption and emission wavelength and extinction, stochastic blinking events, blinking frequency, and photobleaching characteristics. The characteristics being adjusted or optimized can be characteristics particularly relevant to non-assay applications, such as for photonic and photoswitching devices, including organic light emitting diodes (OLEDs). Significantly, the tunability feature of the instant fluorophore-protective agent compositions allows for altering (i.e., increasing or decreasing) the blinking rate of the fluorophore. For example, in certain applications, a faster blinking frequency is desired, while in other applications, a slower blinking frequency is desired, relative to the original blinking frequency (i.e., blinking frequency of the fluorophore when not in proximity to a protective agent). In other embodiments, the lifetimes of fluorescent and dark states can be tuned by decreasing the effective rate of transition into or out of the triplet dark state.

In another embodiment, the invention is directed to applying any of the cyanine dye compositions described above to methods for detecting a cellular process in a living cellular or multicellular organism. Such in vivo methods often include administering to the organism an effective amount of the fluorophore composition, and detecting the fluorophore in the organism. The organism being studied can be, for example, a mammal, a cell from a cell line (e.g., CHO cells or stem cells), a microbe (e.g., a bacterium or protozoan), or a mammalian or non-mammalian egg cell. Typically, the fluorophore composition to be administered possesses a portion (i.e., chemical group) that specifically and selectively targets a biological site or particular biomolecule in the mammal. Therefore, the fluorophore composition used in this manner functions as a targeting probe. These fluorophore compositions can also circumnavigate cell membrane permeability issues and the potential toxicity of protective agents in solution to a living cell. Furthermore, in some embodiments, the protective agent itself can function as a cell permeation enhancer. The specific application of this approach relates to the site-specific labeling of one or more target molecules in the cell by adding the fluorescent species to the cell medium or animal circulation. In both cases, crossing the cell membrane can be a limited aspect of the approach.

Examples have been set forth below for the purpose of illustration and to describe the best mode of the invention at the present time. However, the scope of this invention is not to be in any way limited by the examples set forth herein.

General Procedures

All air- and moisture-sensitive reactions were performed under argon or nitrogen in oven-dried glassware. Solvents and solutions for air- and moisture-sensitive reactions were transferred via syringe or cannula with the maintenance of a positive pressure of an inert gas. Concentration of a solution was accomplished with a Buchi rotary evaporator. In general, the residual solvent was removed on a vacuum line at 1-1.5 torr.

Reagents and Solvents

Unless stated otherwise, commercially available reagents were used as supplied. HPLC grade hexanes and HPLC grade ethyl acetate (EtOAc) were used in chromatography.

Chromatography

All experiments were monitored by thin layer chromatography (TLC) performed on Silicyclo precoated silica gel glass-supported plated with 0.25 mm thickness. Spots were visualized by exposure to ultraviolet (UV) light (254 nm) or to iodine vapor or by staining with a 10% solution of phosphomolybdenic acid (PMA) in ethanol and then heating. Flash chromatography was preformed with EMD brand silica gel (170-400 mesh). Preparative thin layer chromatography (Prep TLC) was performed on Silicyclo precoated silica gel 60F-254 glass-supported plates with 1.00 mm thickness. Semi-prep HPLC was performed on a Varian Prepstar System with a 5 μm 19×150 mm column.

Spectroscopic Measurements

Nuclear magnetic resonance (NMR) spectra were recorded with a Bruker 500 MHz NMR spectrometer. Chemical shifts for proton NMR are reported in parts per million (ppm) relative to the singlet at 7.26 ppm for chloroform-d or relative to the singlet at 7.15 ppm for benzene-d6. Chemical shifts for carbon NMR are reported in ppm with the center line of the triplet for chloroform-d set at 77.00 ppm. The following abbreviations are used in the experimental section for the description of 1H-NMR spectra: singlet (s), doublet (d), triplet (t), quartet (q), multiplet (m), doublet of doublets (dd), doublet of quartet (dq), and broad singlet (br). For complex multiplets, the chemical shift is given for the center of the multiplet. Coupling constants, J, are reported in Hertz (Hz). LC-MS was obtained from an Acquity Ultra performance LC system.

EXAMPLE 1
Synthesis of Cy5-NBA-NHS
The following synthetic scheme was employed:
Scheme 1. Synthesis of Cy5-NBA-NHS
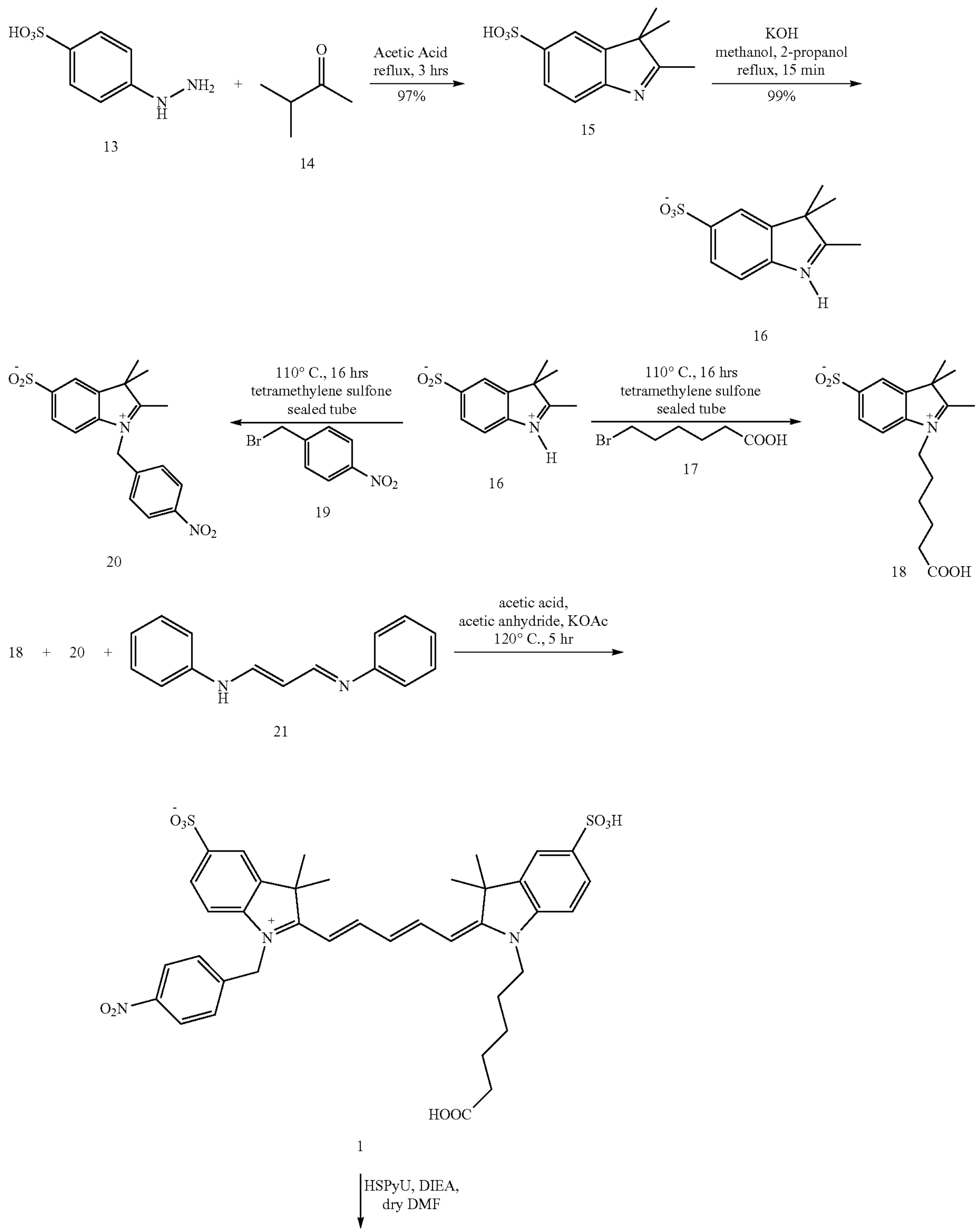

-continued

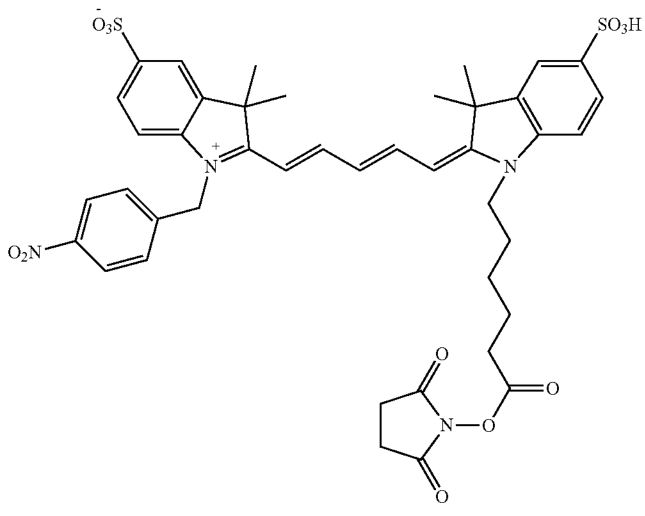

2

In the above reaction, the hydrazine 13 was refluxed with 3-methyl-2-butanone 14 under Fisher's indole condensation condition to give indole species 15, which was then converted to its potassium salt 16. Coupling of 16 with 6-bromohexanoic acid 17 proceeded smoothly in a sealed tube to provide salt 18 as one of the precursors to the Cy5 dye. Coupling in 1,4-dichlorobenzene posed a solubility problem that led to low yields. Use of the more hydrophilic solvent tetramethylene sulfone provided an improved solubility of the reactants, and moreover, permitted the product of the reaction to be simply precipitated from solution by addition of ethylacetate to the reaction solution. In a parallel synthesis, the PA molecule para-nitrobenzyl bromide 19 was coupled to 16 under the same condition to give compound 20.

Addition of both salt 18 and 20 to malonaldehydedianilide hydrochloride 21 in a sequential order provided the desired unsymmetrical Cy5-NBA-COOH molecule 1. Although this type of reaction could be conducted in acetone or acetic anhydride, due to the improved water solubility of these dyes, a reaction medium composed of 10:1 acetic acid and acetic anhydride was used to improve the solubility of the starting materials, which are all salts. NHS activation using dipyrrolidino(N-succinimidyloxy)carbenium hexafluorophosphate (HSPyU) in the presence of diisopropylethylamine (DIEA) produced the final product 2 by using DMF as the reaction solvent. The crude product was precipitated out of the solution by addition of ethyl acetate, and the crude product purified with HPLC.

A more detailed description of the synthetic procedure is provided as follows:

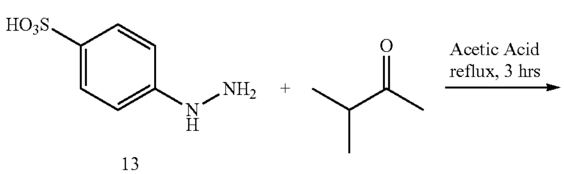

13 14

-continued

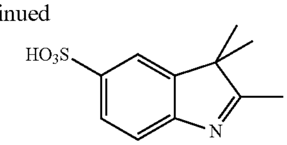

15

In the above reaction, to a flask equipped with magnetic stirrer and reflux condenser were added acetic acid (5 mL), 3-methyl-2-butanone (1.67 mL), and p-hydrazinobenzenesulfonic acid (1 g), and the mixture heated to reflux for three hours, and then cooled until a pink solid precipitated as product. Compound 15 (1.24 g), was obtained as wine-colored crystals in a yield of 97%. $^1$H NMR (500 MHz, DMSO): δ 7.78 (1H, s), 7.64 (d, 1H), 7.48 (d, 1H), 2.5 (s, 3H), 1.37 (s, 6H).

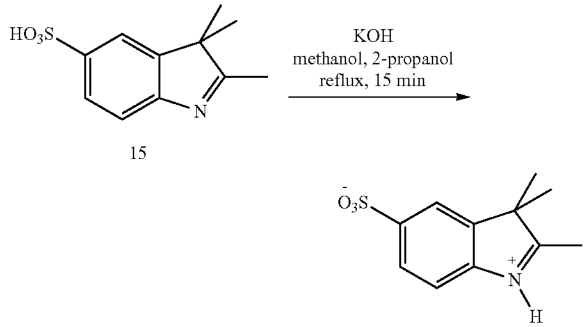

16

In the above reaction, to a flask were added 1 g of compound 15, 234 mg of KOH, 1 mL of MeOH, and 1 mL of 2-propanol, and the mixture stirred and heated to reflux for 15 minutes. The mixture turned from purple to yellow, and the 2,3,3-trimethylindolenium-5-sulfonic potassium salt 16 began to precipitate quantitatively as yellow solid after the reaction mixture was cooled to room temperature (RT, which is typically 18-30° C., or about 25° C.). Compound 16 (1.14 g) was obtained in a yield of 98%.

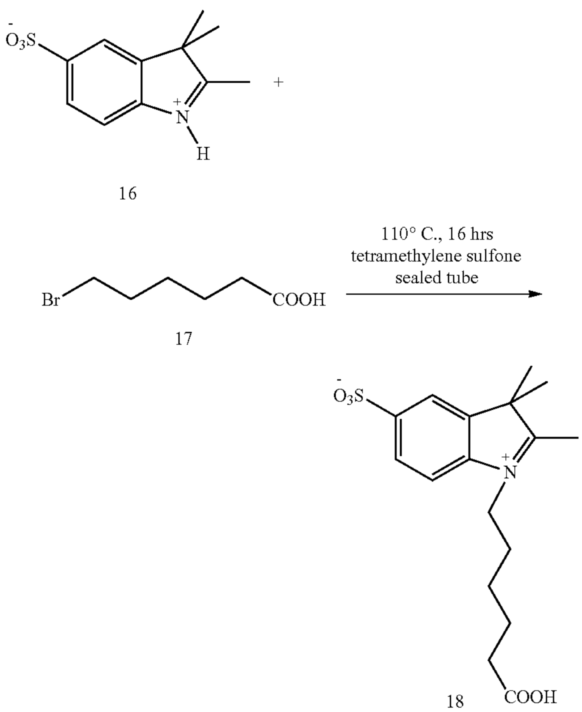

16 17 18

In the above reaction, the 2,3,3-trimethylindolenium-5-sulfonic potassium salt (1 g) and 6-bromo-hexanoic acid were mixed with 2 mL of tetramethylene sulfone. The reaction mixture was transferred into a degassed sealed tube, and heated up to 110° C. for 16 hours. Then the reaction mixture was cooled to room temperature, and the deep purple solution was poured into 15 mL ethyl acetate (EtOAc) to precipitate the product. The purple solid product 18 was washed by 15 mL×3 EtOAc, and dried. Crude compound 18 was carried onto the next step without further purification. MASS (ES+) m/z for $C_{17}H_{23}NO_5S$, $[M+1]^+$, Calculated: 354.1, Found: 354.3.

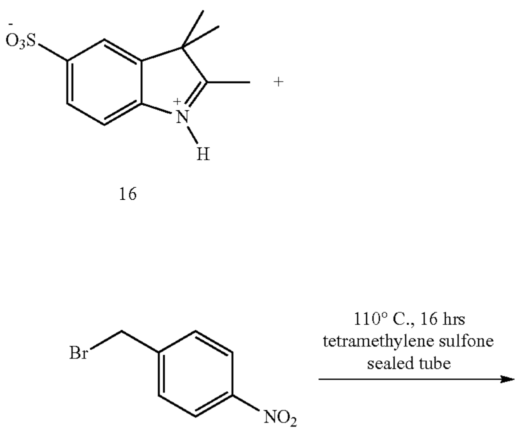

16 19

-continued

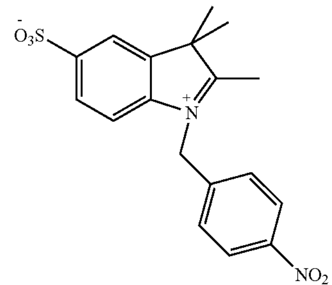

20

The 2,3,3-trimethylindolenium-5-sulfonic potassium salt 16 (256 mg) and 4-nitrobenzylbromide 19 (600 mg) were mixed with 2 mL of tetramethylene sulfone. The reaction mixture was transferred into a degassed sealed tube, and heated up to 110° C. for 16 hours. Then the reaction mixture was cooled to room temperature, and the deep purple solution was poured into 15 mL EtOAc to precipitate the product. The purple solid product was washed with 15 mL×3 EtOAc, and dried. Crude compound 20 was carried onto the next step without further purification. MASS (ES+) m/z for $C_{18}H_{18}N_2O_5S$, $[M+1]^+$, Calculated: 375.1, Found: 375.3.

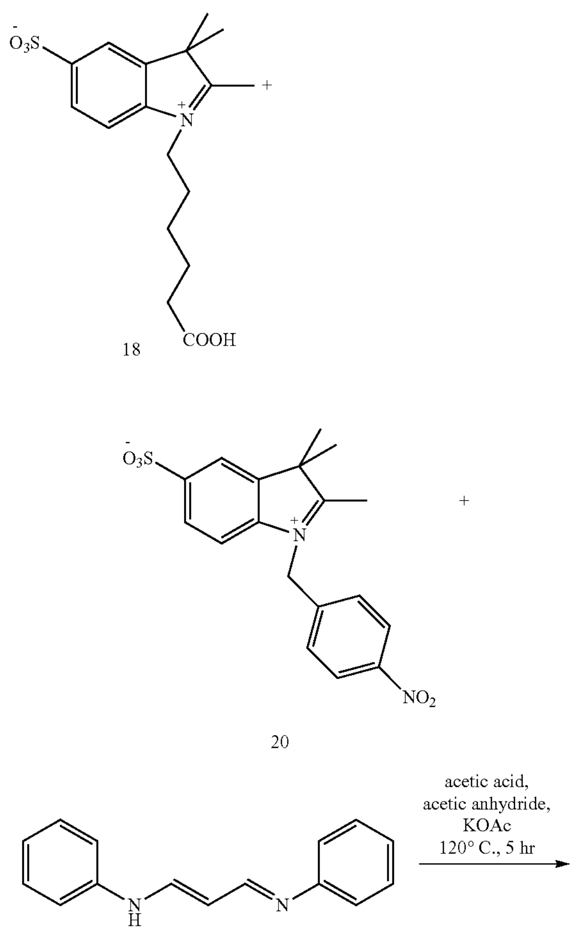

18 20 21

-continued

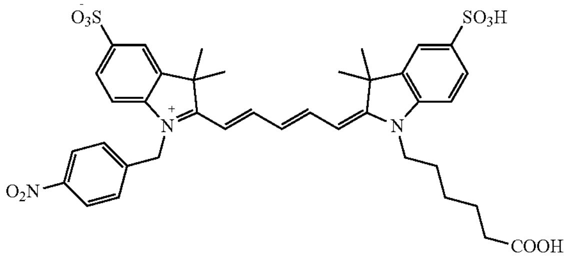

1

In the above reaction, to a round bottom flask were added compound 18 (125 mg), malonaldehyde dianilide hydrochloride 21 (78 mg), 5 mL acetic acid, and 0.5 mL acetic anhydride. The resulting purple solution was heated up to 120° C. for two hours, then 130 mg of compound 20 was added to this solution followed by 276 mg of KOAc. The reaction mixture was heated to 120° C. and stirred for another three hours. After the reaction was complete, the reaction mixture was poured into 45 mL of EtOAc to precipitate the crude product as a dark blue solid. The residue was washed three more times (40 mL each time) by EtOAc, and dried. The pure Cy5 dye compound 1 was isolated by semi-prep HPLC purification (0.1% formic acid aq. and actonitrile) as a dark blue solid. MASS (ES+) m/z for $C_{38}H_{41}N_3O_{10}S_2$, $[M+1]^+$ Calculated: 764.2, Found: 764.5.

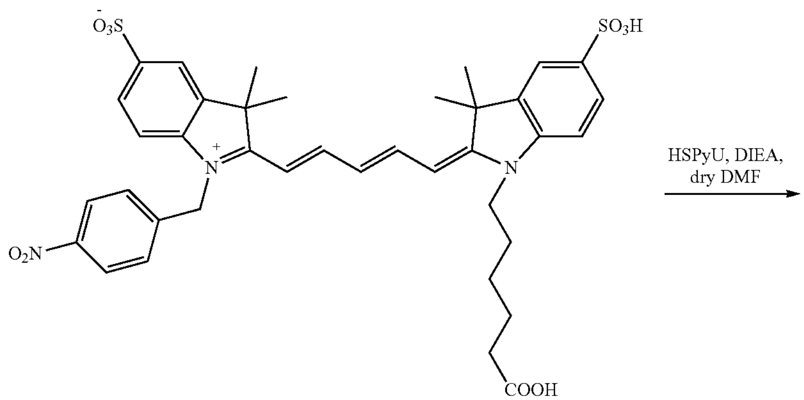

1

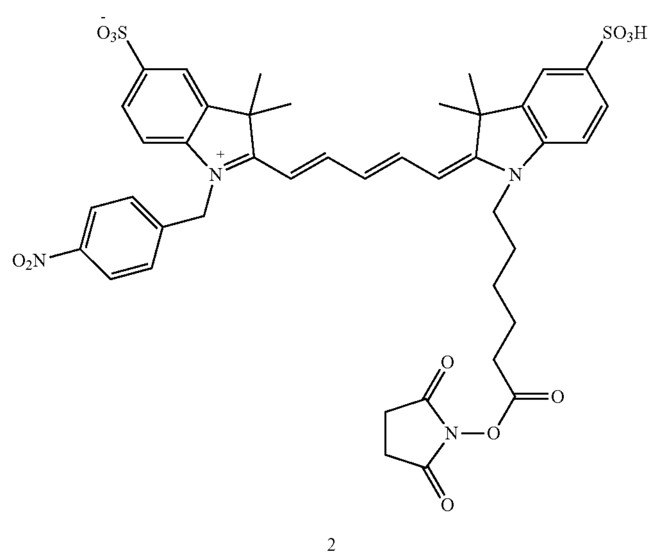

2

In the above reaction, to a 1.5 mL Eppendorf tube, 0.1 mg of compound 1 was dissolved in 100 μL of dry DMF, then 4 mg of HSPyU and 1.7 μL of DIEA were added at RT. The reaction was monitored by LC-MS, which was complete in 30 minutes. Then 1.5 mL EtOAc was added to the tube to precipitate the product. The dark blue solid product 2 was washed three more times by EtOAc, and dried. MASS (ES+) m/z for $C_{42}H_{44}N_4O_{12}S_2$, $[M+1]^+$ Calculated: 861.2, Found: 861.8.

EXAMPLE 2

Synthesis of Cy5-diglycol-NBA-NHS and Cy5-tetraglycol-NBA-NHS (wherein NBA=nitrobenzyl alcohol)

The following synthetic scheme was employed:

Scheme 2. Synthesis of Cy5-diglycol-NBA-NHS and Cy5-tetraglycol-NBA-NHS

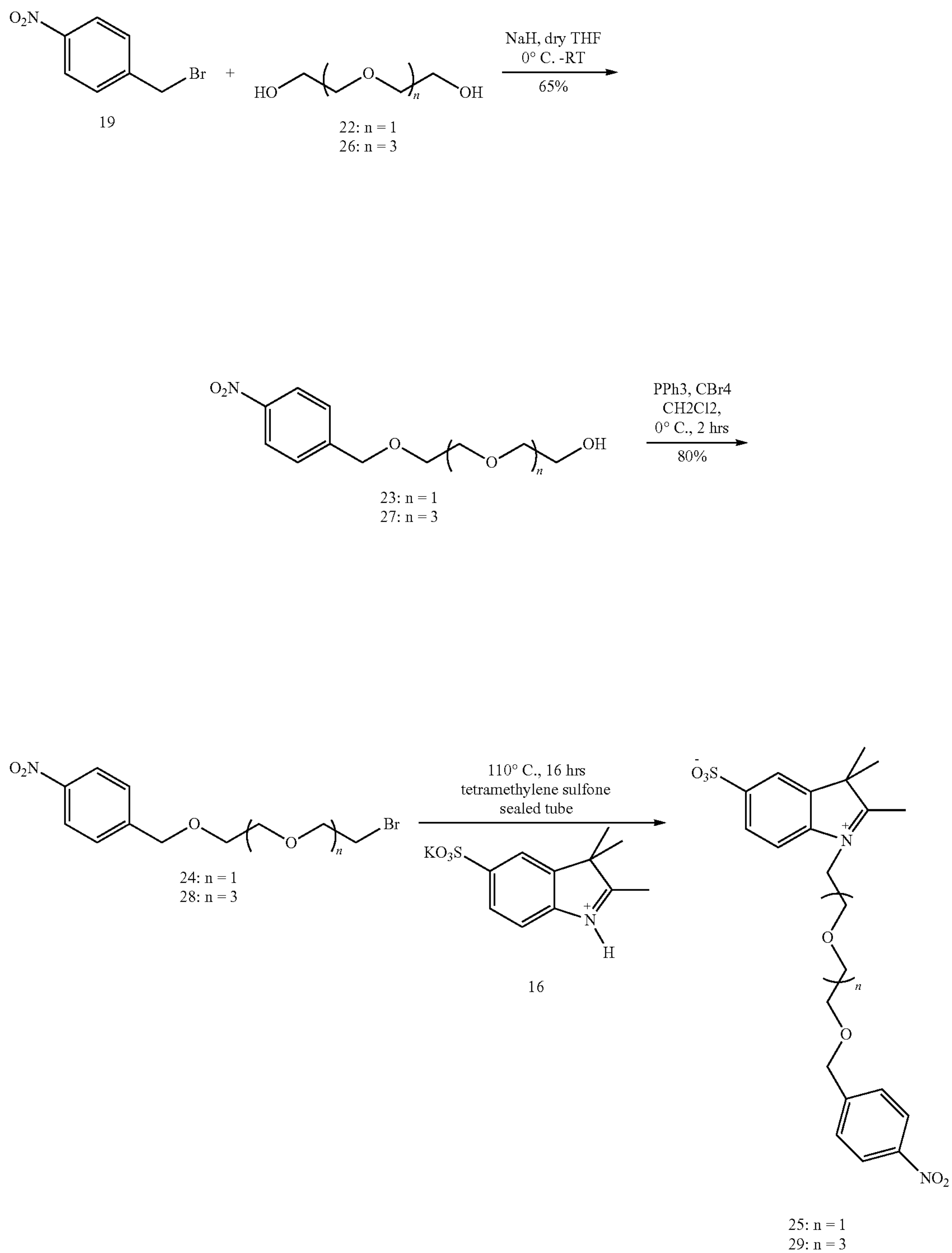

-continued

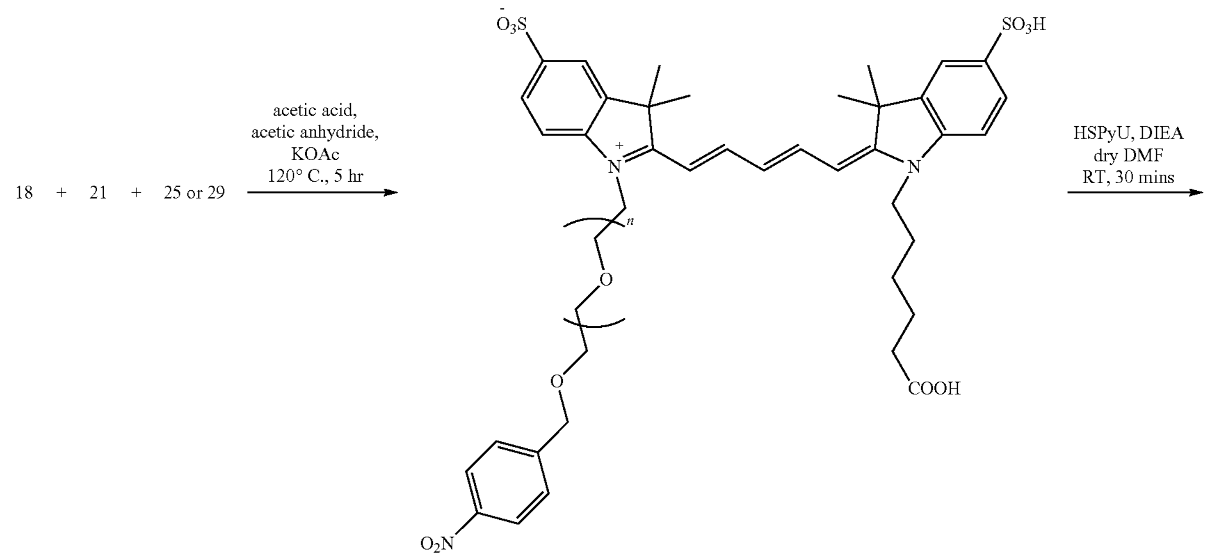

3: n = 1
5: n = 3

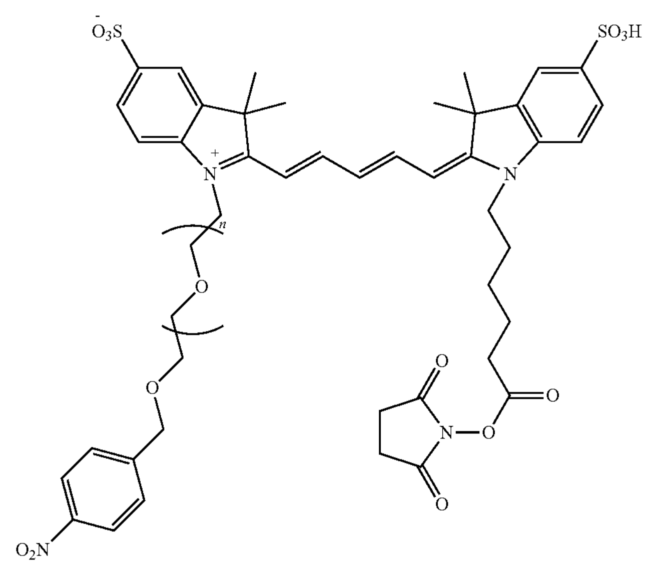

4: n = 1
6: n = 3

For the diglycol product, reaction of p-nitrobenzyl bromide with diglycol upon treatment of NaH in THF gave compound 23, NBA-diglycol. The hydroxyl group was converted to bromide by treating 23 with $PPh_3$ and $CBr_4$. The resulting compound 24 was coupled with indole salt 16 to give Cy5 dye precursor 25. Following an analogous process for the tetraglycol product, the resulting compound 28 was coupled with indole salt 16 to give Cy5 dye precursor 29. Again, indolyl derivative 18, and 25 or 29, were reacted with malonaldehydedianilide hydrochloride to result in the product Cy5-diglycol-NBA-COOH 3 or Cy5-tetraglycol-NBA-COOH 5, which, after purification and NHS ester activation, resulted in Cy5-diglycol-NBA-NHS 1 and Cy5-tetraglycol-NBA-NHS 5.

A more detailed description of the synthetic procedure is provided as follows:

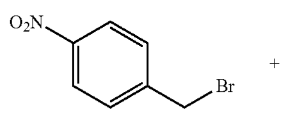

19

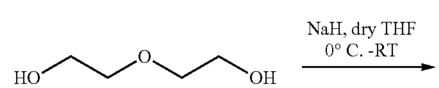

22

-continued

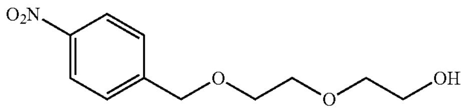

23

In the above reaction, to a Ar protected round bottom flask was added 288 mg of NaH (80% wt in oil) and 30 mL of dry THF, cooled to 0° C., 1.27 g of diglycol was added and then stirred at 0° C. for 1 hour. Then 2.16 g of 4-nitrobenzylbromide in 10 mL THF was added slowly at this temperature. The reaction mixture was stirred and allowed to warm up to RT, and the reaction monitored by TLC. After two hrs, 1 mL of water was added to quench the reaction, the solvent was removed by vacuum, and the residue was purified by column (1:1 EtoAC/Hexanes). The product 23 (1.6 g) was isolated as thick light yellow oil in a yield of 65%. MASS (ES+) m/z for $C_{11}H_{15}NO_5$, $[M+1]^+$ Calculated: 242.1, Found: 242.2.

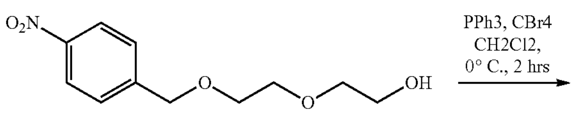

23

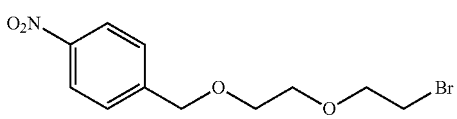

24

In the above reaction, a solution of 2.1 g of $Ph_3P$ in 20 mL of $CH_2Cl_2$ was added dropwise to an ice-cold solution of 1.6 g of compound 23 and 2.6 g of carbon tetrabromide in 10 mL of $CH_2Cl_2$. The reaction was monitored by TLC, after two hours the solvent was removed, and the residue was purified by column (1:1 EtOAc/Hexanes) to isolate the pure bromide substituted product 24. Compound 24 (1.6 g) was obtained as a light yellow solid in a yield of 80%. MASS (ES+) m/z for $C_{11}H_{14}BrNO_4$, $[M+1]^+$ Calculated: 304.0, Found: 304.2.

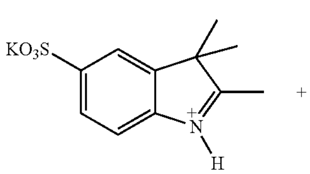

16

-continued

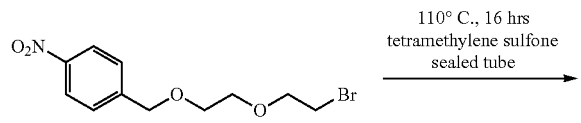

24

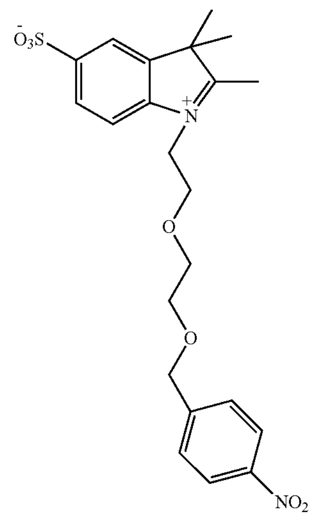

25

In the above reaction, the 2,3,3-trimethylindolenium-5-sulfonic potassium salt 16 (300 mg) and compound 24 (600 mg) were mixed with 2 mL of tetramethylene sulfone. The reaction mixture was transferred into a degassed sealed tube, and heated to 110° C. for 16 hours. Then the reaction mixture was cooled to room temperature, the deep purple solution was poured into 15 mL EtOAc to precipitate the product. The purple solid product was washed with 15 mL×3 EtOAc, and dried. Crude compound 25 was carried onto the next step without further purification. MASS (ES+) m/z for $C_{22}H_{26}N_2O_7S$, $[M+1]^+$ Calculated: 463.2, Found: 463.5.

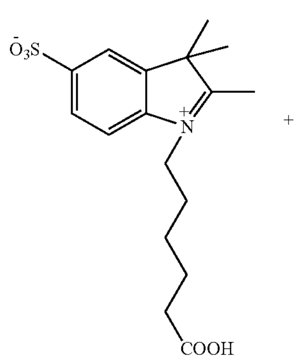

18

-continued

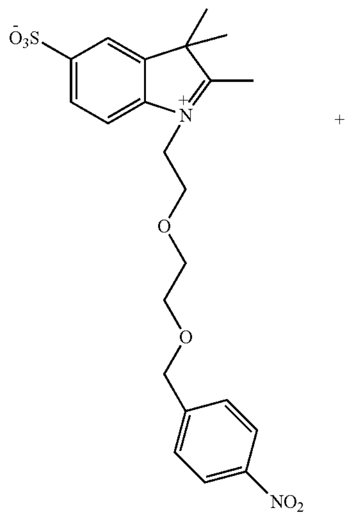

25

-continued

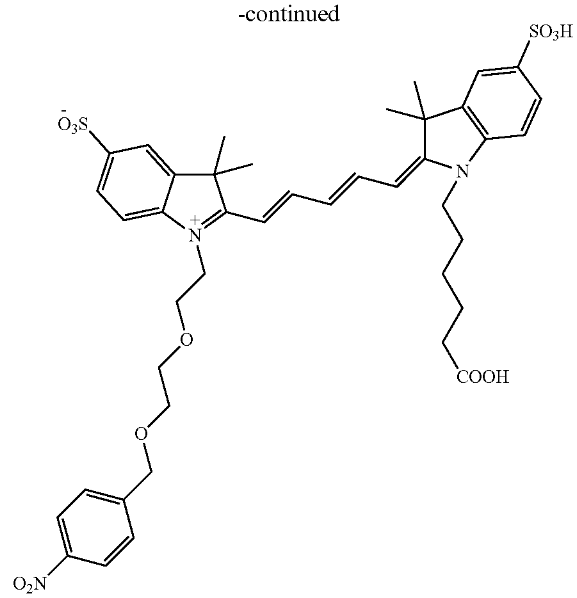

3

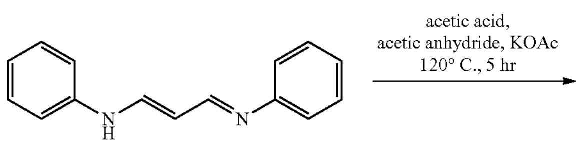

21

In the above reaction, to a round bottom flask were added compound 18 (229 mg), malonaldehyde dianilide hydrochloride (167 mg), 5 mL acetic acid, 0.5 mL acetic anhydride. The resulting purple solution was heated to 120° C. for two hrs, then 300 mg of compound 25 was added to this solution followed by 636 mg of KOAc. The reaction mixture was heated to 120° C. and stirred for another three hours. After the reaction was complete, the reaction mixture was poured into 45 mL of EtOAc to precipitate the crude product as a dark blue solid. The residue was washed three more times (40 mL each time) by EtOAc, and dried. The pure Cy5 dye compound 3 was isolated by semi-prep HPLC purification (0.1% formic acid aq. and actonitrile) as a dark blue solid. MASS (ES+) m/z for $C_{42}H_{49}N_3O_{12}S_2$, $[M+1]^+$ Calculated: 852.3, Found: 852.5.

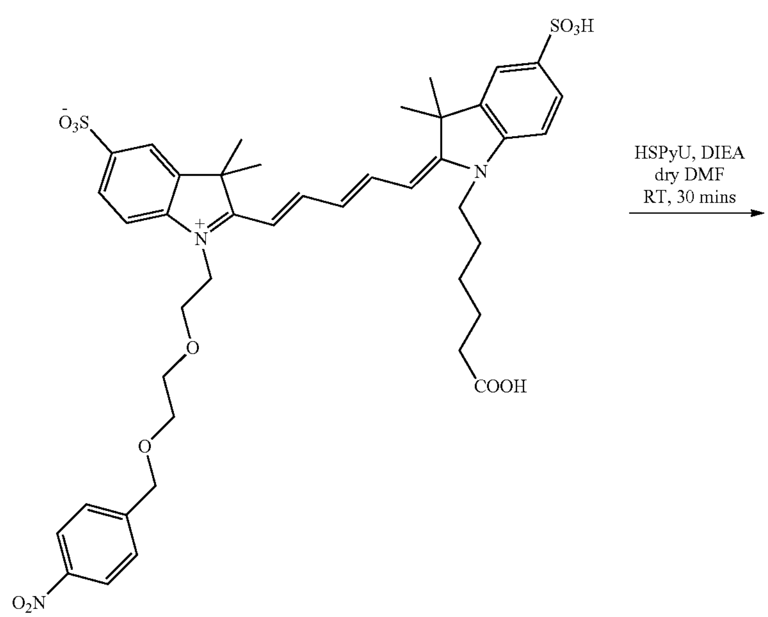

3

-continued

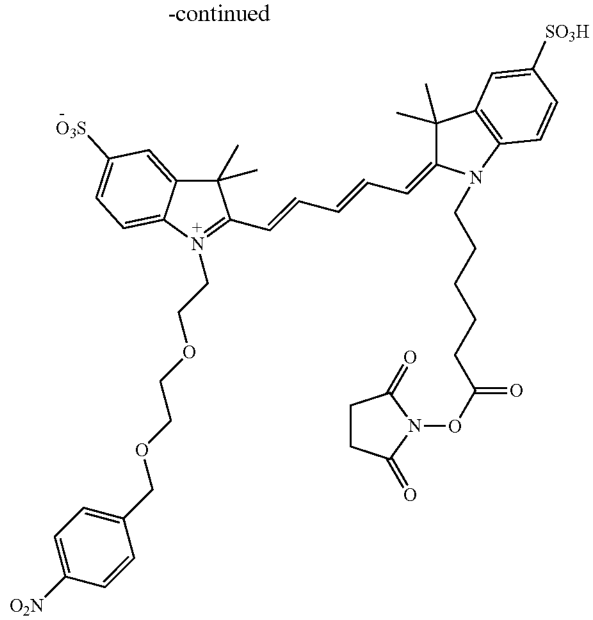

4

In the above reaction, to a 1.5 mL Eppendorf tube, 2 mg of compound 3 was dissolved in 100 μL of dry DMF, then 8.7 mg of HSPyU and 3.3 μL of DIEA were added at RT. The reaction was monitored by LC-MS, which was complete in 30 minutes. Then 1.5 mL EtOAc was added to the tube to precipitate the product. The dark blue solid product 4 was washed three more times by EtOAc, and dried. MASS (ES−) m/z for $C_{46}H_{52}N_4O_{14}S_2$, $[M-1]^-$ Calculated: 947.3, Found: 947.9.

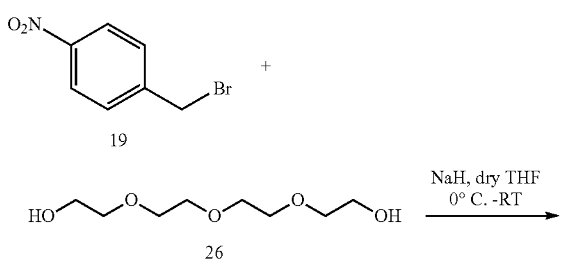

-continued

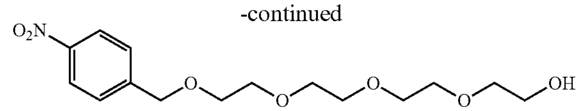

27

In the above reaction, to a Ar protected round bottom flask was taken 360 mg of NaH (80% wt in oil) and 30 mL of dry THF, cooled to 0° C., 2.32 g of tetraglycol was added, and stirred at 0° C. for 1 hour. Then 2.16 g of 4-nitrobenzylbromide in 10 mL THF was added slowly at this temperature. The reaction mixture was stirred and allowed to warm up to RT, and the reaction monitored by TLC. After two hours, 1 mL of water was added to quench the reaction, the solvent was removed by vacuum, and the residue was purified by column (1:1 EtoAC/Hexanes). The product 27 (1.0 g) was isolated as thick gray oil, in a yield of 30.3%. MASS (ES+) m/z for $C_{15}H_{23}NO_7$, $[M+1]^+$ Calculated: 330.2, Found: 330.4.

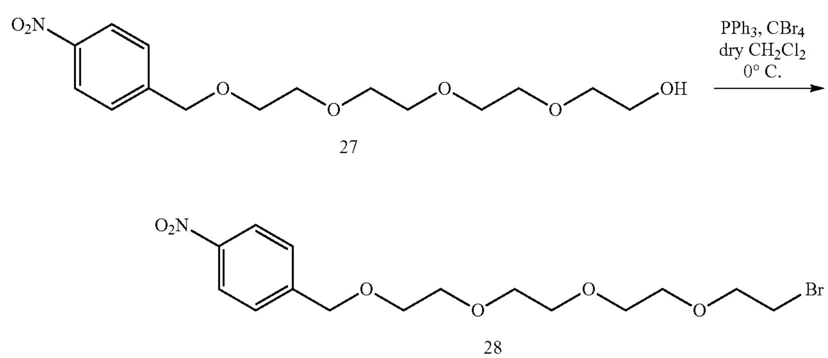

In the above reaction, a solution of 1.1 g of $Ph_3P$ in 20 mL of $CH_2Cl_2$ was added dropwise to an ice-cold solution of 1.0 g of compound 27 and 1.4 g of carbon tetrabromide in 10 mL of $CH_2Cl_2$. The reaction was monitored by TLC, after two hours the solvent was removed, and the residue was purified by column (1:3 EtOAc/Hexanes) to isolate the pure bromide substituted product 28. Compound 24 (1.6 g) was obtained as a light yellow solid in a yield of 92%. MASS (ES+) m/z for $C_{15}H_{22}BrNO_6$, $[M+1]^+$ Calculated: 392.1, Found: 392.4.

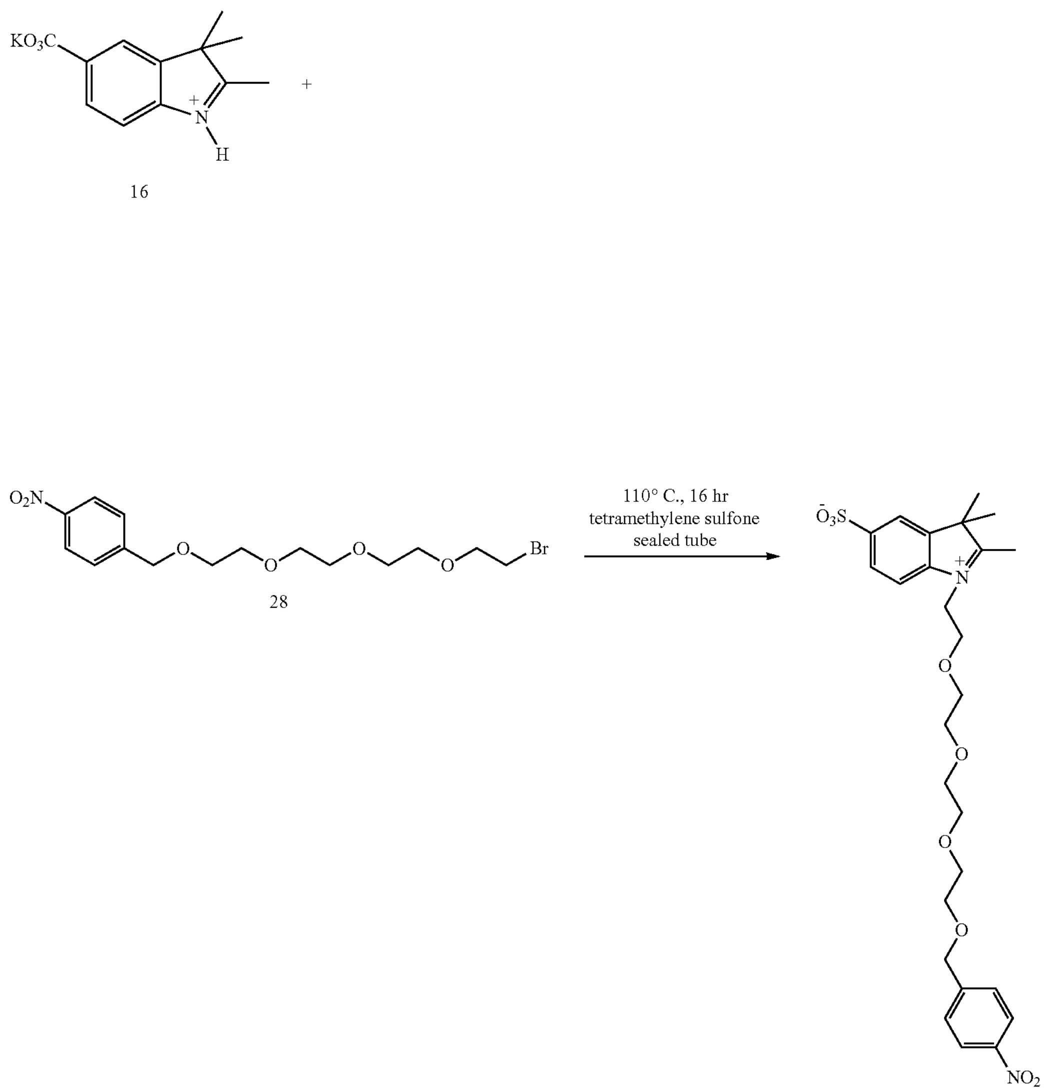

16

28

29

In the above reaction, the 2,3,3-trimethylindolenium-5-sulfonic potassium salt (250 mg) and compound 28 (700 mg) were mixed with 2 mL of tetramethylene sulfone. The reaction mixture was transferred into a degassed sealed tube, heated up to 110° C. for 16 hours. Then the reaction mixture was cooled to room temperature, and the deep purple solution was poured into 15 mL EtOAc to precipitate the product. The purple solid product was washed by 15 mL×3 EtOAc, and dried. Crude compound 29 was carried onto the next step without further purification. MASS (ES−) m/z for $C_{26}H_{34}N_2O_9S$, $[M-1]^-$ Calculated: 549.2, Found: 549.7.

-continued

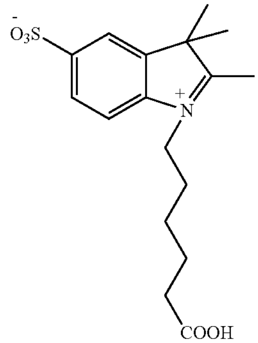

18

+

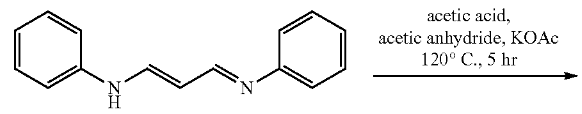

21

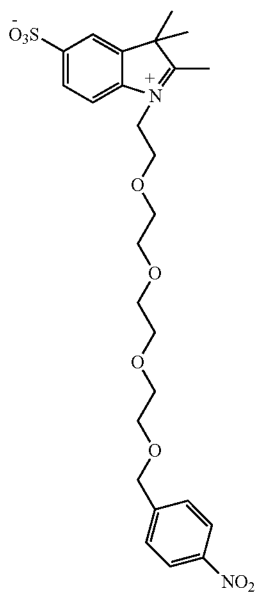

29

+

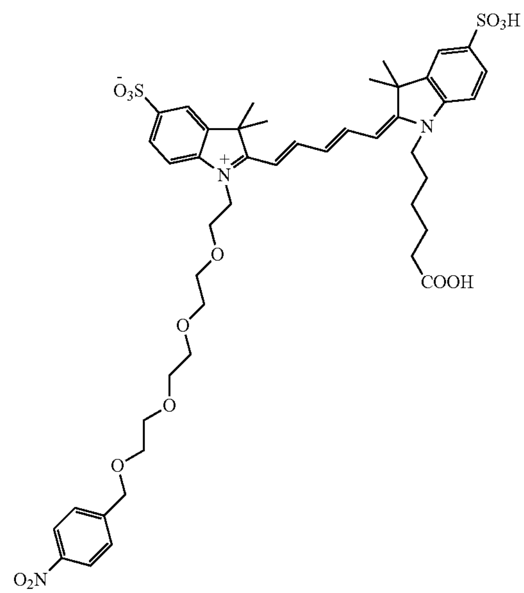

5

In the above reaction, to a round bottom flask were added compound 18 (130 mg), malonaldehyde dianilide hydrochloride (94 mg), 5 mL acetic acid, 0.5 mL acetic anhydride. The resulting purple solution was heated to 120° C. for two hours, then 200 mg of compound 29 was added to this solution followed by 356 mg of KOAc. The reaction mixture was heated to 120° C. and stirred for another three hours. After the reaction was complete, the reaction mixture was poured into 45 mL of EtOAc to precipitate the crude product as a dark blue solid. The residue was washed three more times (40 mL each time) by EtOAc, and dried. The pure Cy5 dye compound 5 was isolated by semi-prep HPLC purification (0.1% formic acid aq. and actonitrile) as a dark blue solid. MASS (ES−) m/z for $C_{46}H_{57}N_3O_{14}S_2$, $[M-1]^-$ Calculated: 938.3, Found: 938.1.

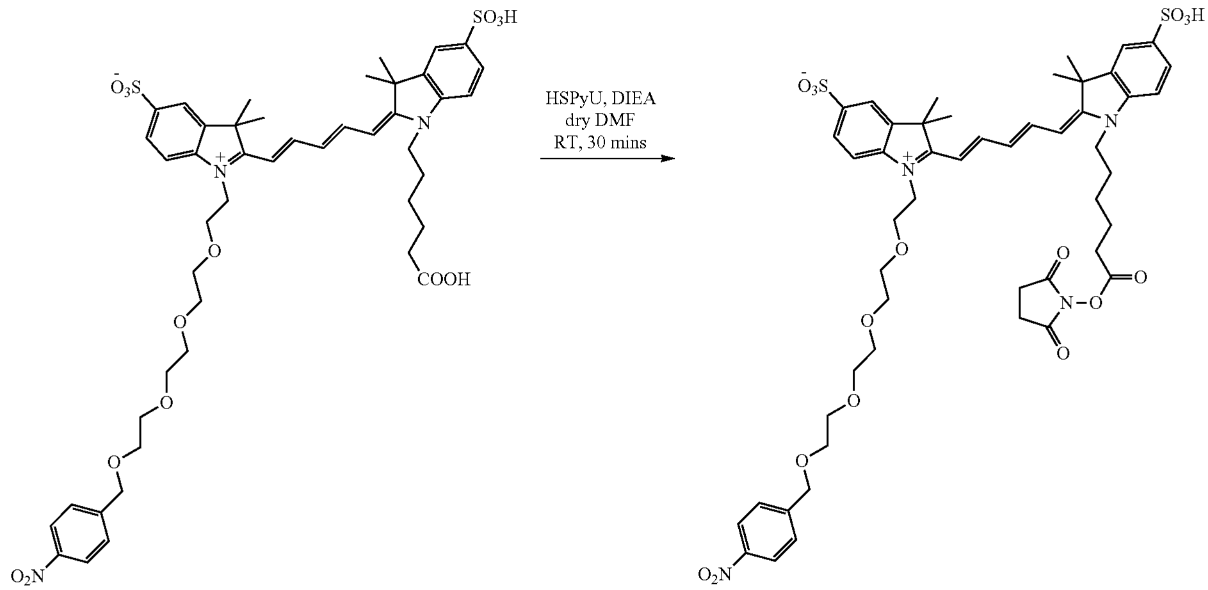

5 6

In the above reaction, to a 1.5 mL Eppendorf tube, 2 mg of compound 3 was dissolved in 100 μL of dry DMF, then 8.7 mg of HSPyU and 3.3 μL of DIEA were added at RT. The reaction was monitored by LC-MS, which was complete in 30 minutes. Then 1.5 mL EtOAc was added to the tube to precipitate the product. The dark blue solid product 4 was washed three more times by EtOAc, and dried. MASS (ES−) m/z for $C_{50}H_{60}N_4O_{16}S_2$, $[M-1]^-$ Calculated: 1035.3, Found: 1035.7.

EXAMPLE 3

Synthesis of Cy5-diglycol-TX-NHS (TX=Trolox)

The following synthetic scheme was employed:

Scheme 3. Synthesis of Cy5-diglycol-Trolox-NHS

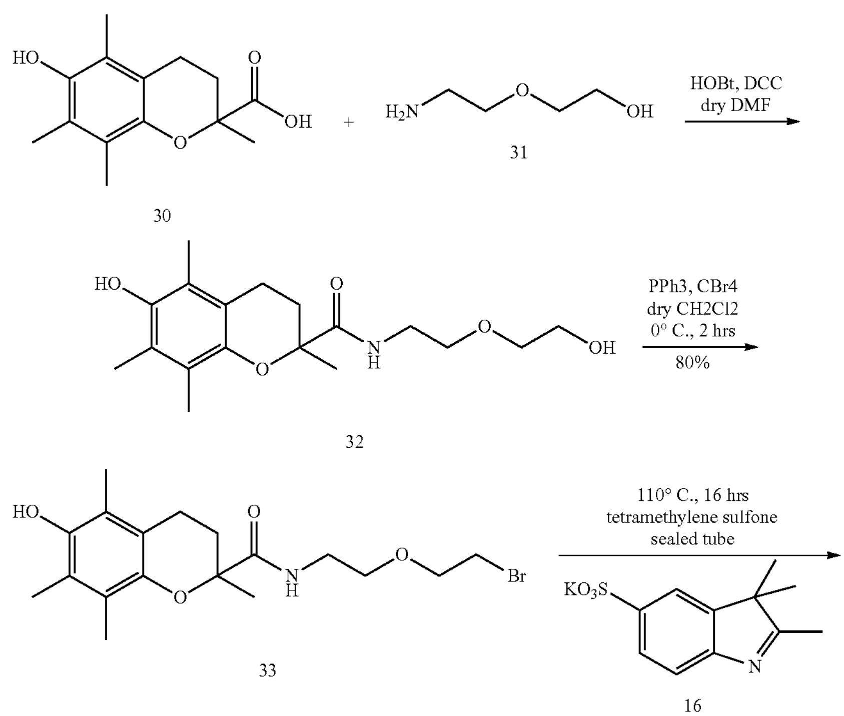

-continued
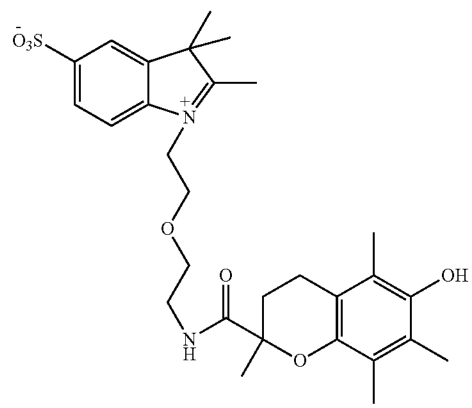
34
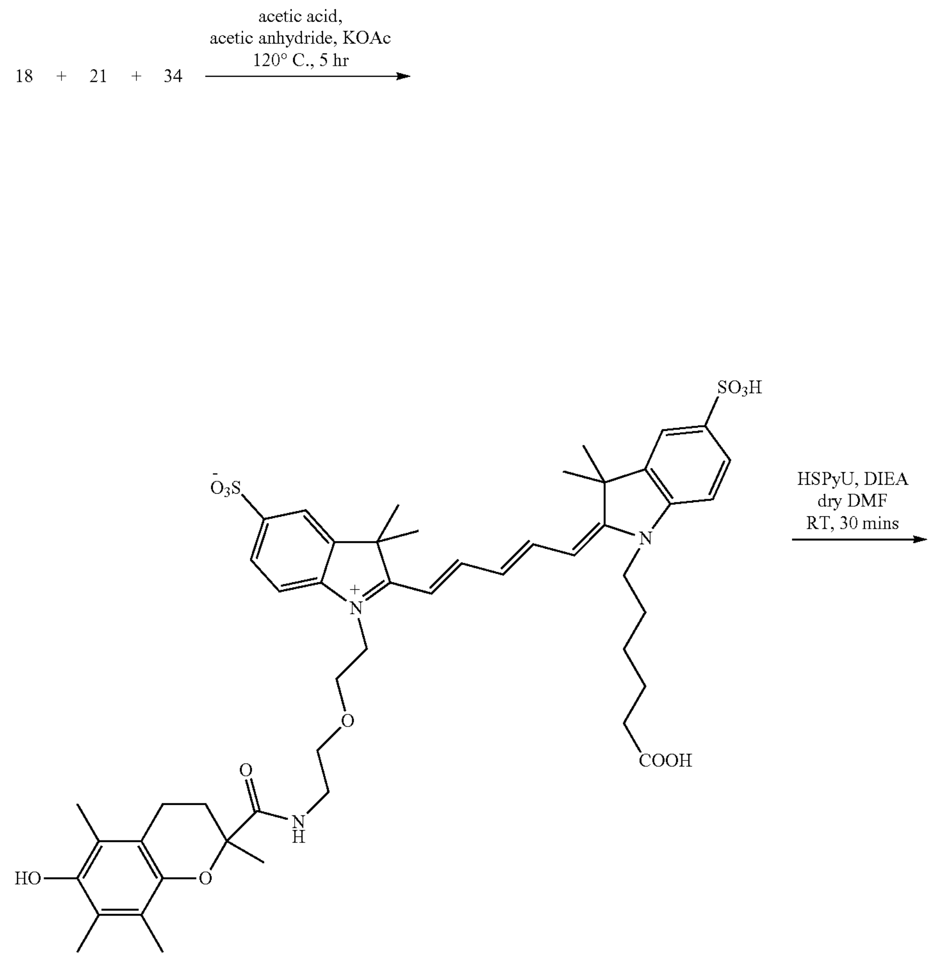
7

-continued

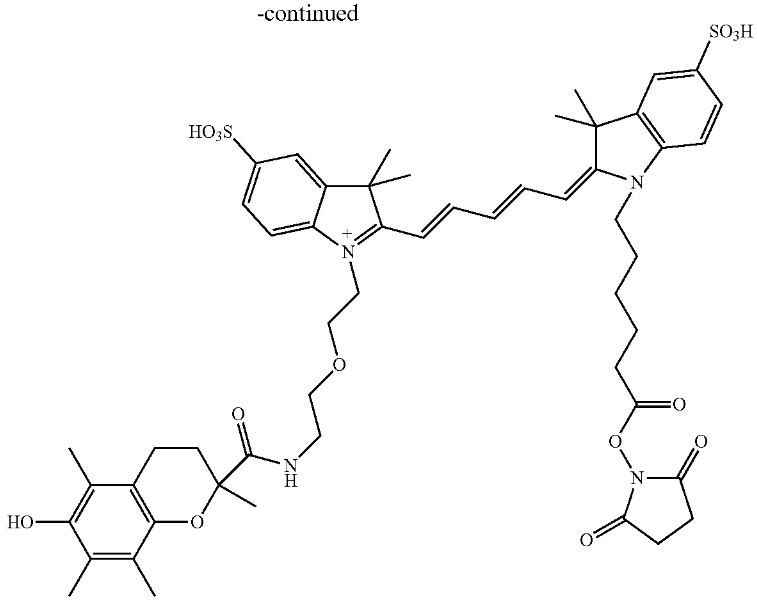

8

In the above reaction, an amide linkage was explored to attach Trolox compound 30 to the cyanine moiety instead of an ester linkage since an ester linkage would likely be hydrolyzed by the conditions used in biological testing. With this idea in mind, an asymmetric linker 31 was used that bears a primary amine group on one end. Coupling of Trolox with compound 31 in the presence of HOBt and DCC gave compound 32 as expected. The untouched primary hydroxyl group in 32 was then replaced with bromine yielding the precursor 33 for the next coupling reaction. Using the brominated Trolox derivative 33, a new Cy5 compound 8 was successfully synthesized using conditions described above in the preceding Examples.

A more detailed description of the synthetic procedure is provided as follows:

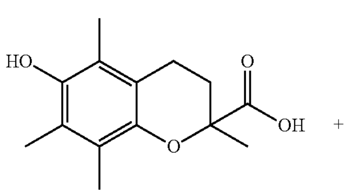

30

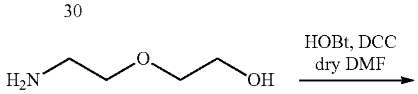

31

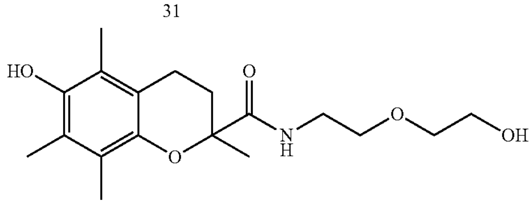

32

In the above reaction, in a flask, 2 mL of dry DMF was cooled to 0° C., 142 mg of Trolox, 60 mg 2-(2-aminoethoxy) ethanol, and 253 mg of 1-hydroxybenzotriazole hydrate (HOBt) were added to chilled DMF. After stirring for 30 minutes, 140 mg of DCC in 2 mL DMF was added to the reaction solution slowly. After stirring for 16 hours at RT, the reaction slurry was filtered, and the filtrate was concentrated. The residue was purified by column. The product compound 32, after the column still had HOBt mixed, was carried onto the next step without further purification. MASS (ES−) m/z for $C_{18}H_{27}NO_5$, $[M-1]^-$ Calculated: 336.2, Found: 336.4.

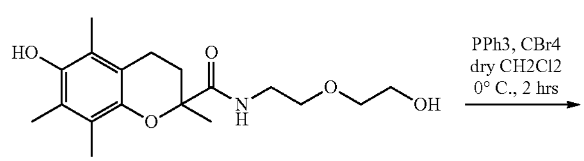

32

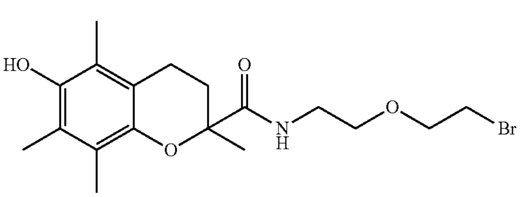

33

In the above reaction, a solution of 179 mg of $Ph_3P$ in 20 mL of $CH_2Cl_2$ was added dropwise to an ice-cold solution of 250 mg (HOBt mixed) of compound 27 and 226 mg of carbon tetrabromide in 10 mL of $CH_2Cl_2$. The reaction was monitored by TLC, after two hours the solvent was removed, and the residue was purified by column (1:3 EtOAc/Hexanes) to isolate the pure bromide substituted product 33. Compound 33 (181 mg) was obtained as a light yellow oil, the yield is 80%. MASS (ES+) m/z for $C_{18}H_{26}BrNO_4$, $[M+1]^+$ Calculated: 400.1, Found: 400.3.

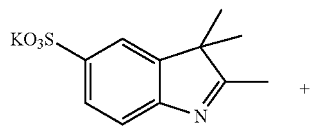

16

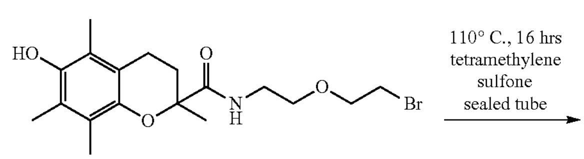

33

-continued

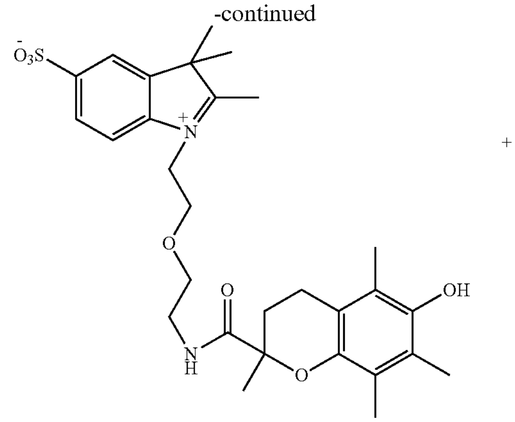

34

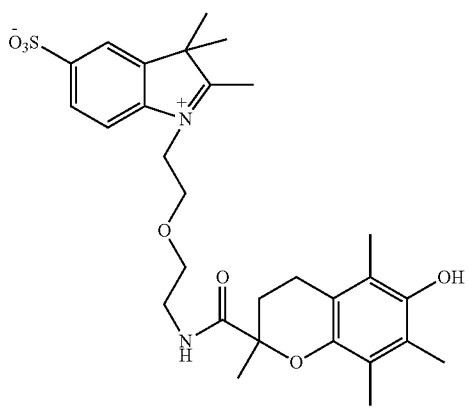

34

In the above reaction, the 2,3,3-trimethylindolenium-5-sulfonic potassium salt (250 mg) and compound 28 (700 mg) were mixed with 2 mL of tetramethylene sulfone. The reaction mixture was transferred into a degassed sealed tube, and heated up to 110° C. for 16 hours. Then the reaction mixture was cooled to room temperature, and the deep purple solution was poured into 15 mL EtOAc to precipitate the product. The purple solid product was washed with 15 mL×3 EtOAc, and dried. Crude compound 29 was carried onto the next step without further purification. MASS (ES+) m/z for $C_{29}H_{38}N_2O_7S$, $[M+1]^+$ Calculated: 559.2, Found: 559.7.

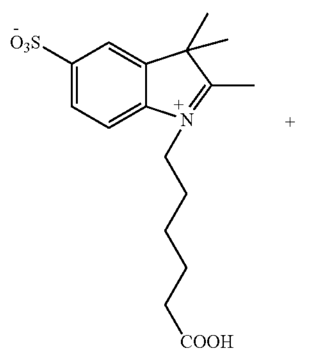

18

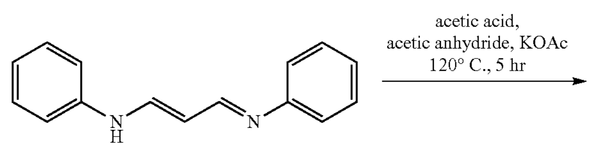

21

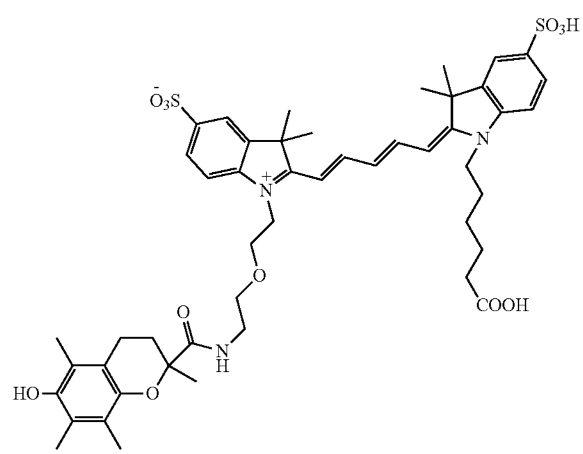

7

In the above reaction, to a round bottom flask were added compound 18 (72 mg), malonaldehyde dianilide hydrochloride (52 mg), 5 mL acetic acid, and 0.5 mL acetic anhydride. The resulting purple solution was heated up to 120° C. for two hours, then 100 mg of compound 34 was added to this solution followed by 198 mg of KOAc. The reaction mixture was heated to 120° C. and stirred for another three hours. After the reaction was complete, the reaction mixture was poured into 45 mL of EtOAc to precipitate the crude product as a dark blue solid. The residue was washed three more times (40 mL each time) by EtOAc, and dried. The pure Cy5 dye compound 7 was isolated by semi-prep HPLC purification (0.1% formic acid aq. and actonitrile) as a dark blue solid. MASS (ES−) m/z for $C_{46}H_{57}N_3O_{14}S_2$, $[M-1]^-$ Calculated: 947.4, Found: 947.8.

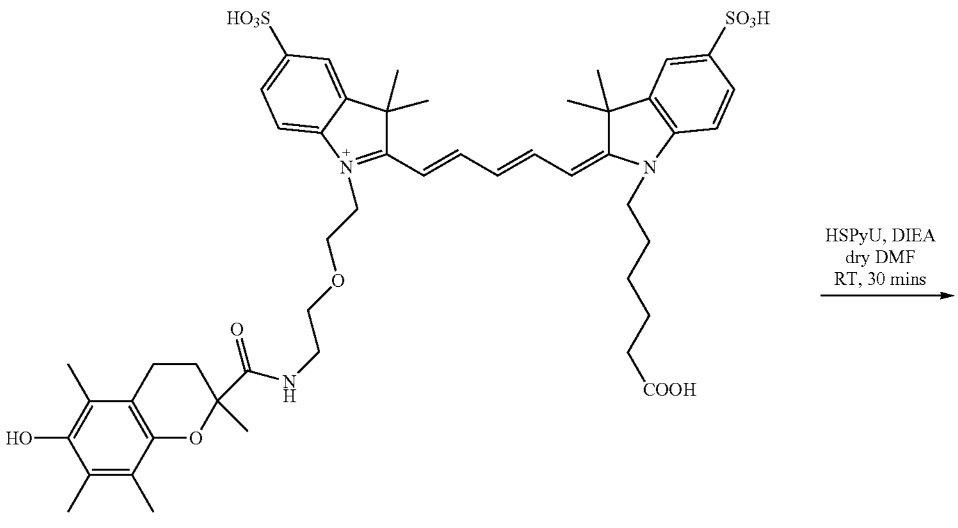

7

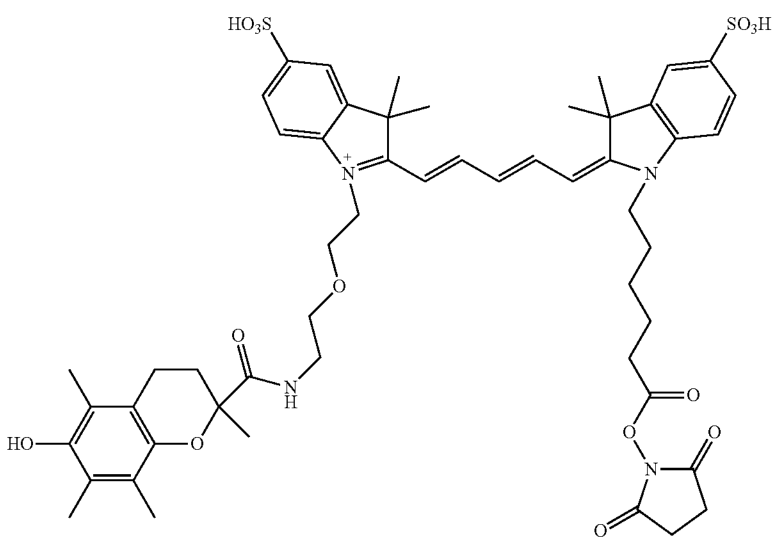

8

In the above reaction, to a 1.5 mL eppendorf tube, 2 mg of compound 7 was dissolved in 100 μL of dry DMF, then 8.0 mg of HSPyU and 3.3 μL of DIEA were added at RT. The reaction was monitored by LC-MS, which was complete in 30 minutes. Then 1.5 mL EtOAc was added to the tube to precipitate the product. The dark blue solid product 8 was washed three more times by EtOAc, and dried. MASS (ES−) m/z for $C_{53}H_{64}N_4O_{14}S_2$, $[M-1]^-$ Calculated: 1044.4, Found: 1044.8.

EXAMPLE 4

Synthesis of Cy5-tetraglycol-TX-NHS

The following synthetic scheme was employed:

Scheme 4. Synthesis of Cy5-tetraglycol-Trolox-NHS

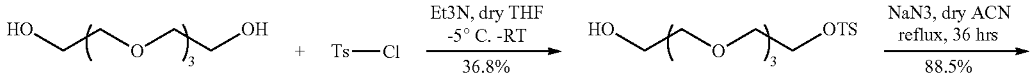

26 35

-continued
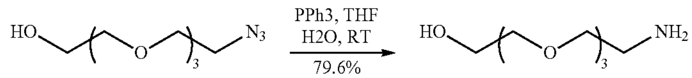
36 37
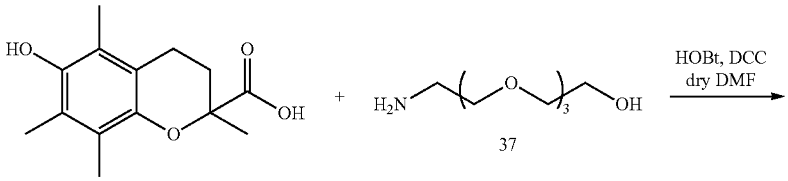
37
30
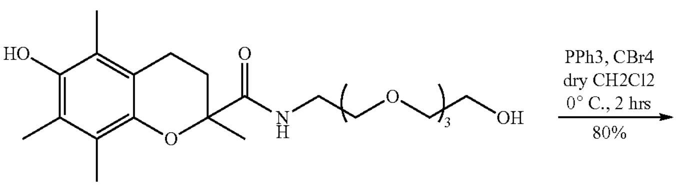
38
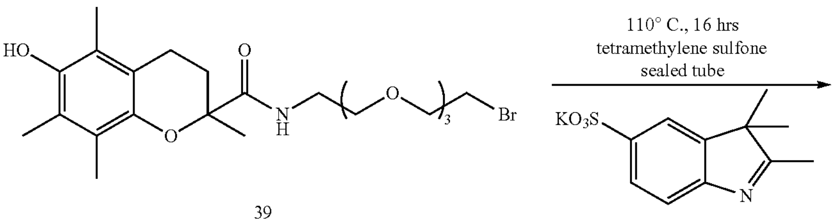
39
16
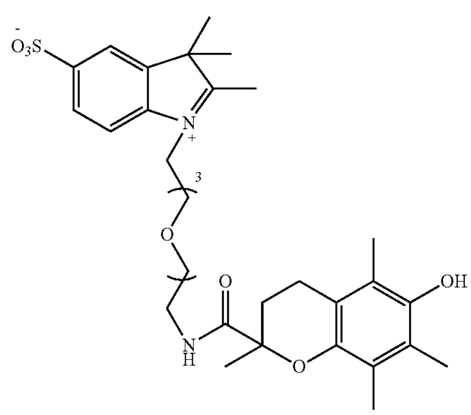
40
18 + 21 + 40 $\xrightarrow{\text{acetic acid, acetic anhydride, KOAc, 120° C., 5 hr}}$ -continued

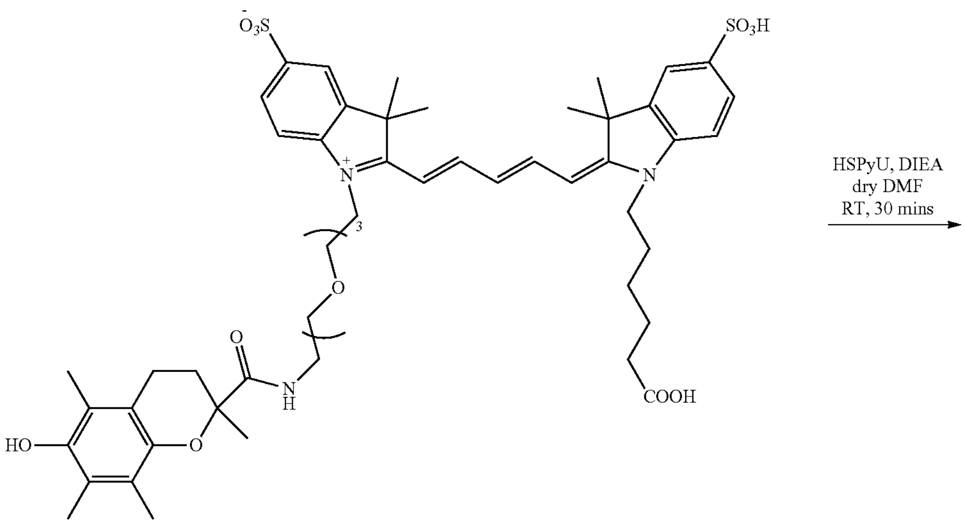

9

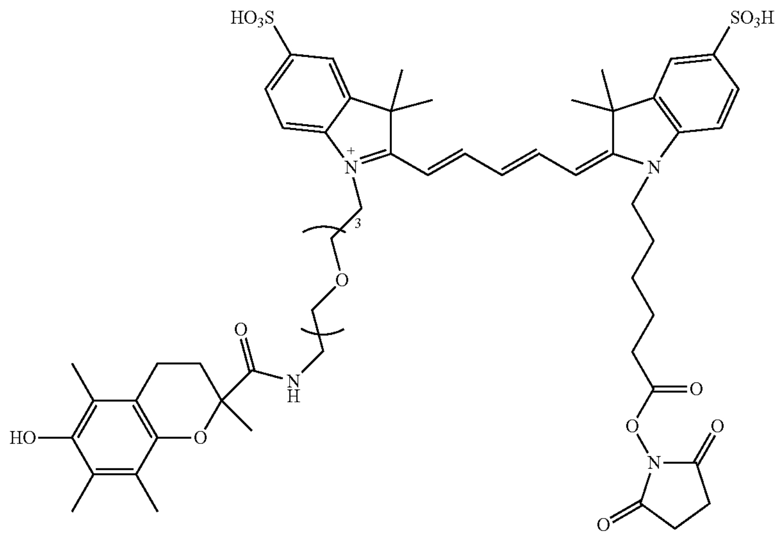

10

In the above reaction, since no commercial amino tetraglycol was available, a selective tosylation-substitution synthesis was performed to prepare the desired linker in a total yield of 26% over three steps. Tetraglycol 26 was first converted to a monotysolate 35 that was then treated with sodium azide in refluxing acetonitrile. The obtained azide-tetraglycol 36 was then reduced with triphenylphine to give the target amino-derivatized linker 37. Following the same synthetic route as for linker 31 in the Example 3, and following with the general procedure described in Example 3, a Trolox-tetraglycol Cy5 compound 10 was synthesized.

A more detailed description of the synthetic procedure is provided as follows:

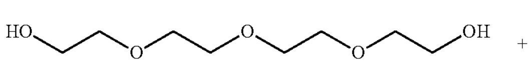

26

-continued

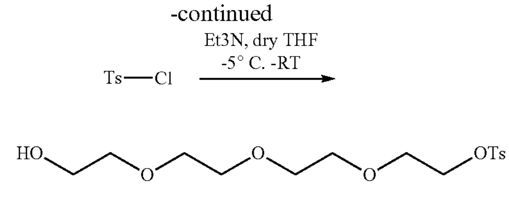

35

In the above reaction, to a THF solution of 1.94 g tetraglycol and 1.01 g triethyl amine cooled to 0° C., was added 1.91 g tosylchloride (Ts-Cl) in 10 mL THF slowly. The reaction was monitored by TLC. After five hrs, the reaction mixture was filtered, the filtrate was concentrated, and the residue was purified by column. 1.25 g of compound 35 was obtained as a light yellow thick oil in a yield of 36.8%. MASS (ES+) m/z for $C_{15}H_{24}O_7S$, $[M+1]^+$ Calculated: 349.1, Found: 349.5.

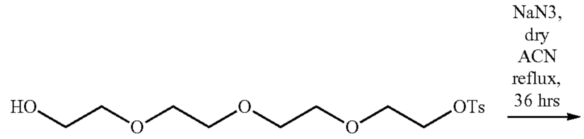

35

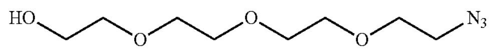

36

In the above reaction, tetraglycol-Ts 35 (500 mg) was dissolved in 15 mL dry acetonitrile, and 140 mg of $NaN_3$ was added to the solution. The reaction solution was refluxed for 36 hours, cooled to RT, poured into 20 mL of water, and extracted by $CH_2Cl_2$. The organic layers were combined, concentrated, and the residue purified by silica column. 278 mg of compound 36 was obtained as light yellow oil, in a yield of 88.5%. MASS (ES+) m/z for $C_8H_{17}N_3O_4$, $[M+1]^+$ Calculated: 220.1, Found: 220.3.

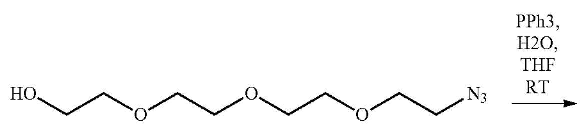

36

-continued

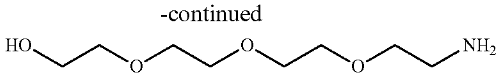

37

In the above reaction, at RT, compound 36 (278 mg), $PPh_3$ (366 mg), and water (34 mg), were added to 5 mL THF, and stirred for four hours. Then the solvent was removed and the residue was purified by column ($CHCl_3$/MeOH/$Et_3N$ 3:3:1). 195 mg of product 37 was obtained as light yellow oil, in a yield of 79.6%.

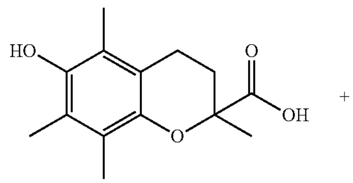

30

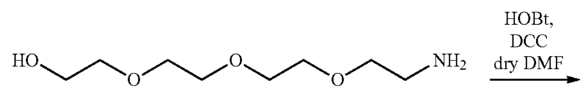

37

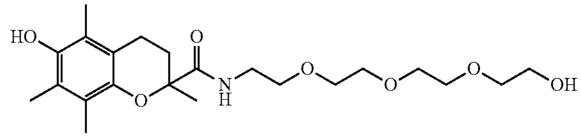

38

In the above reaction, in a flask, 2 mL of dry DMF was cooled to 0° C., 252 mg of Trolox, 195 mg tetraglycol-$NH_2$ 37, and 450 mg of HOBt were added to chilled DMF. After stirring for 30 minutes, 250 mg of DCC in 2 mL DMF was added to the reaction solution slowly. After stirring for 16 hours at RT, the reaction slurry was filtered and the filtrate was concentrated. The residue was purified by column. The product compound 38, after the column still had HOBt mixed, was carried onto the next step without further purification. MASS (ES+) m/z for $C_{22}H_{35}NO_7$, $[M+1]^+$ Calculated: 426.2, Found: 426.0.

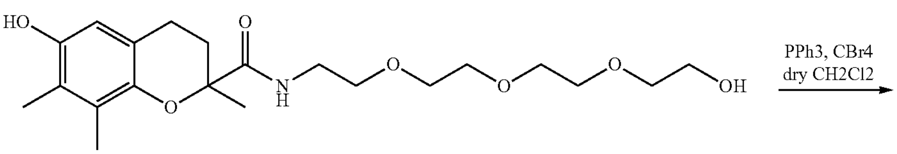

38

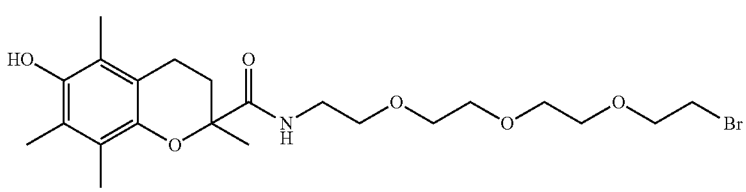

39

In the above reaction, a solution of 260 mg of $Ph_3P$ in 10 mL $CH_2Cl_2$ was added dropwise to an ice-cold solution of 350 mg (HOBt mixed) of compound 38 and 330 mg of carbon tetrabromide in 10 mL of $CH_2Cl_2$. The reaction was monitored by TLC, after two hours the solvent was removed, and the residue was purified by column (1:1 EtOAc/Hexanes) to isolate the bromide substituted product 39. Crude compound 39 505 mg was obtained as light yellow oil, with HOBt mixed, was carried onto the next step without further purification. MASS (ES+) m/z for $C_{22}H_{34}BrNO_6$, $[M+1]^+$ Calculated: 488.2, Found: 488.5.

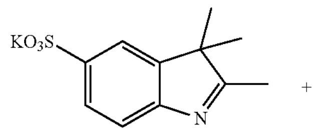

16

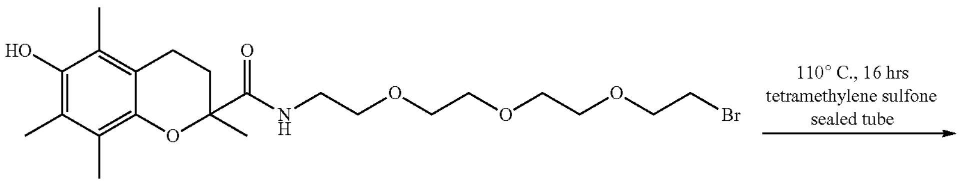

39

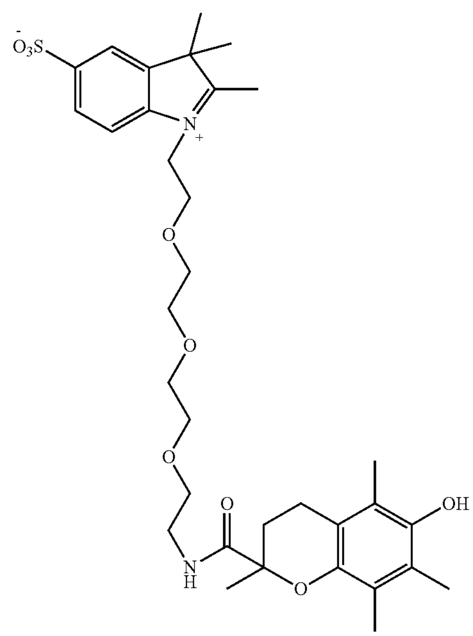

40

In the above reaction, the 2,3,3-trimethylindolenium-5-sulfonic potassium salt (113 mg) and compound 39 (300 mg) were mixed with 2 mL of tetramethylene sulfone. The reaction mixture was added into a degassed sealed tube and heated up to 110° C. for 16 hours. Then the reaction mixture was cooled to room temperature, and the deep purple solution was poured into 15 mL EtOAc to precipitate the product. The purple solid product was washed by 15 mL×3 EtOAc, and dried. Crude compound 40 was carried onto the next step without further purification. MASS (ES+) m/z for $C_{33}H_{46}N_2O_9S$, $[M+1]^+$ Calculated: 647.3, Found: 647.6.

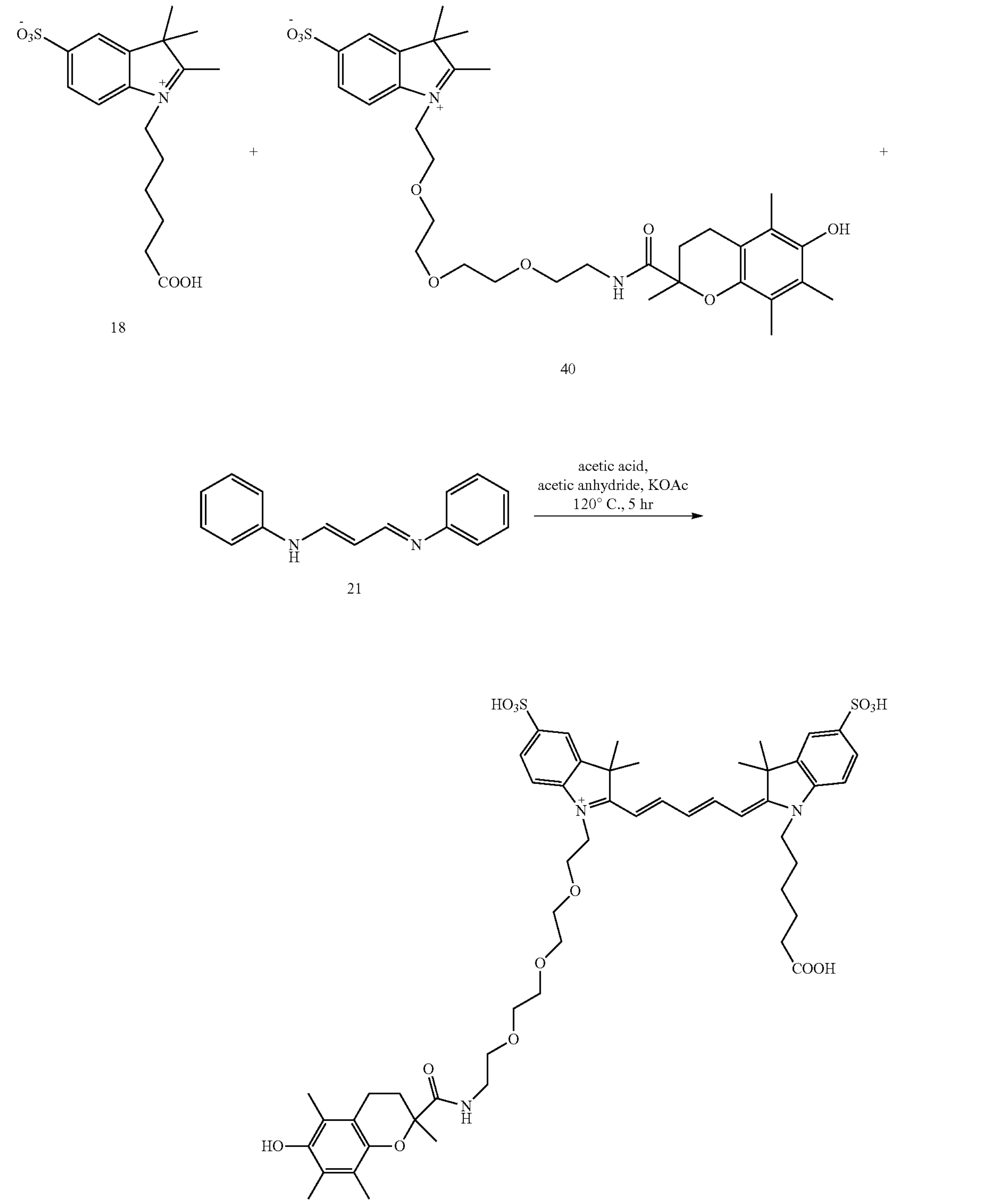

In the above reaction, to a round bottom flask were added compound 18 (192 mg), malonaldehyde dianilide hydrochloride (67 mg), 5 mL acetic acid, and 0.5 mL acetic anhydride. The resulting purple solution was heated up to 120° C. for two hours, then 157 mg of compound 40 was added to this solution followed by 350 mg of KOAc. The reaction mixture was heated to 120° C. and stirred for another three hours. After the reaction was complete, the reaction mixture was poured into 45 mL of EtOAc to precipitate the crude product as a dark blue solid. The residue was washed three more times (40 mL each time) by EtOAc, and dried. The pure Cy5 dye compound 9 was isolated by semi-prep HPLC purification (0.1% formic acid aq. and actonitrile) as a dark blue solid. MASS (ES−) m/z for $C_{53}H_{69}N_3O_{14}S_2$, [M−1]− Calculated: 1034.4, Found: 1034.9.

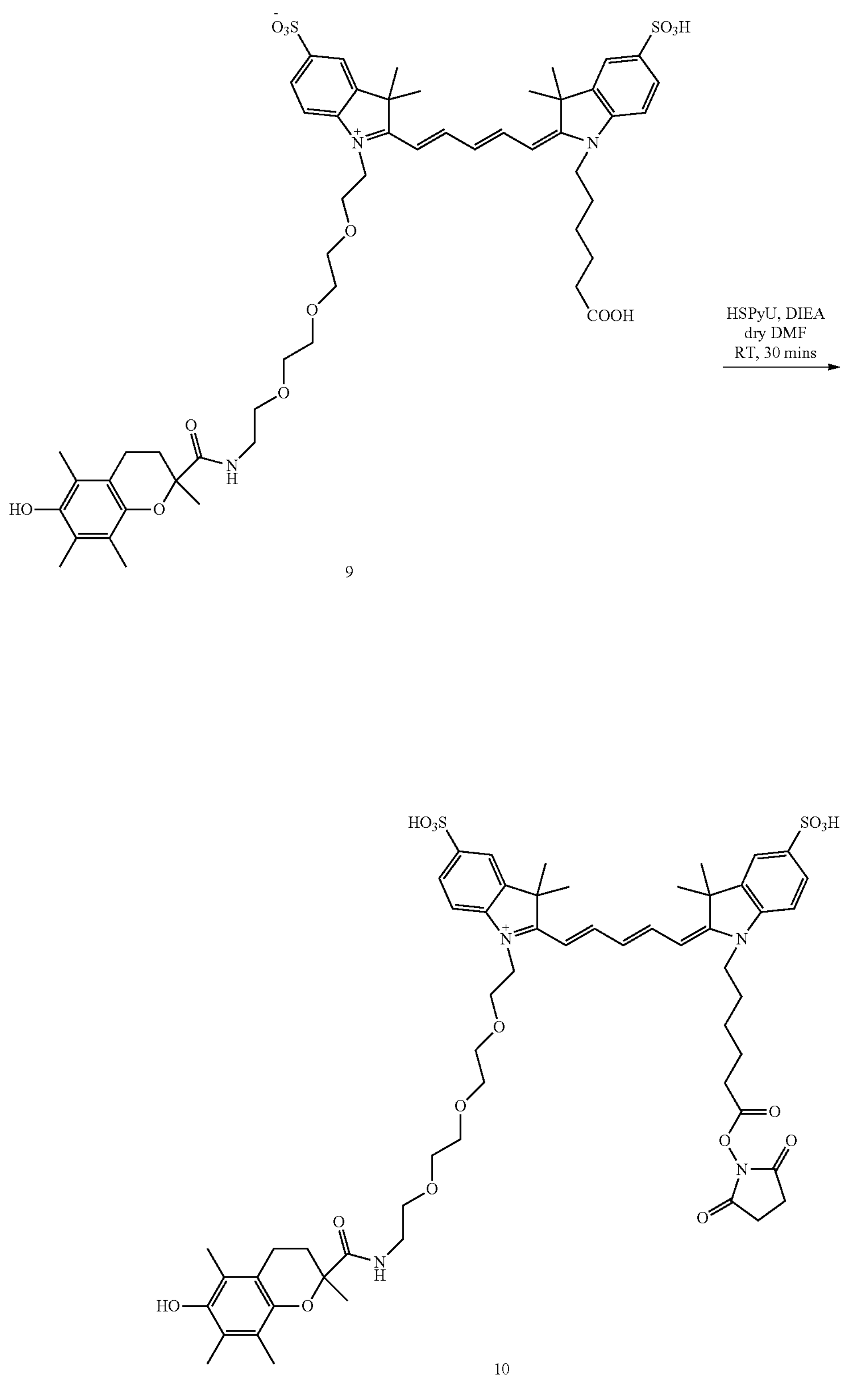

9

10

In the above reaction, to a 1.5 mL Eppendorf tube, 2 mg of compound 9 was dissolved in 100 μL of dry DMF, then 8.0 mg of HSPyU and 3.3 μL of DIEA were added at RT. The reaction was monitored by LC-MS, which was complete in 30 minutes. Then 1.5 mL EtOAc was added to the tube to precipitate the product. The dark blue solid product 10 was washed three more times by EtOAc, and dried. MASS (ES−) ink for $C_{57}H_{72}N_4O_{16}S_2$, $[M-1]^-$ Calculated: 1131.4, Found: 1131.5.

EXAMPLE 5
Synthesis of Cy5-tetraglycol-Q-NHS (where Q=3,5-dinitrobenzyl)
The following synthetic scheme was employed:
Scheme 5. Synthesis of Cy5-tetraglycol-Q-NHS (where Q = 3,5-dinitrobenzyl)
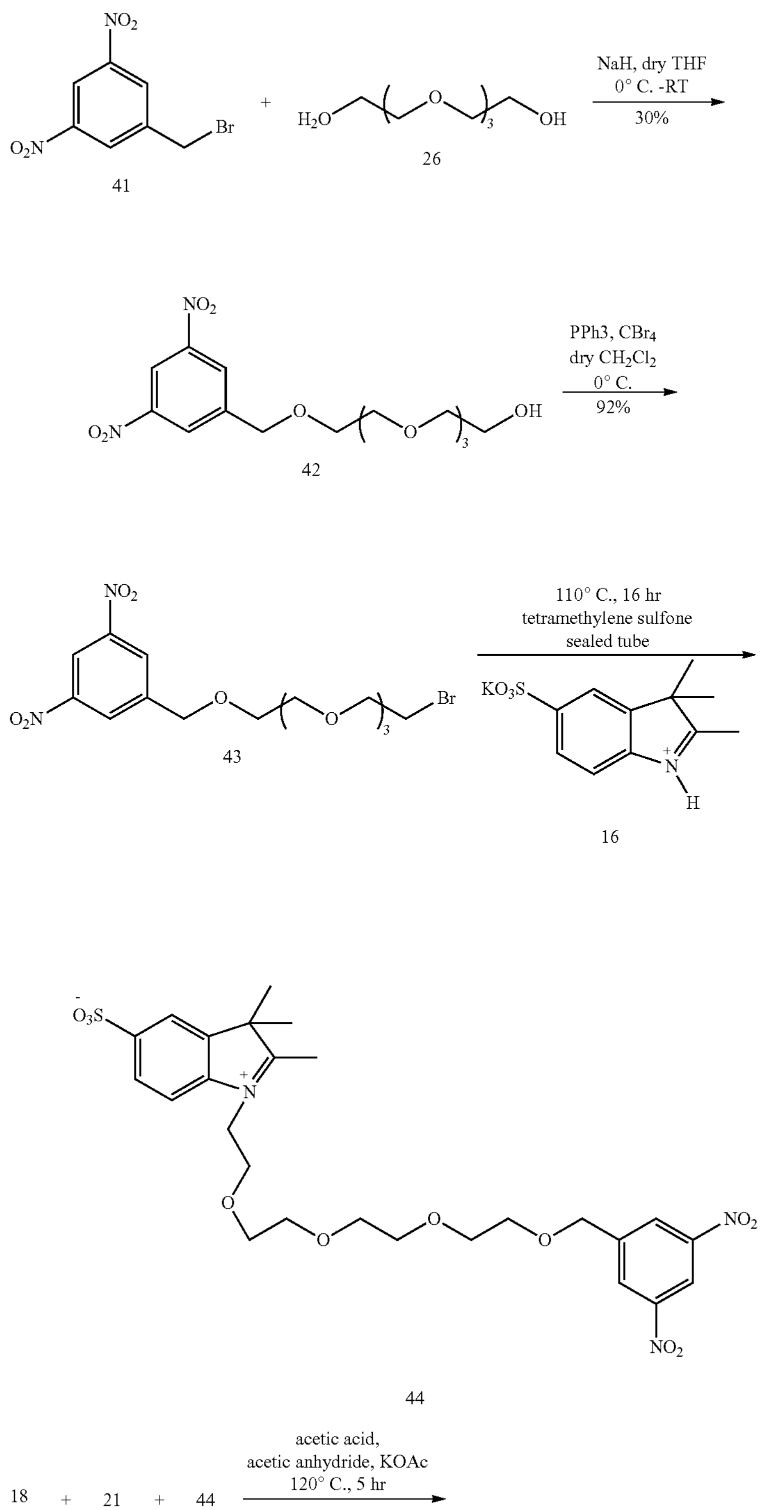

-continued
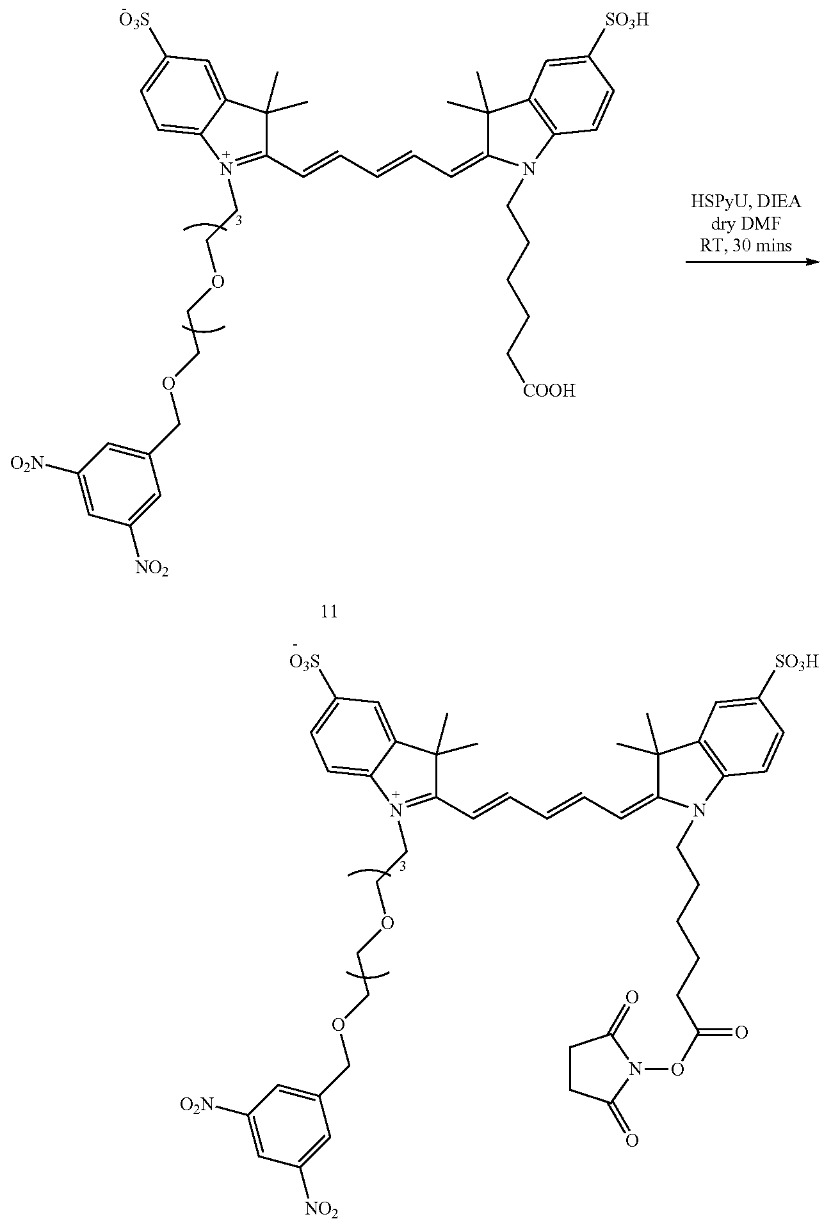
11
12
The above reaction scheme can be achieved by using procedures described in Example 2 for analogous NBA derivatives. A more detailed description of the synthetic procedure is provided as follows:
-continued
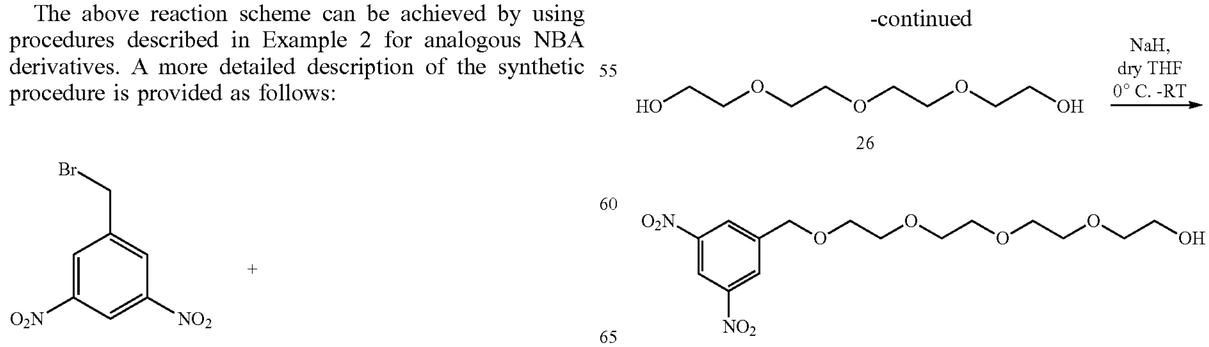
41
26
42

In the above reaction, to a Ar protected round bottom flask was added 63 mg of NaH (80% wt in oil) and 10 mL of dry THF, cooled to 0° C., 306 mg of tetraglycol was added, and stirred at 0° C. for 1 hour. Then 412 mg of 3,5-dinitrobenzylbromide in 10 mL THF was added slowly at this temperature. The reaction mixture was stirred and allowed to warm up to RT, and the reaction was monitored by TLC. After two hours, 1 mL of water was added to quench the reaction, the solvent was removed by vacuum, and the residue was purified by column (1:1 EtOAC/Hexanes). The product 42 (215 mg) was isolated as thick grey oil in a yield of 36.4%. MASS (ES+) m/z for $C_{15}H_{22}N_2O_9$, $[M+1]^+$ Calculated: 375.1, Found: 375.3.

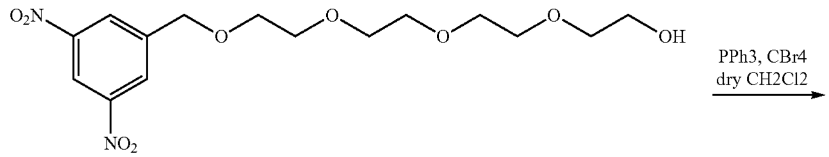

42

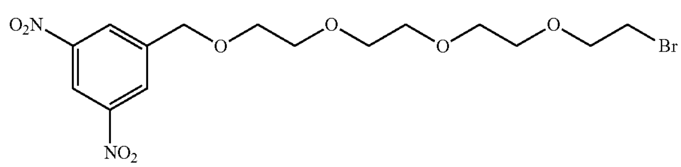

43

In the above reaction, a solution of 181 mg of $Ph_3P$ in 10 mL of $CH_2Cl_2$ was added dropwise to an ice-cold solution of 215 mg of compound 42 and 229 mg of carbon tetrabromide in 10 mL of $CH_2Cl_2$, and the reaction was monitored by TLC. After two hours, the solvent was removed, and the residue was purified by column (1:3 EtOAc/Hexanes) to isolate the pure bromide substituted product 43. Compound 43 (192 mg) was obtained as a light yellow solid in a yield of 76.5%.

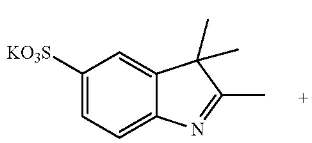

16

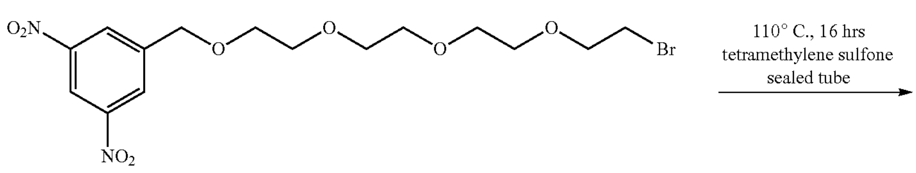

43

-continued

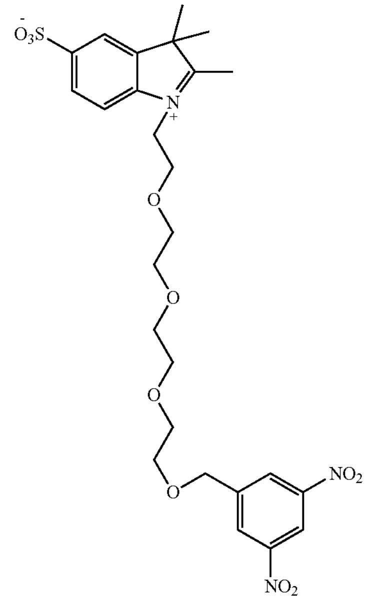

44

In the above reaction, the 2,3,3-trimethylindolenium-5-sulfonic potassium salt (82 mg) and compound 43 (192 mg) were mixed with 2 mL of tetramethylene sulfone. The reaction mixture was added into a degassed sealed tube and heated up to 110° C. for 16 hours. Then the reaction mixture was cooled to room temperature, and the deep purple solution was poured into 15 mL EtOAc to precipitate the product. The purple solid product was washed with 15 mL×3 EtOAc, and dried. Crude compound 44 was carried onto the next step without further purification. MASS (ES+) m/z for $C_{26}H_{33}N_3O_{11}S$, $[M+1]^+$ Calculated: 596.2, Found: 596.5.

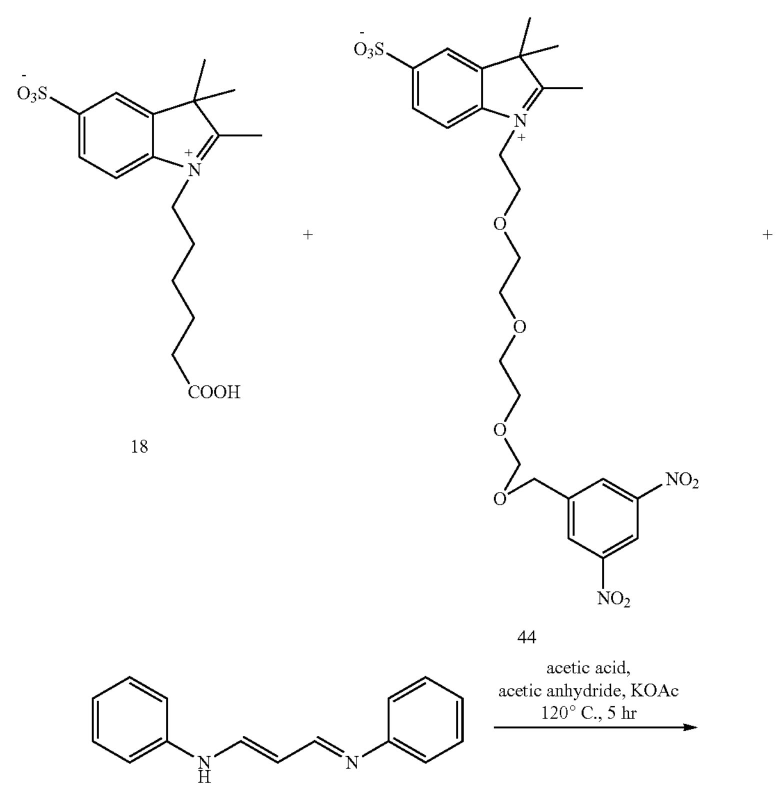

18

44

21

-continued

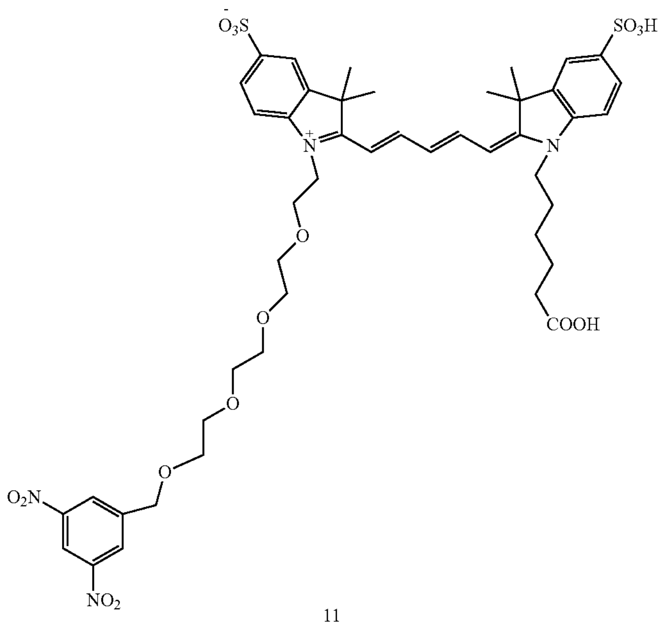

11

In the above reaction, to a round bottom flask were added compound 18 (83 mg), malonaldehyde dianilide hydrochloride (61 mg), 5 mL acetic acid, and 0.5 mL acetic anhydride. The resulting purple solution was heated to 120° C. for two hours, then 98 mg of compound 44 was added to this solution followed by 230 mg of KOAc. The reaction mixture was heated to 120° C. and stirred for another three hours. After the reaction was complete, the reaction mixture was poured into 45 mL of EtOAc to precipitate the crude product as a dark blue solid. The residue was washed three more times (40 mL each time) by EtOAc, and dried. The pure Cy5 dye compound 11 was isolated by semi-prep HPLC purification (0.1% formic acid aq. and actonitrile) as a dark blue solid. MASS (ES−) m/z for $C_{46}H_{56}N_4O_{16}S_2$, $[M-1]^-$ Calculated: 984.3, Found: 984.2.

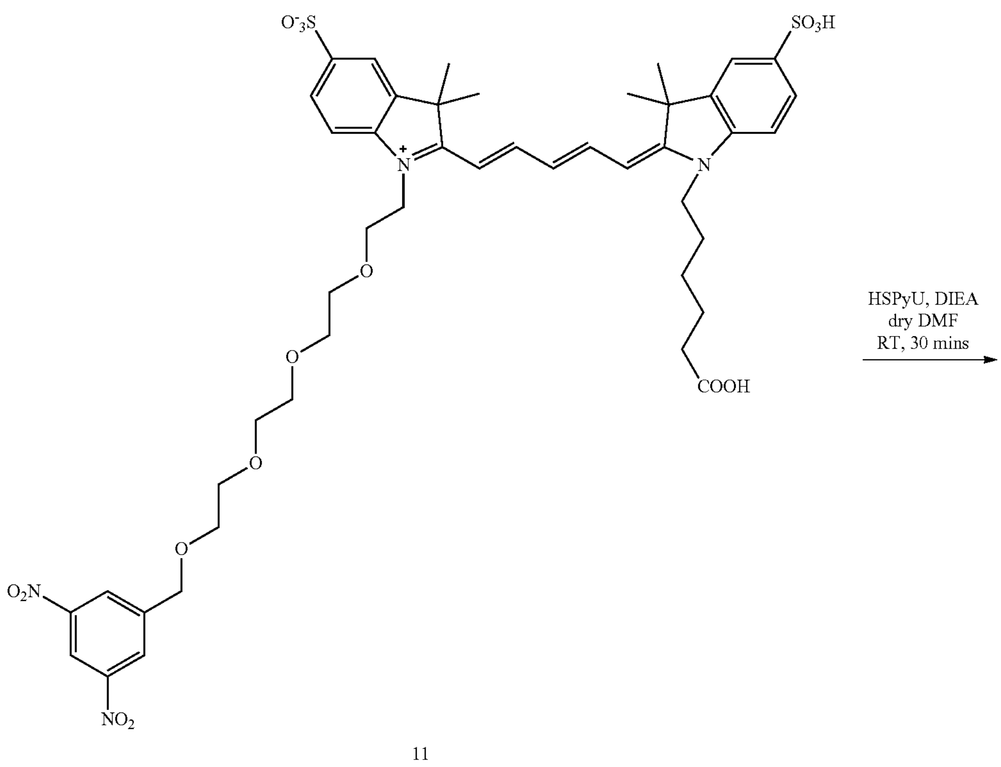

11

-continued

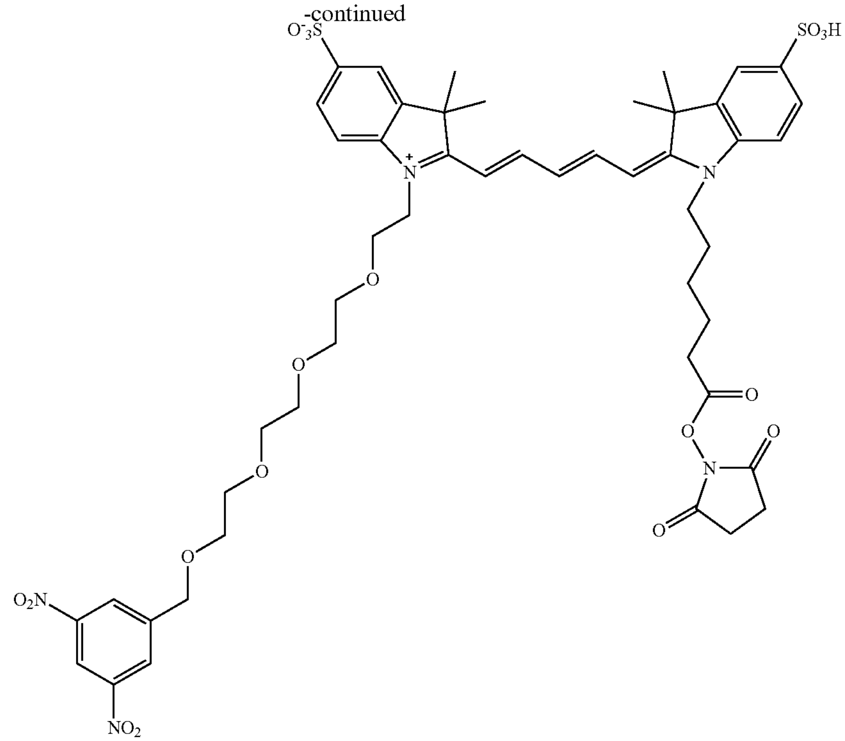

12

In the above reaction, to a 1.5 mL Eppendorf tube, 2 mg of compound 11 was dissolved in 100 μL of dry DMF, then 8.0 mg of HSPyU and 3.3 μL of DIEA were added at RT. The reaction was monitored by LC-MS, which was complete in 30 minutes. Then 1.5 mL EtOAc was added to the tube to precipitate the product. The dark blue solid product 12 was then washed three more times by EtOAc, and dried. MASS (ES−) m/z for $C_{50}H_{59}N_5O_{18}S_2$, $[M-1]^-$ Calculated: 1080.6, Found: 1080.3.

EXAMPLE 6

Synthesis of Cy5-3c-COT-NHS (where 3c Designates a Three-carbon Linker, and COT=cyclooctatetraene)

The following synthetic scheme was employed:

Scheme 6. Synthesis of Cy5-3c-Q-NHS

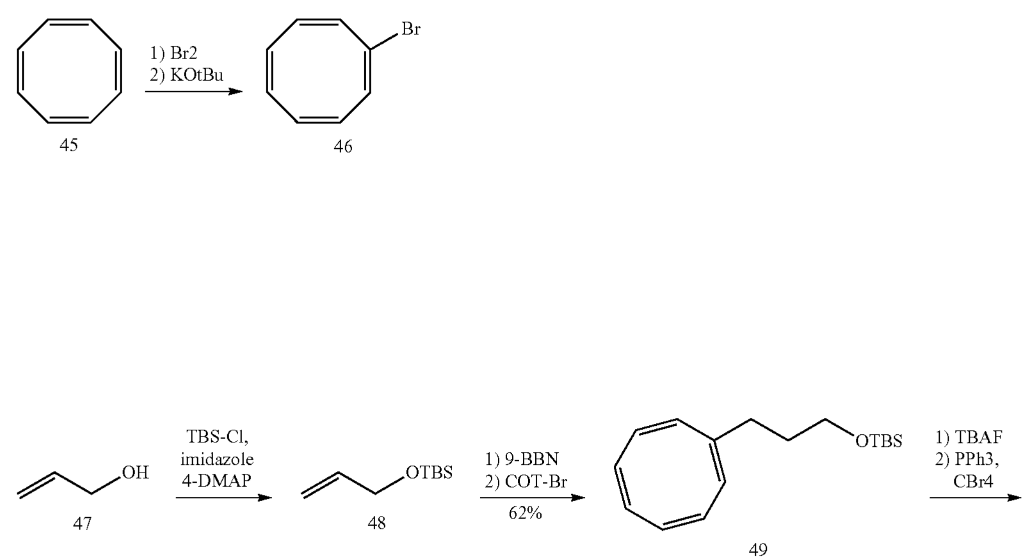

-continued

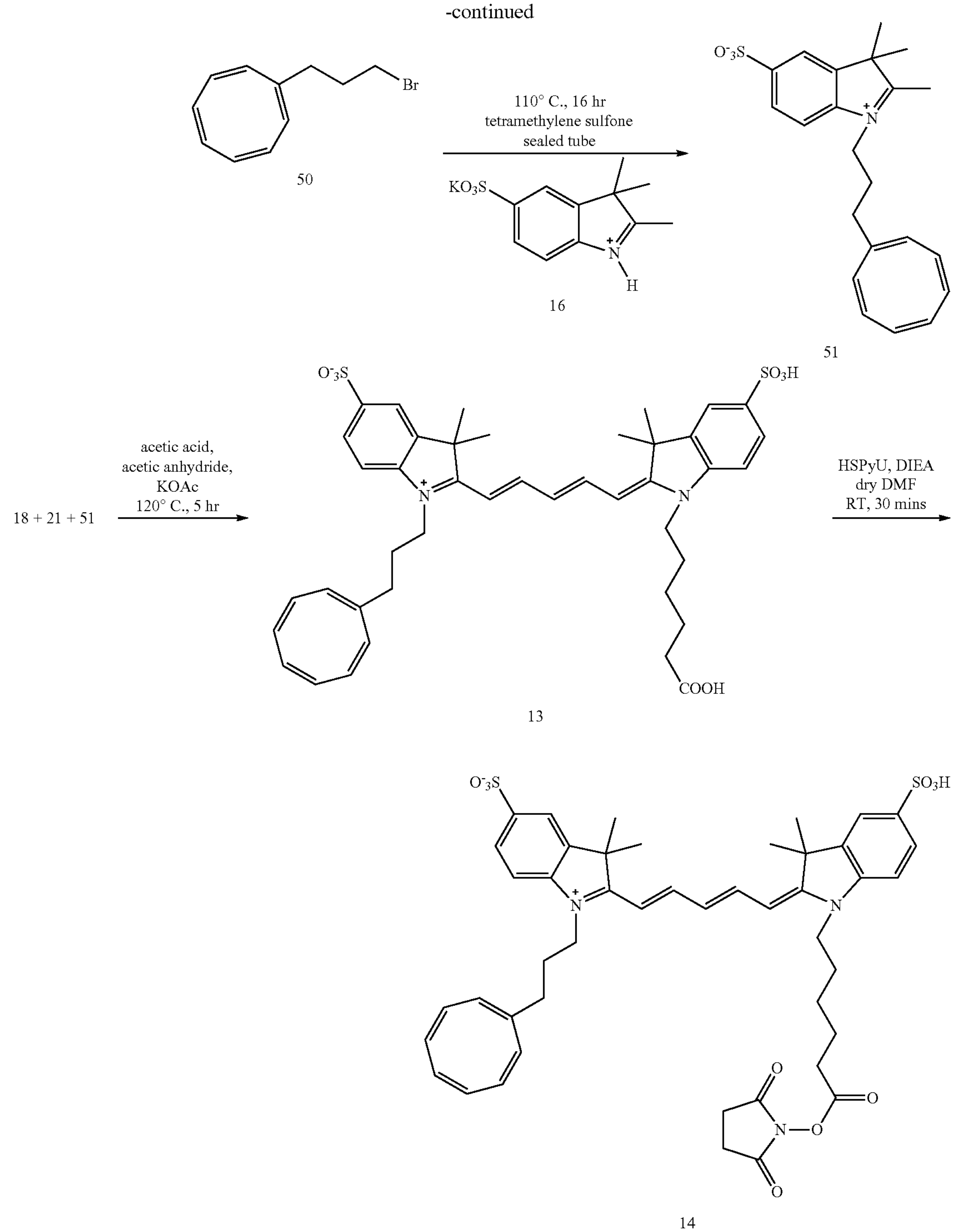

COT is another unique and interesting protective agent, but is a very hydrophobic compound that does not dissolve in water. Thus, to couple the COT to the Cy5, the COT ring needed to first be properly derivatized. The bromo-COT 46 was prepared by an addition-elimination strategy by treating the commercially available COT 45 with bromine followed by potassium t-butoxide. Transmetallation of 46 with n-butyllithium followed by addition of dry ice produced a mixture of COT-COOH with a series of other side products that made the purification very difficult. Alternatively, a one-pot procedure to boronate allyl TBS (t-butylsilane) ether 48 followed by a Suzuki coupling reaction with bromo-COT produced the COT-alkyl-OTBS intermediate 49 in good yield (62%). Bromination of 49 gave the COT-alkyl-bromide 50. The COT-alkyl-bromide 50 was then attached to an indolyl moiety to provide indolyl derivative 51, in analogy to the reaction conditions described in the preceding examples, and the indolyl derivative 51 and indolyl derivative 18 reacted with the dianilide compound 21 to provide the precursor (M=COOH) dye compound 13, which is converted to the activated ester (NHS) form, all as described in preceding Examples.

EXAMPLE 7

Synthesis of Cy3-3c-NBA-NHS

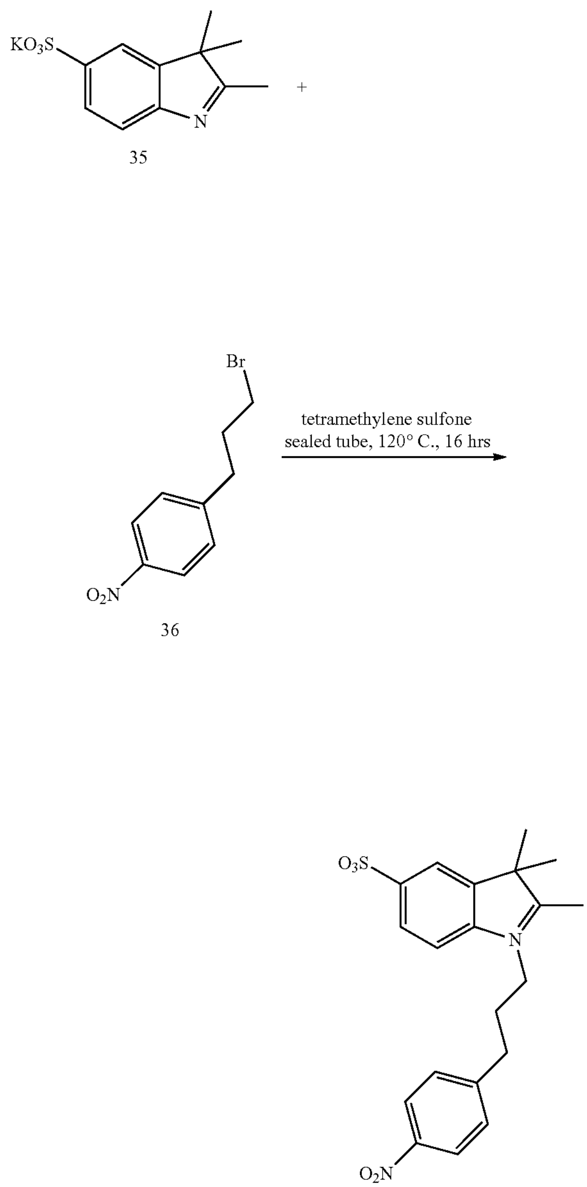

35 36 37

In the above reaction, the 2,3,3-trimethylindolenium-5-sulfonic potassium salt (277 mg) and 1-(3-bromopropyl)-4-nitrobenzene 36 (600 mg) were mixed with 2 mL of tetramethylene sulfone. Compound 36 was prepared by a literature method (*J. Org. Chem.,* 2002, 67(8), pp. 2677-2678). The reaction mixture was transferred into a degassed sealed tube and heated to 110° C. for 16 hours. Then the reaction mixture was cooled to room temperature, and the deep purple solution was poured into 15 mL EtOAc to precipitate the product. The purple solid product was washed with 15 mL×3 EtOAc, and dried. Crude compound 37 was carried onto the next step without further purification. MASS (ES+) m/z for $C_{20}H_{22}N_2O_5S$, $[M+1]^+$, Calculated: 403.1, Found: 403.3.

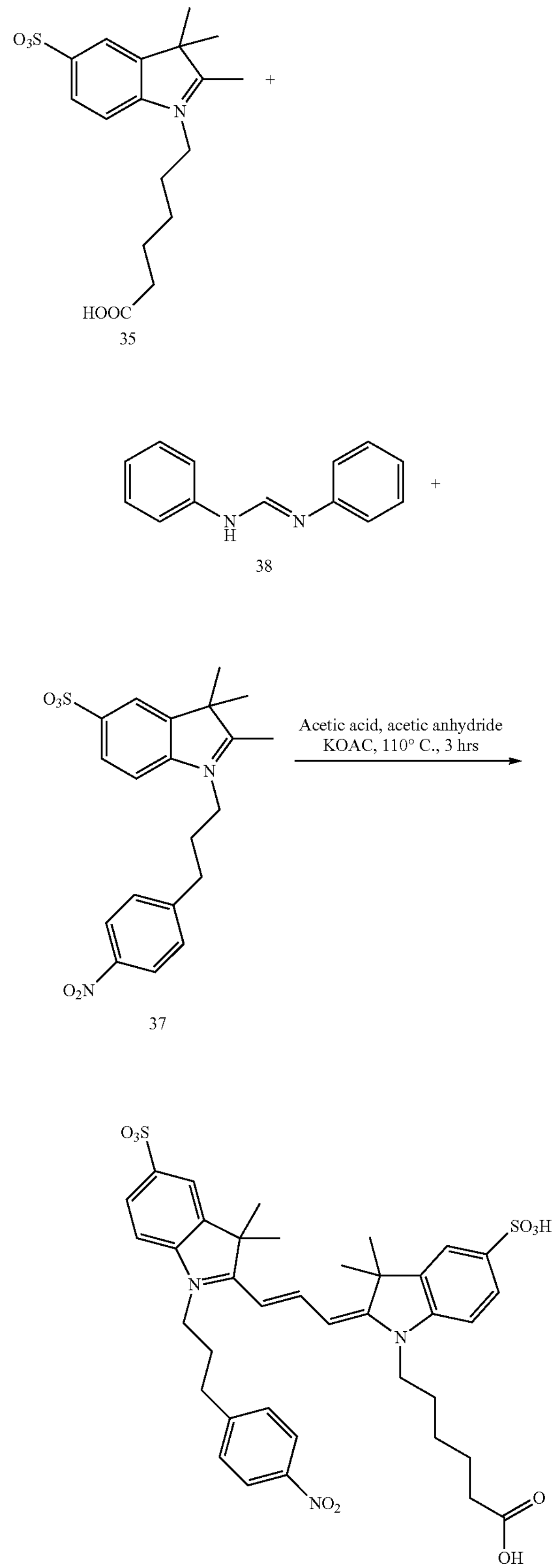

35 38 37 1

In the above reaction, to a round bottom flask were added compound 35 (176 mg), N,N'-diphenylformamidine (98 mg), 5 mL acetic acid, and 0.5 mL acetic anhydride. The resulting purple solution was heated to 120° C. for two hours, then 200 mg of compound 37 was added to this solution followed by 500 mg of KOAc. The reaction mixture was heated to 120° C. and stirred for another 1.5 hours. After the reaction was complete, the reaction mixture was poured into 45 mL of EtOAc to precipitate the crude product as a dark pink solid. The residue was washed three more times (40 mL each time) by EtOAc, and dried. The pure Cy3 dye compound 1 was isolated by semi-prep HPLC purification (15% acetonitrile in 0.1% formic acid aq. to 65% acetonitrile) as a bright pink solid. MASS (ES−) m/z for $C_{38}H_{43}N_3O_{10}S_2$, $[M-1]^1$ Calculated: 765.2, Found: 765.3.

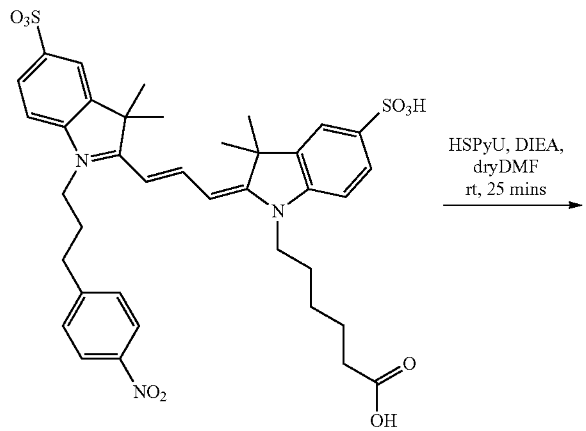

1

-continued

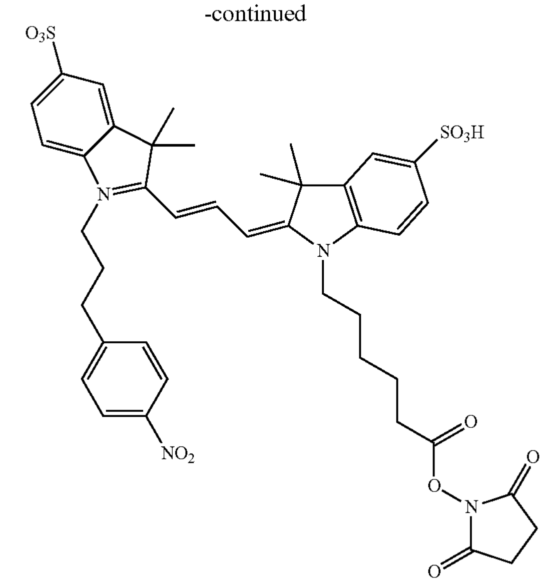

2

In the above reaction, to a 5 mL flask, 1 mg of compound 1 was dissolved in 1 mL of dry DMF, and then 5.4 mg of HSPyU and 4.5 μL of DIEA were added at RT. The reaction was monitored by LC-MS, which was complete in 25 minutes. Then the reaction solution was poured into 15 mL EtOAc to precipitate the product. The crude pink solid product 2 was washed three more times by EtOAc, and dried. The pure NHS product was obtained by HPLC purification (15% acetonitrile in 0.1% formic acid aq. to 65% acetonitrile) as a pink solid. MASS (ES−) m/z for $C_{42}H_{46}N_4O_{12}S_2$, $[M-1]^-$ Calculated: 862.3, Found: 862.2.

EXAMPLE 8

Synthesis of Cy3-3c-NBA-Mal

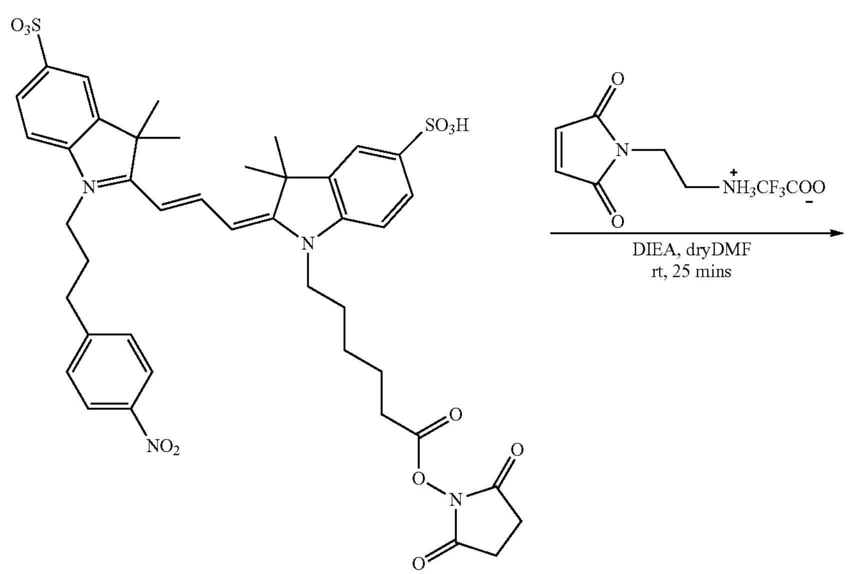

2

-continued

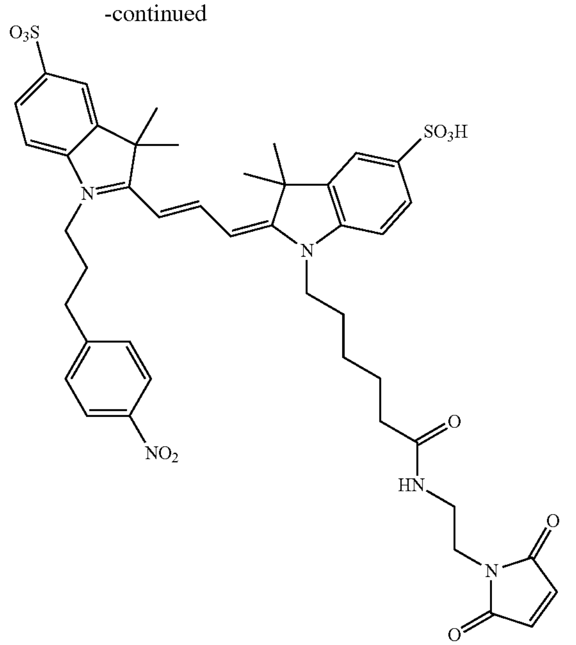

3

In the above reaction, to a 5 mL flask, 1 mg of compound 2 was dissolved in 1 mL of dry DMF, and then 4.7 mg of 2-(2,5-dioxo-2,5-dihydro-1H-pyrrol-1-yl)ethanaminium 2,2,2-trifluoroacetate and 4 μl of DIEA were added at RT. The reaction was monitored by LC-MS, which was complete in 25 minutes. Then the reaction solution was poured into 15 mL EtOAc to precipitate the product. The crude pink solid product 3 was washed three more times by EtOAc, and dried. The pure NHS product was obtained by HPLC purification (15% acetonitrile in 0.1% formic acid aq. to 65% acetonitrile) as a pink solid. MASS (ES−) m/z for $C_{44}H_{49}N_5O_{11}S_2$, $[M-1]^-$ Calculated: 887.3, Found: 887.3.

EXAMPLE 9

Synthesis of Cy5-3c-NBA-NHS

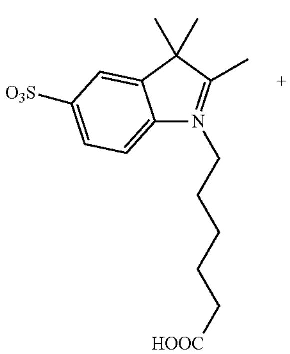

35

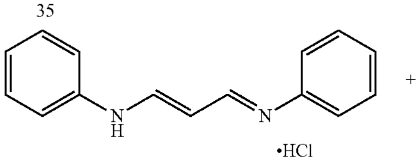

39

-continued

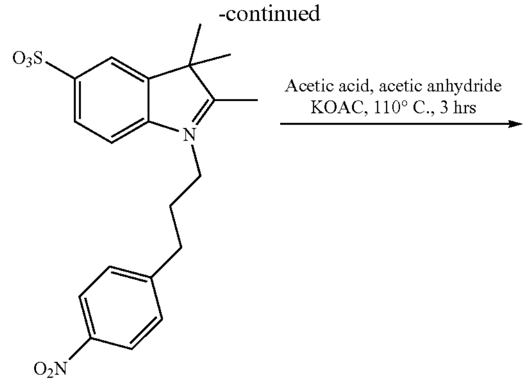

37

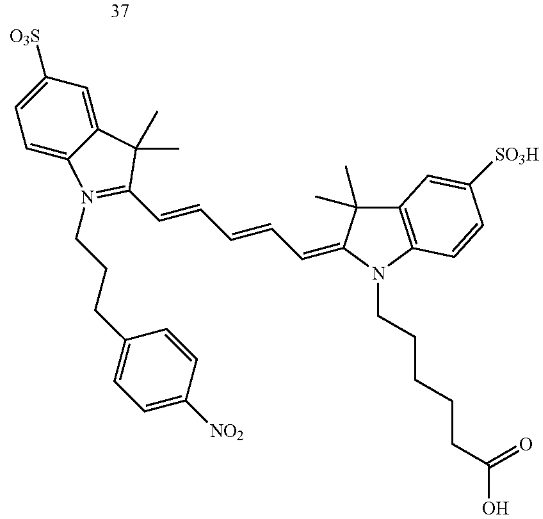

4

In the above reaction, to a round bottom flask were added compound 35 (176 mg), malonaldehyde dianilide hydrochloride 39 (129 mg), 5 mL acetic acid, and 0.5 mL acetic anhydride. The resulting purple solution was heated to 120° C. for 2 hours, then 200 mg of compound 37 was added to this solution followed by 500 mg of KOAc. The reaction mixture was heated to 120° C. and stirred for another 1.5 hours. After the reaction was complete, the reaction mixture was poured into 45 mL of EtOAc to precipitate the crude product as a dark green solid. The residue was washed three more times (40 mL each time) by EtOAc, and dried. The pure Cy5 dye compound 4 was isolated by semi-prep HPLC purification (25% acetonitrile in 0.1% formic acid aq. to 65% acetonitrile) as a blue solid. MASS (ES−) m/z for $C_oH_{45}N_3O_{10}S_2$, $[M-1]^1$ Calculated: 791.3, Found: 791.4.

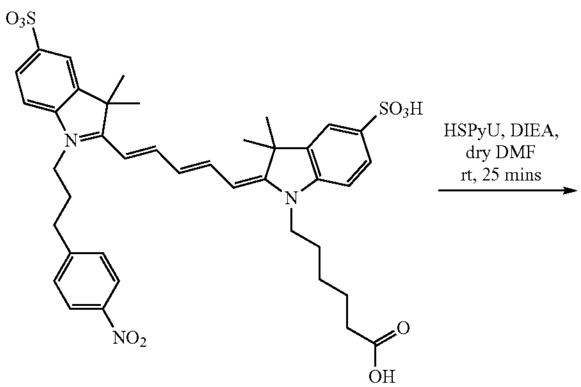

4

-continued

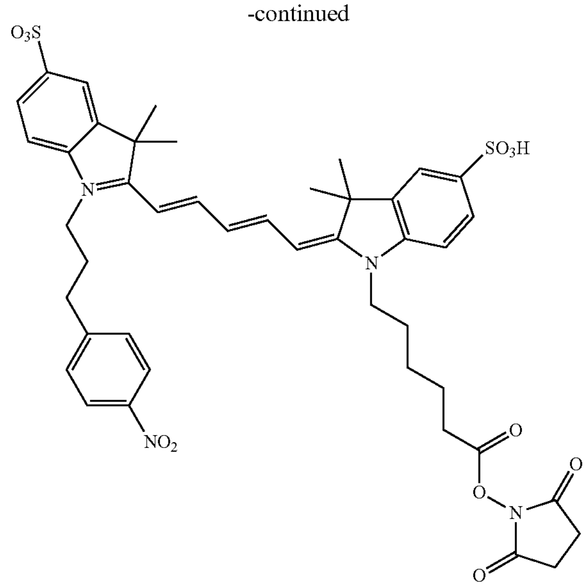

5

In the above reaction, to a 5 mL flask, 1 mg of compound 4 was dissolved in 1 mL of dry DMF, and then 5.2 mg of HSPyU and 4.4 μL of DIEA were added at RT. The reaction was monitored by LC-MS, which was complete in 25 minutes. Then the reaction solution was poured into 15 mL EtOAc to precipitate the product. The crude blue solid product 5 was washed three more times by EtOAc, and dried. The pure NHS product was obtained by HPLC purification (25% acetonitrile in 0.1% formic acid aq. to 65% acetonitrile) as a blue solid. MASS (ES−) m/z for $C_{44}H_{48}N_4O_{12}S_2$, $[M-1]^-$ Calculated: 888.3, Found: 888.6.

EXAMPLE 10

Synthesis of Cy5-3c-NBA-Mal

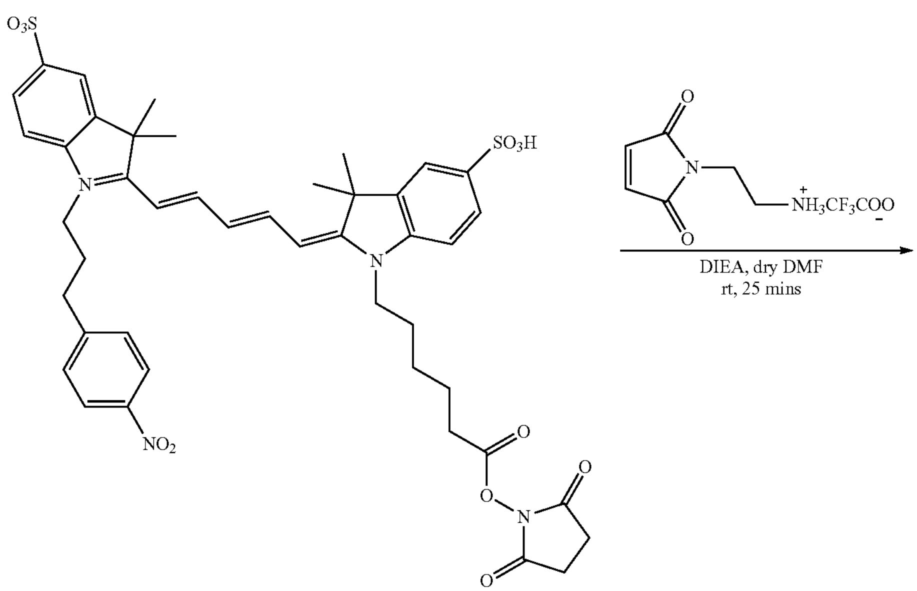

5

-continued

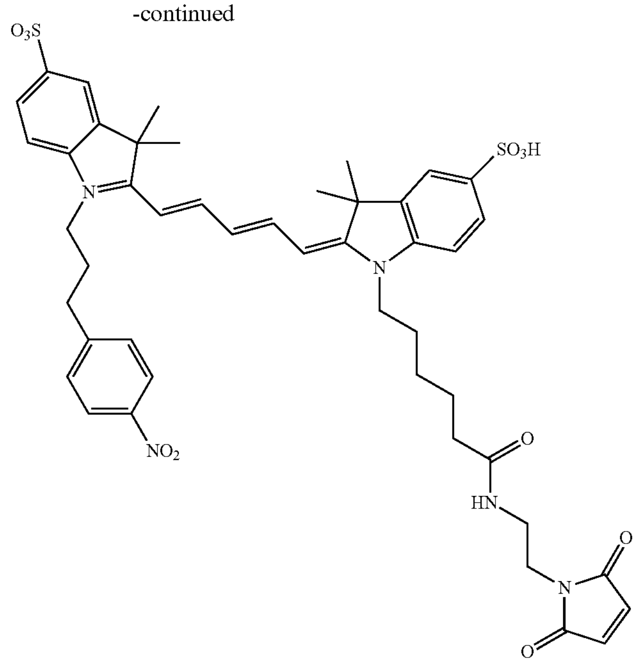

6

In the above reaction, to a 5 mL flask, 1 mg of compound 5 was dissolved in 1 mL of dry DMF, and then 2.9 mg of 2-(2,5-dioxo-2,5-dihydro-1H-pyrrol-1-yl)ethanaminium 2,2,2-trifluoroacetate and 4 μL of DIEA were added at RT. The reaction was monitored by LC-MS, which was complete in 25 minutes. Then the reaction solution was poured into 15 mL EtOAc to precipitate the product. The crude blue solid product 6 was washed three more times with EtOAc, and dried. The pure NHS product was obtained by HPLC purification (25% acetonitrile in 0.1% formic acid aq. to 65% acetonitrile) as a blue solid. MASS (ES−) m/z for $C_{46}H_{51}N_5O_{11}S_2$, $[M-1]^-$ Calculated: 913.3, Found: 913.2.

EXAMPLE 11

Synthesis of Cy5-3c-NBA-BG (where BG is a 6-oxyguanine derivative)

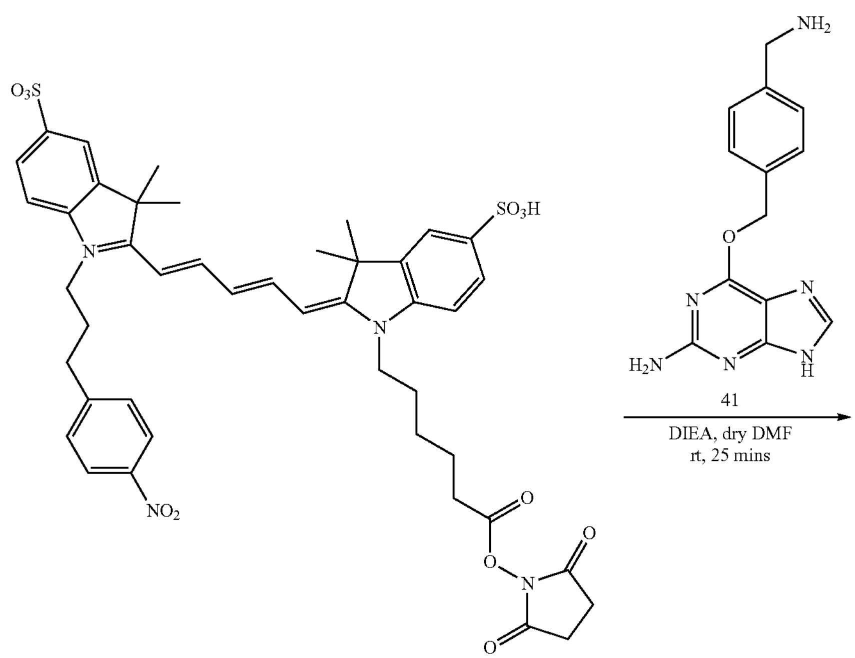

5

-continued

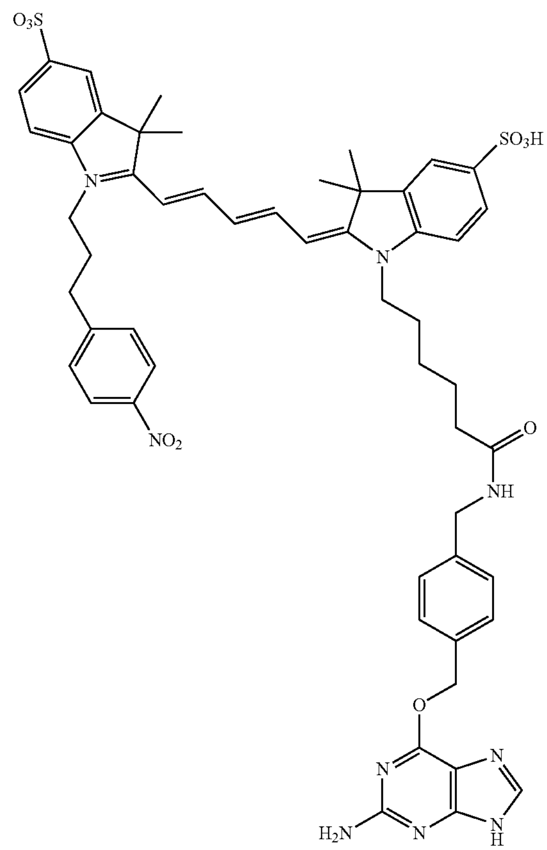

7

In the above reaction, compound 41 (BG-NH2) was prepared by a literature method (Nature Biotechnol., 2003, 21, 86-89). In a 5 mL flask, 1 mg of compound 5 was dissolved in 1 mL of dry DMF, and then 3 mg compound 41 and 4 μL of DIEA were added at RT. The reaction was monitored by LC-MS, which was complete in 25 minutes. Then the reaction solution was poured into 15 mL EtOAc to precipitate the product. The crude blue solid product 7 was washed three more times with EtOAc, and dried. The pure NHS product was obtained by HPLC purification (0% acetonitrile in 0.1% formic acid aq. to 80% acetonitrile) as a blue solid. MASS (ES−) m/z for $C_{53}H_{57}N_9O_{10}S_2$, $[M-1]^-$ Calculated: 1043.4, Found: 1043.3.

EXAMPLE 12

Synthesis of Cy7-3c-NBA-NHS

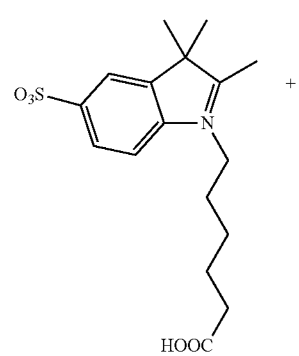

35

-continued

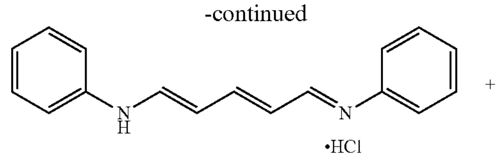

40

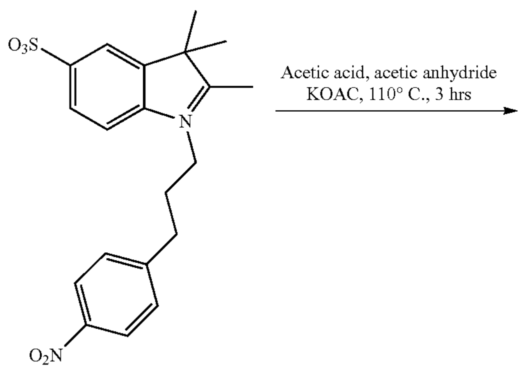

37

-continued

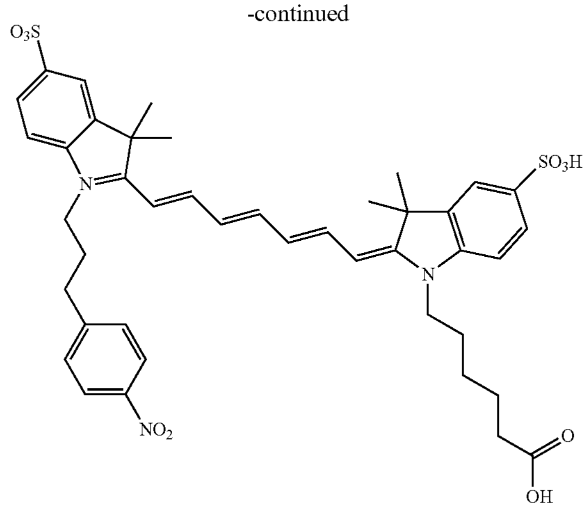

8

In the above reaction, to a round bottom flask were added compound 35 (176 mg), glutaconaldehydedianilide hydrochloride 40 (143 mg), 5 mL acetic acid, and 0.5 mL acetic anhydride. The resulting purple solution was heated up to 120° C. for 2 hours, then 200 mg of compound 37 was added to this solution followed by 500 mg of KOAc. The reaction mixture was heated to 120° C. and stirred for another 1.5 hours. After the reaction was complete, the reaction mixture was poured into 45 mL of EtOAc to precipitate the crude product as a dark blue solid. The residue was washed three more times (40 mL each time) by EtOAc, and dried. The pure Cy7 dye compound 8 was isolated by semi-prep HPLC purification (30% acetonitrile in 0.1% formic acid aq. to 80% acetonitrile) as a teal solid. MASS (ES−) m/z for $C_{42}H_{47}N_3O_{10}S_2$, $[M-1]^-$ Calculated: 817.3, Found: 817.6.

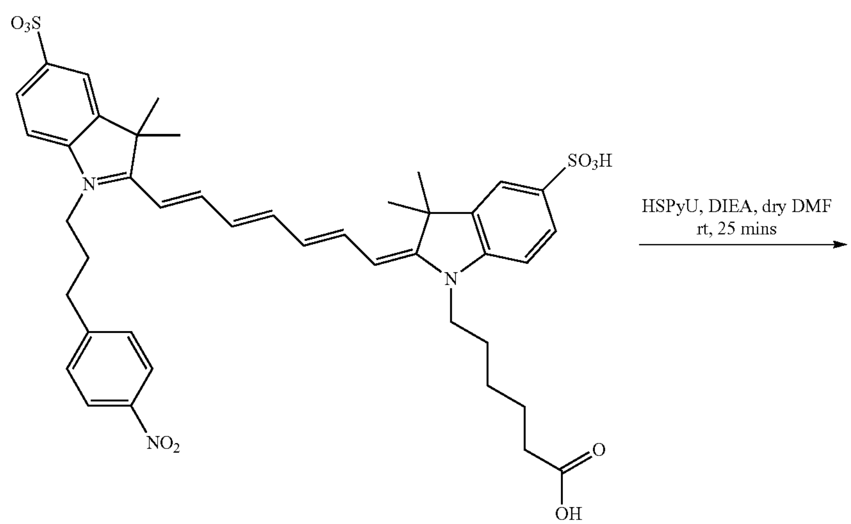

8

-continued

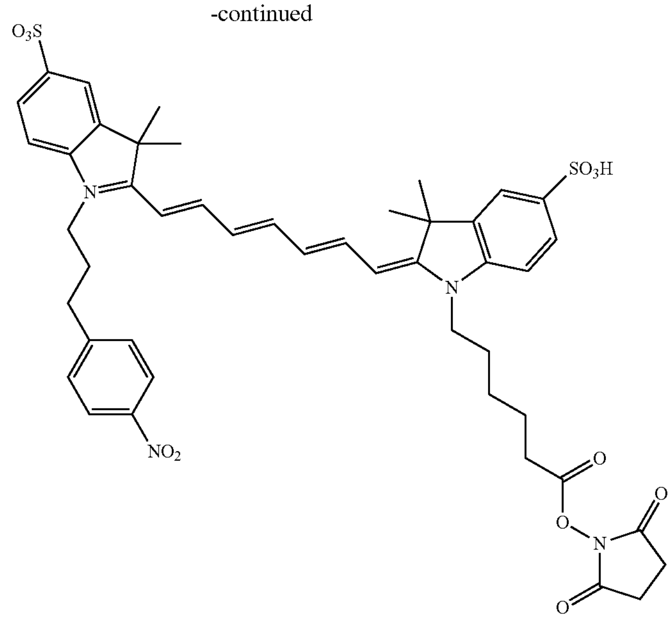

9

In the above reaction, to a 5 mL flask, 1 mg of compound 8 was dissolved in 1 mL of dry DMF, and then 5 mg of HSPyU and 4.3 μL of DIEA were added at RT. The reaction was monitored by LC-MS, which was complete in 25 minutes. Then the reaction solution was poured into 15 mL EtOAc to precipitate the product. The crude teal solid product 9 was washed three more times by EtOAc, and dried. The pure NHS product was obtained by HPLC purification (30% acetonitrile in 0.1% formic acid aq. to 80% acetonitrile) as a teal solid. MASS (ES−) m/z for $C_{46}H_{50}N_4O_{12}S_2$, $[M-1]^-$ Calculated: 914.3, Found: 914.3.

EXAMPLE 13

Synthesis of Cy7-3c-NBA-Mal

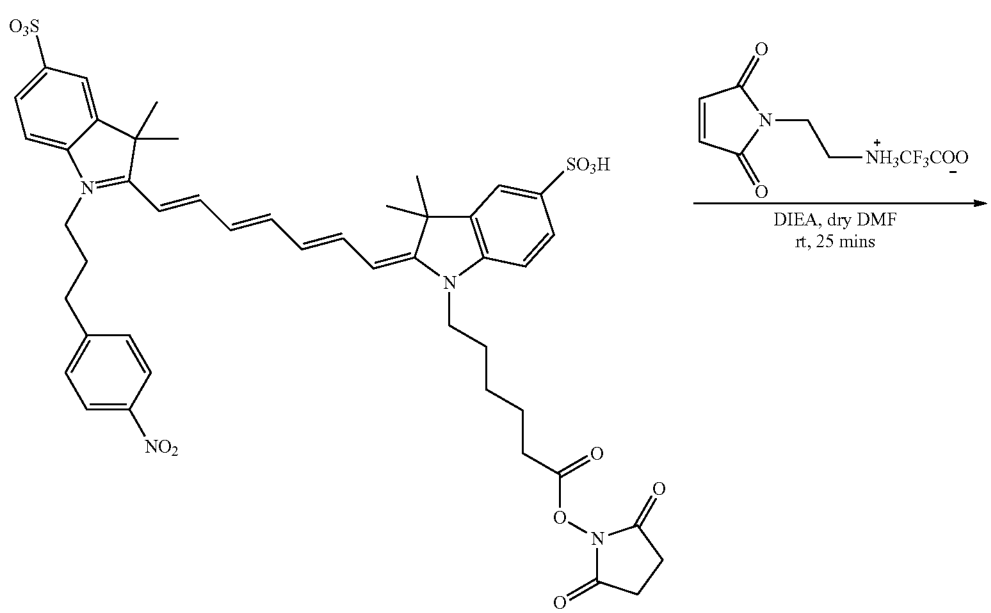

9

-continued

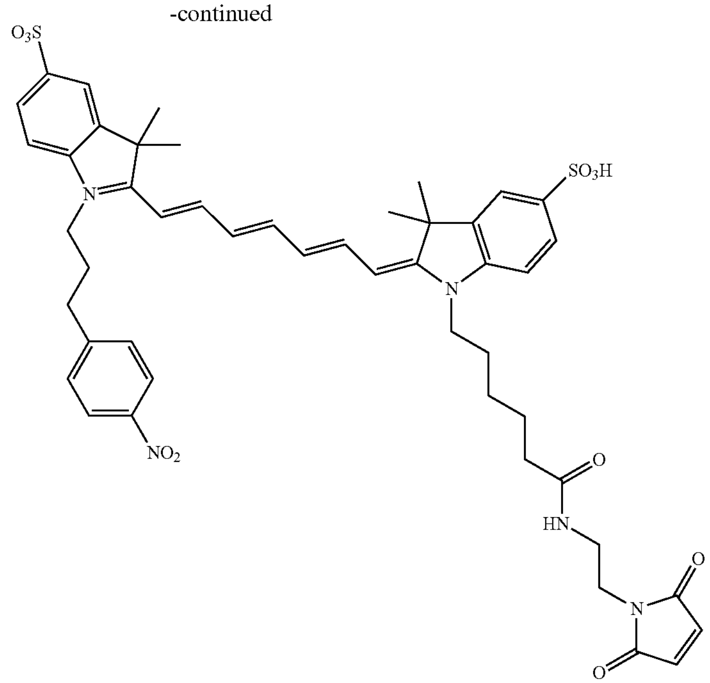

10

In the above reaction, to a 5 mL flask, 1 mg of compound 9 was dissolved in 1 mL of dry DMF, and then 2.8 mg of 2-(2,5-dioxo-2,5-dihydro-1H-pyrrol-1-yl)ethanaminium 2,2,2-trifluoroacetate and 3.8 μL of DIEA were added at RT. The reaction was monitored by LC-MS, which was complete in 25 minutes. Then the reaction solution was poured into 15 mL EtOAc to precipitate the product. The crude teal solid product 10 was washed three more times by EtOAc, and dried. The pure NHS product was obtained by HPLC purification (30% acetonitrile in 0.1% formic acid aq. to 80% acetonitrile) as a teal solid. MASS (ES−) m/z for $C_{48}H_{53}N_5O_{11}S_2$, $[M-1]^-$ Calculated: 939.3, Found: 939.1.

EXAMPLE 14

Synthesis of Cy3-3c-TX-NHS

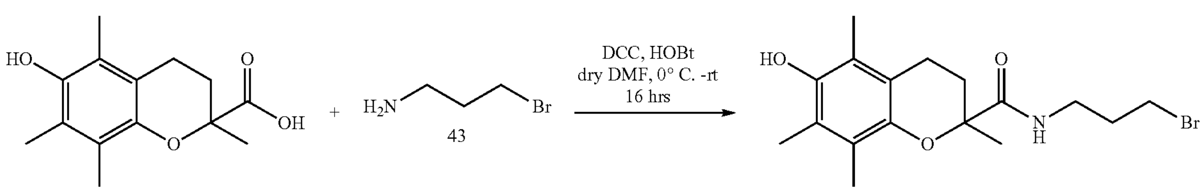

42 43 44

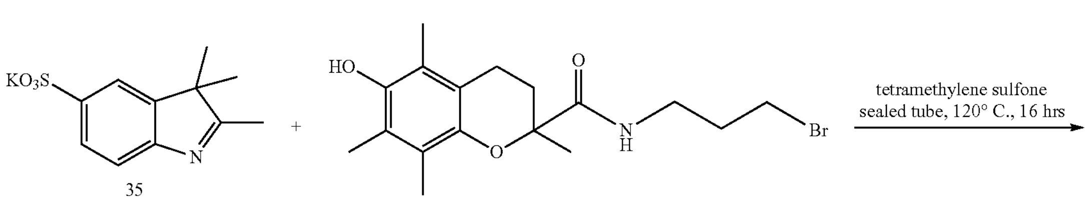

35 44

-continued

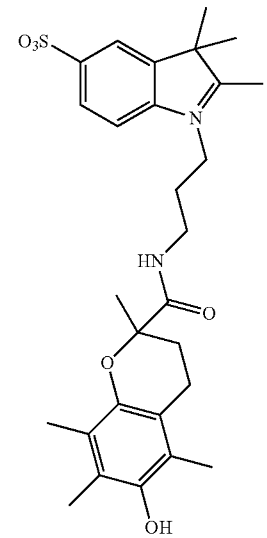

45

In the above reactions, the 2,3,3-trimethylindolenium-5-sulfonic potassium salt (277 mg) and Trolox-3C-Br 44 (560 mg) were mixed with 2 mL of tetramethylene sulfone. The reaction mixture was transferred into a degassed sealed tube and heated to 110° C. for 16 hours. Then the reaction mixture was cooled to room temperature, and the deep purple solution was poured into 15 mL EtOAc to precipitate the product. The purple solid product was washed with 15 mL×3 EtOAc, and dried. Crude compound 45 was carried onto the next step without further purification. MASS (ES+) m/z for $C_{20}H_{22}N_2O_5S$, $[M+1]^+$, Calculated: 528.3, Found: 528.5.

-continued

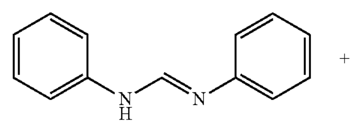

38

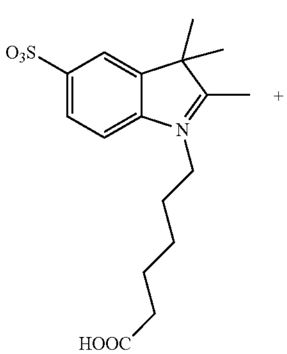

35

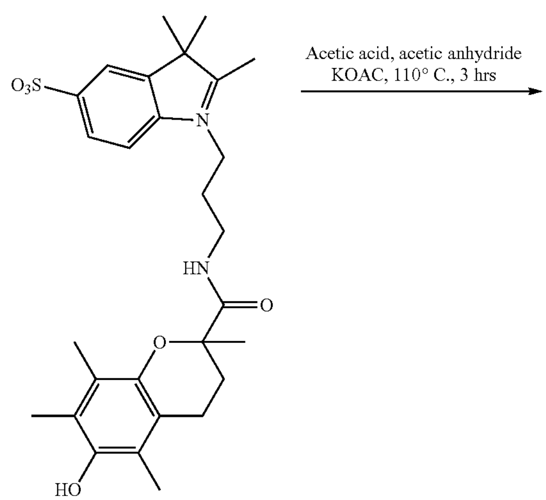

45

-continued

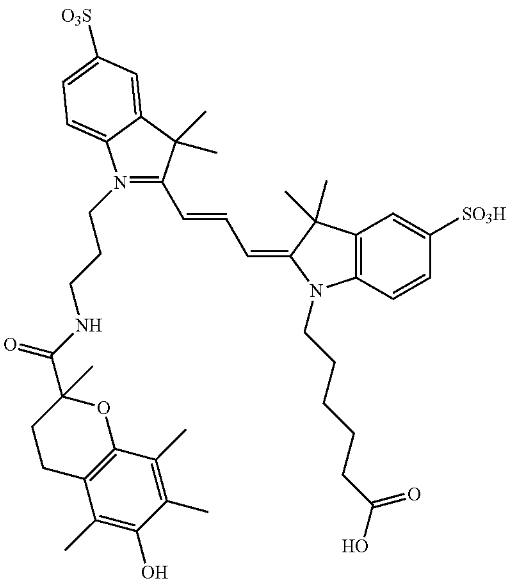

11

In the above reaction, to a round bottom flask were added compound 35 (176 mg), N,N'-diphenylformamidine (98 mg), 5 mL acetic acid, and 0.5 mL acetic anhydride. The resulting purple solution was heated to 120° C. for two hours, and then 264 mg of compound 45 was added to this solution followed by 500 mg of KOAc. The reaction mixture was heated to 120° C. and stirred for another 45 minutes. After the reaction was complete, the reaction mixture was poured into 45 mL of EtOAc to precipitate the crude product as a dark pink solid. The residue was washed three more times (40 mL each time) by EtOAc, and dried. The pure Cy3 dye compound 11 was isolated by semi-prep HPLC purification (15% acetonitrile in 0.1% formic acid aq. to 65% acetonitrile) as a bright pink solid. MASS (ES−) m/z for $C_{46}H_{57}N_3O_{11}S_2$, $[M-1]^-$ Calculated: 891.4, Found: 891.4.

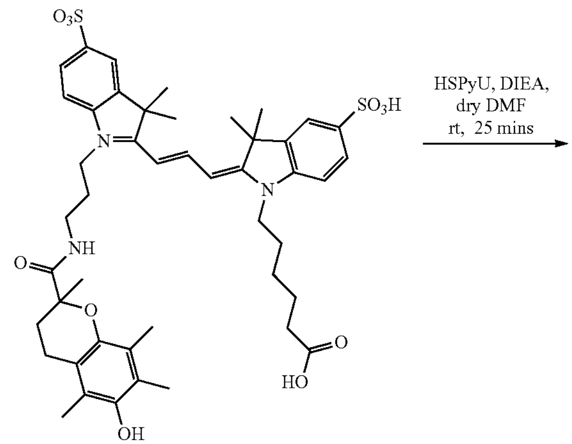

11

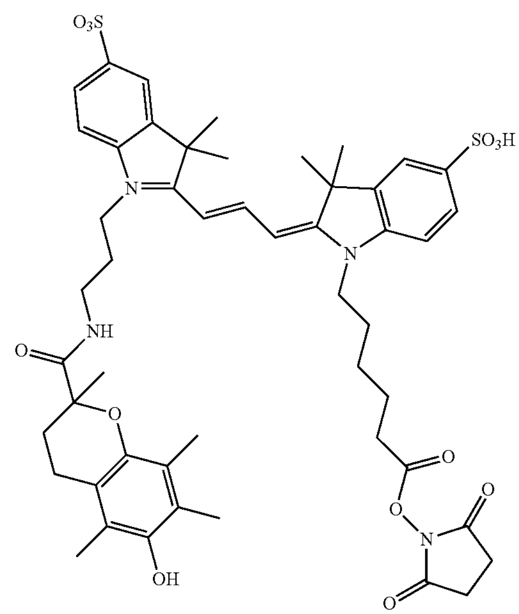

12

In the above reaction, to a 5 mL flask, 1 mg of compound 11 was dissolved in 1 mL of dry DMF, and then 4.6 mg of HSPyU and 4 μL of DIEA were added at RT. The reaction was monitored by LC-MS, which was complete in 25 minutes. Then the reaction solution was poured into 15 mL EtOAc to precipitate the product. The crude pink solid product 12 was washed three more times by EtOAc, and dried. The pure NHS product was obtained by HPLC purification (15% acetonitrile in 0.1% formic acid aq. to 65% acetonitrile) as a pink solid. MASS (ES−) m/z for $C_{48}H_{60}N_4O_{13}S_2$, $[M-1]^-$ Calculated: 988.4, Found: 988.3.

EXAMPLE 15

Synthesis of Cy3-3c-TX-Mal

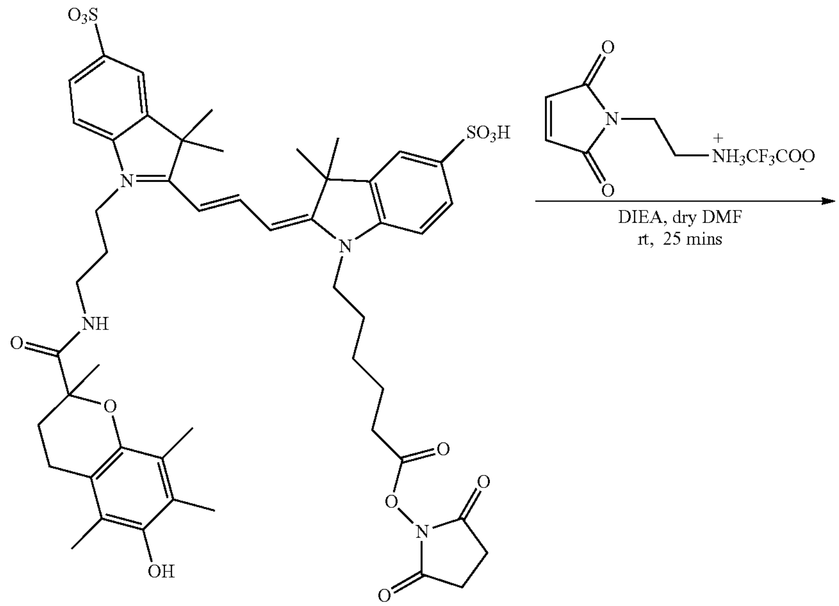

12

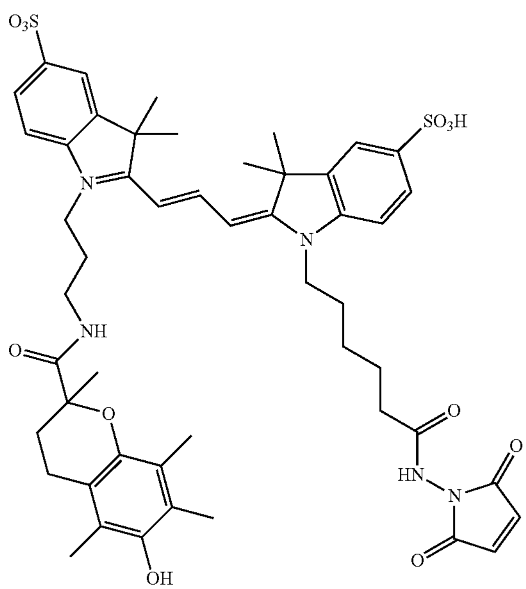

13

In the above reaction, to a 5 mL flask, 1 mg of compound 12 was dissolved in 1 mL of dry DMF, and then 2.6 mg of 2-(2,5-dioxo-2,5-dihydro-1H-pyrrol-1-yl)ethanaminium 2,2,2-trifluoroacetate and 4 μL of DIEA were added at RT. The reaction was monitored by LC-MS, which was complete in 25 minutes. Then the reaction solution was poured into 15 mL EtOAc to precipitate the product. The crude pink solid product 13 was washed three more times by EtOAc, and dried. The pure NHS product was obtained by HPLC purification (15% acetonitrile in 0.1% formic acid aq. to 65% acetonitrile) as a pink solid. MASS (ES−) m/z for $C_{50}H_{63}N_5O_{12}S_2$, $[M-1]^-$ Calculated: 1013.4, Found: 1013.2.

Example 16

Synthesis of Cy5-3c-TX-NHS

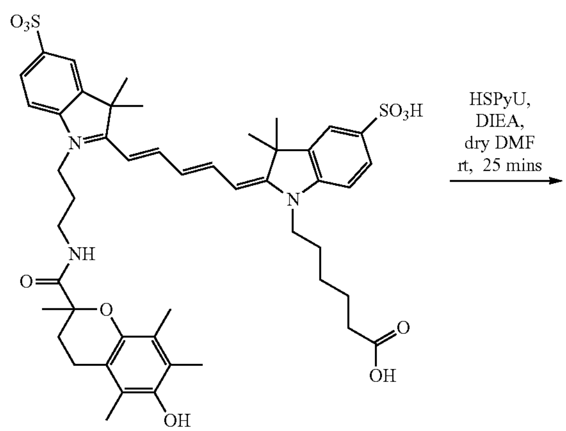

14

-continued

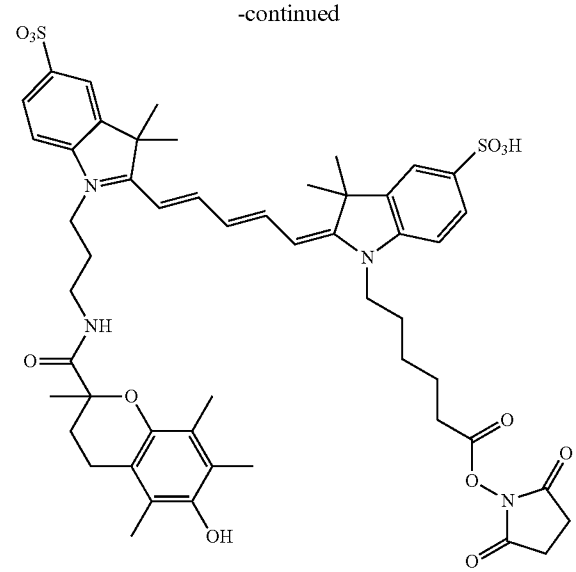

15

In the above reaction, to a 5 mL flask, 1 mg of compound 14 was dissolved in 1 mL of dry DMF, and then 4.5 mg of HSPyU and 4 μL of DIEA were added at RT. The reaction was monitored by LC-MS, which was complete in 25 minutes. Then the reaction solution was poured into 15 mL EtOAc to precipitate the product. The crude blue solid product 15 was washed three more times by EtOAc, and dried. The pure NHS product was obtained by HPLC purification (25% acetonitrile in 0.1% formic acid aq. to 65% acetonitrile) as a blue solid. MASS (ES−) m/z for $C_{50}H_{62}N_4O_{13}S_2$, $[M-1]^-$ Calculated: 1014.4, Found: 1014.3.

EXAMPLE 17

Synthesis of Cy5-3c-TX-Mal

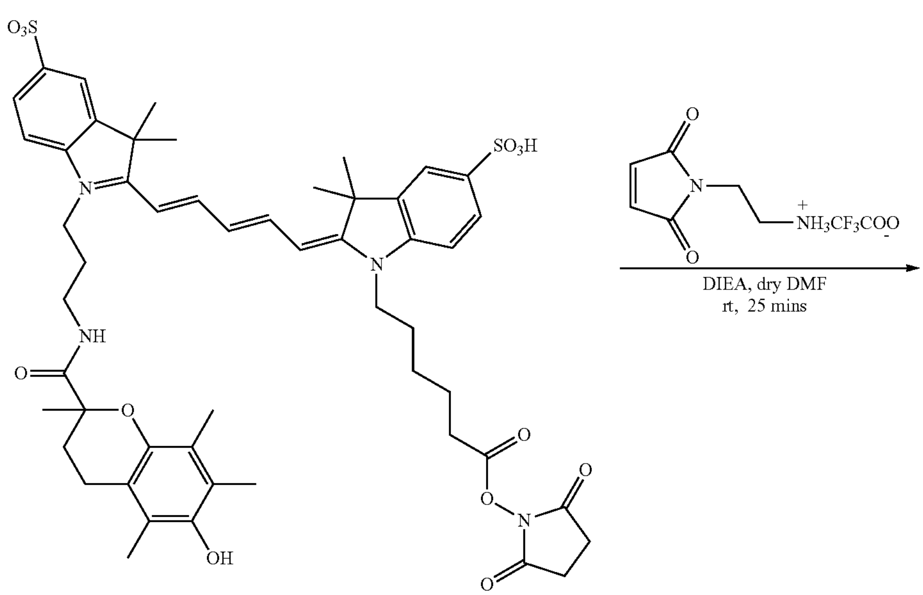

15

-continued

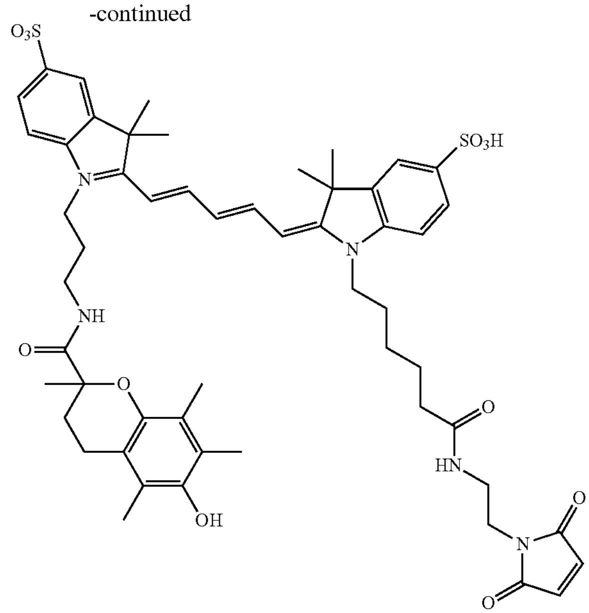

16

In the above reaction, to a 5 mL flask, 1 mg of compound 15 was dissolved in 1 mL of dry DMF, and then 2.5 mg of 2-(2,5-dioxo-2,5-dihydro-1H-pyrrol-1-yl)ethanaminium 2,2,2-trifluoroacetate and 3.5 μL of DIEA were added at RT. The reaction was monitored by LC-MS, which was complete in 25 minutes. Then the reaction solution was poured into 15 mL EtOAc to precipitate the product. The crude blue solid product 16 was washed three more times by EtOAc, and dried. The pure NHS product was obtained by HPLC purification (25% acetonitrile in 0.1% formic acid aq. to 65% acetonitrile) as a blue solid. MASS (ES−) m/z for $C_{52}H_{65}N_5O_{12}S_2$, $[M-1]^-$ Calculated: 1039.4, Found: 1039.2

EXAMPLE 18

Synthesis of Cy5-3c-TX-BG

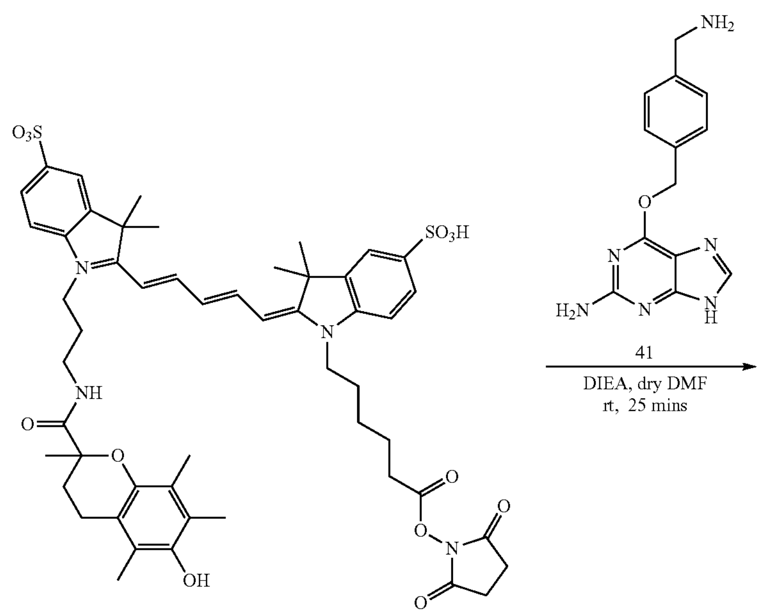

15

-continued

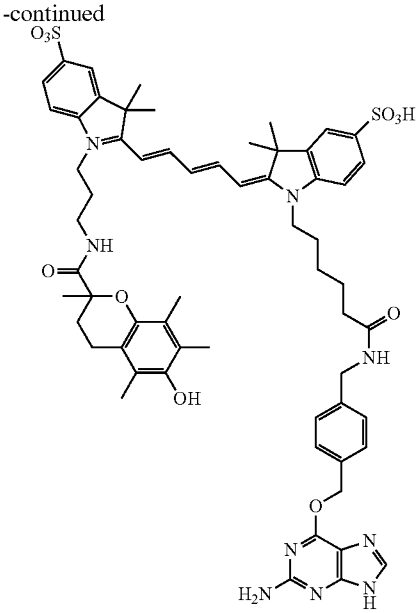

17

In the above reaction, in a 5 mL flask, 1 mg of compound 15 was dissolved in 1 mL of dry DMF, and then 3 mg compound 41 and 4 μL of DIEA were added at RT. The reaction was monitored by LC-MS, which was complete in 25 minutes. Then the reaction solution was poured into 15 mL EtOAc to precipitate the product. The crude blue solid product 17 was washed three more times by EtOAc, and dried. The pure NHS product was obtained by HPLC purification (0% acetonitrile in 0.1% formic acid aq. to 80% acetonitrile) as a blue solid. MASS (ES−) m/z for $C_{61}H_{71}N_9O_{11}S_2$, $[M-1]^-$ Calculated: 1169.5, Found: 1169.8.

EXAMPLE 19

Synthesis of Cy7-3c-TX-NHS

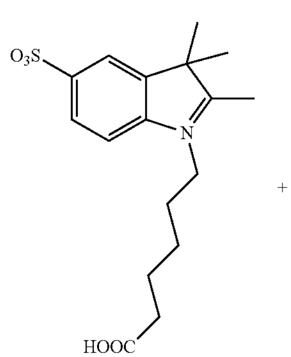

35

-continued

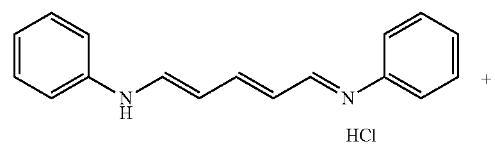

40

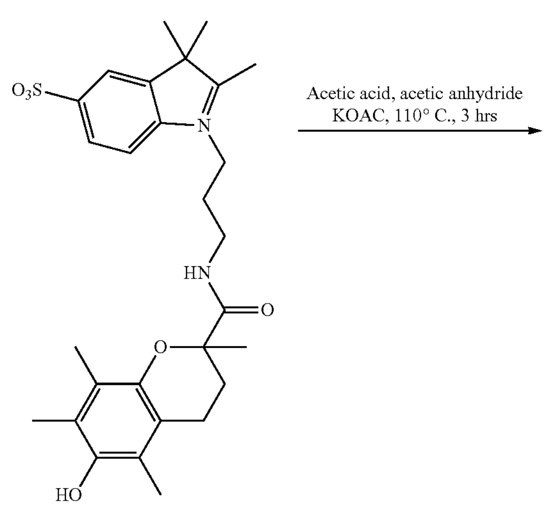

45

-continued

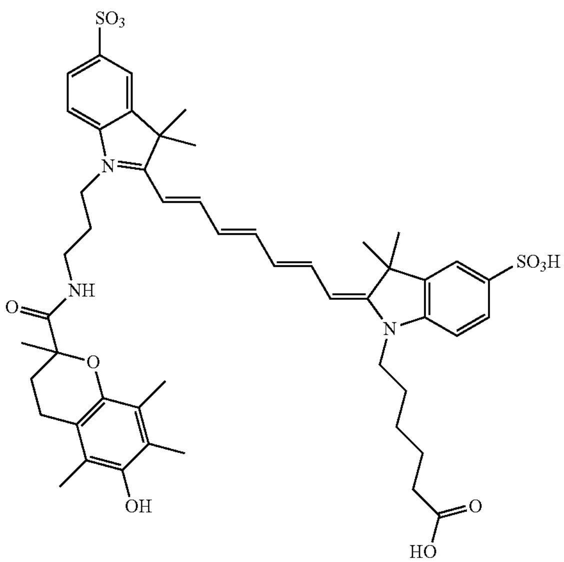

18

In the above reaction, to a round bottom flask were added compound 35 176 mg, glutaconaldehydianilide hydrochloride 40 (143 mg), 5 mL acetic acid, and 0.5 mL acetic anhydride. The resulting purple solution was heated up to 120° C. for two hours, then 264 mg of compound 45 was added to this solution followed by 500 mg of KOAc. The reaction mixture was heated to 120° C. and stirred for another 45 minutes. After the reaction was complete, the reaction mixture was poured into 45 mL of EtOAc to precipitate the crude product as a dark blue solid. The residue was washed three more times (40 mL each time) by EtOAc, and dried. The pure Cy7 dye compound 18 was isolated by semi-prep HPLC purification (30% acetonitrile in 0.1% formic acid aq. to 80% acetonitrile) as a teal solid. MASS (ES−) m/z for $C_{50}H_{61}N_3O_{11}S_2$, $[M-1]^-$ Calculated: 943.4, Found: 943.2.

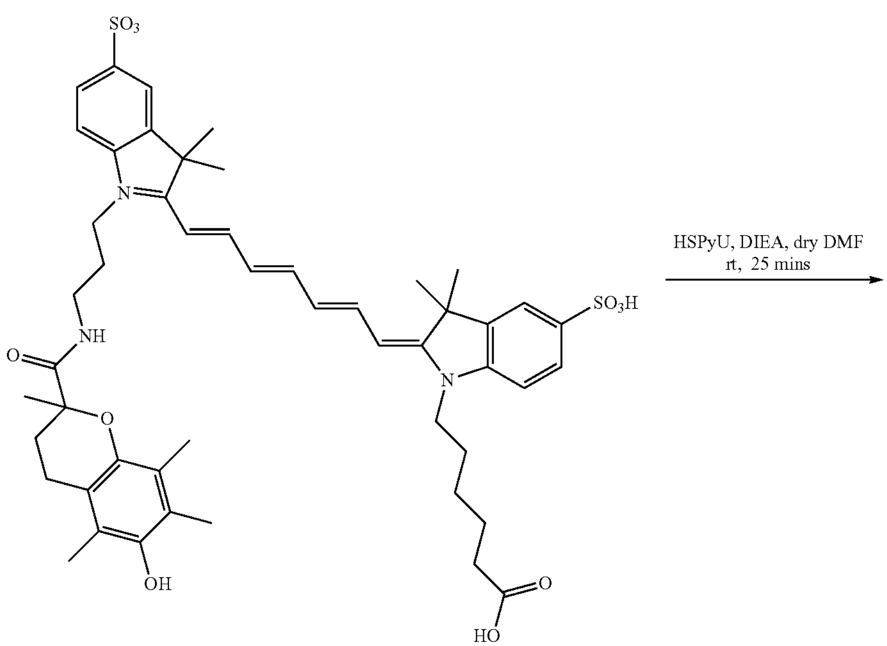

18

-continued

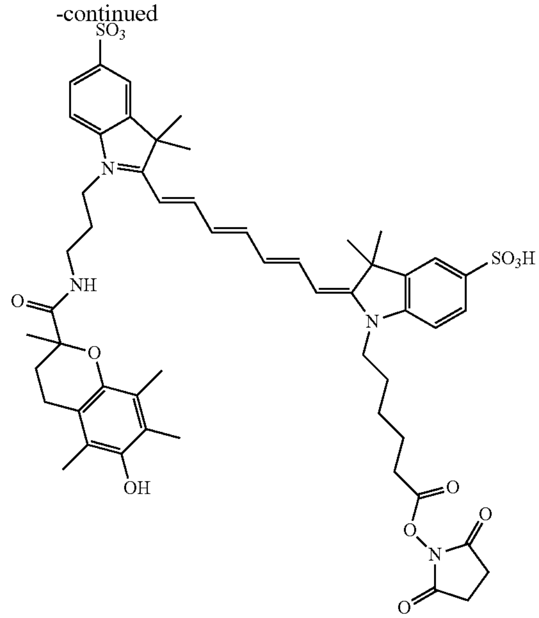

19

In the above reaction, to a 5 mL flask, 1 mg of compound 18 was dissolved in 1 mL of dry DMF, and then 4.4 mg of HSPyU and 3.7 μL of DIEA were added at RT. The reaction was monitored by LC-MS, which was complete in 25 minutes. Then the reaction solution was poured into 15 mL EtOAc to precipitate the product. The crude teal solid product 19 was washed three more times by EtOAc, and dried. The pure NHS product was obtained by HPLC purification (30% acetonitrile in 0.1% formic acid aq. to 80% acetonitrile) as a teal solid. MASS (ES−) m/z for $C_{52}H_{64}N_4O_{13}S_2$, $[M-1]^-$ Calculated: 1040.4, Found: 1040.6.

EXAMPLE 20

Synthesis of Cy7-3c-TX-Mal

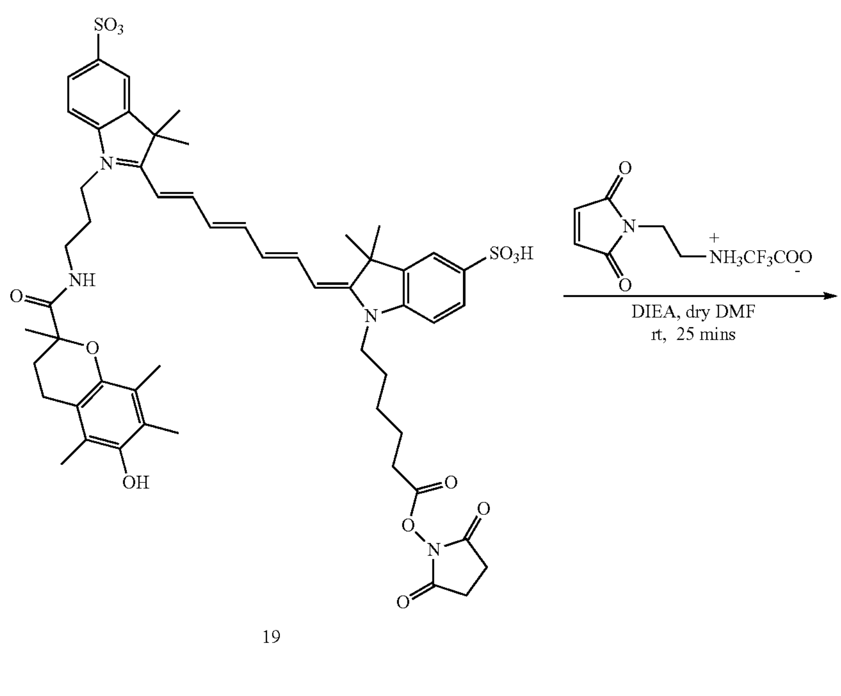

19

-continued

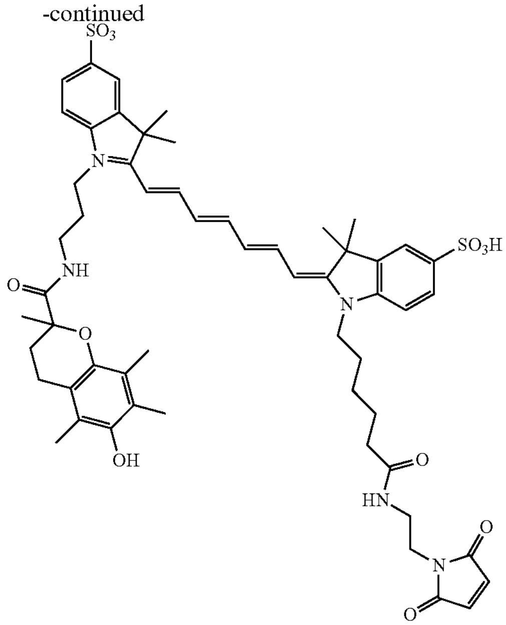

20

In the above reaction, to a 5 mL flask, 1 mg of compound 19 was dissolved in 1 mL of dry DMF, and then 2.4 mg of 2-(2,5-dioxo-2,5-dihydro-1H-pyrrol-1-yl)ethanaminium 2,2,2-trifluoroacetate and 3.3 μL of DIEA were added at RT. The reaction was monitored by LC-MS, which was complete in 25 minutes. Then the reaction solution was poured into 15 mL EtOAc to precipitate the product. The crude teal solid product 20 was washed three more times by EtOAc, and dried. The pure NHS product was obtained by HPLC purification (30% acetonitrile in 0.1% formic acid aq. to 80% acetonitrile) as a teal solid. MASS (ES−) m/z for $C_{54}H_{67}N_5O_{12}S_2$, $[M-1]^-$ Calculated: 1065.4, Found: 1065.4.

EXAMPLE 21

Synthesis of Cy3-3c-COT-NHS

Compound 46; Synthesis has been described in the Nature Method paper (submitted)

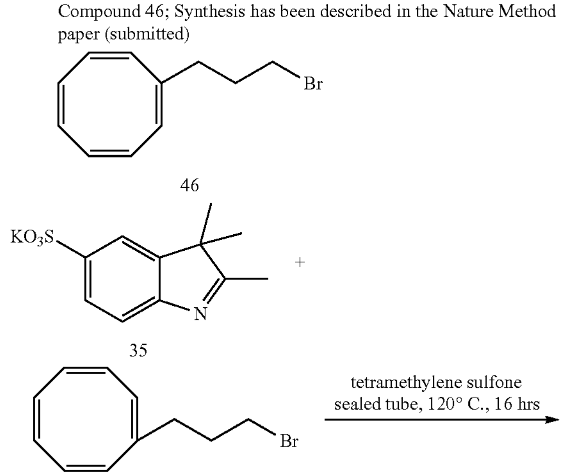

46

35

46

-continued

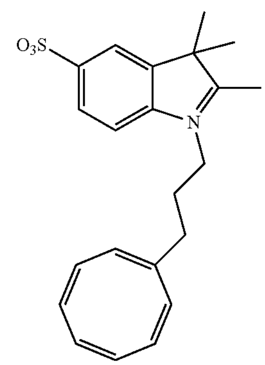

47

In the above reaction, the 2,3,3-trimethylindolenium-5-sulfonic potassium salt (277 mg) and 1-(3-bromopropyl) cycloocta-1,3,5,7-tetraene 46 (400 mg) were mixed with 2 mL of tetramethylene sulfone. The reaction mixture was transferred into a degassed sealed tube, heated up to 110° C. for 16 hours. Then the reaction mixture was cooled to room temperature, and the deep purple solution was poured into 15 mL EtOAc to precipitate the product. The purple solid product was washed by 15 mL×3 EtOAc, and dried. Crude compound 47 was carried onto the next step without further purification. MASS (ES+) m/z for $C_{22}H_{25}NO_3S$, $[M+1]^+$, Calculated: 383.2, Found: 383.1.

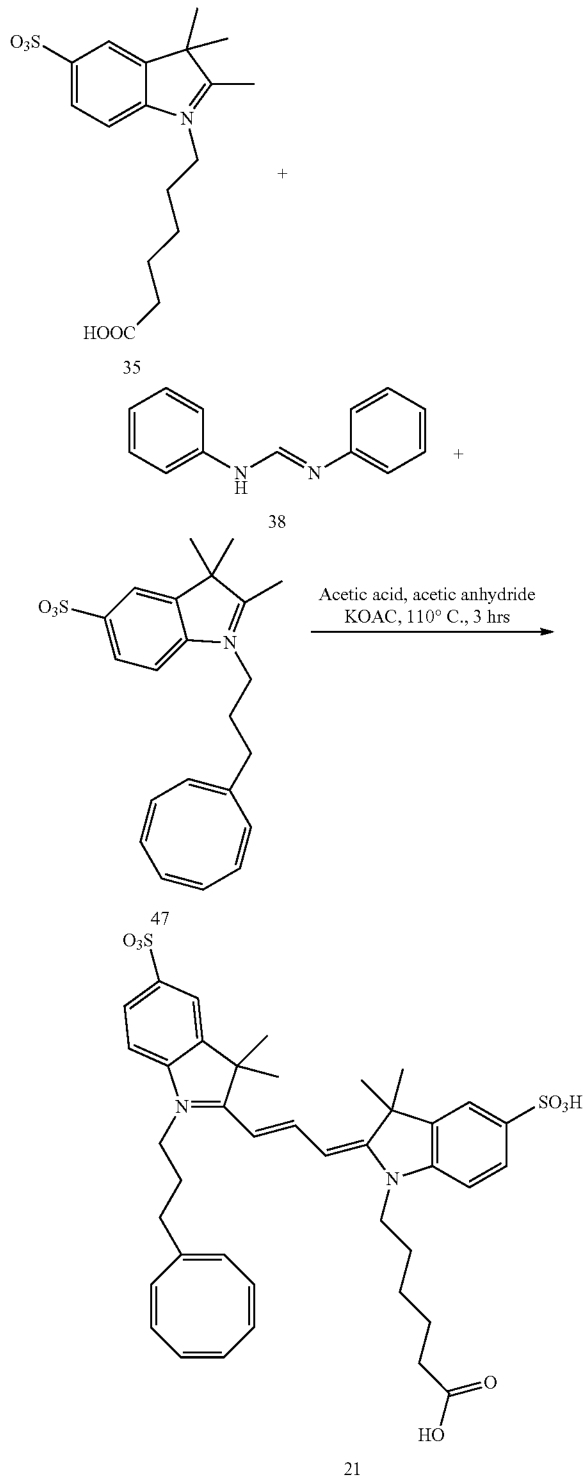

In the above reaction, to a round bottom flask were added compound 35 (176 mg), N,N'-diphenylformamidine (98 mg), 5 mL acetic acid, and 0.5 mL acetic anhydride. The resulting purple solution was heated up to 120° C. for two hours, then 192 mg of compound 47 was added to this solution followed by 500 mg of KOAc. The reaction mixture was heated to 120° C. and stirred for another 45 minutes. After the reaction was complete, the reaction mixture was poured into 45 mL of EtOAc to precipitate the crude product as a dark pink solid. The residue was washed three more times (40 mL each time) by EtOAc, and dried. The pure Cy3 dye compound 11 was isolated by semi-prep HPLC purification (15% acetonitrile in 0.1% formic acid aq. to 65% acetonitrile) as a bright pink solid. MASS (ES−) m/z for $C_{40}H_{46}N_2O_8S_2$, $[M-1]^-$ Calculated: 746.3, Found: 746.5.

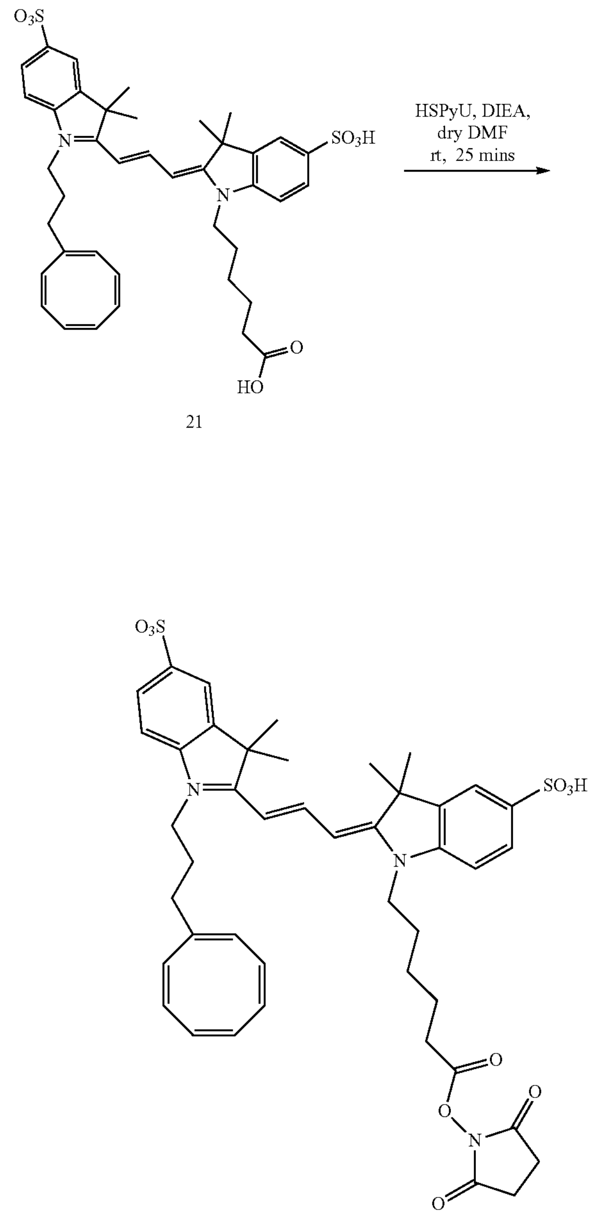

In the above reaction, to a 5 mL flask, 1 mg of compound 21 was dissolved in 1 mL of dry DMF, and then 3 mg of HSPyU and 4 μL of DIEA were added at RT. The reaction was monitored by LC-MS, which was complete in 25 minutes. Then the reaction solution was poured into 15 mL EtOAc to precipitate the product. The crude pink solid product 22 was washed three more times by EtOAc, and dried. The pure NHS product was obtained by HPLC purification (15% acetonitrile in 0.1% formic acid aq. to 65% acetonitrile) as a pink solid. MASS (ES−) m/z for $C_{44}H_{49}N_3O_{10}S_2$, $[M-1]^-$ Calculated: 843.3, Found: 843.5.

EXAMPLE 22

Synthesis of Cy3-3c-COT-Mal

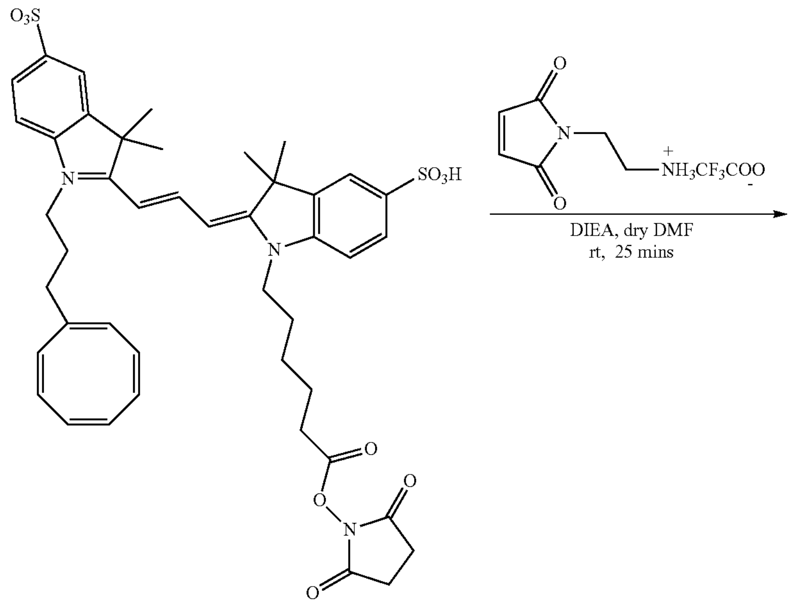

22

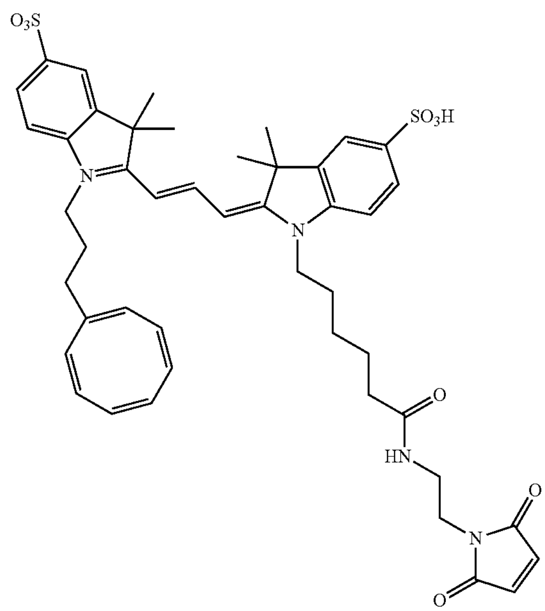

23

In the above reaction, to a 5 mL flask, 1 mg of compound 22 was dissolved in 1 mL of dry DMF, and then 3 mg of 2-(2,5-dioxo-2,5-dihydro-1H-pyrrol-1-yl)ethanaminium 2,2,2-trifluoroacetate and 4 μL of DIEA were added at RT. The reaction was monitored by LC-MS, which was complete in 25 minutes. Then the reaction solution was poured into 15 mL EtOAc to precipitate the product. The crude pink solid product 23 was washed three more times by EtOAc, and dried. The pure NHS product was obtained by HPLC purification (15% acetonitrile in 0.1% formic acid aq. to 65% acetonitrile) as a pink solid. MASS (ES−) m/z for $C_{46}H_{52}N_4O_9S_2$, $[M-1]^-$ Calculated: 868.3, Found: 867.9.

EXAMPLE 23

Synthesis of Cy3-3c-COT-BG

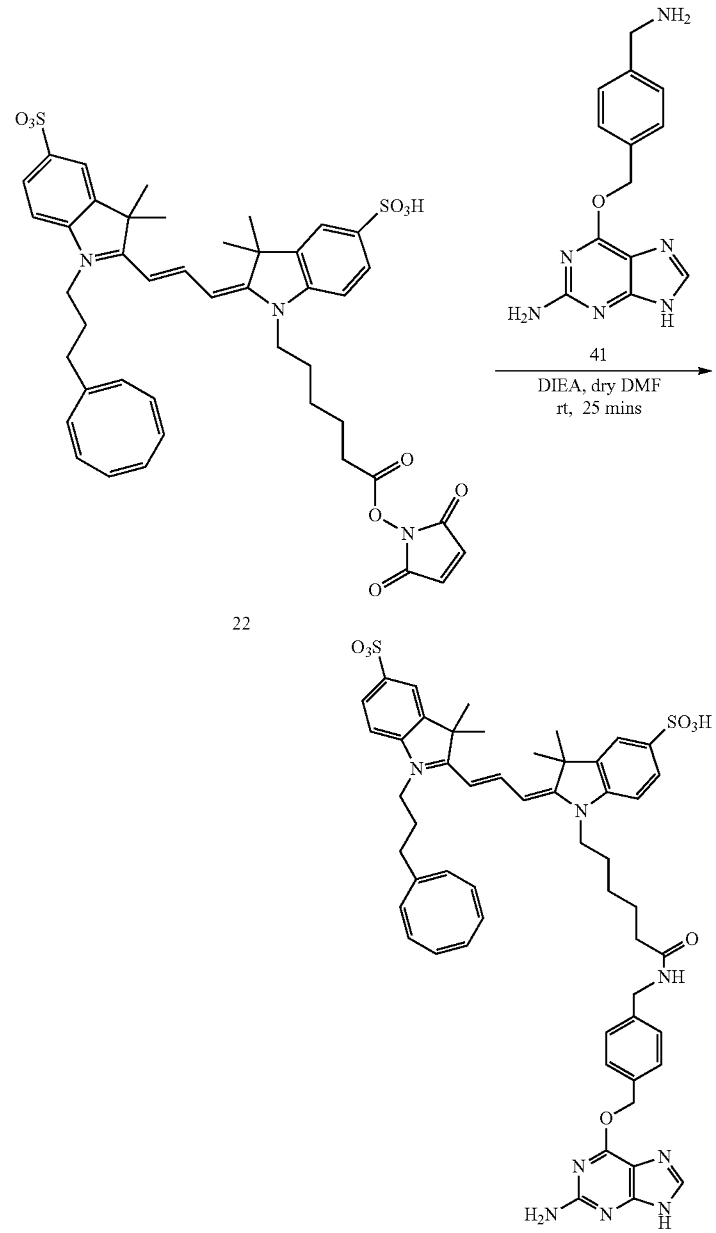

In the above reaction, ton a 5 mL flask, 1 mg of compound 22 was dissolved in 1 mL of dry DMF, and then 3 mg compound 41 and 4 μL of DIEA were added at RT. The reaction was monitored by LC-MS, which was complete in 25 minutes. Then the reaction solution was poured into 15 mL EtOAc to precipitate the product. The crude pink solid product 24 was washed three more times by EtOAc, and dried. The pure NHS product was obtained by HPLC purification (0% acetonitrile in 0.1% formic acid aq. to 80% acetonitrile) as a pink solid. MASS (ES−) m/z for $C_{53}H_{58}N_8O_8S_2$, $[M-1]^-$ Calculated: 998.4, Found: 998.4.

EXAMPLE 24

Synthesis of Cy3-3c-COT-N3 compound 48 was prepared by literature method JACS 2004, 126(30), 9152-9153

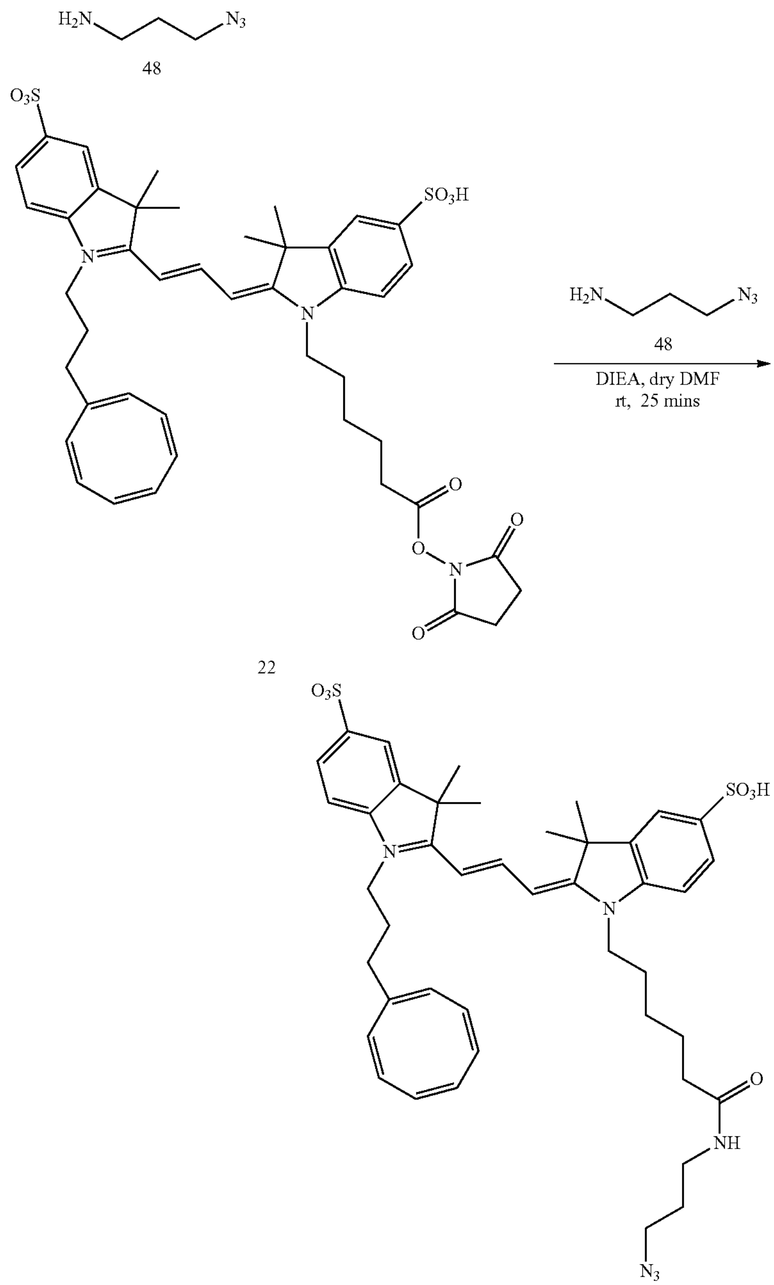

25

In the above reaction, to a 5 mL flask, 1 mg of compound 22 was dissolved in 1 mL of dry DMF, and then 3 mg compound 48 and 4 μL of DIEA were added at RT. The reaction was monitored by LC-MS, which was complete in 25 minutes. Then the reaction solution was poured into 15 mL EtOAc to precipitate the product. The crude pink solid product 25 was washed three more times by EtOAc, and dried. The pure NHS product was obtained by HPLC purification (15% acetonitrile in 0.1% formic acid aq. to 65% acetonitrile) as a pink solid. MASS (ES−) m/z for $C_{43}H_{52}N_6O_7S_2$, $[M-1]^+$ Calculated: 828.3, Found: 828.6.

EXAMPLE 25

Synthesis of Cy5-3c-COT-NHS

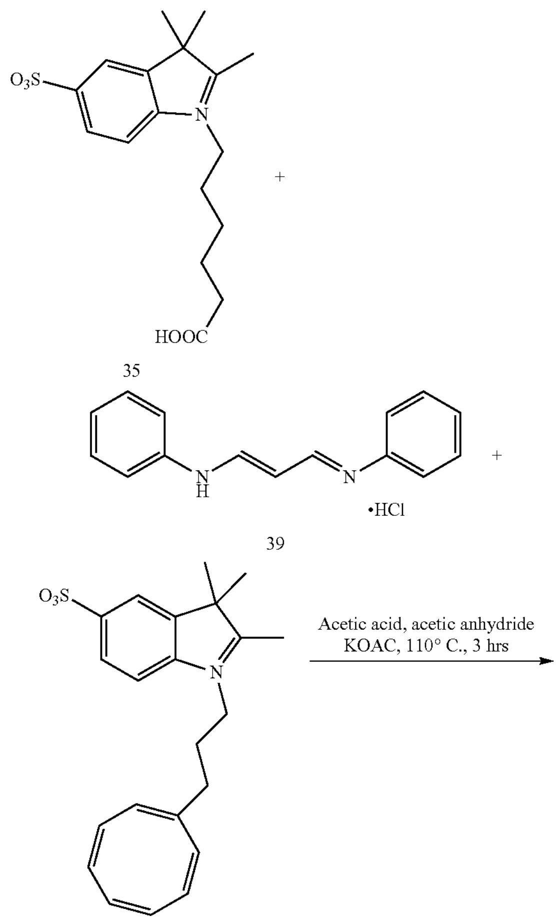

35

39

47

-continued

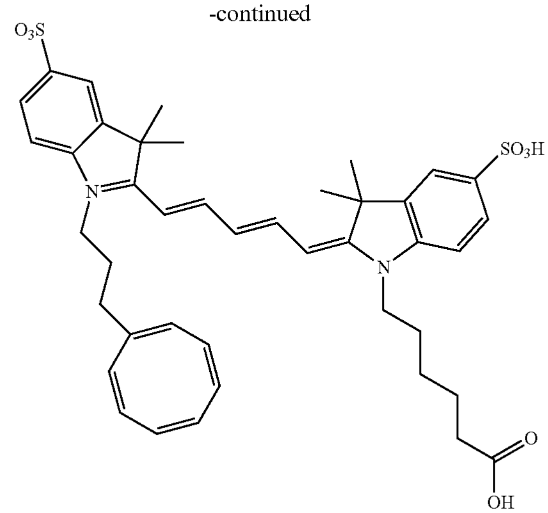

26

In the above reaction, to a round bottom flask were added compound 35 (176 mg), malonaldehydedianilide hydrochloride 39 (129 mg), 5 mL acetic acid, and 0.5 mL acetic anhydride. The resulting purple solution was heated up to 120° C. for two hours, then 192 mg of compound 47 was added to this solution followed by 500 mg of KOAc. The reaction mixture was heated to 120° C. and stirred for another 1.5 hours. After the reaction was complete, the reaction mixture was poured into 45 mL of EtOAc to precipitate the crude product as a dark green solid. The residue was washed three more times (40 mL each time) by EtOAc, and dried. The pure Cy5 dye compound 26 was isolated by semi-prep HPLC purification (25% acetonitrile in 0.1% formic acid aq. to 65% acetonitrile) as a blue solid. MASS (ES−) m/z for C42H48N2O8S2, $[M-1]^-$ Calculated: 772.3, Found: 772.4

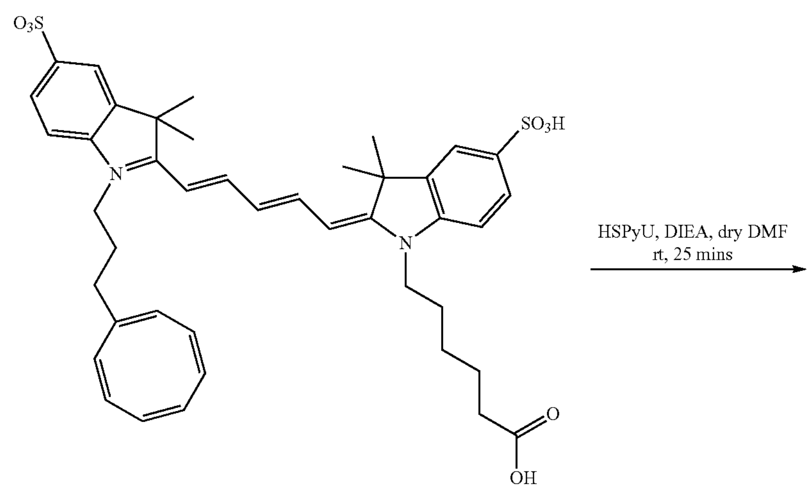

26

-continued

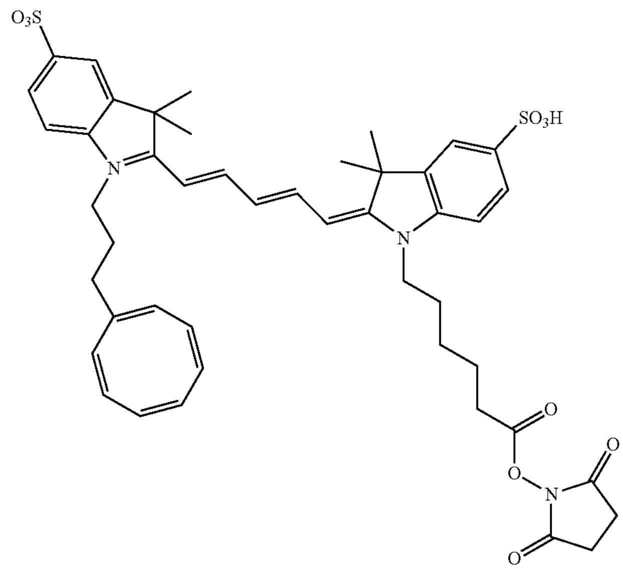

27

In the above reaction, to a 5 mL flask, 1 mg of compound 26 was dissolved in 1 mL of dry DMF, and then 3 mg of HSPyU and 4 μL of DIEA were added at RT. The reaction was monitored by LC-MS, which was complete in 25 minutes. Then the reaction solution was poured into 15 mL EtOAc to precipitate the product. The crude blue solid product 27 was washed three more times by EtOAc, and dried. The pure NHS product was obtained by HPLC purification (25% acetonitrile in 0.1% formic acid aq. to 65% acetonitrile) as a blue solid. MASS (ES−) m/z for $C_{46}H_{51}N_3O_{10}S_2$, $[M-1]^-$ Calculated: 869.3, Found: 869.6.

EXAMPLE 26

Synthesis of Cy5-3c-COT-Mal

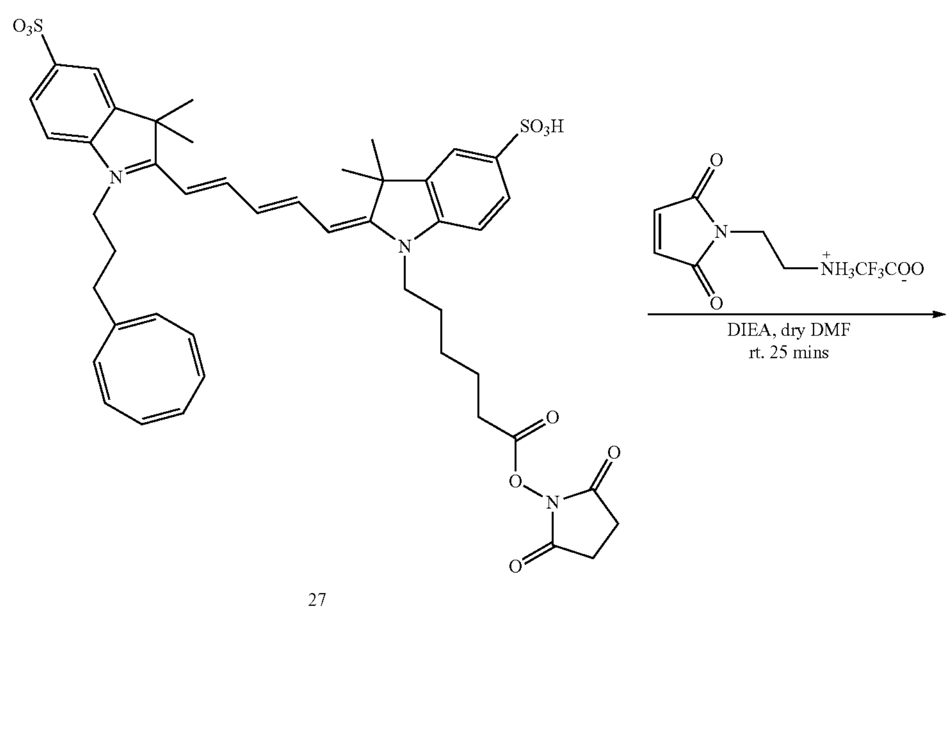

27

-continued

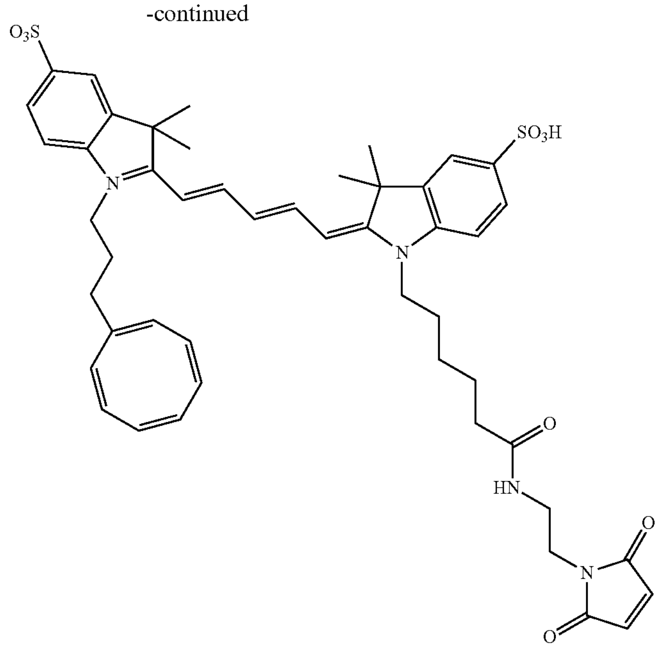

28

In the above reaction, to a 5 mL flask, 1 mg of compound 27 was dissolved in 1 mL of dry DMF, and then 3 mg of 2-(2,5-dioxo-2,5-dihydro-1H-pyrrol-1-yl)ethanaminium 2,2,2-trifluoroacetate and 4 μL of DIEA were added at RT. The reaction was monitored by LC-MS, which was complete in 25 minutes. Then the reaction solution was poured into 15 mL EtOAc to precipitate the product. The crude blue solid product 28 was washed three more times by EtOAc, and dried. The pure NHS product was obtained by HPLC purification (25% acetonitrile in 0.1% formic acid aq. to 65% acetonitrile) as a blue solid. MASS (ES−) m/z for $C_{48}H_{54}N_4O_9S_2$, $[M-1]^-$ Calculated: 894.3, Found: 894.5.

EXAMPLE 27

Synthesis of Cy5-3c-COT-BG

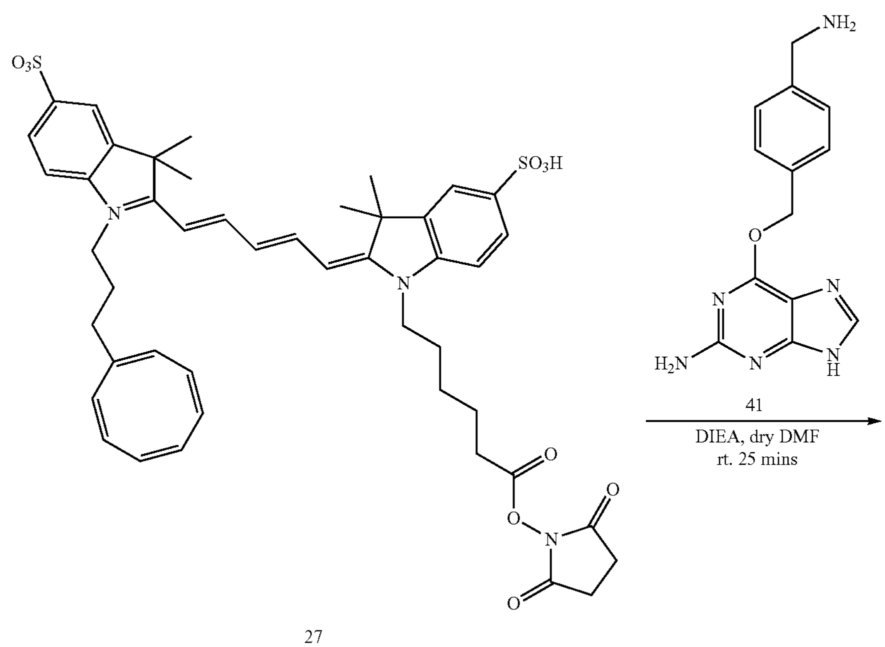

27

-continued

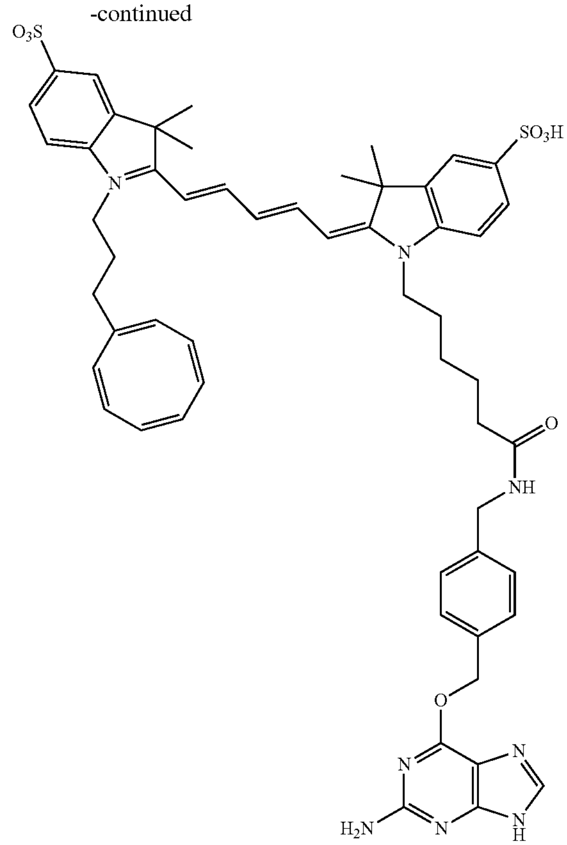

29

In the above reaction, to a 5 mL flask, 1 mg of compound 27 was dissolved in 1 mL of dry DMF, and then 3 mg compound 41 and 4 μL of DIEA were added at RT. The reaction was monitored by LC-MS, which was complete in 25 minutes. Then the reaction solution was poured into 15 mL EtOAc to precipitate the product. The crude blue solid product 29 was washed three more times by EtOAc, and dried. The pure NHS product was obtained by HPLC purification (0% acetonitrile in 0.1% formic acid aq. to 80% acetonitrile) as a blue solid. MASS (ES−) m/z for $C_{55}H_{60}N_8O_8S_2$, $[M-1]^-$ Calculated: 1024.4, Found: 1024.4.

EXAMPLE 28

Synthesis of Cy5-3c-COT-N3

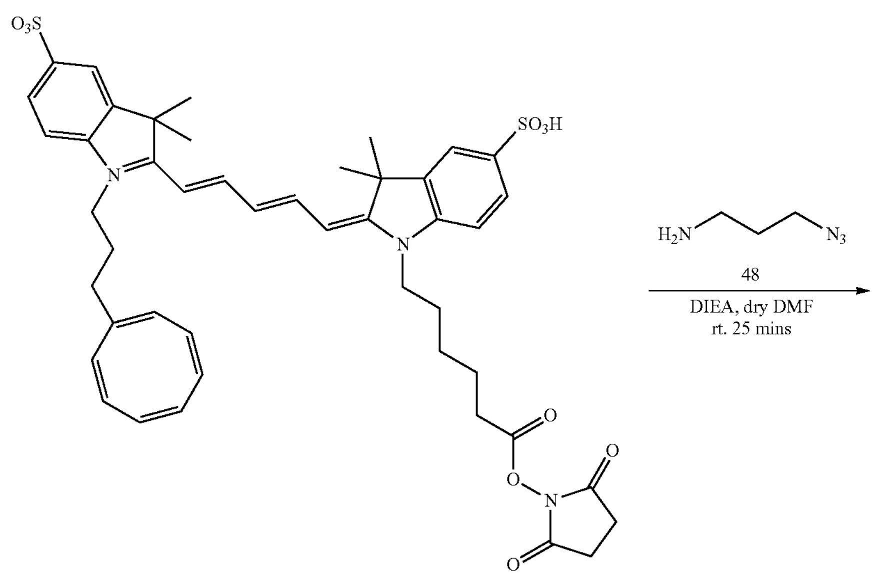

27

-continued

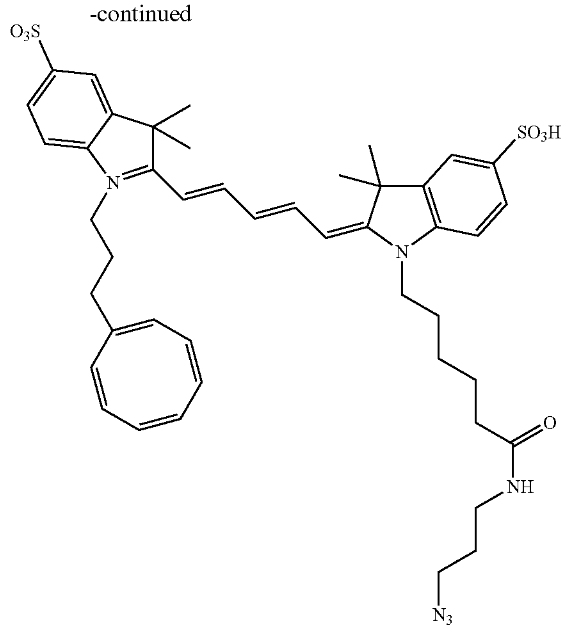

30

In the above reaction, to a 5 mL flask, 1 mg of compound 27 was dissolved in 1 mL of dry DMF, and then 3 mg compound 48 and 4 μL of DIEA were added at RT. The reaction was monitored by LC-MS, which was complete in 25 minutes. Then the reaction solution was poured into 15 mL EtOAc to precipitate the product. The crude pink solid product 30 was washed three more times by EtOAc, and dried. The pure NHS product was obtained by HPLC purification (25% acetonitrile in 0.1% formic acid aq. to 65% acetonitrile) as a blue solid. MASS (ES−) m/z for $C_{45}H_{54}N_6O_7S_2$, $[M-1]^-$ Calculated: 854.3, Found: 854.6.

EXAMPLE 29

Synthesis of Cy7-3c-COT-NHS

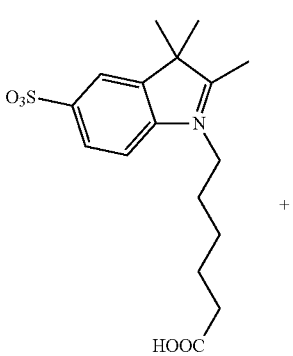

35

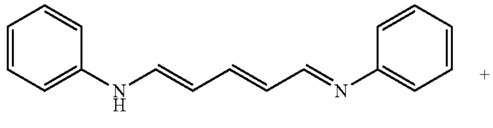

40

-continued

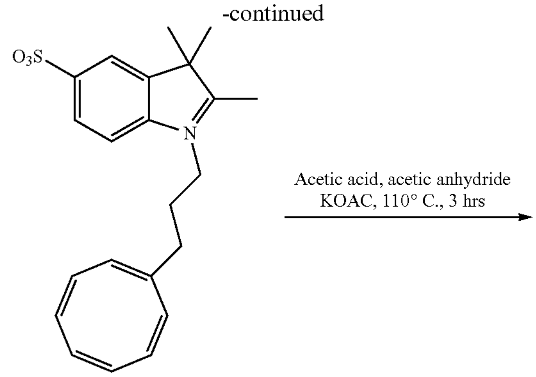

47

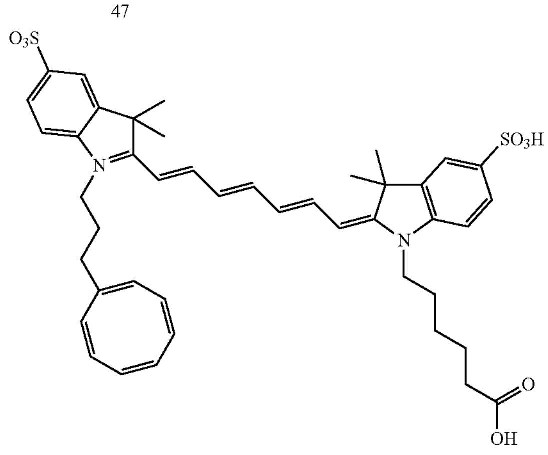

31

In the above reaction, to a round bottom flask were added compound 35 (176 mg), glutaconaldehydedianilide hydrochloride 40 (192 mg), 5 mL acetic acid, and 0.5 mL acetic anhydride. The resulting purple solution was heated to 120°

C. for two hours, then 200 mg of compound 47 was added to this solution followed by 500 mg of KOAc. The reaction mixture was heated to 120° C. and stirred for another 1.5 hours. After the reaction was complete, the reaction mixture was poured into 45 mL of EtOAc to precipitate the crude product as a dark blue solid. The residue was washed three more times (40 ml, each time) by EtOAc, and dried. The pure Cy5 dye compound 31 was isolated by semi-prep HPLC purification (30% acetonitrile in 0.1% formic acid aq. to 80% acetonitrile) as a teal solid. MASS (ES−) m/z for $C_{44}H_{50}N_2O_8S_2$, $[M-1]^1$ Calculated: 797.3, Found: 797.3.

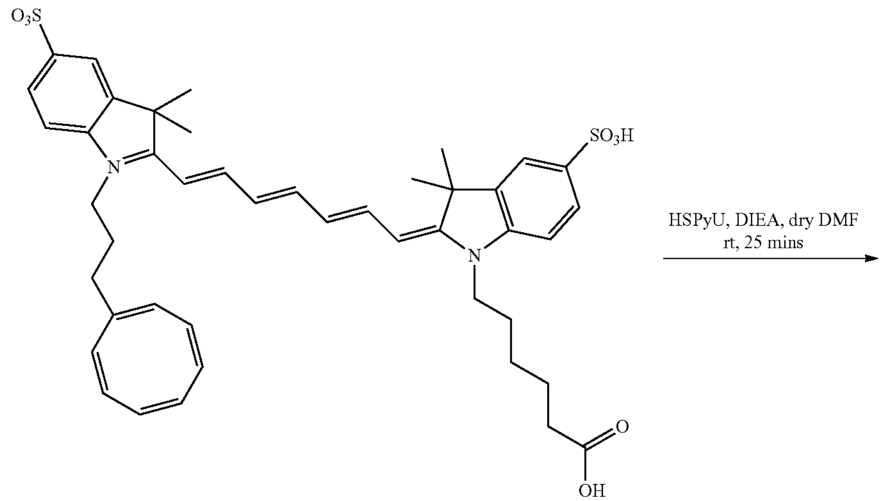

31

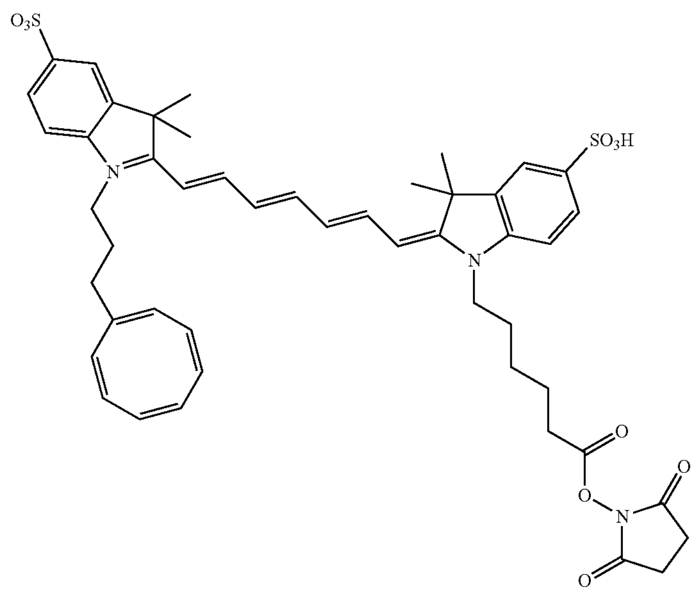

32

In the above reaction, to a 5 mL flask, 1 mg of compound 31 was dissolved in 1 mL of dry DMF, and then 3 mg of HSPyU and 4 μL of DIEA were added at RT. The reaction was monitored by LC-MS, which was complete in 25 minutes. Then the reaction solution was poured into 15 mL EtOAc to precipitate the product. The crude teal solid product 32 was washed three more times by EtOAc, and dried. The pure NHS product was obtained by HPLC purification (30% acetonitrile in 0.1% formic acid aq. to 80% acetonitrile) as a teal solid. MASS (ES−) m/z for $C_{48}H_{53}N_3O_{10}S_2$, $[M-1]^-$ Calculated: 894.3, Found: 894.5.

EXAMPLE 30

Synthesis of Cy7-3c-COT-Mal

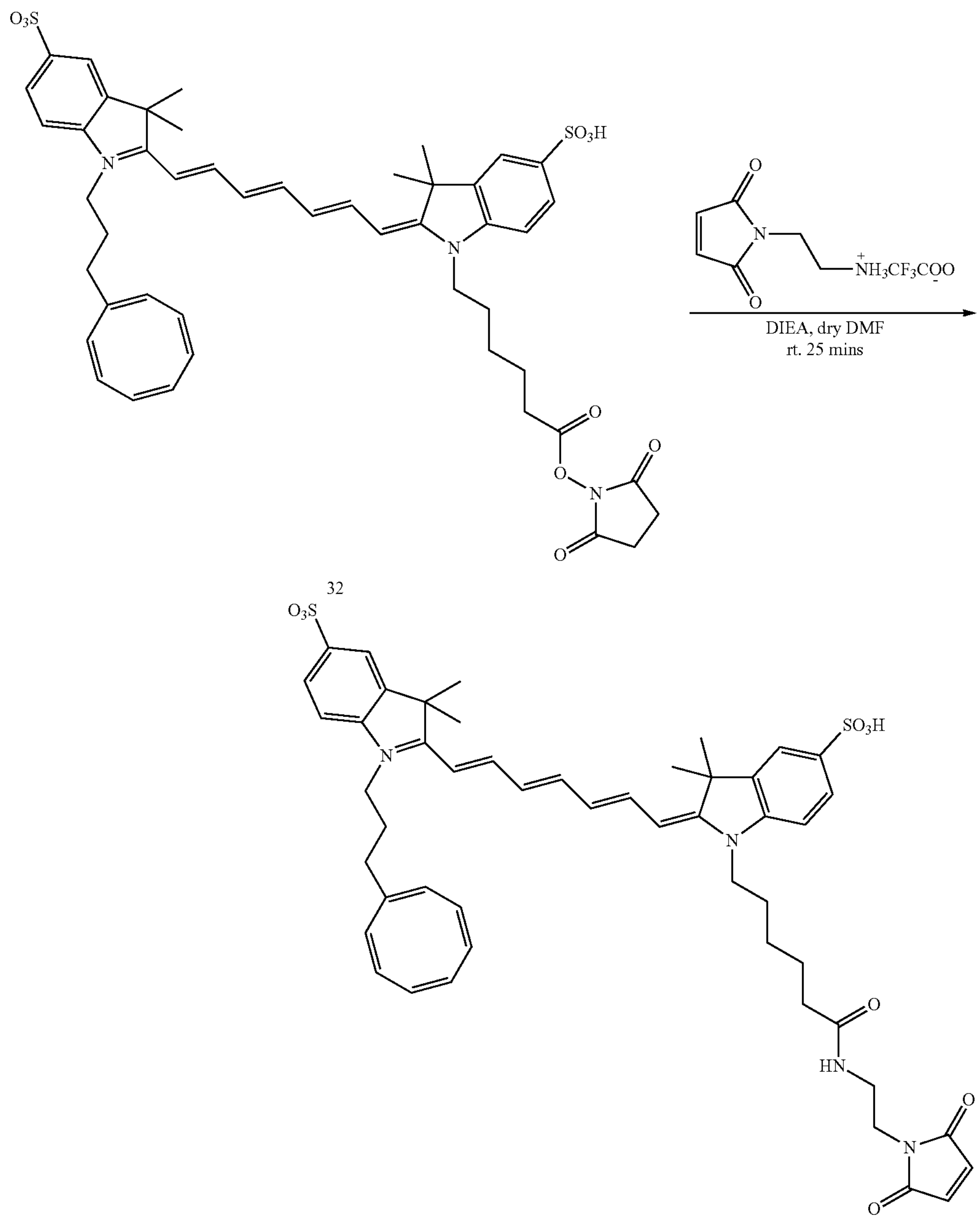

32

33

In the above reaction, to a 5 mL flask, 1 mg of compound 32 was dissolved in 1 mL of dry DMF, and then 3 mg of 2-(2,5-dioxo-2,5-dihydro-1H-pyrrol-1-yl)ethanaminium 2,2,2-trifluoroacetate and 4 μL of DIEA were added at RT. The reaction was monitored by LC-MS, which was complete in 25 minutes. Then the reaction solution was poured into 15 mL EtOAc to precipitate the product. The crude teal solid product 33 was washed three more times by EtOAc, and dried. The pure NHS product was obtained by HPLC purification (30% acetonitrile in 0.1% formic acid aq. to 80% acetonitrile) as a teal solid. MASS (ES−) m/z for $C_{50}H_{56}N_4O_9S_2$, $[M-1]^-$ Calculated: 919.3, Found: 919.2.

EXAMPLE 31

Synthesis of Highly Sulfonated Dye Derivatives

Synthesis of Precursors

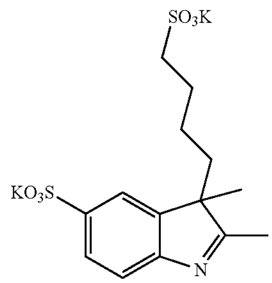

potassium 2,3-dimethyl-3-(4-sulfonatobutyl)-3H-indole-5-sulfonate was prepared by literature procedure

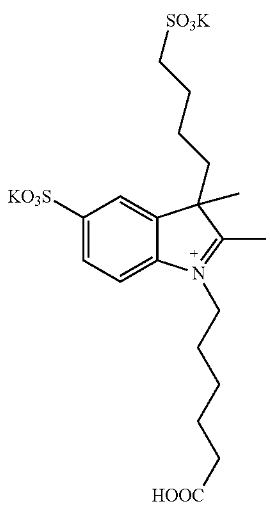

Precursor 1
dipotassium mono(1-(5-carboxypentyl)-2,3-dimethyl-3-(4-sulfonatobutyl)-3H-indolium-5-sulfonate)

-continued

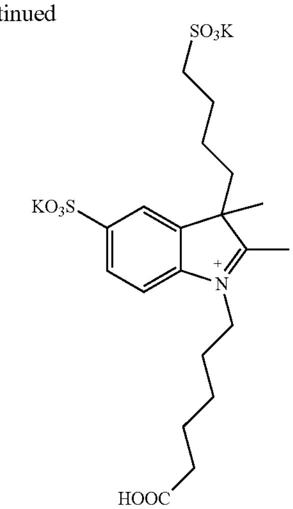

In a sealed tube, 437 mg of potassium 2,3-dimethyl-3-(4-sulfonatobutyl)-3H -indole-5-sulfonate (1 mmol) and 291 mg of 6-bromohexanoic acid (1.5 mmol) were combined followed by addition of 2 mL of tetramethylene sulfone. The reaction mixture was heated to 110° C. for 16 hours and poured into 40 mL of EtOAc to precipitate product as a pink solid. The product (Precursor 1) was washed with 40 mL of EtOAc×2, and dried. Precursor 1 was carried onto the next step without further purification. MASS (ES+) m/z for C20H29NO8S2, $[M+1]^+$, Calculated: 476.1, Found: 476.3.

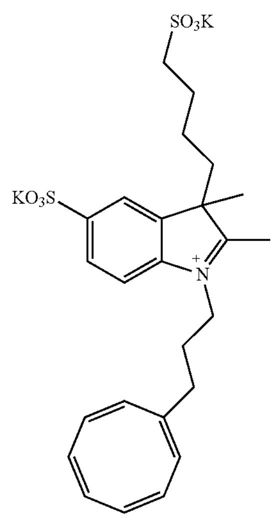

Precursor 2
dipotassium mono(1-(3-((1Z,3Z,5Z,7Z)-cycloocta-1,3,5,7-tetraenyl)propyl)-2,3-dimethyl-3-(4-sulfonatobutyl)-3H-indolium-5-sulfonate)

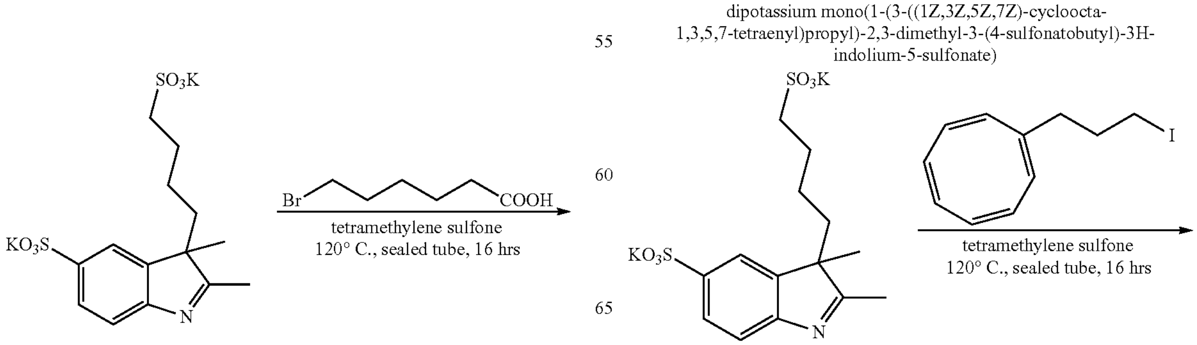

-continued

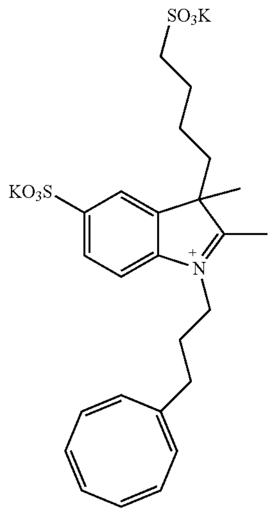

In a sealed tube, 437 mg of potassium 2,3-dimethyl-3-(4-sulfonatobutyl)-3H-indole-5-sulfonate (1 mmol) and 408 mg of 1-(3-iodopropyl)cycloocta-1,3,5,7-tetraene (1.5 mmol) were combined followed by addition of 2 mL of tetramethylene sulfone. The reaction mixture was heated to 110° C. for 16 hours and poured into 40 mL of EtOAc to precipitate product as a pink solid. The product (Precursor 2) was washed with 40 mL of EtOAc×2, and dried. Precursor 2 was carried onto the next step without further purification. MASS (ES+) m/z for C25H31NO6S2, $[M+1]^+$, Calculated: 506.2, Found: 506.4.

Synthesis of Cy3-4S-COT-COOH

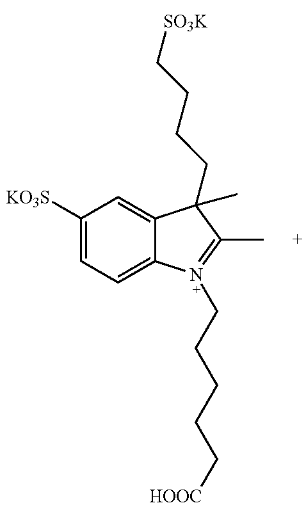

Precursor 1

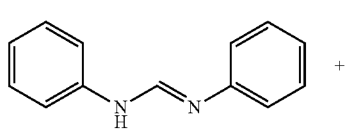

(E)-N,N'-diphenylformimidamide

-continued

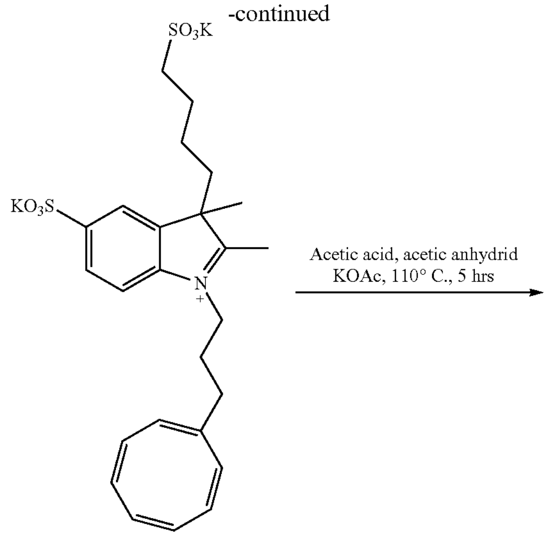

Precursor 2

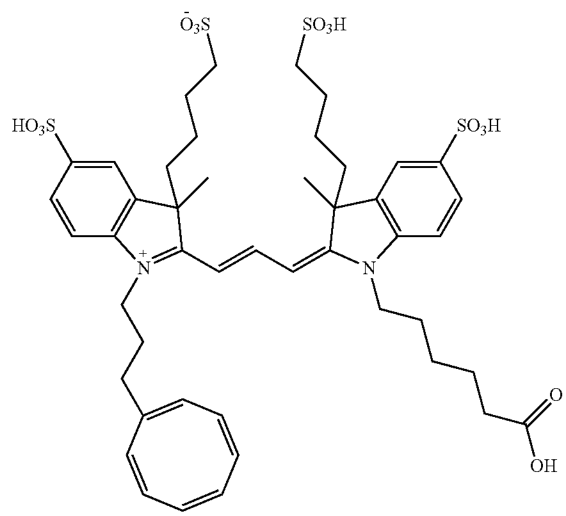

Cy3-4S-COT-COOH

In a round bottom flask, 55 mg of Precursor 1, 20 mg of N,N'-diphenylformimidamide, 2 mL of acetic acid, and 0.2 mL of acetic anhydride were combined. The resulting purple solution was heated up to 120° C. for 2 hours. 60 mg of Precursor 2 was added to this solution followed by 50 mg of KOAc. The reaction mixture was heated to 120° C. and stirred for another 3 hours. After the reaction was complete, the reaction mixture was poured into 45 mL of EtOAc to precipitate the crude product as a dark red solid. The residue was washed three more times (40 mL each time) by EtOAc, and dried. The pure Cy3 dye compound was isolated by semi-prep HPLC purification (15% acetonitrile in 10 mM TEAA pH 7.0 buffer aq. to 65% acetonitrile) as a red solid. MASS (ES−) m/z for C46H58N2O14S4, $[M-1]^-$ Calculated: 989.3, Found: 989.2.

Synthesis of Cy5-4S-COT-COOH

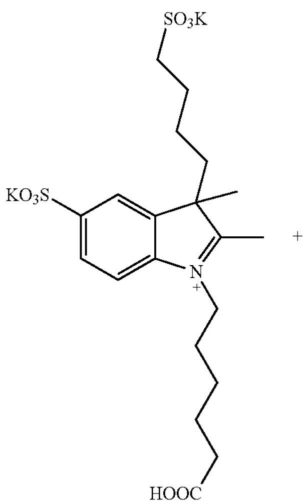

Precursor 1

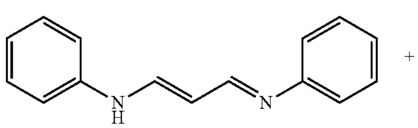

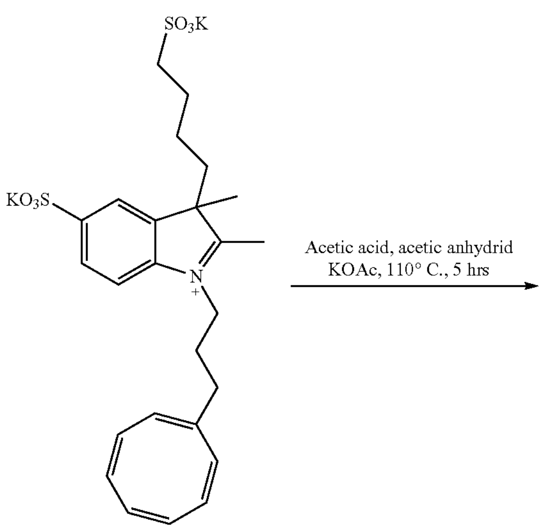

Precursor 2

-continued

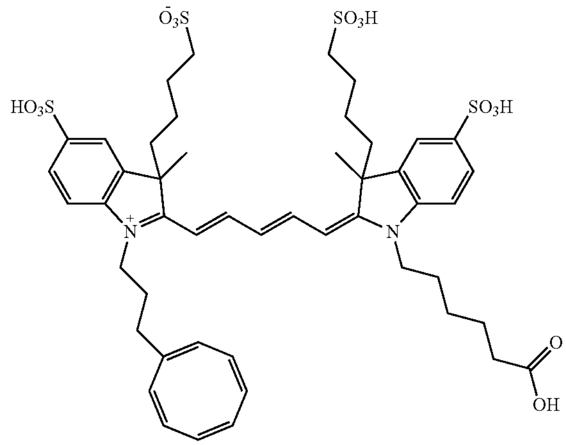

Cy5-4S-COT-COOH

In a round bottom flask, 55 mg of Precursor 1, 26 mg of malonaldehyde dianilide hydrochloride, 2 mL of acetic acid, and 0.2 mL of acetic anhydride were combined. The resulting purple solution was heated up to 120° C. for 2 hours. 60 mg of Precursor 2 was added to this solution followed by 500 mg of KOAc. The reaction mixture was heated to 120° C. and stirred for another 3 hours. After completion, the reaction mixture was poured into 45 mL of EtOAc to precipitate the crude product as a dark green solid. The residue was washed three more times (40 mL each time) with EtOAc, and dried. The pure Cy5 dye compound was isolated by semi-prep HPLC purification (15% acetonitrile in 10 mM TEAA pH 7.0 buffer aq. to 65% acetonitrile) as a blue solid. MASS (ES−) m/z for C48H60N2O14S4, $[M-1]^-$ Calculated: 1015.3, Found: 1015.6.

Synthesis of Cy7-4S-COT-COOH

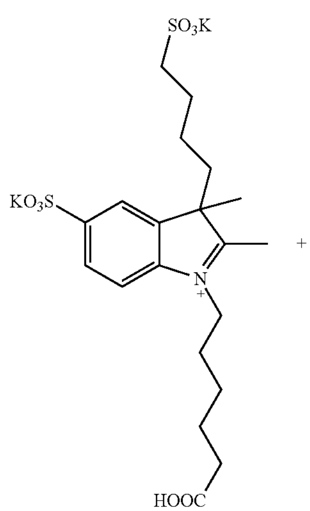

Precursor 1

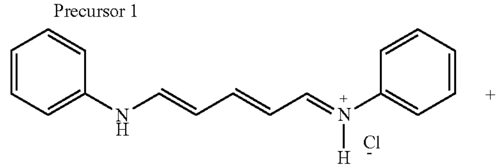

-continued

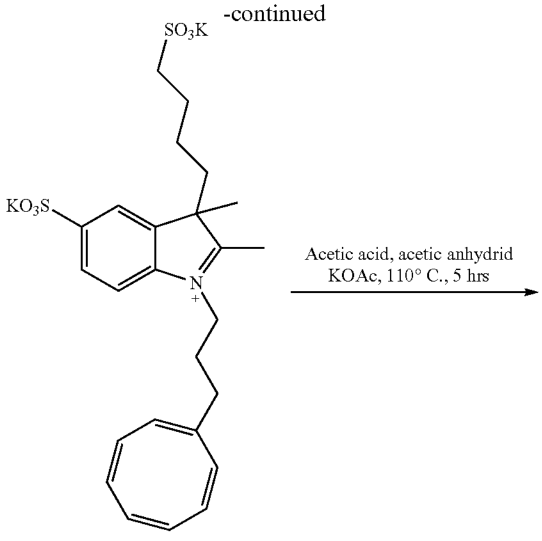

Precursor 2

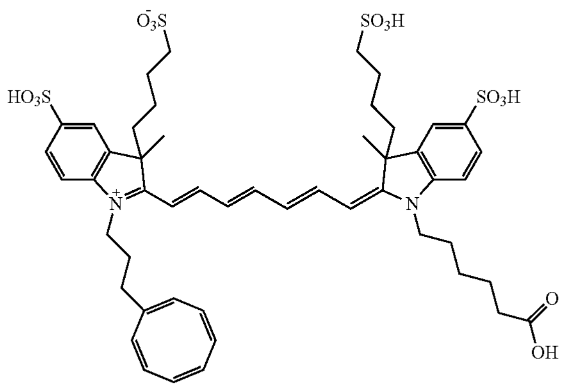

Cy7-4S-COT-COOH

In a round bottom flask, 55 mg of Precursor 1, 28 mg of glutaconaldehyde dianilide hydrochloride, 2 mL of acetic acid, and 0.2 mL of acetic anhydride were combined. The resulting purple solution was heated up to 120° C. for 2 hours, then 60 mg of Precursor 2 was added to this solution followed by 500 mg of KOAc. The reaction mixture was heated to 120° C. and stirred for another 3 hours. After the reaction was complete, the reaction mixture was poured into 45 mL of EtOAc to precipitate the crude product as a dark purple solid. The residue was washed three more times (40 mL each time) with EtOAc, and dried. The pure Cy5 dye compound was isolated by semi-prep HPLC purification (15% acetonitrile in 10 mM TEAA pH 7.0 buffer aq. to 65% acetonitrile) as a teal colored solid. MASS (ES−) m/z C50H62N2O14S4, $[M-1]^-$ Calculated: 1041.3, Found: 1041.5.

Any of the carboxylate-functionalized dye derivatives described above can be used as precursors, as described in Examples 1-30 above, for the preparation of such highly sulfonated dye derivatives containing any suitable reactive crosslinking group, such as an activated ester (NHS), maleimide, azide, BG, or epoxy group.

General Procedure for 4S Dye-NHS Synthesis:

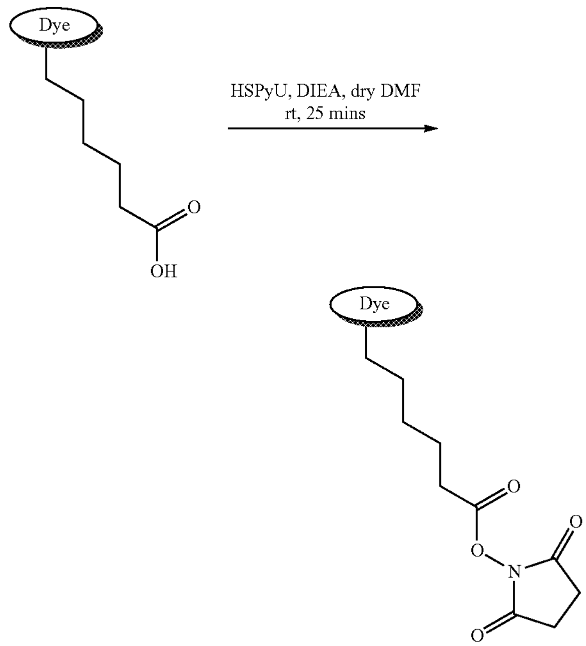

In a 5 mL flask, 1-5 mg of dye-COOH was dissolved in 1 mL of dry DMF, and then 5 eq. of HSPyU and 10 eq. of DIEA were added at RT. The reaction was monitored by LC-MS, and complete in 25 minutes. Next the reaction solution was poured into 15 mL of EtOAc to precipitate the product and centrifuged. The crude solid product was washed 3 more times with EtOAc, centrifuged, and dried by vacuum.

Purification:

Crude NHS activated fluorophore was purified using a semipreparative HPLC C18 T3 column (Waters) with a 10 mM TEAA pH 7.0 buffer mobile phase in a gradient from 15% (0 min) to 65% (25 mins) acetonitrile at a flow rate of 20 mL/min.

Cy3-4S-COT-NHS

MASS (ES−) m/z C50H61N3O16S4, $[M-1]^-$ Calculated: 1086.3, Found: 1086.6.

Cy5-4S-COT-NHS

MASS (ES−) m/z C 52H63N3O16S4, $[M-1]^-$ Calculated: 1112.3, Found: 1112.4.

Cy7-4S-COT-NHS

MASS (ES−) m/z C 54H65N3O16S4, $[M-1]^-$ Calculated: 1138.3, Found: 1038.5.

General Procedure for 4S dye-MAL Synthesis:

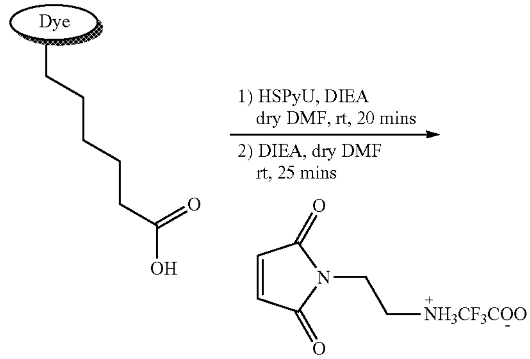

-continued

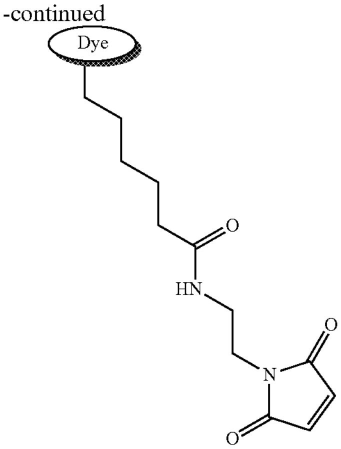

In a 5 mL flask, 1-5 mg of dye-COOH was dissolved in 1 mL of dry DMF, and then 5 eq. of HSPyU and 10 eq. of DIEA were added at RT. The reaction was monitored by LC-MS, and complete in 25 minutes. Next the reaction solution was quenched by 10 eq. of maleimide-NH2, 10 eq. of DIEA, and monitored by LC-MS. The reaction solution was then poured into 15 mL of EtOAc to precipitate the product and centrifuged. The crude solid product was washed 3 more times by EtOAc, centrifuged, and dried by vacuum.

Purification:

Crude MAL activated fluorophore was purified using a semipreparative HPLC C18 T3 column (Waters) with a mobile phase of 10 mM TEAA pH 7.0 in a gradient from 15% (0 min) to 65% (25 mins) acetonitrile at a flow rate of 20 mL/min.

Cy3-4S-COT-MAL

MASS (ES−) m/z C52H64N4O15S4, $[M-1]^-$ Calculated: 1111.3, Found: 1111.5.

Cy5-4S-COT-MAL

MASS (ES−) m/z C54H66N4O15S4, $[M-1]^-$ Calculated: 1138.3, Found: 1138.6.

Cy7-4S-COT-MAL

MASS (ES−) m/z C56H68N4O15S4, $[M-1]^-$ Calculated: 1163.4, Found: 1163.5.

General Procedure for 4S Dye-BG

Synthesis:

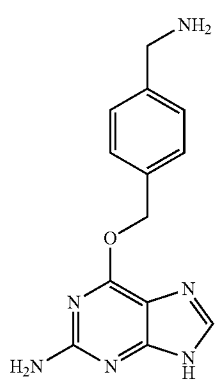

41

BG—NH2 was prepared by literature method Nature Biotechnol 2003, 21, 86-89

-continued

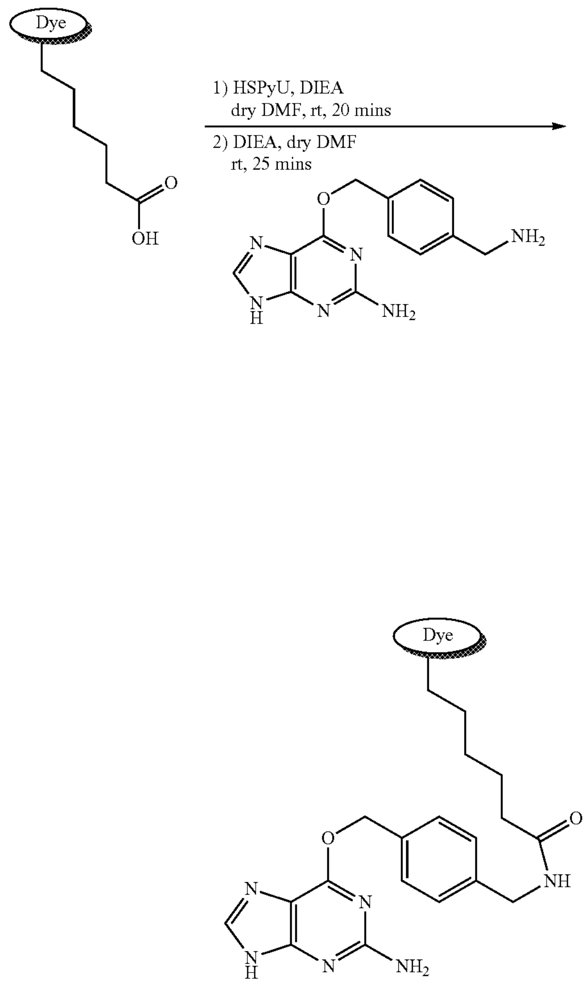

In a 5 mL flask, 1-5 mg of dye-COOH was dissolved in 1 mL of dry DMF, and then 5 eq. of HSPyU and 10 eq. of DIEA were added at RT. The reaction was monitored by LC-MS and complete in 25 minutes. Next the reaction solution was quenched by 10 eq. of BG-NH2 and 10 eq. of DIEA while monitoring by LC-MS. The reaction solution was then poured into 15 mL of EtOAc to precipitate the product and centrifuged. The crude solid product was washed three more times by EtOAc, centrifuged, and dried by vacuum.

Purification:

Crude BG-activated fluorophore was purified using a semipreparative HPLC C18 T3 column (Waters) with a mobile phase of 10 mM TEAA pH 7.0 in a gradient from 15% (0 min) to 65% (25 mins) acetonitrile at a flow rate of 20 mL/min.

Cy3-4S-COT-BG

MASS (ES−) m/z C59H70N8O14S4, $[M-1]^-$ Calculated: 1241.4, Found: 1241.6.

Cy5-4S-COT-BG

MASS (ES−) m/z C61H72N8O14S4, $[M-1]^-$ Calculated: 1267.4, Found: 1267.4.

General Procedure for 4S dye-CD Synthesis:

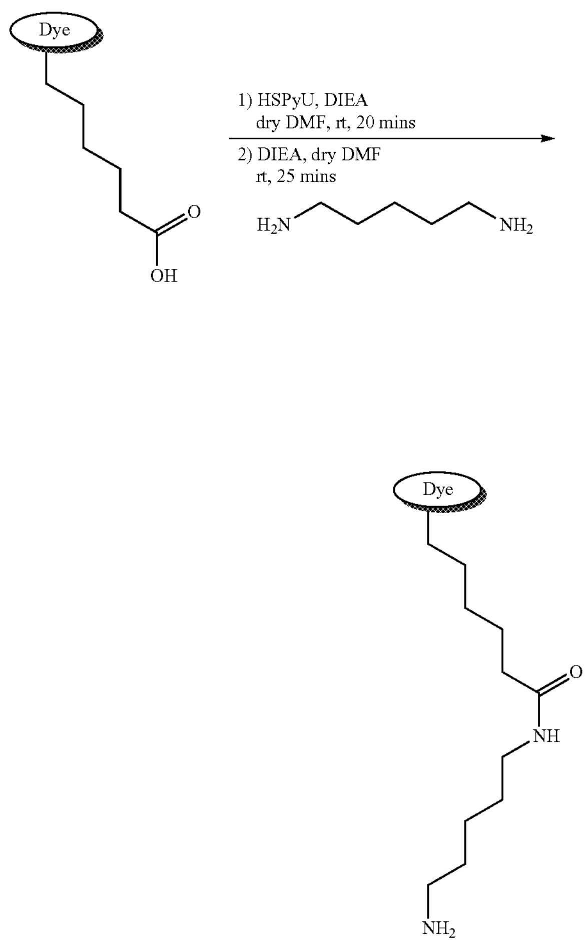

In a 5 mL flask, 1-5 mg of dye-COOH was dissolved in 1 mL of dry DMF, and then 5 eq. of HSPyU and 10 eq. of DIEA were added at RT. The reaction was monitored by LC-MS and complete in 25 minutes. Next the reaction solution was quenched by 10 eq. of N3-3C-NH2 and 10 eq. of DIEA while monitoring by LC-MS. The reaction solution was then poured into 15 mL of EtOAc to precipitate the product and centrifuged. The crude solid product was washed three more times by EtOAc, centrifuged, and dried by vacuum.

Purification:

Crude CD-activated fluorophore was purified using a semipreparative HPLC C18 T3 column (Waters) with a mobile phase of 10 mM TEAA pH 7.0 in a gradient from 15% (0 min) to 65% (25 min) acetonitrile at a flow rate of 20 mL/min.

Cy3-4S-COT-CD

MASS (ES−) m/z C51H70N4O13S4, $[M-1]^-$ Calculated: 1073.4, Found: 1073.7.

Cy5-4S-COT-CD

MASS (ES−) m/z C53H72N4O13S4, $[M-1]^-$ Calculated: 1099.4, Found: 1099.5.

An exemplary list of highly sulfonated dye compositions are provided as follows:

Cy3-4S-COT Series

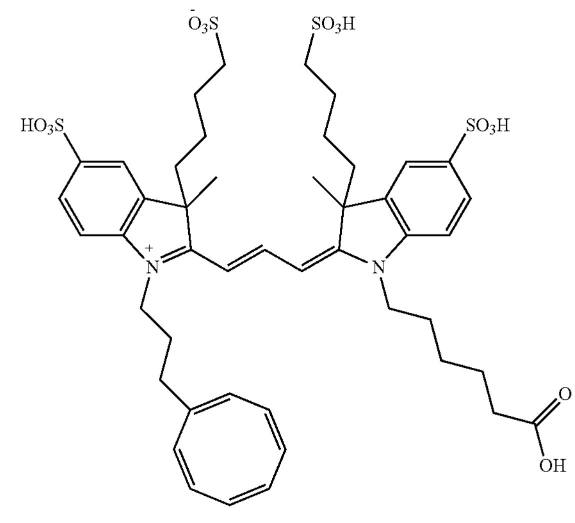

Cy3-4S-COT-COOH

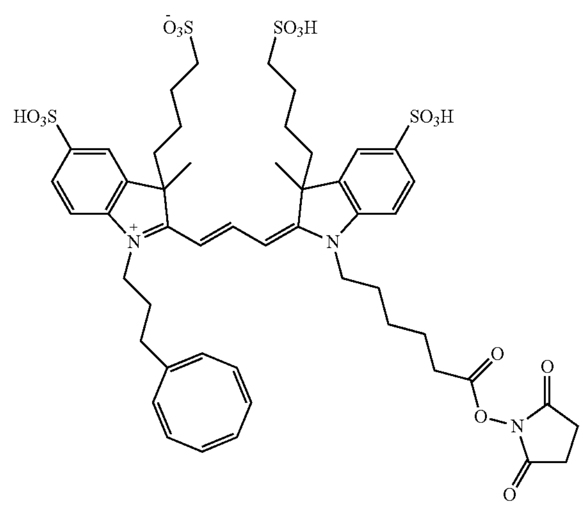

Cy3-4S-COT-NHS

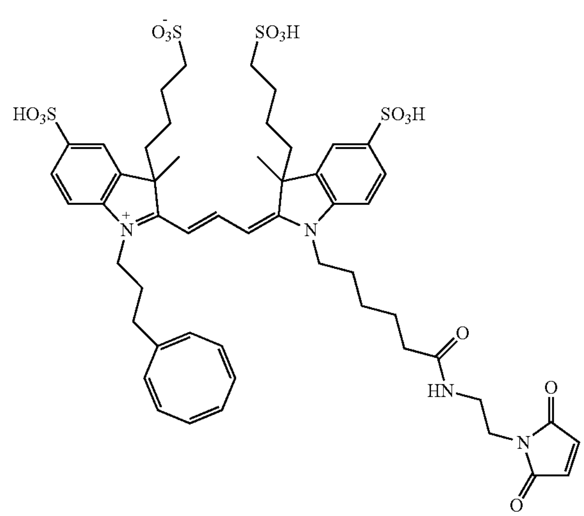

Cy3-4S-COT-MAL

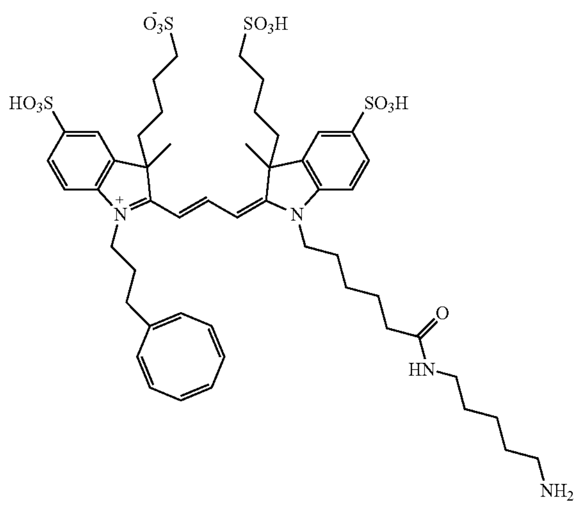
Cy3-4S-COT-CD
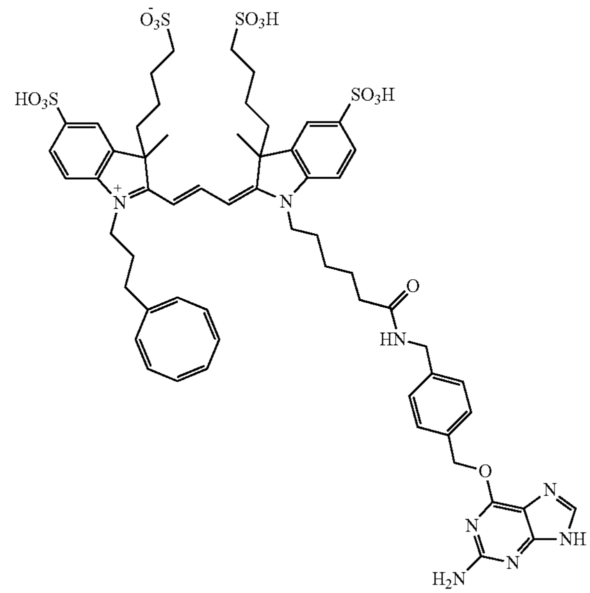
Cy3-4S-COT-BG
Cy5-4S-COT Series
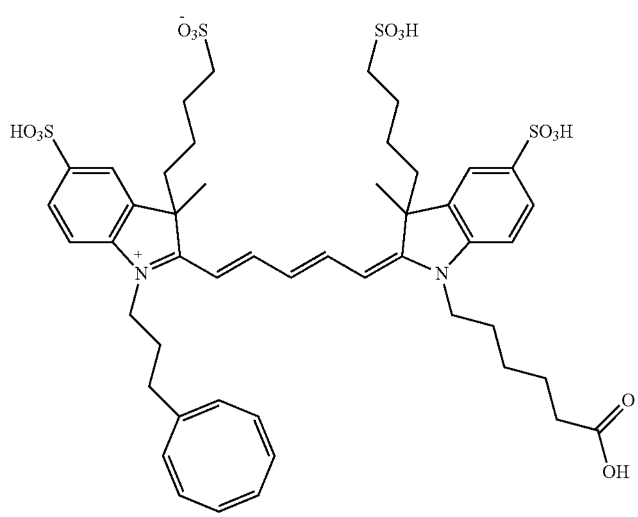
Cy5-4S-COT-COOH -continued
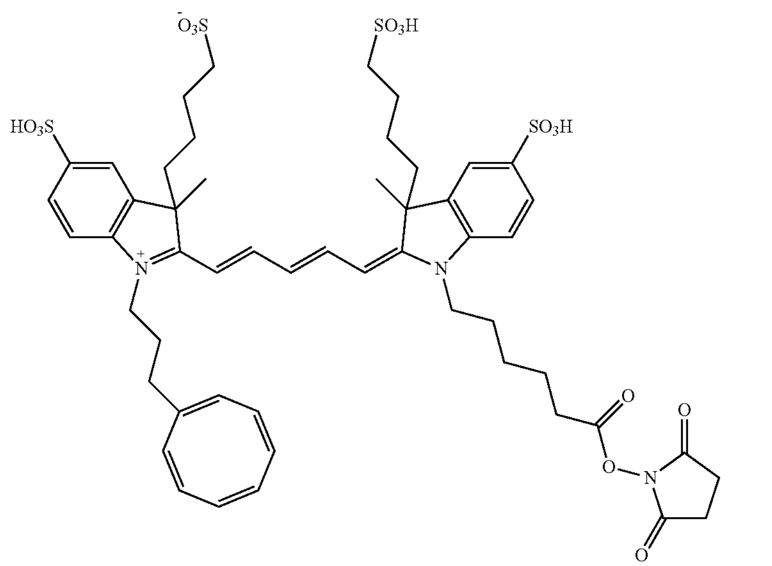
Cy5-4S-COT-NHS
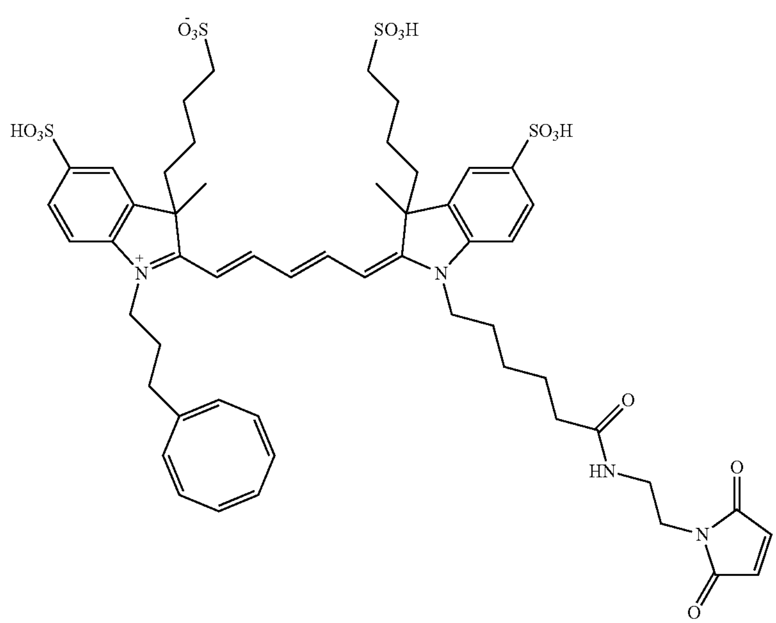
Cy5-4S-COT-MAL -continued
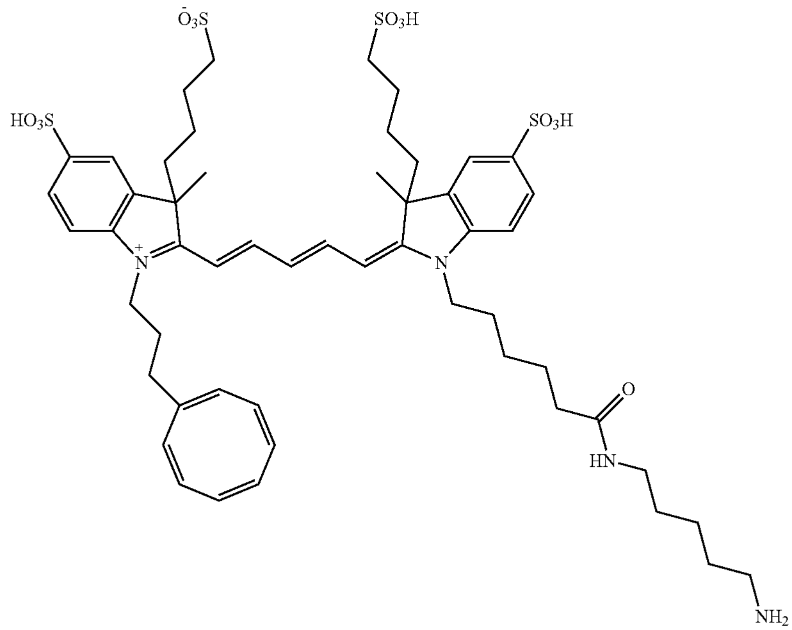
Cy5-4S-COT-CD
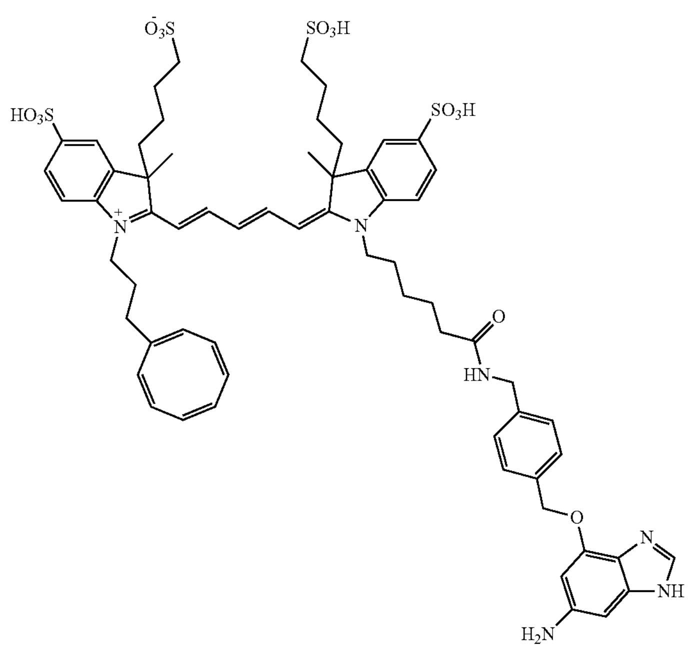
Cy3-4S-COT-BG Cy7-4S-COT Series
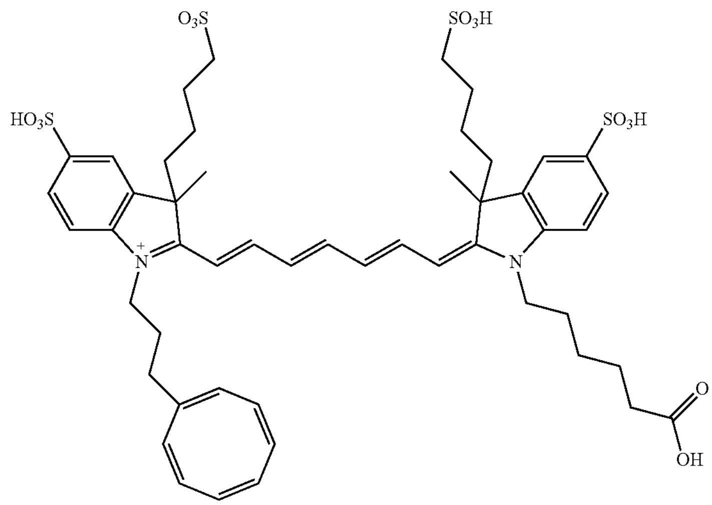
Cy5-4S-COT-COOH
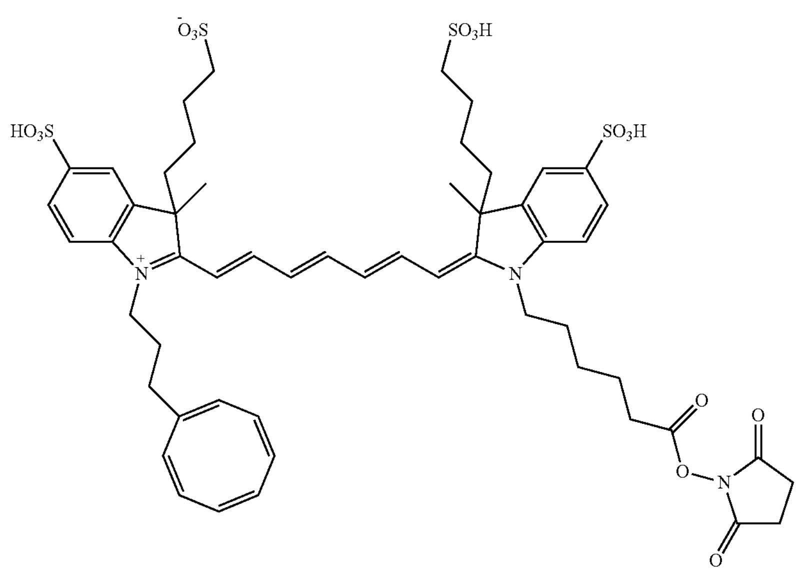
Cy37-4S-COT-NHS -continued

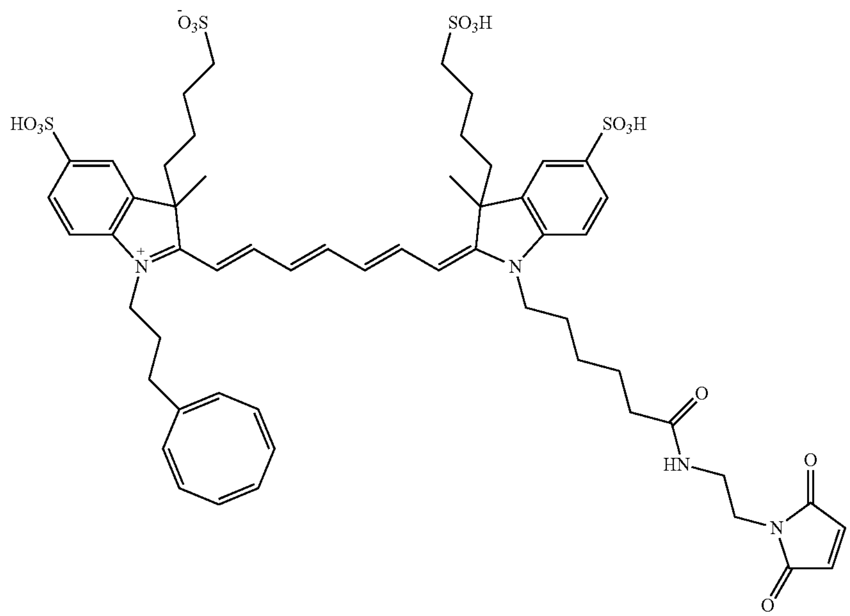

Cy7-4S-COT-MAL

EXAMPLE 32

Synthesis of Sulfonated COT ("SCOT")

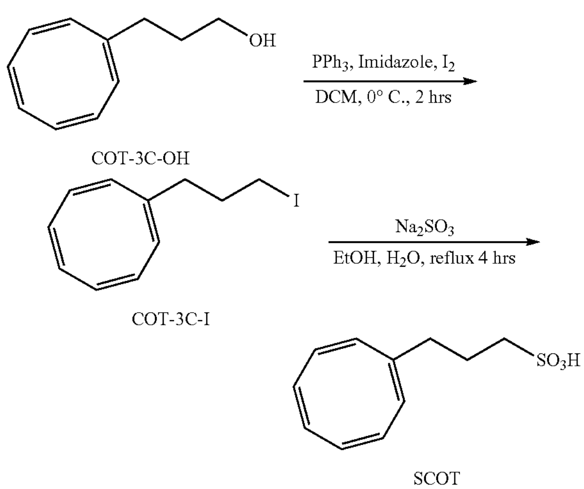

Step 1

In a round bottom flask, 700 mg of 3-COT-propan-1-ol was dissolved in 10 mL of DCM, cooled to 0° C. followed by addition of 1.25 g of triphenylphosphine and 1.20 g of imidazole. Next, 1.2 g of iodine flakes were added. The reaction solution was stirred at 0° C. until all the iodine flakes were gone, followed by stirring for two more hours at room temperature. The dark yellow solution was then concentrated and the residue was purified by silica gel chromatography using 1:20 EtOAc:Hexanes. 834 mg of 1-(3-iodopropyl)-COT product was obtained as a yellow colored thick oil with a yield of 71%.

$^{1}$H NMR ($CDCl_3$): δ 5.91-5.67 (m, 6H), 5.64 (s, 1H), 3.27 (t, J=6.2 Hz, 2H), 2.16 (s, 2H), 1.91 (t, J=6.2 Hz, 2H);

$^{13}$C NMR ($CDCl_3$): δ 142.0, 133.7, 132.2, 131.9, 131.6, 131.2, 127.8, 37.9, 31.8, 6.60

Step 2

300 mg of 1-(3-iodopropyl)-COT and 10 mL of EtOH were combined in a round bottom flask. To this solution 1.4 g sodium sulfite was added in 10 mL of water. The mixture was refluxed for 4 hours, cooled to room temperature and poured into 50 mL of methanol. The majority of the excess sodium sulfite was removed as a white precipitate. The methanol solution was then concentrated and the residue was purified by a semipreparative HPLC C18 T3 column (Waters) with a mobile phase of 0.1% formic acid aq. solution in a gradient from 15% (0 min) to 80% (25 mins) acetonitrile at a flow rate of 20 mL/min. 203 mg of 3-COT-propane-1-sulfonic acid was obtained as a brown oil with a yield of 81%.

$^{1}$H NMR (MeOD): δ 5.80-5.74 (m, 6H), 5.59 (s, 1H), 3.32 (t, J=6.2 Hz, 2H), 2.18 (s, 2H), 1.90 (t, J=6.2 Hz, 2H);

$^{13}$C NMR (MeOD): δ 142.9, 133.3, 131.7, 131.6, 131.4, 130.6, 127.1, 50.6, 35.9, 23.1

ADDITIONAL EXAMPLES

The approach described herein takes advantage of the nucleophility of the nitrogen atoms in the indole moiety. Such groups advantageously permit coupling of the indole ring to a variety of electrophilic auxiliaries such as halogen-activated PAs prepared with specific linkers or other side chains. Subsequently, two indole rings can be condensed using one equivalent of malonaldehydedianilide, yielding a non-symmetrical fluorophore (FIG. 1). This general synthetic strategy has been reduced to practice (as described below) to synthesize an array of fluorophore derivatives bearing a single PA molecule, directly linked to the fluorogenic center, that was subsequently activated with chemical groups (e.g. NHS ester) in order to provide a chemical handle through which they could be coupled to a biological molecule of interest (eg. one bearing a primary amine substituent).

Starting with the simplest structure, a p-nitrobenzyl group was directly linked to the Cy5 core structure, as shown in the following scheme:

Scheme 1. Synthesis of NBA-Cy5-NHS

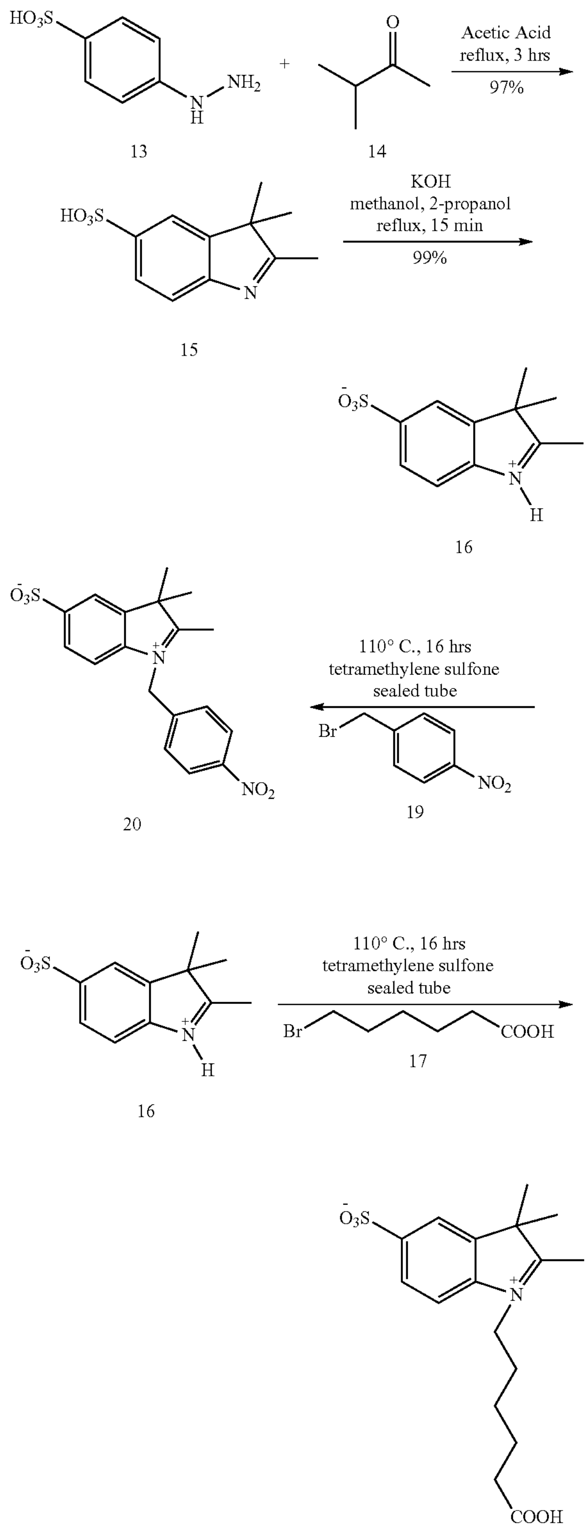

-continued

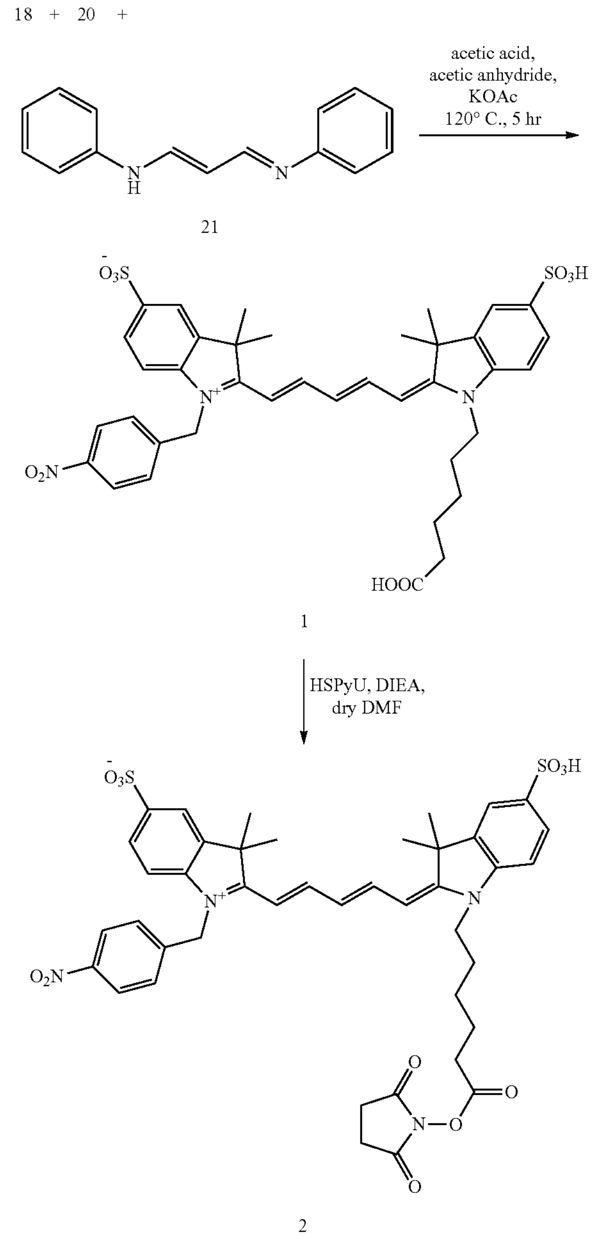

The hydrazine 13 was refluxed with 3-methyl-2-butanone 14 under Fisher's indole condensation condition to give indole species 15 which was then converted to its potassium salt 16. Coupling of the 16 with 6-bromo-hexanoic acid 17 proceeded smoothly in a sealed tube to provide salt 18 as one of the precursors to Cy5 dye. Although this coupling was previously reported to occur in 1,4-dichlorobenzene, in the instant case, solubility problems led to low yields. The use of tetramethylene sulfone as the reaction solvent gave much better solubility of the reactants, and the product of the reaction can be simply precipitated out by adding EtOAc to the reaction solution. In a parallel synthesis, the molecule para-nitrobenzyl bromide 19 was coupled to 17 under the same condition to give compound 20.

Addition of both salt 18 and 20 to malonaldehydedianilide hydrochloride 21 in a sequential order gave the desired asymmetrical NBA-Cy5-COOH product 1. This type of reaction was reported to happen in acetone or acetic anhydride. Due to the improved water solubility of these dyes and the solubility of the starting materials, which are all salts, 10:1 acetic acid and acetic anhydride was used. The final product 2 was prepared by activating the fluorophore with an NHS ester using DMF as the reaction solvent. Again, the crude product was precipitated out of the solution by addition of ethyl acetate, which was subsequently purified with HPLC.

As the distance between the PA and fluorogenic center may play a determining role in the performance of the PA-fluorophore conjugates, a series of compounds with different length linkers between PA and the fluorogenic center were prepared. As downstream uses of the conjugates typically entails their use in aqueous solvents, the initial direction was to modify the linker element between the PA and fluorophore using varied polymer length chains based on the hydrophilic, polyethyleneglycol building block.

Scheme 2. Synthesis of NBA-diglycol-Cy5-NHS, NBA-tetraglycol-Cy5-NHS

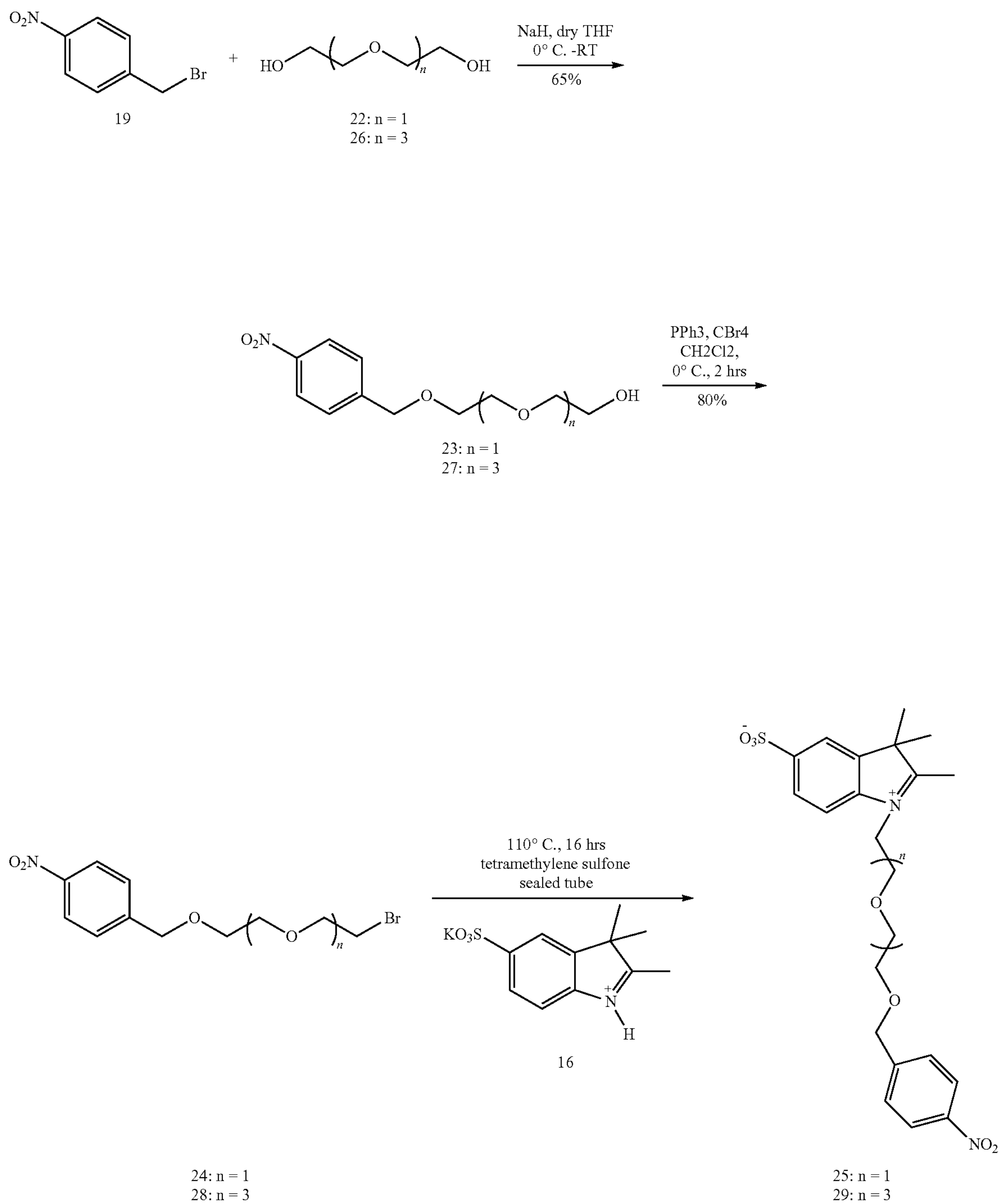

-continued

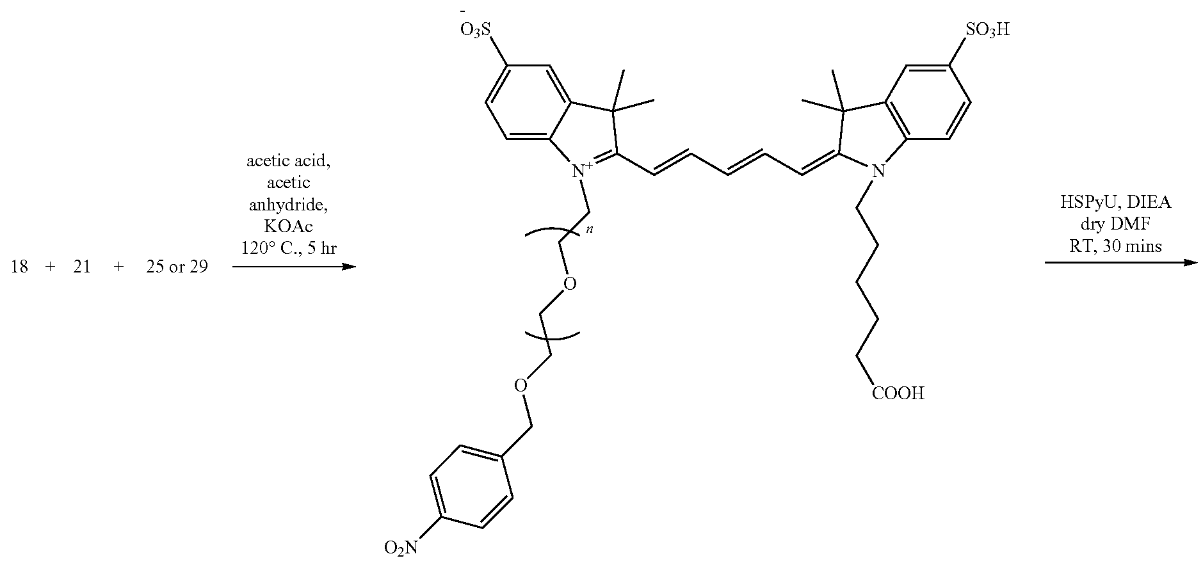

3: n = 1
5: n = 3

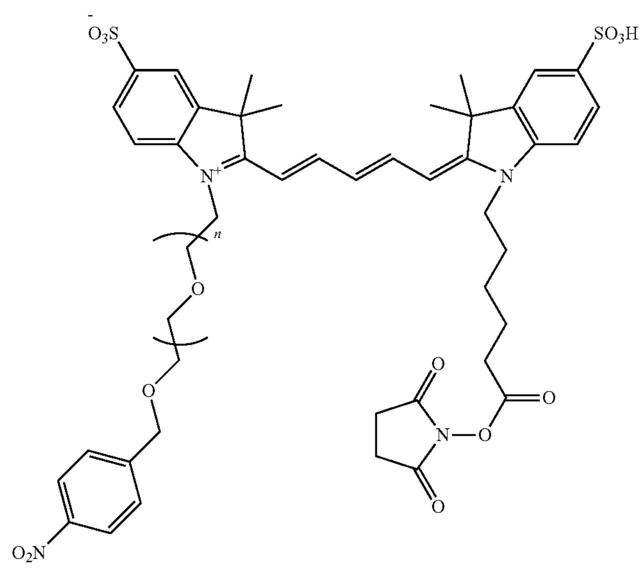

4: n = 1
6: n = 3

The first linker prepared was a diglycol (two units of the polyethelene glycol unit). Reaction of p-nitrobenzyl bromide with diglycol upon treatment of NaH in THF gave compound 23, NBA-diglycol. The hydroxyl group was converted to bromide by treating 23 with $PPh_3$ and $CBr_4$. The resulting compound 24 was coupled with indole salt 16 to give Cy5 dye precursor 29. Again, the same Cy5 synthesis sequence with 18, 29 and malonaldehydedianilide hydrochloride gave the product NBA-diglycol-Cy5-COOH 3, which was purified and NHS ester activated. Following the same route, but switching the linker from diglycol to tetraglycol, NBA-Tetraglycol-Cy5-NHS (6) was similarly prepared. (Scheme 2)

Scheme 3. Synthesis of Trolox-diglycol-Cy5-NHS
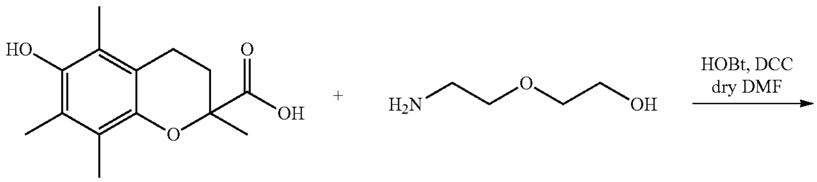
30 31
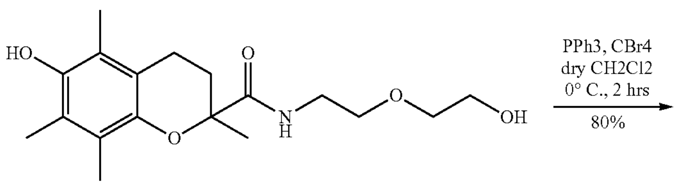
32
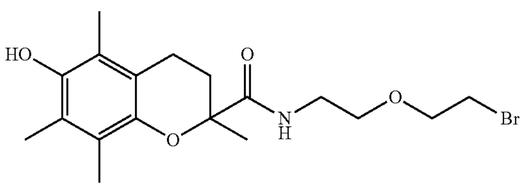
33
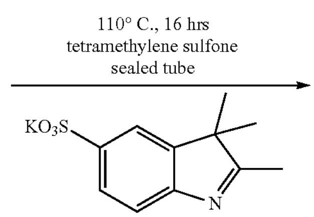
16
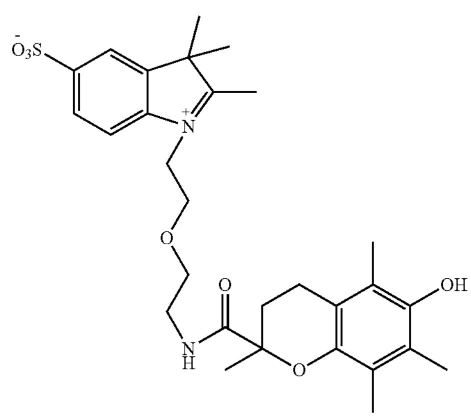
34
acetic acid,
acetic anhydride,
KOAc
120° C., 5 hr
18 + 21 + 34 →

-continued

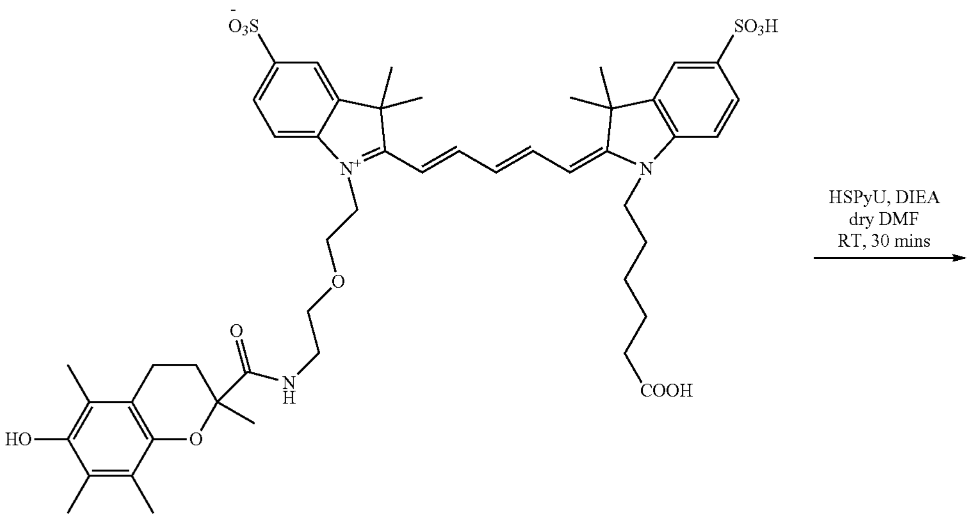

7

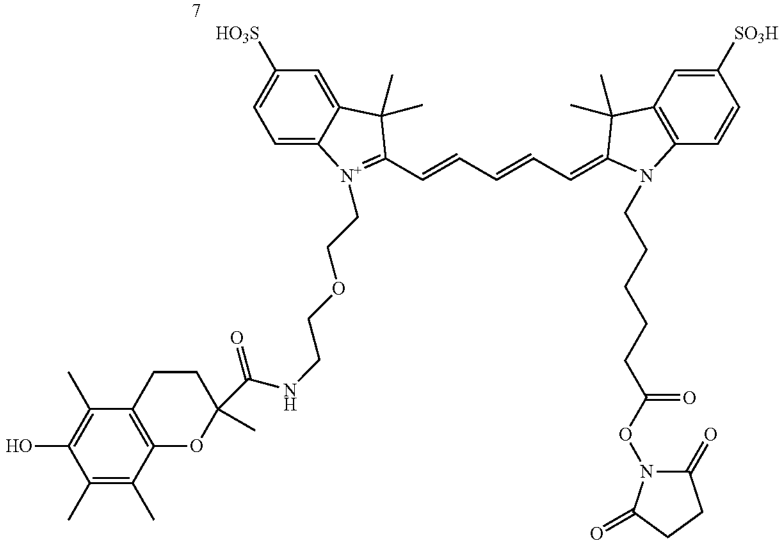

8

Synthetic reactions of the types described above were also demonstrated using the PA, Trolox. To do so, the carboxylic acid moiety of Trolox was first converted to a halogen-activated derivative in a multistep process by first coupling it to molecule 31, an amine activated diglycol constituent that provides the appropriate linker length and converts the carboxylic acid moiety of Trolox to a water stable amide group. Coupling of Trolox with compound 31 in the presence of HOBt and DCC gave 32 as expected. The primary hydroxyl group in 32 was then replaced with bromine yielding the precursor 33 for the next coupling reaction. With compound 33 in hand, the derivatized fluorophore precursor compound 34 was generated and converted sequentially to the final fluorophore, compound 8, following previously described procedures. (Scheme 3)

Scheme 4. Synthesis of Trolox-tetraglycol-Cy5-NHS

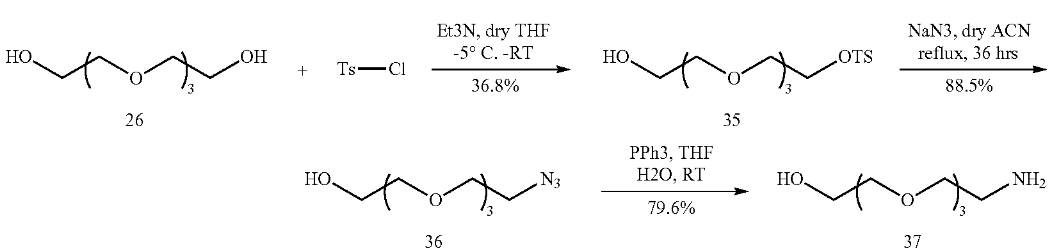

-continued
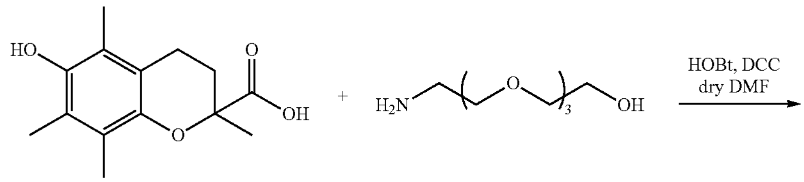
30 37
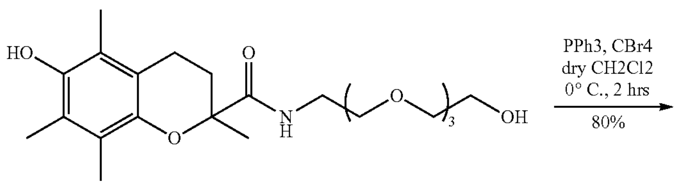
38
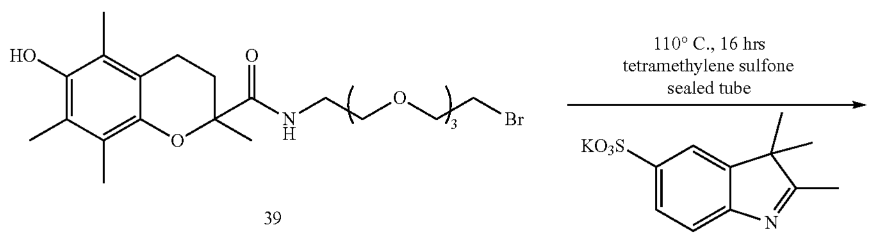
39
16
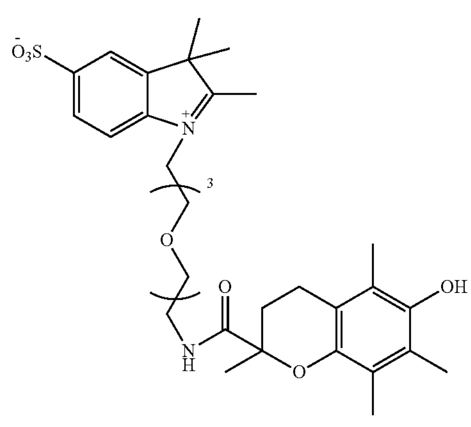
40
18 + 21 + 40 —— acetic acid, acetic anhydride, KOAc, 120° C., 5 hr ——→

-continued

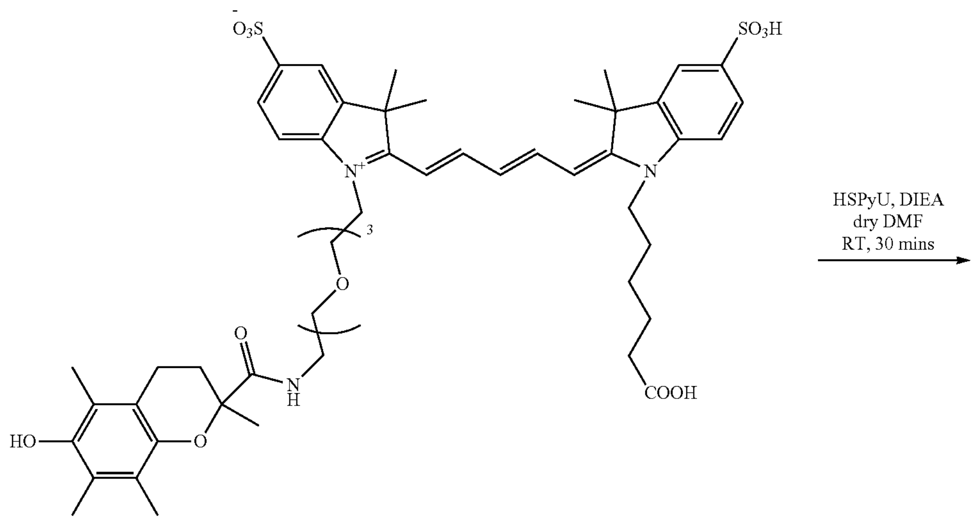

9

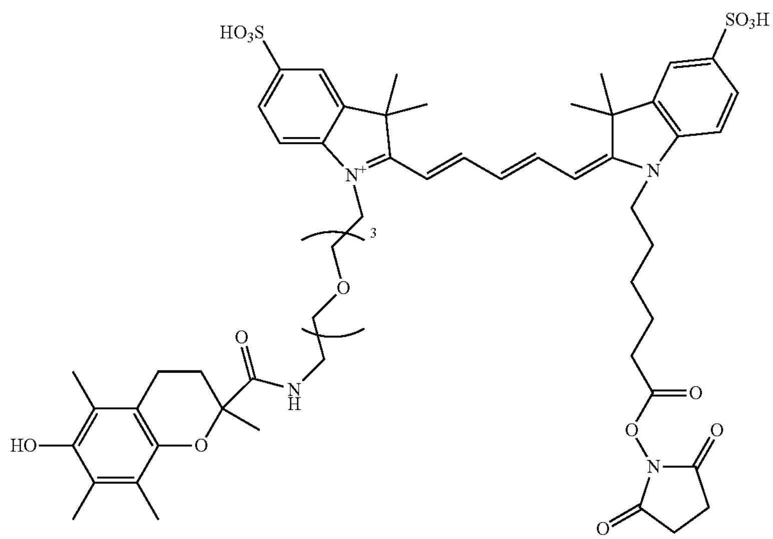

10

Since amine-containing tetraglycol compounds are not commercially available, a selective tosylation-substitution synthesis was performed to prepare the desired linker in a total yield of 26% over three steps. Tetraglycol 26 was first converted to a monotysolate 35 that was then treated with sodium azide in refluxing acetonitrile. The azide-tetraglycol 36 obtained was then reduced with triphenylphine to give the target linker 37. Following the same synthetic route as linker 31, a Trolox-tetraglycol fluorophore 10 was synthesized (Scheme 4).

Scheme 5. Synthesis of dinitrobenzyl-tetraglycol-Cy5-NHS

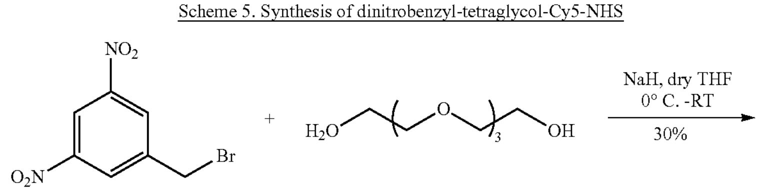

41 26

-continued
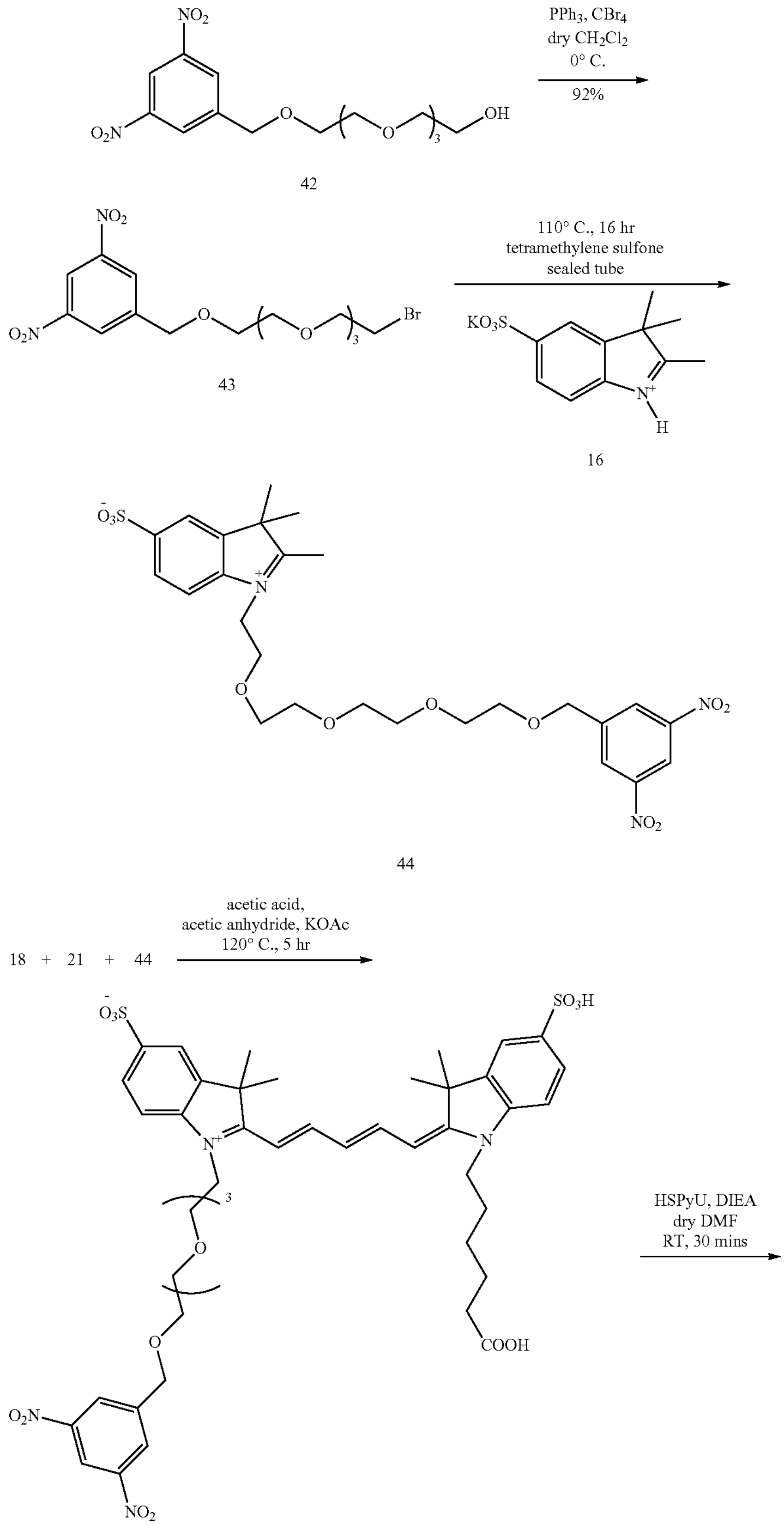
11

-continued

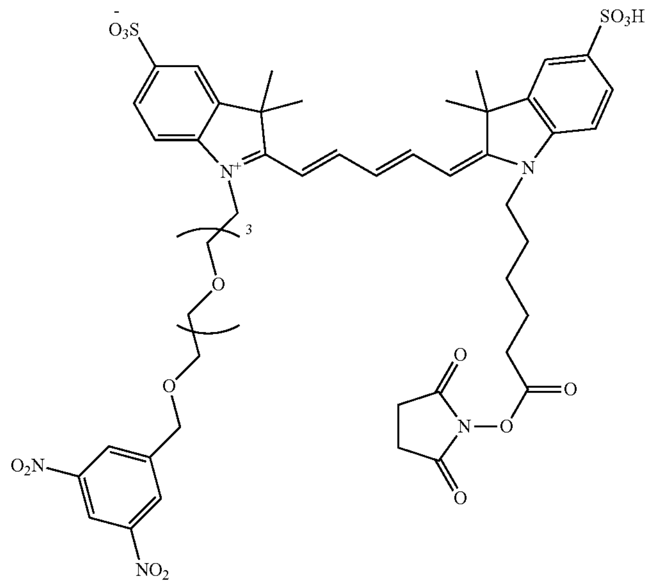

12

As described for p-nitrobenzylalcohol and Trolox above, the next direction in the invention was to extend the distance between the dinitrobenzyl group and the fluorogenic center in order to control the effects of this small molecule on the fluorophore. Such molecules were synthesized according to the chemical procedures described as shown above (Scheme 5).

Scheme 6. Synthesis of COT-Cy5-NHS

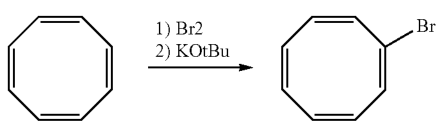

45 46

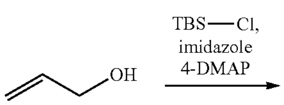

47

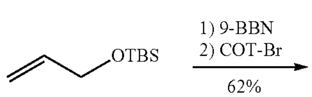

48

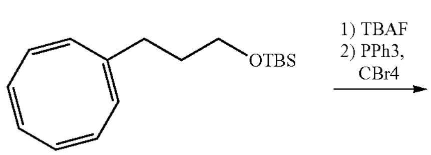

49

-continued

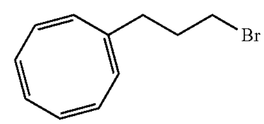

50

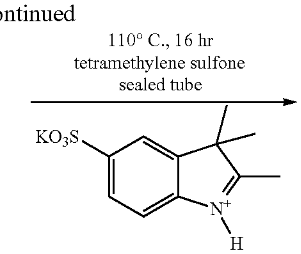

16

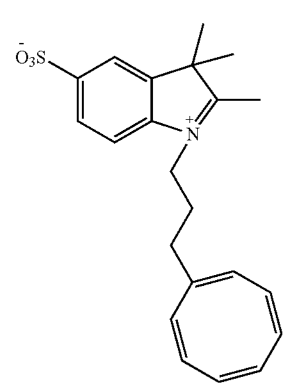

51

18 + 21 + 51 $\xrightarrow{\text{acetic acid, acetic anhydride, KOAc, 120° C., 5 hr}}$ -continued

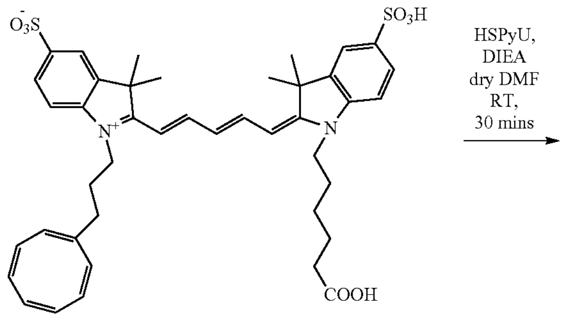

13

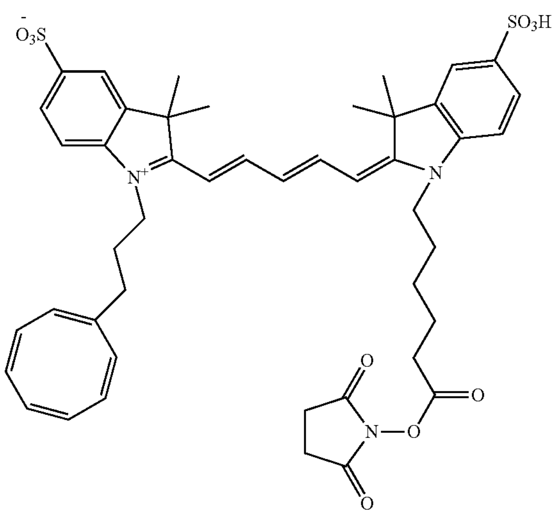

14

Analogous procedures were also applied to link COT, a distinct PA, to the fluorogenic center. To do so, bromo-COT 46 was synthesized with an addition-elimination strategy by treating the commercially available COT 45 with bromine followed by potassium t-butoxide. A one-pot procedure was then developed in which boronate allyl TBS ether 48 was coupled to bromo-COT 46 following a Suzuki coupling reaction to generate 49 in a good yield (62%), which was subsequently converted to bromo-COT containing an extended alkyl chain 50. Bromo-COT with a three-carbon linker 50 was then successfully linked to the fluorogenic center giving the compound 14 (Scheme 6).

In summary, there has been described herein an efficient total synthesis route to PA-conjugated fluorophore derivatives in which the linker length between the PA and fluorogenic center can be specifically controlled and subsequently activated with an NHS ester moiety. These compounds can be directly reacted with amine-containing biomolecules of interest. Alternatively the NHS group can be replaced or modified to yield a variety of distinct electrophilic or nucleophilic reactive groups for biomolecule coupling including, but not limited to a maleimide group, an azide group, an alkyne group, an iodoacetamide group, a hydrazide group, or a hydroxylamine group. Alternatively, such chemistries can be replaced or derivatized to yield biotin, coenzyme A, benzylguanine (BG), benzylcytosine (BC), Nickel-NTA or other bio-reactive substituent(s) that enable the fluorophore to be conjugated to a biomolecule, solid support or polymer matrix depending on the intended application.

Further disclosed herein is a modular approach to synthesizing any number of "self-healing" fluorophores, as well as the resulting compounds. This has also been expanded beyond the example above of Cy5 to other members of the cyanine family, Cy3 and Cy7.

Below is a table of contents for each module in the approach, followed by a listing of some of the fluorophores made, with their structures, accessible using the modular approach. Each structure lists the modules that are employed in order to synthesize the fluorophore. Following that, is a description of the protocol for each module. It is clear to an expert in that field that by using the modules in various ways, many different structures can be generated in which the PA, or other small molecule effector of fluorophore performance, is covalently linked in close proximity to the light absorbing and/or emitting center of interest. Because full synthetic control has been achieved over the linker moiety, strategies for linking more than one PA to the fluorogenic center is also envisaged. Also disclosed herein is the use of the resulting compounds in biological research, as dyes used in clothing, food coloring or light absorbing compounds, such as those used in sunscreen, dye-sensitized photovoltaic cells, phosphorescent and plasma displays.

Some representative dye structures within the scope of Formula (1) are provided as follows:
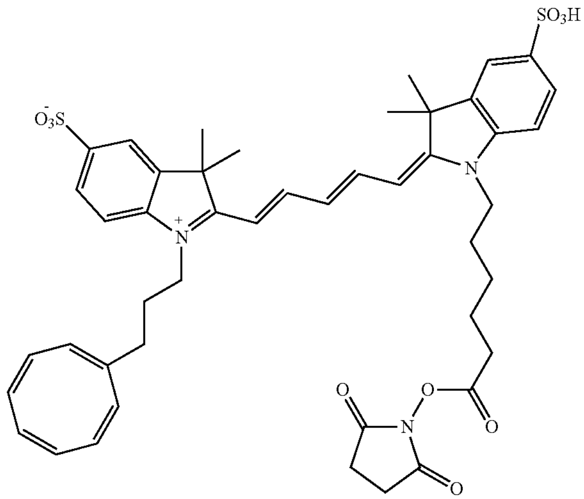
Cy5-3C-COT-NHS
Follow Protocols 1,3,4,11,12
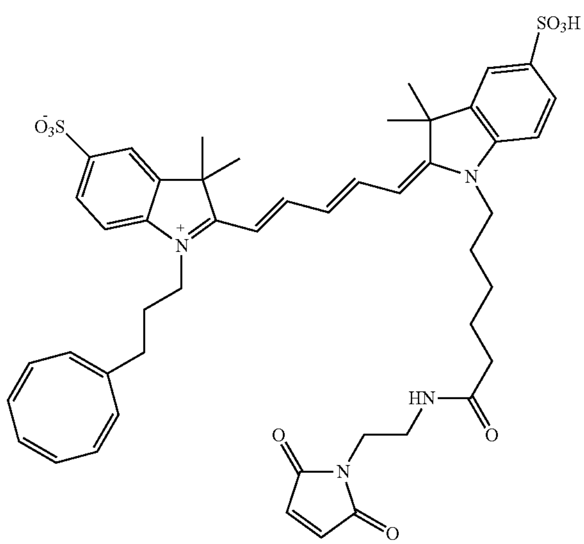
Cy5-3C-COT-MaI
Follow Protocols 1,3,4,11,13

-continued
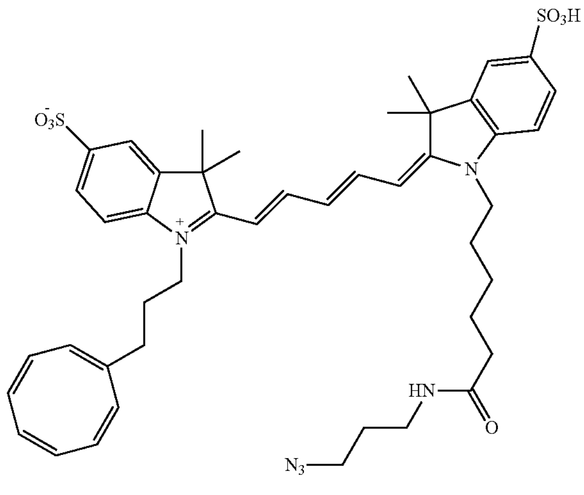
Cy5-3C-COT-$N_3$
Follow Protocols 1,3,4,11,14
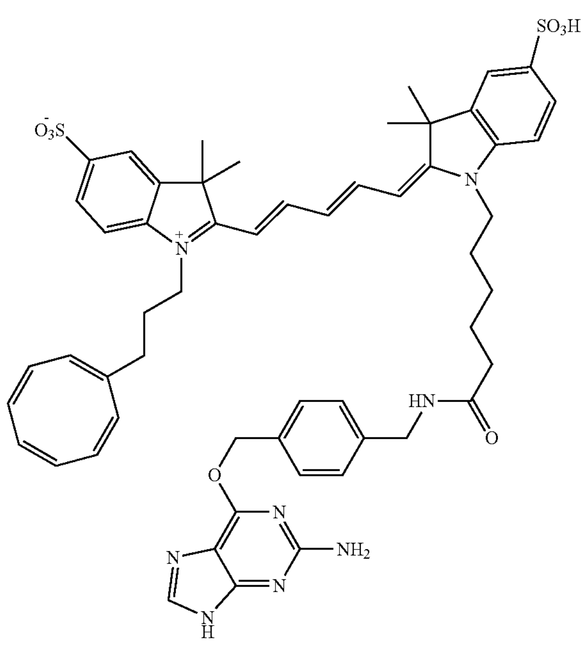
Cy5-3C-COT-BG
Follow Protocols 1,3,4,11,15

-continued
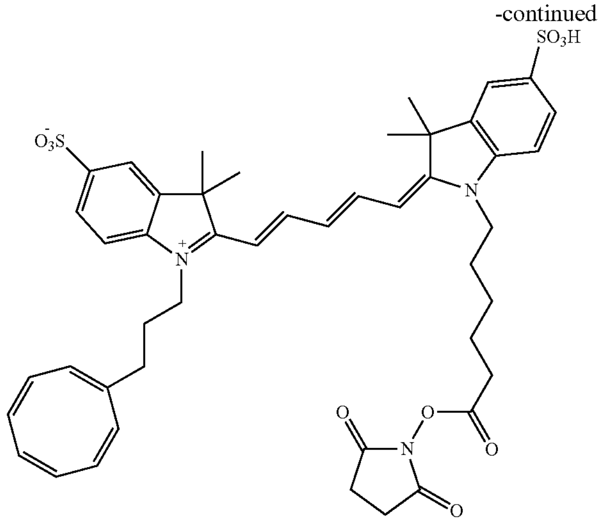
Cy5-3C-COT-NHS
Follow Protocols 1,3,4,11,12
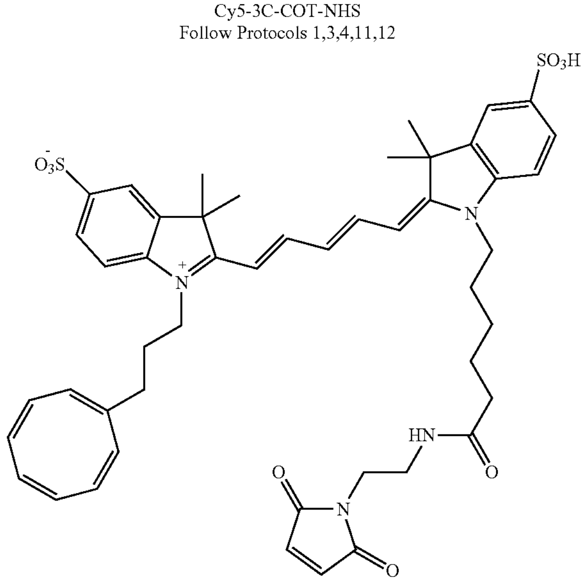
Cy5-3C-COT-MaI
Follow Protocols 1,3,4,11,13
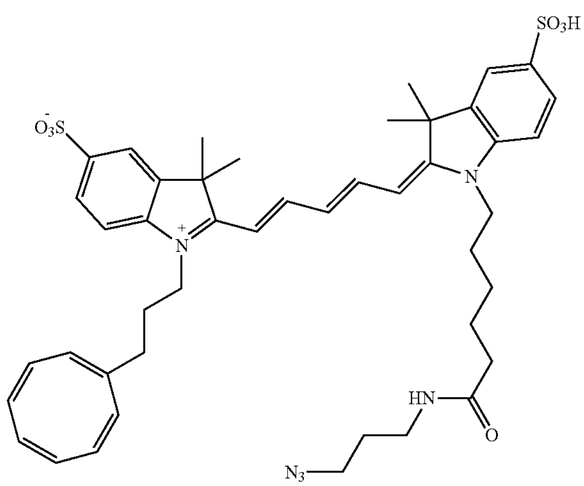
Cy5-3C-COT-$N_3$
Follow Protocols 1,3,4,11,14

-continued
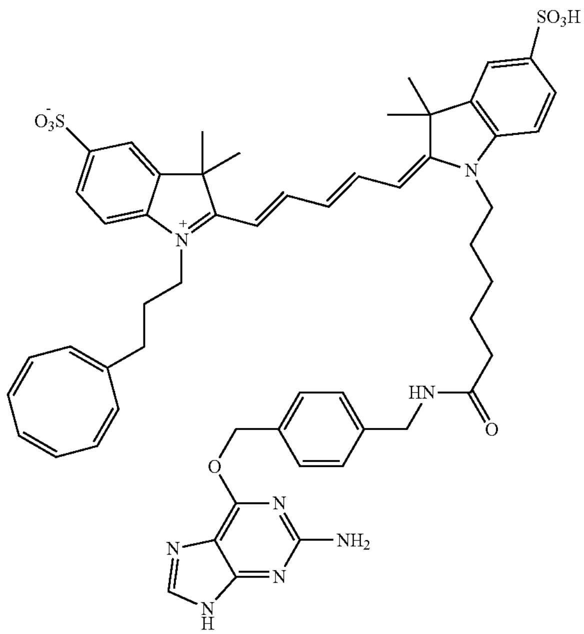
Cy5-3C-COT-BG
Follow Protocols 1,3,4,11,15
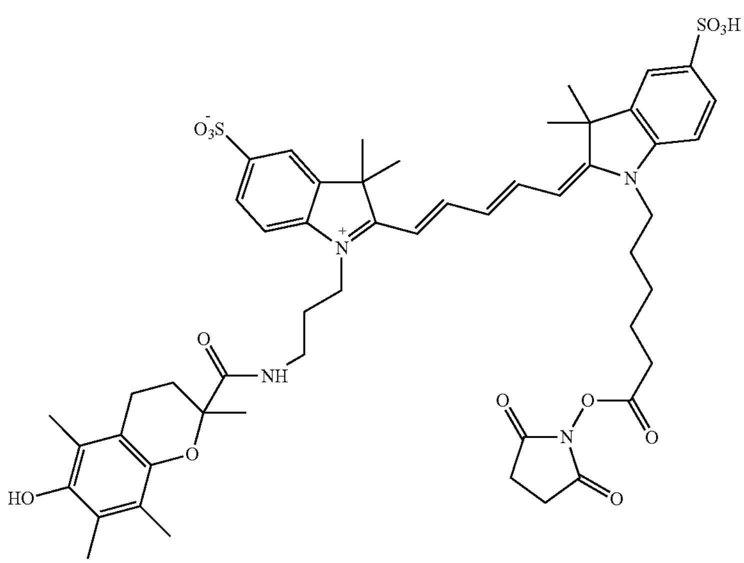
Cy5-3C-Trolox-NHS
Follow Protocols 1,5,11,12

-continued
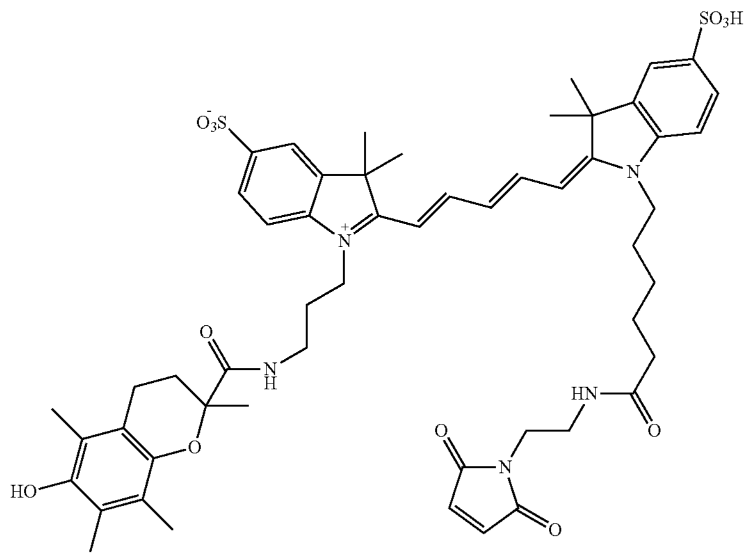
Cy5-3C-Trolox-MaI
Follow Protocols 1,5,11,13
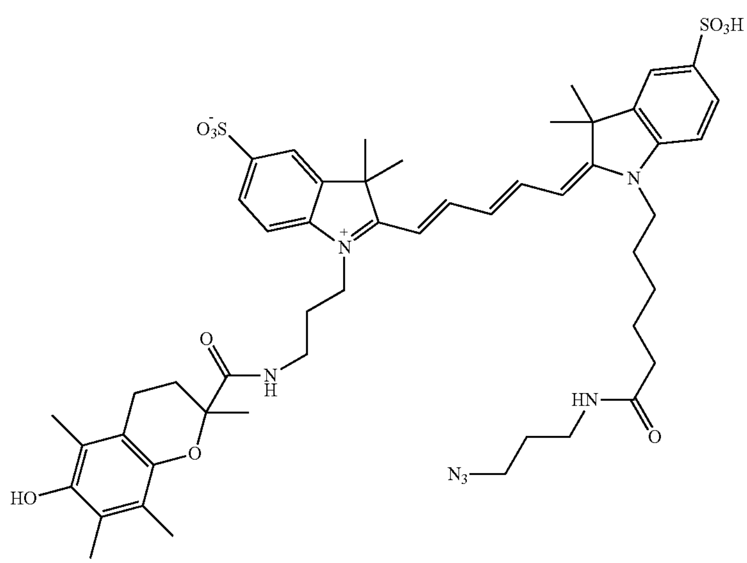
Cy5-3C-Trolox-$N_3$ Follow Protocols 1,5,11,14

-continued
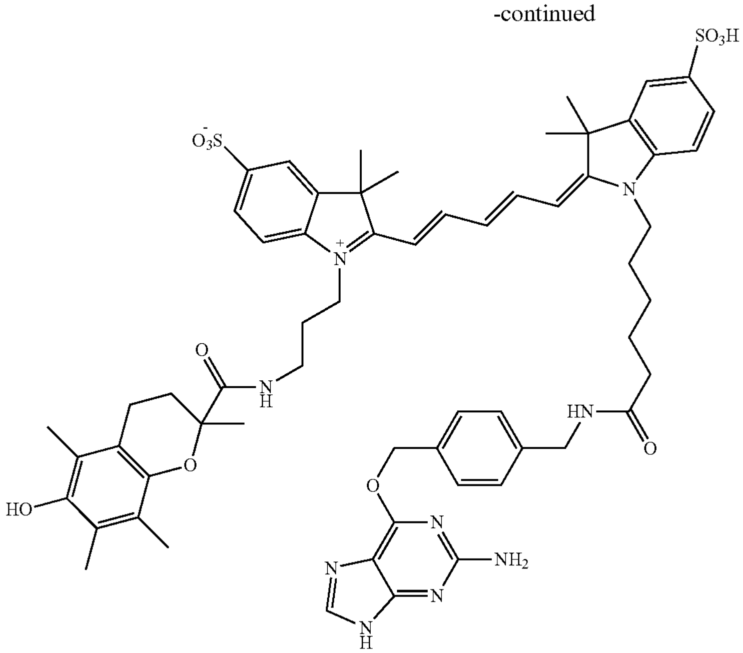
Cy5-3C-Trolox-BG Follow Protocols 1,5,11,15
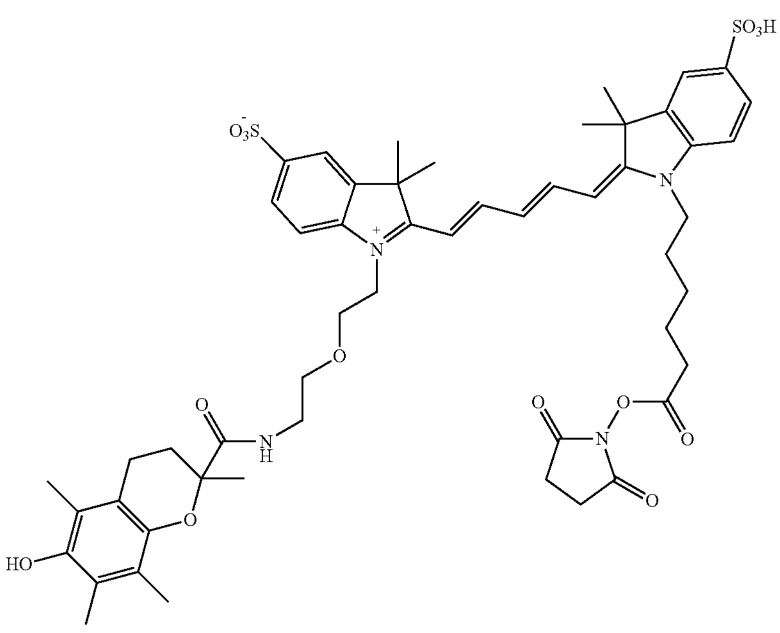
Cy5-diglycol-Trolox-NHS
Follow Protocols 1,6,11,12

-continued
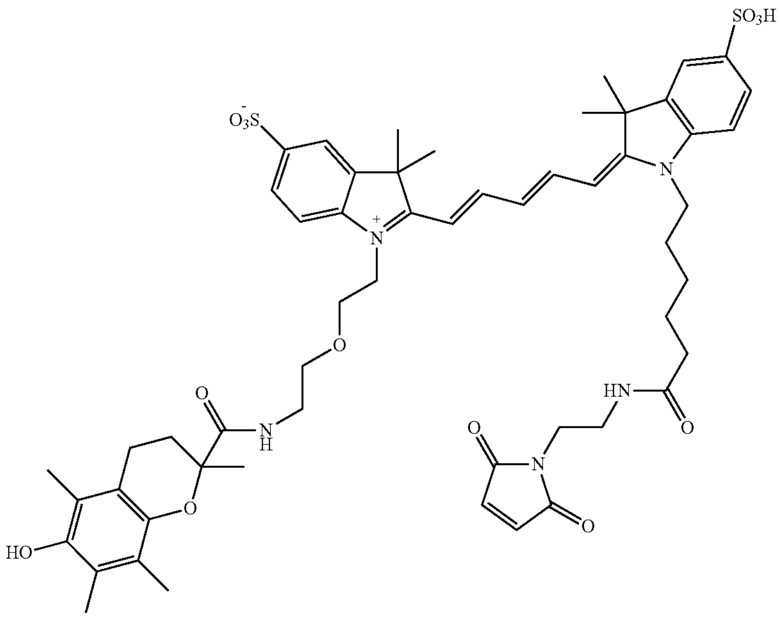
Cy5-diglycol-Trolox-MaI
Follow Protocols 1,6,11,13
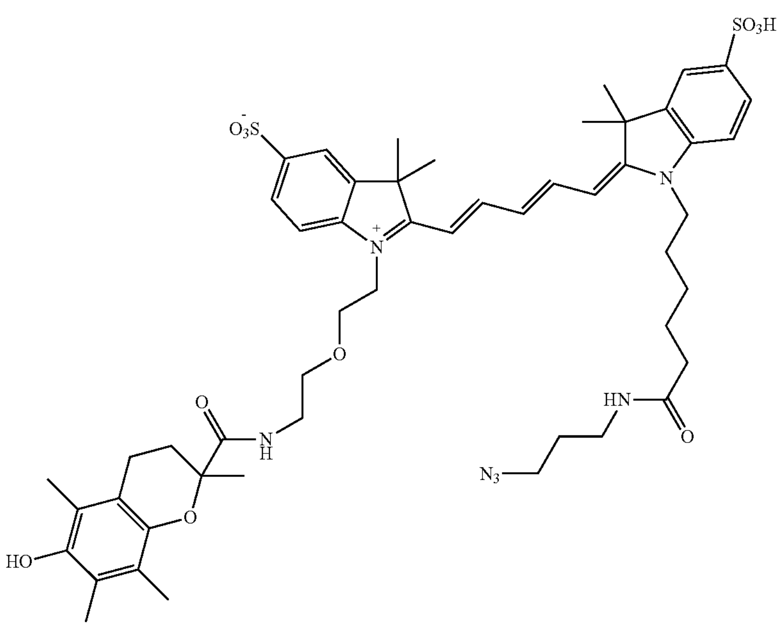
Cy5-diglycol-Trolox-BG
Follow Protocols 1,6,11,14

-continued
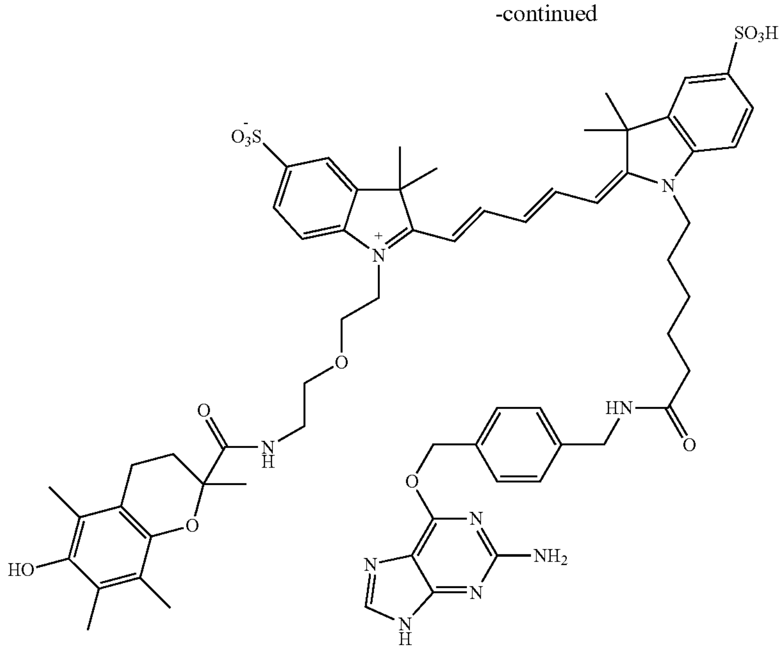
Cy5-diglycol-Trolox-BG
Follow Protocols 1,6,11,15
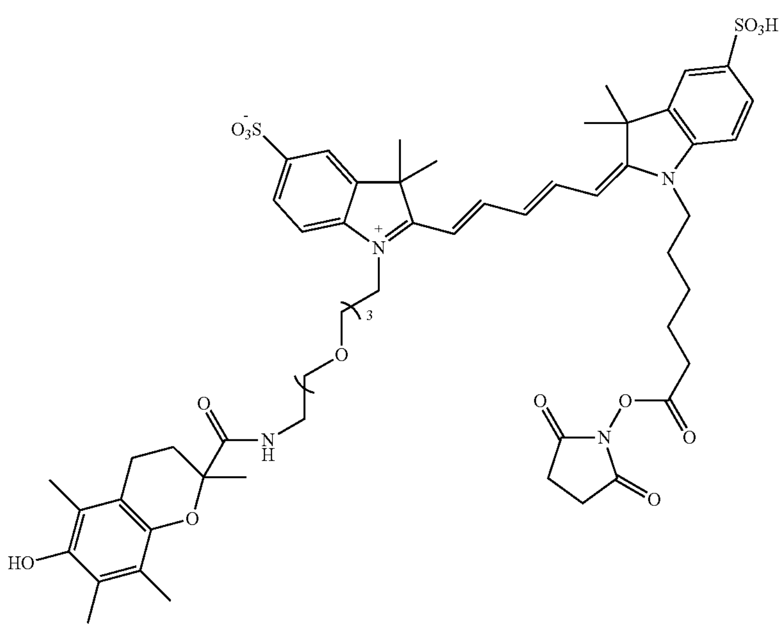
Cy5-tetraglycol-Trolox-NHS
Follow Protocols 1,7,11,12

-continued
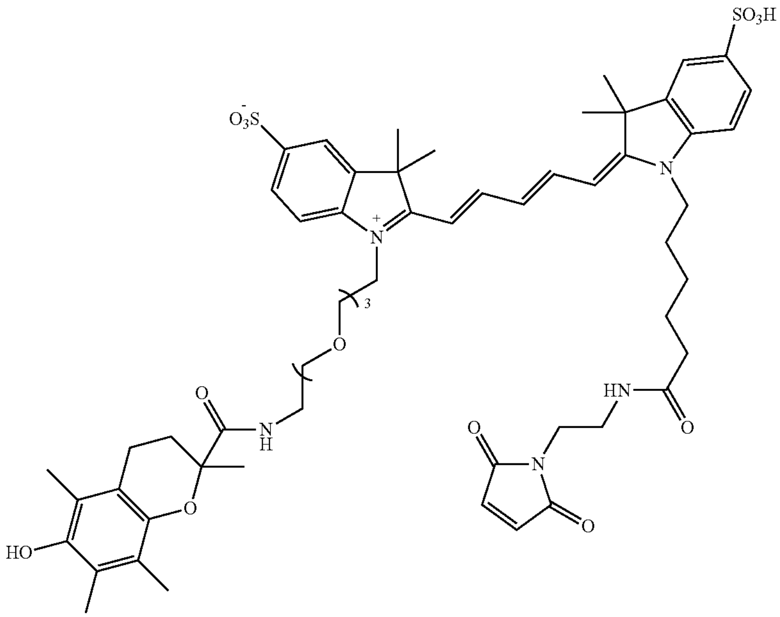
Cy5-tetraglycol-Trolox-MaI
Follow Protocols 1,7,11,13
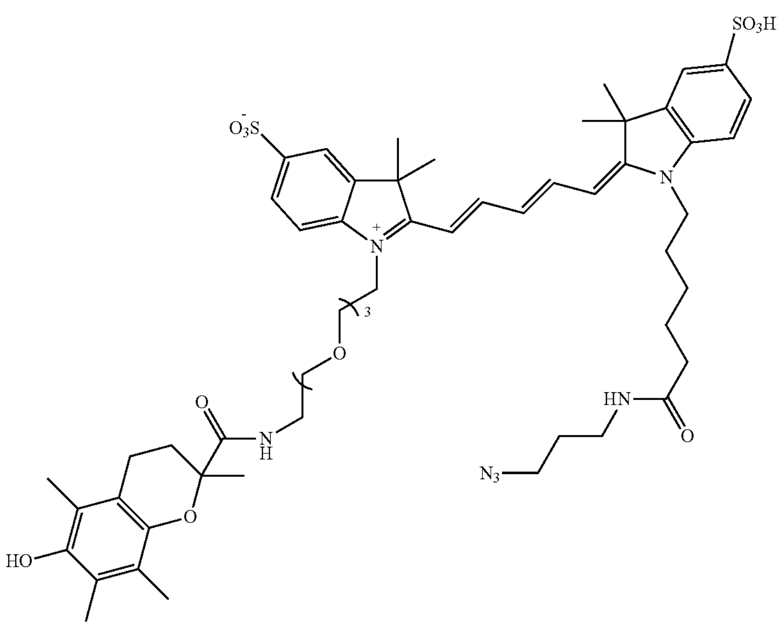
Cy5-tetraglycol-Trolox-$N_3$
Follow Protocols 1,7,11,14

-continued
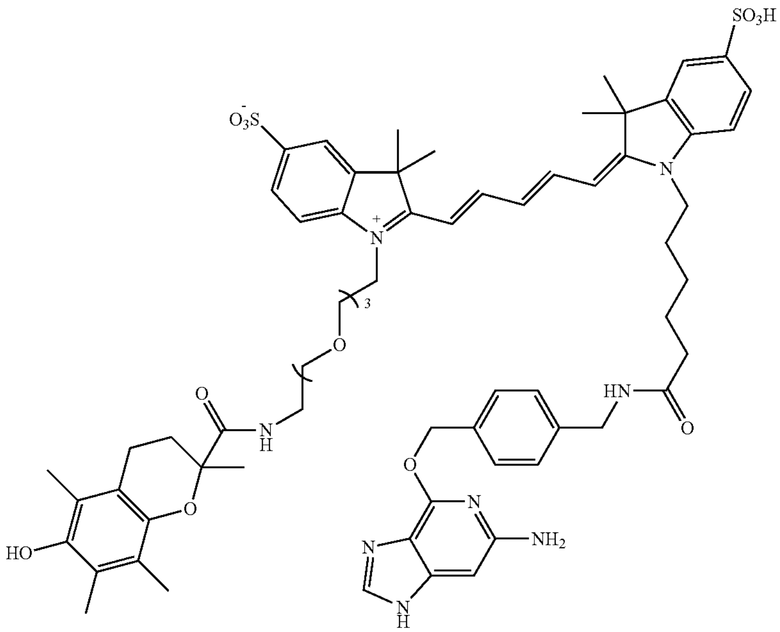
Cy5-tetraglycol-Trolox-BG
Follow Protocols 1,7,11,15
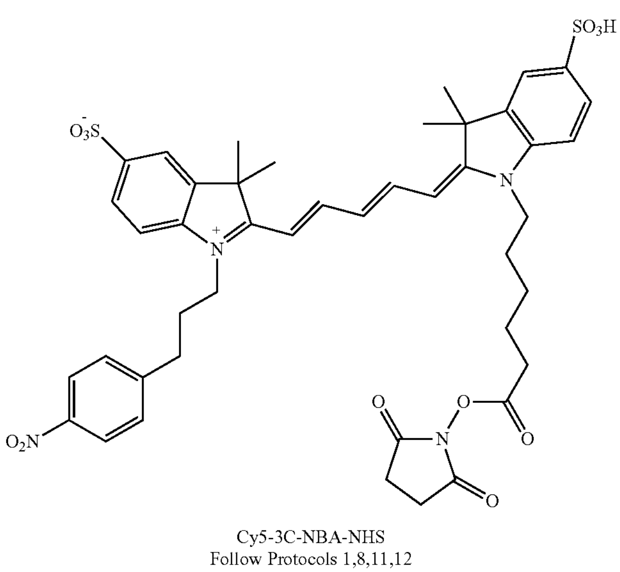
Cy5-3C-NBA-NHS
Follow Protocols 1,8,11,12

-continued
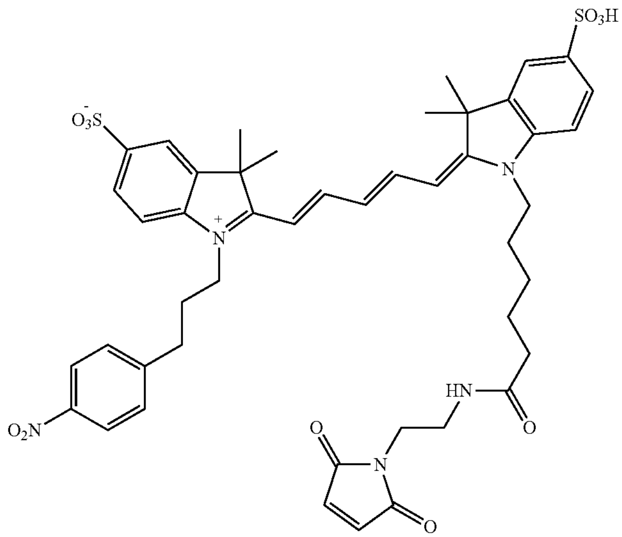
Cy5-3C-NBA-MaI
Follow Protocols 1,8,11,13
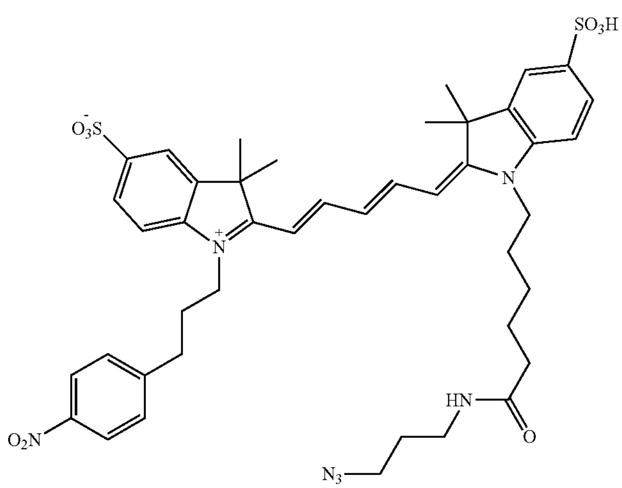
Cy5-3C-NBA-$N_3$
Follow Protocols 1,8,11,14

-continued
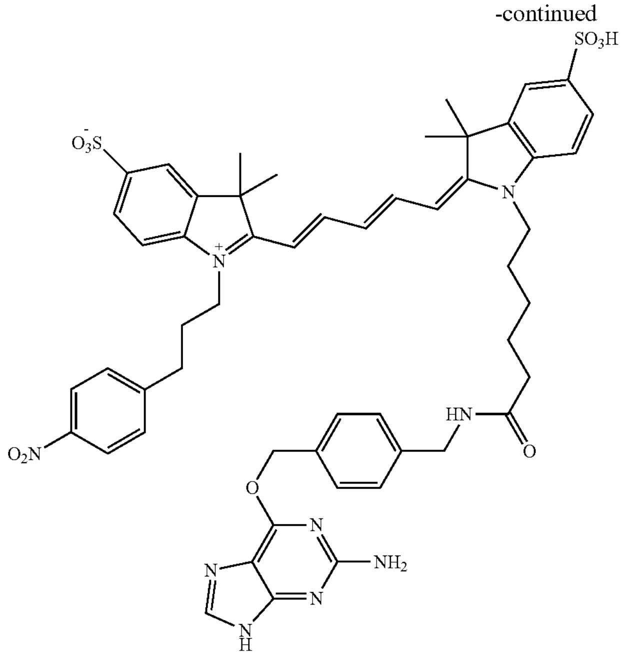
Cy5-3C-NBA-BG
Follow Protocols 1,8,11,15
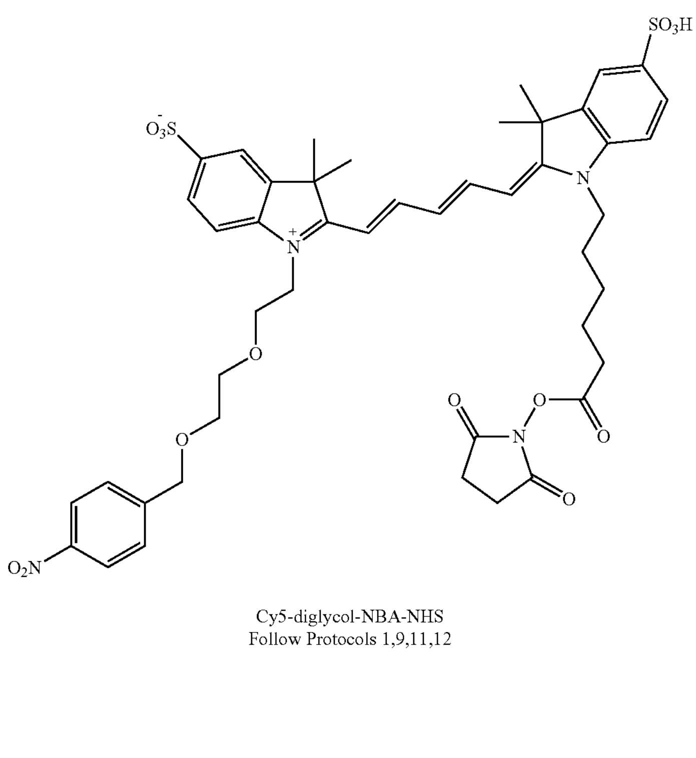
Cy5-diglycol-NBA-NHS
Follow Protocols 1,9,11,12

-continued
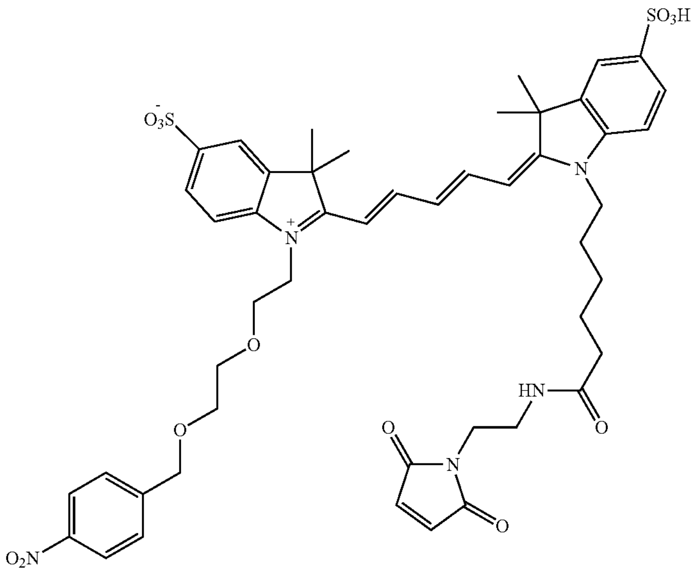
Cy5-diglycol-NBA-MaI
Follow Protocols 1,9,11,13
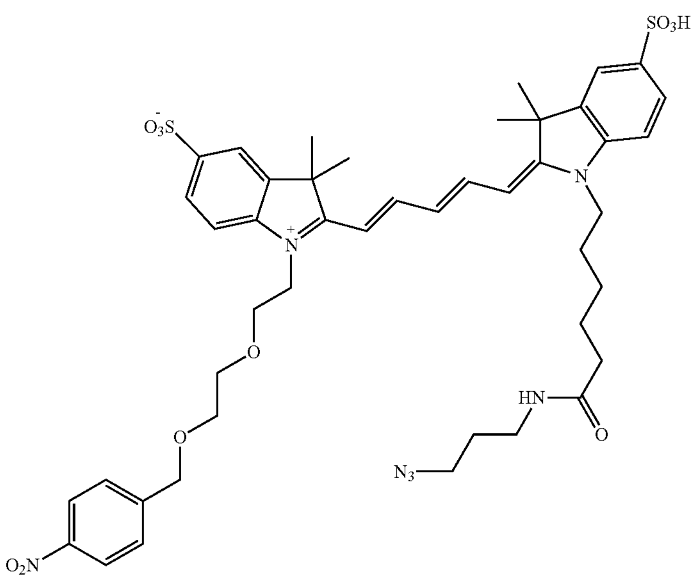
Cy5-diglycol-NBA-$N_3$
Follow Protocols 1,9,11,14

-continued
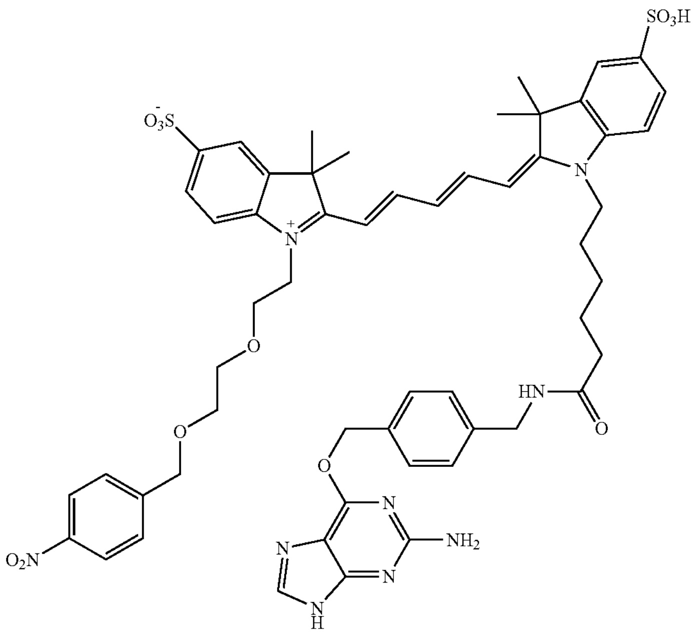
Cy5-diglycol-NBA-BG
Follow Protocols 1,9,11,15
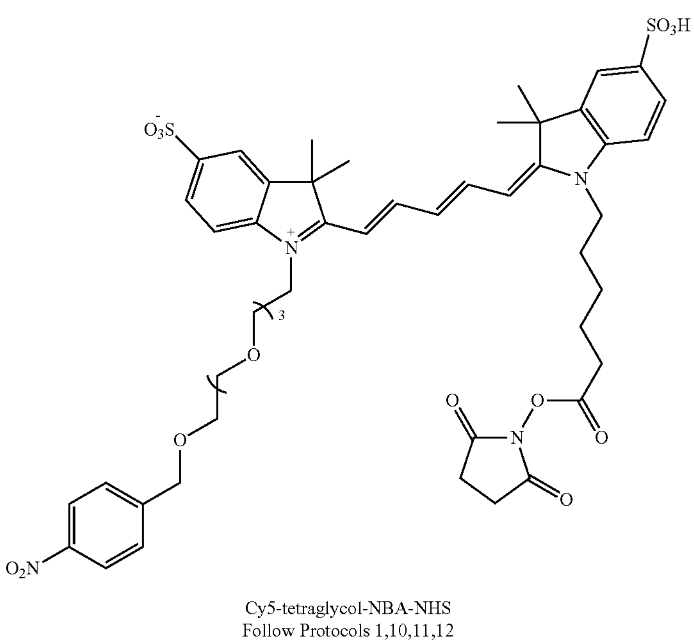
Cy5-tetraglycol-NBA-NHS
Follow Protocols 1,10,11,12

-continued
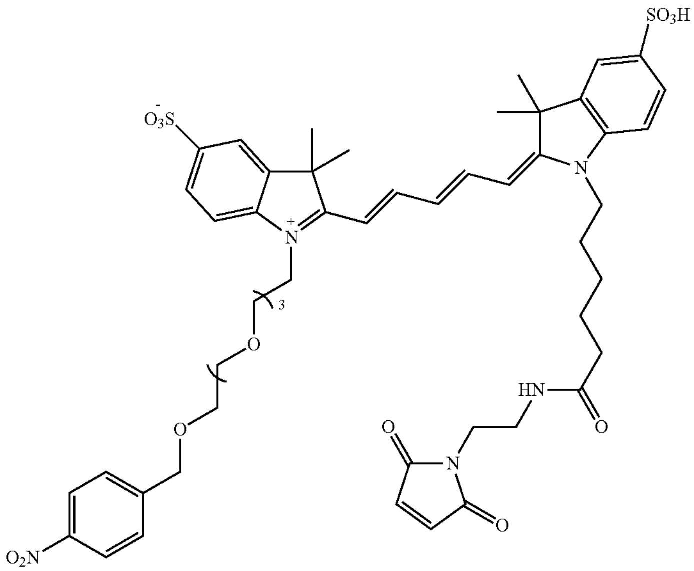
Cy5-tetraglycol-NBA-MaI
Follow Protocols 1,10,11,13
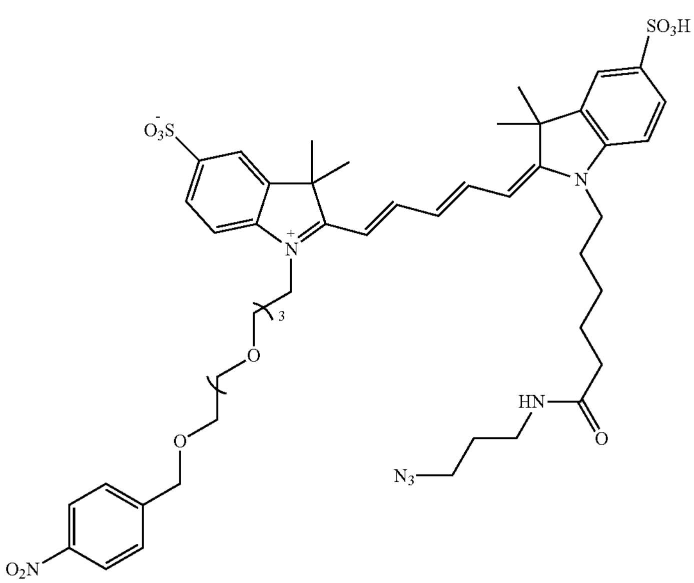
Cy5-tetraglycol-NBA-$N_3$
Follow Protocols 1,10,11,14

-continued
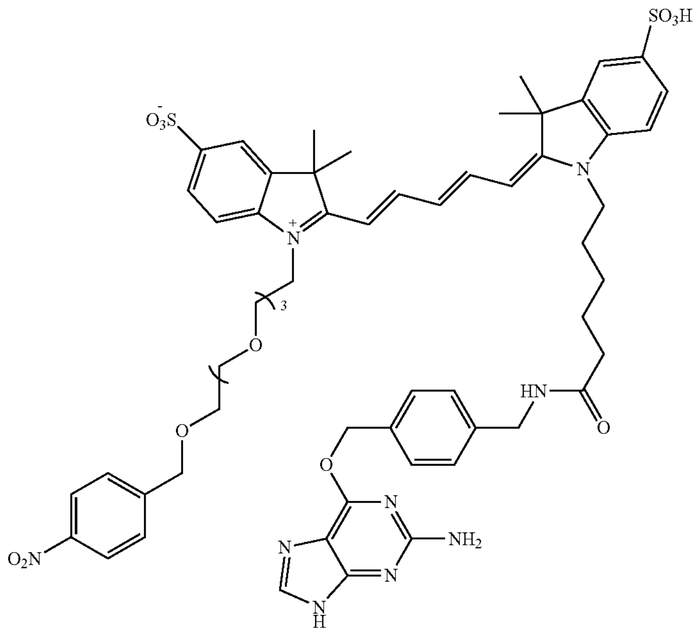
Cy5-tetraglycol-NBA-BG
Follow Protocols 1,10,11,15
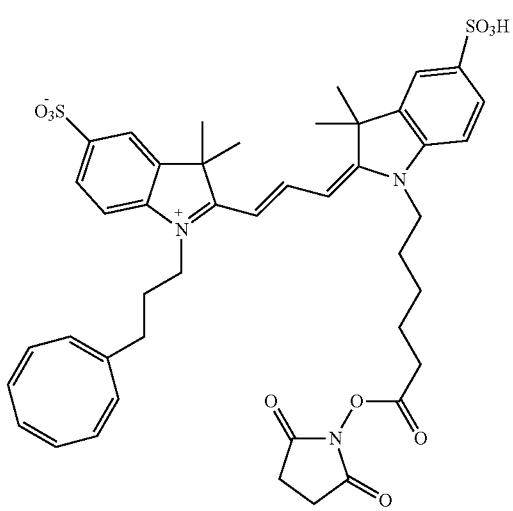
Cy3-3C-COT-NHS
Follow Protocols 1,2,3,4,11,12
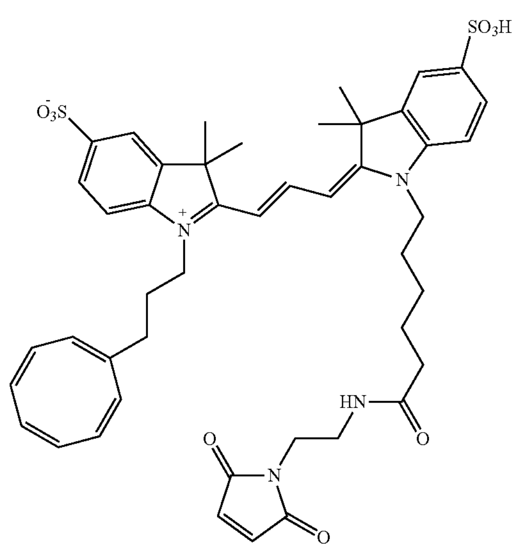
Cy3-3C-COT-MaI
Follow Protocols 1,2,3,4,11,13

-continued
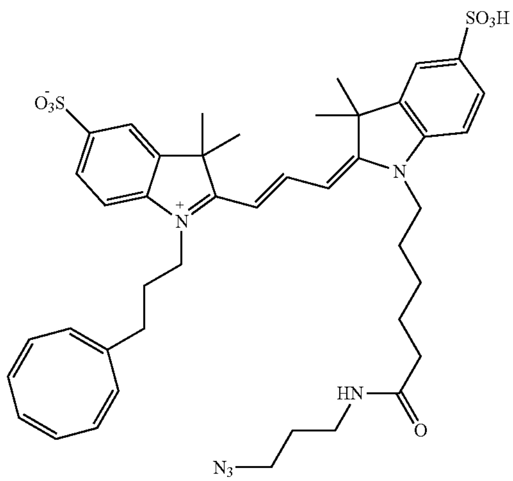
Cy3-3C-COT-$N_3$
Follow Protocols 1,2,3,4,11,14
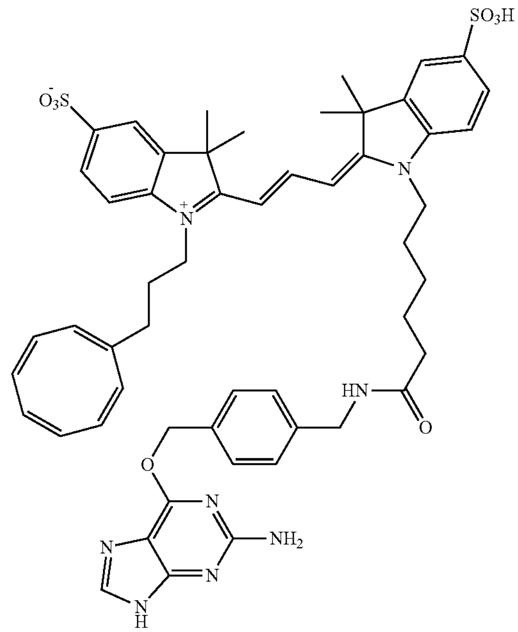
Cy3-3C-COT-BG
Follow Protocols 1,2,3,4,11,15
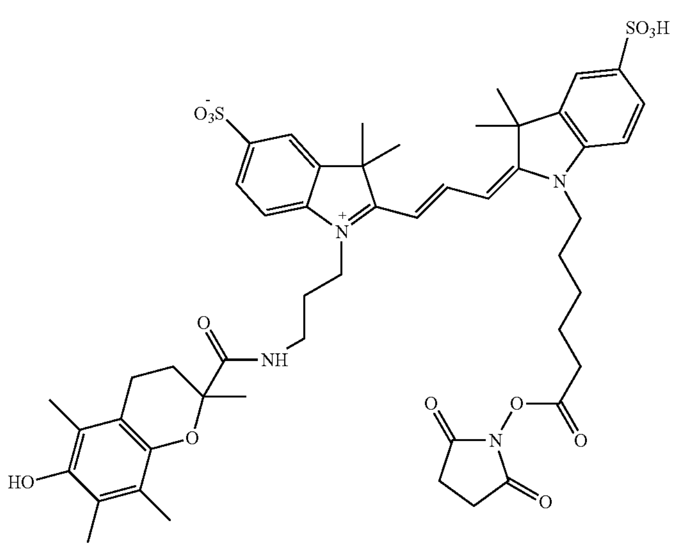
Cy3-3C-Trolox-NHS
Follow Protocols 1,2,5,11,12

-continued
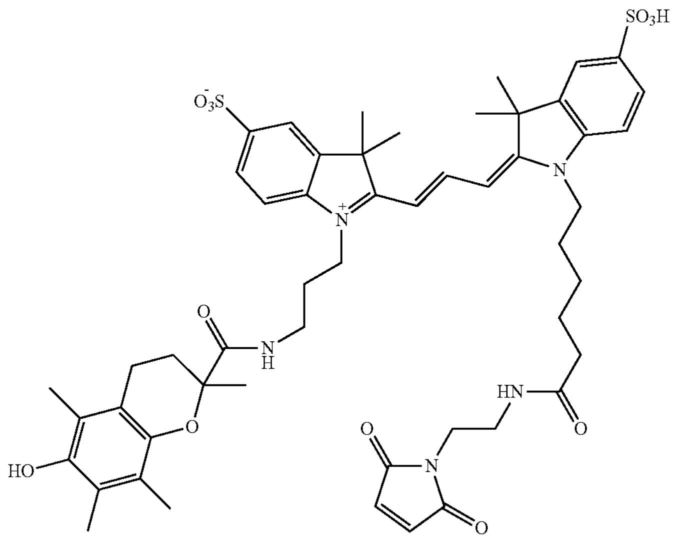
Cy3-3C-Trolox-MaI
Follow Protocols 1,2,5,11,13
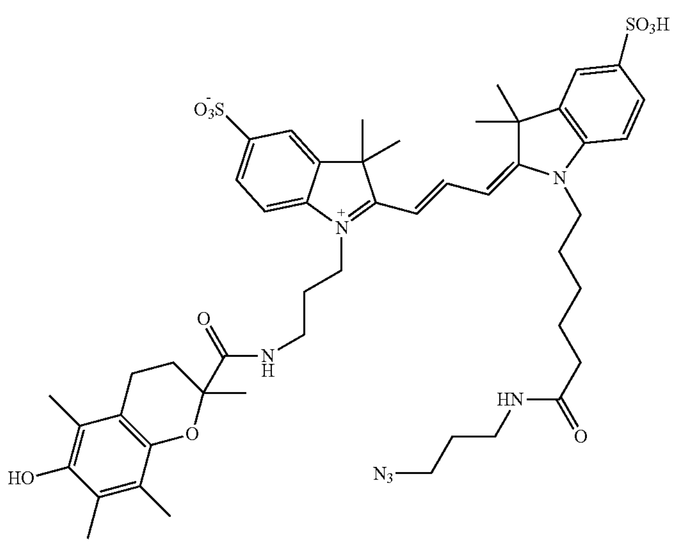
Cy3-3C-Trolox-$N_3$
Follow Protocols 1,2,5,11,14

-continued
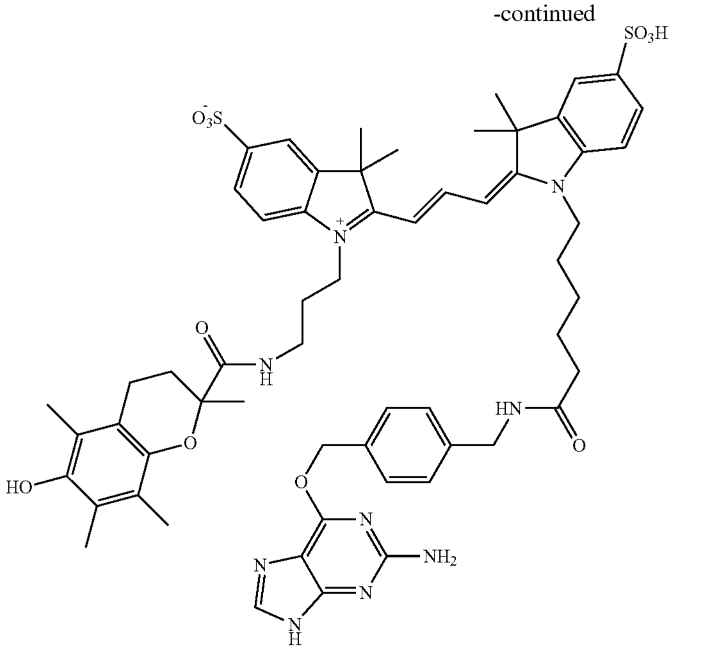
Cy3-3C-Trolox-BG
Follow Protocols 1,2,5,11,15
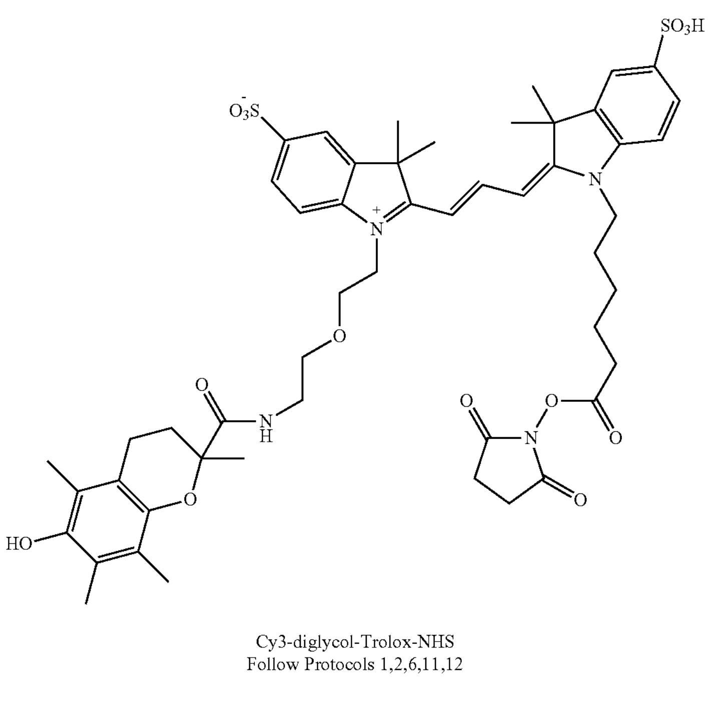
Cy3-diglycol-Trolox-NHS
Follow Protocols 1,2,6,11,12

-continued
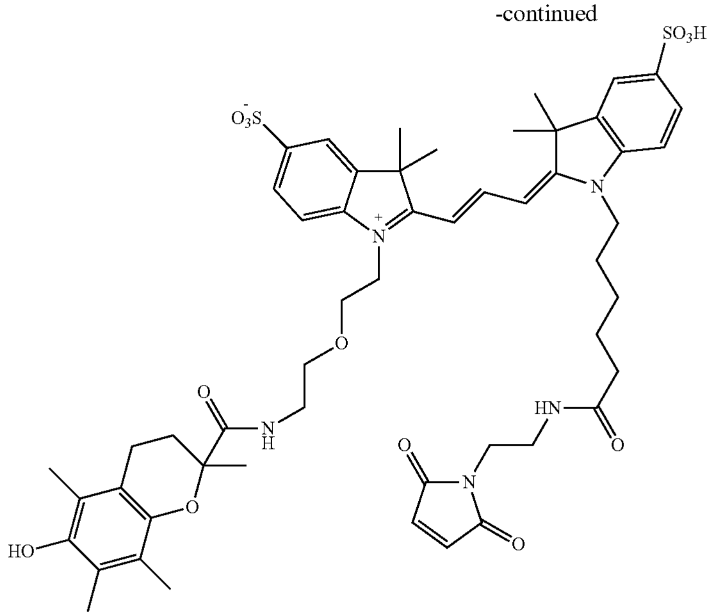
Cy3-diglycol-Trolox-MaI
Follow Protocols 1,2,6,11,13
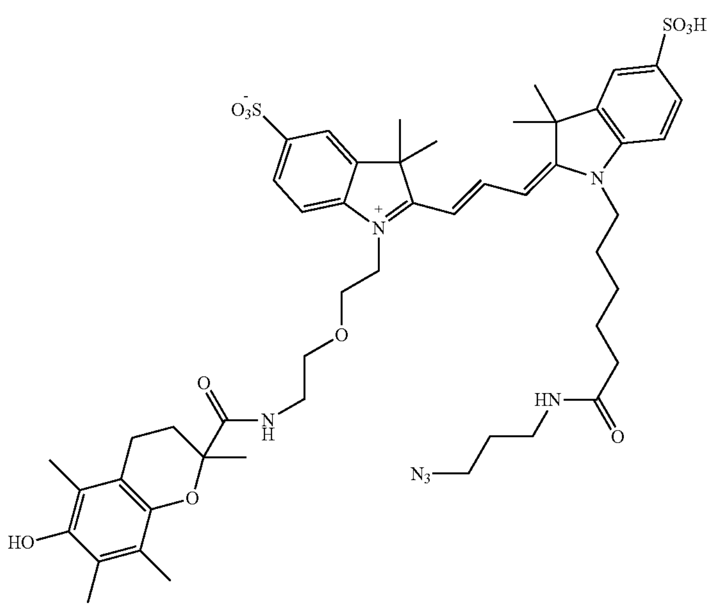
Cy3-diglycol-Trolox-$N_3$
Follow Protocols 1,2,6,11,14

-continued
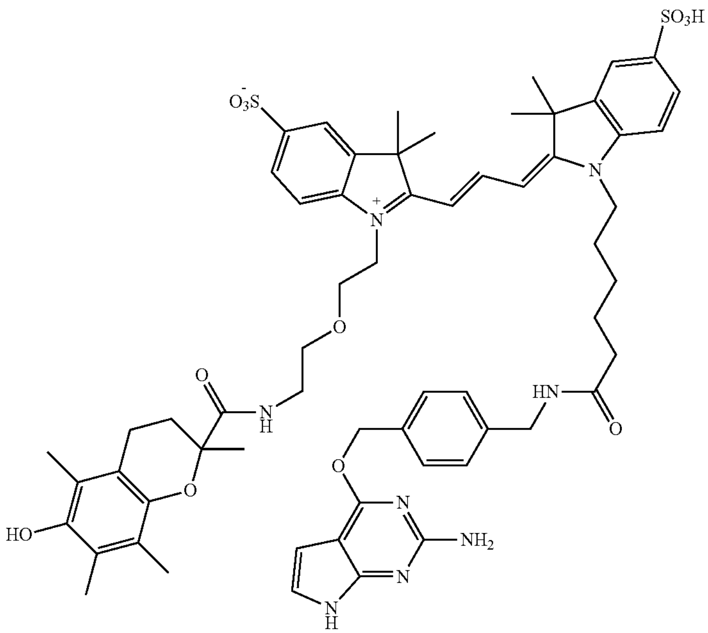
Cy3-diglycol-Trolox-BG
Follow Protocols 1,2,6,11,15
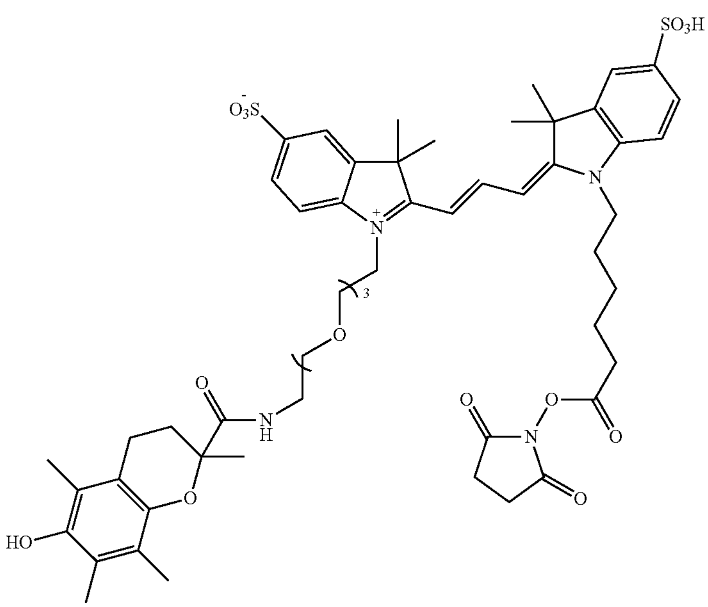
Cy3-tetraglycol-Trolox-NHS
Follow Protocols 1,2,7,11,12

-continued
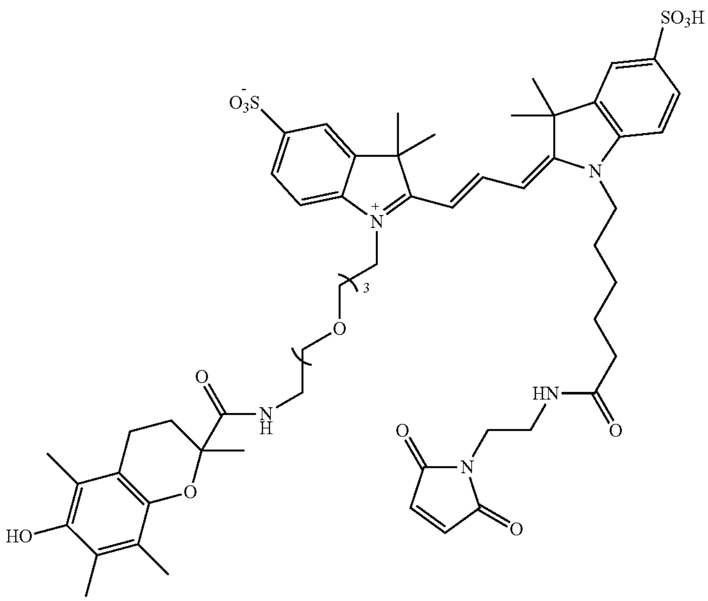
Cy3-tetraglycol-Trolox-MaI
Follow Protocols 1,2,7,11,13
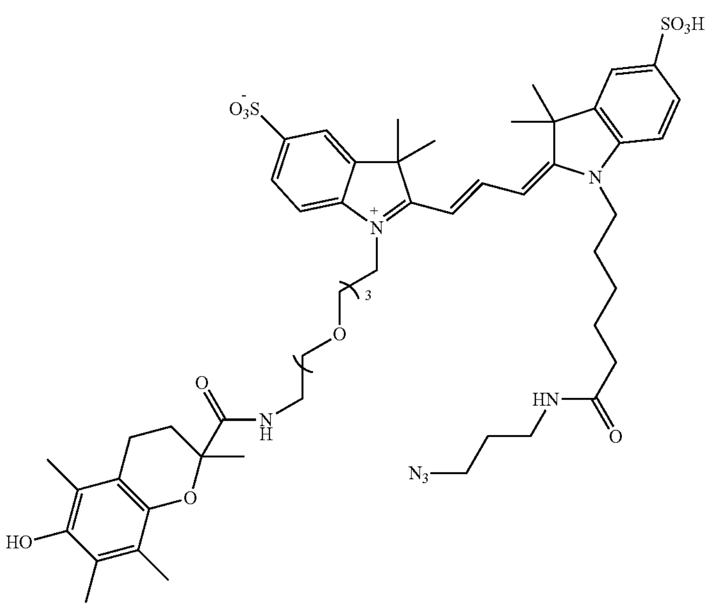
Cy3-tetraglycol-Trolox-$N_3$
Follow Protocols 1,2,7,11,14

-continued
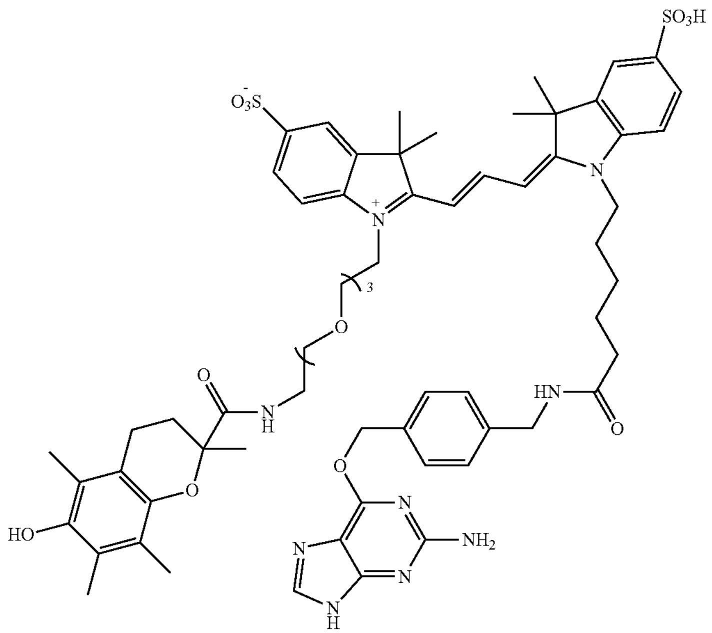
Cy3-tetraglycol-Trolox-BG
Follow Protocols 1,2,7,11,15
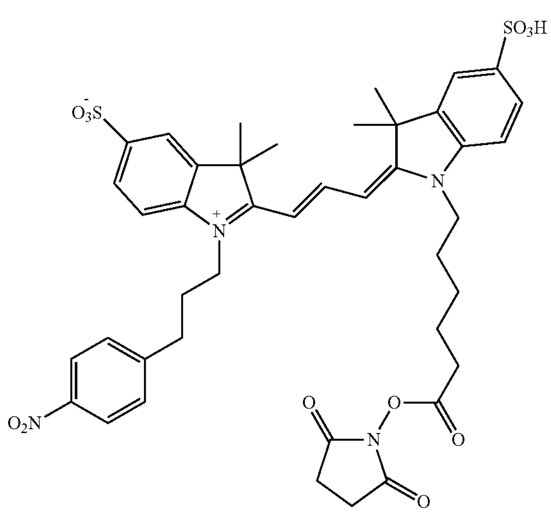
Cy3-3C-NBA-NHS
Follow Protocols 1,2,8,11,12
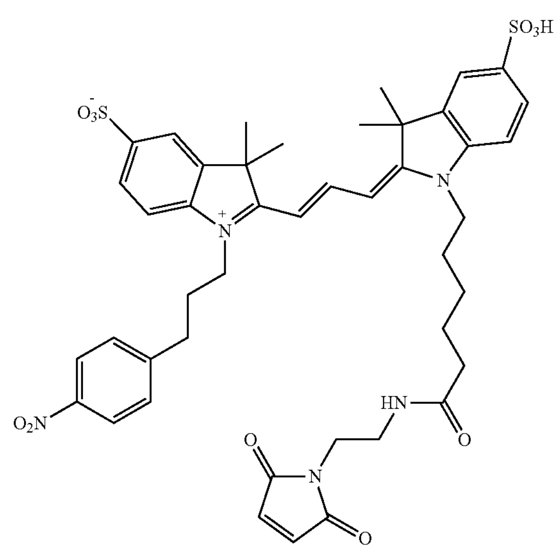
Cy3-3C-NBA-MaI
Follow Protocols 1,2,8,11,13

-continued
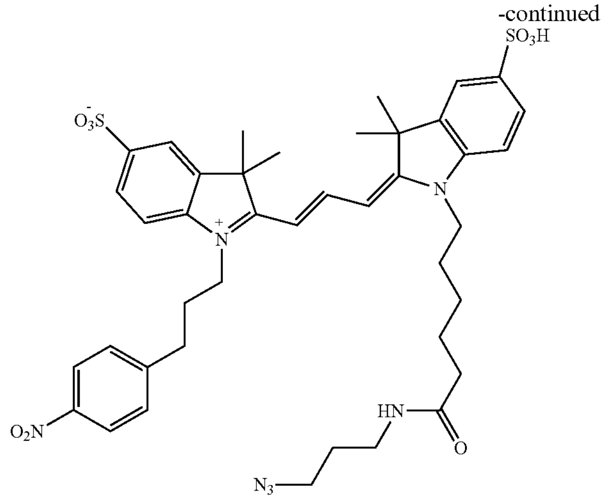
Cy3-3C-NBA-$N_3$
Follow Protocols 1,2,8,11,14
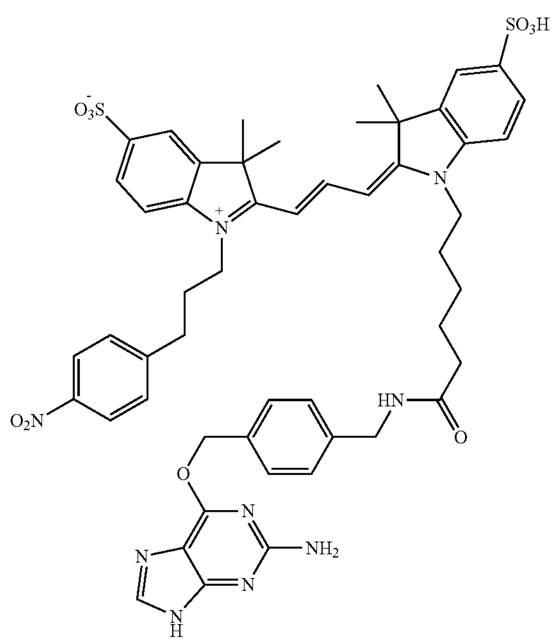
Cy3-3C-NBA-BG
Follow Protocols 1,2,8,11,15

-continued
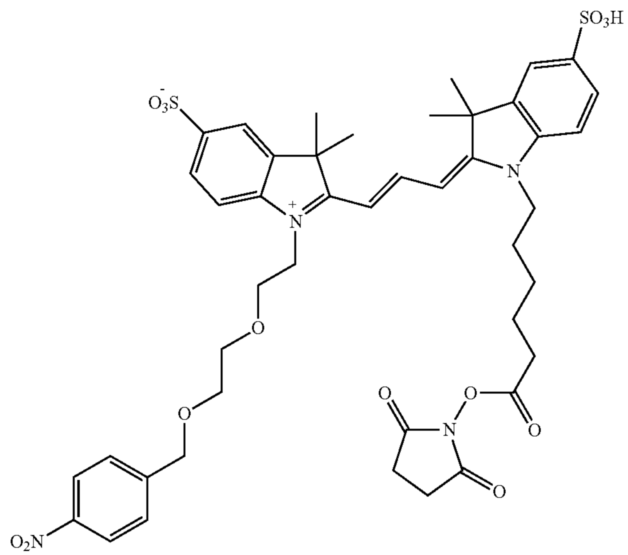
Cy3-diglycol-NBA-NHS
Follow Protocols 1,2,9,11,12
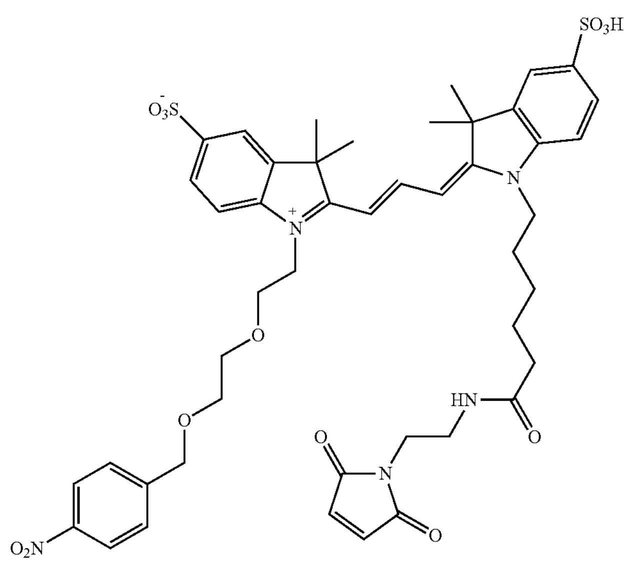
Cy3-diglycol-NBA-MaI
Follow Protocols 1,2,9,11,13

-continued
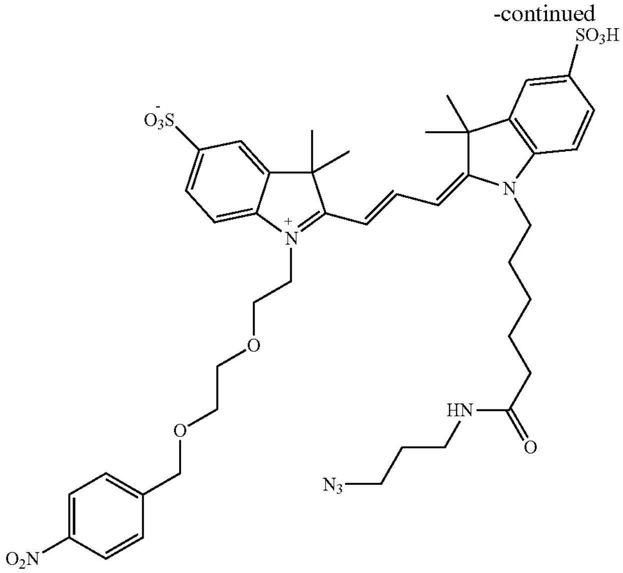
Cy3-diglycol-NBA-$N_3$
Follow Protocols 1,2,9,11,14
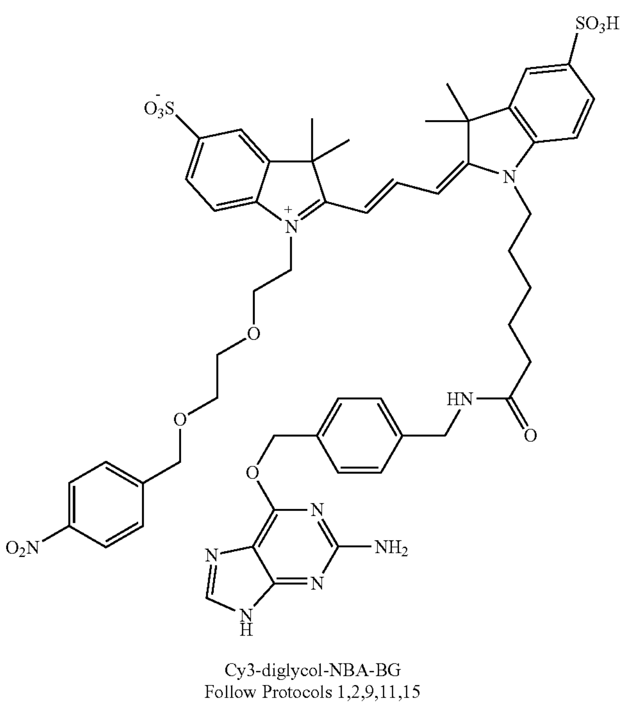
Cy3-diglycol-NBA-BG
Follow Protocols 1,2,9,11,15

-continued
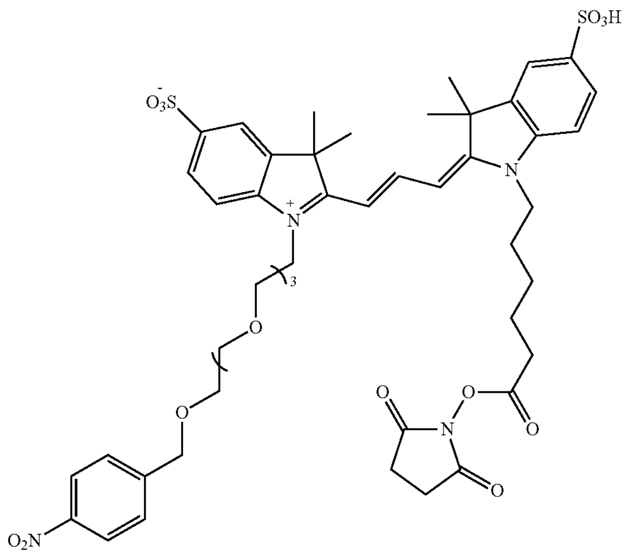
Cy3-tetraglycol-NBA-NHS
Follow Protocols 1,2,10,11,12
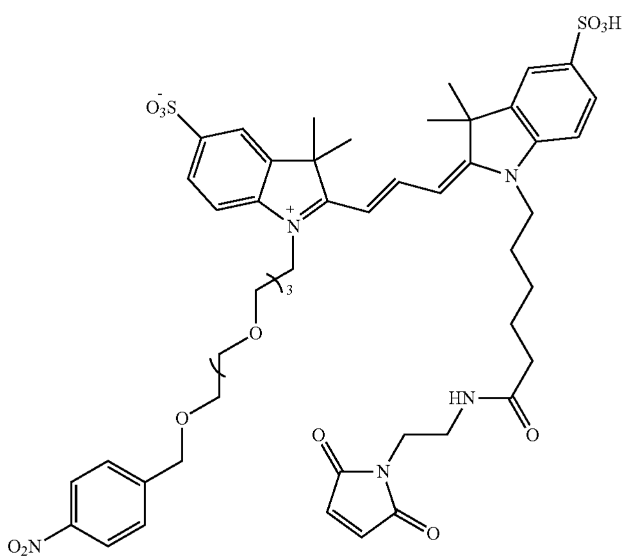
Cy3-tetraglycol-NBA-MaI
Follow Protocols 1,2,10,11,13

-continued
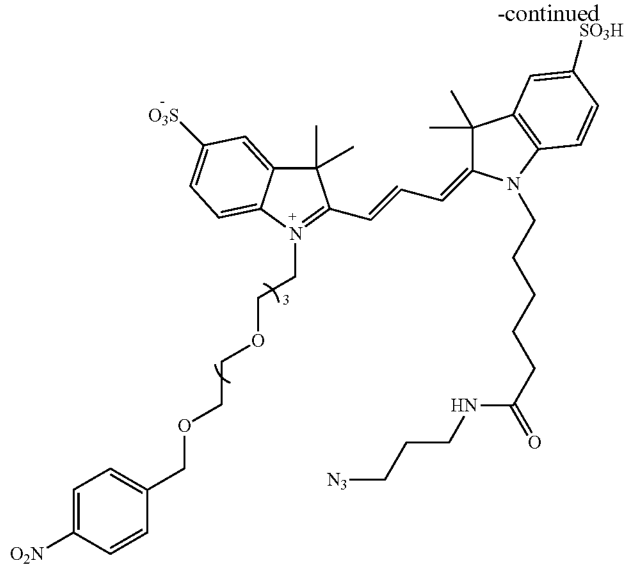
Cy3-tetraglycol-NBA-$N_3$
Follow Protocols 1,2,10,11,14
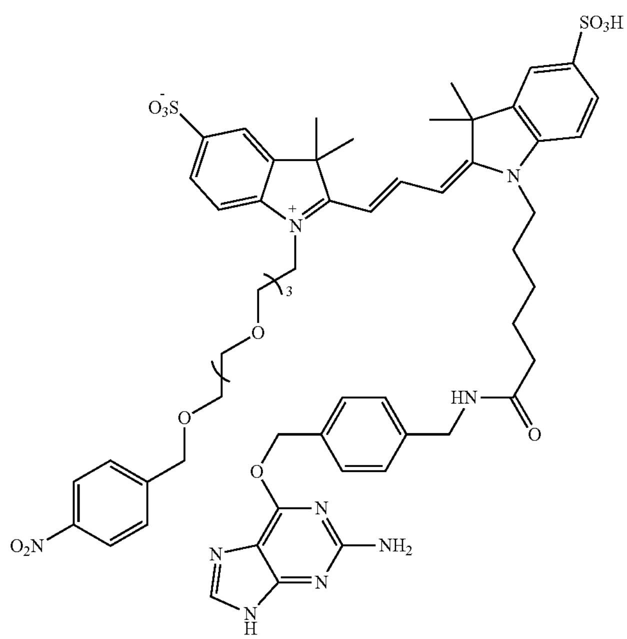
Cy3-tetraglycol-NBA-BG
Follow Protocols 1,2,10,11,15

-continued
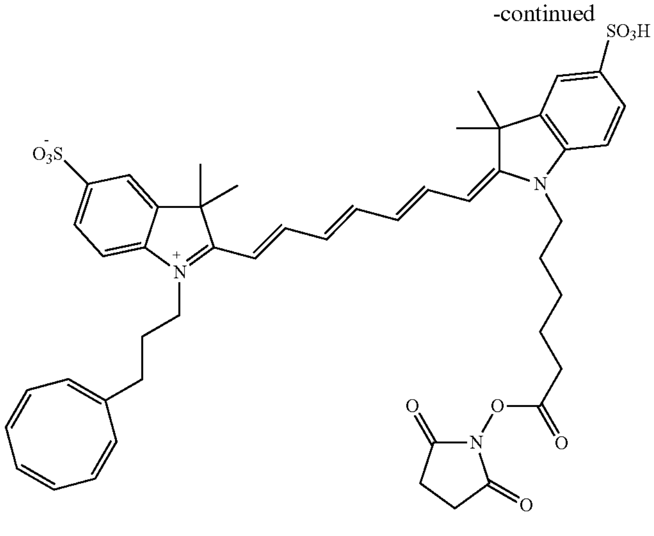
Cy7-3C-COT-NHS
Follow Protocols 1,2,3,4,11,12
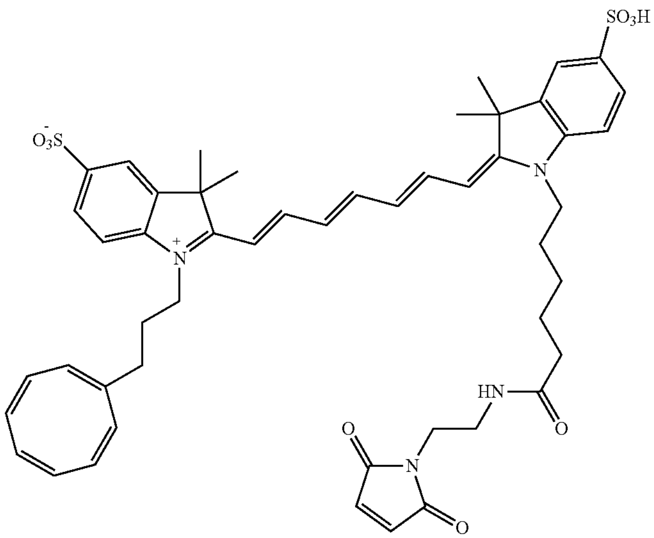
Cy7-3C-COT-NHS
Follow Protocols 1,2,3,4,11,13
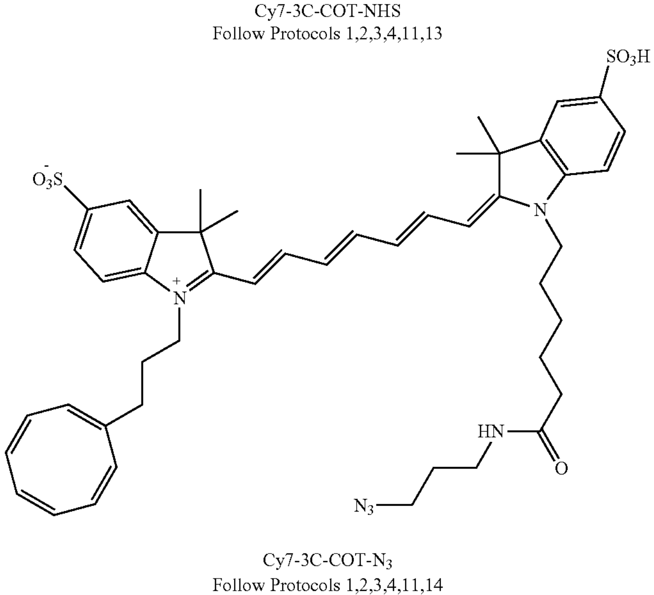
Cy7-3C-COT-$N_3$
Follow Protocols 1,2,3,4,11,14

-continued
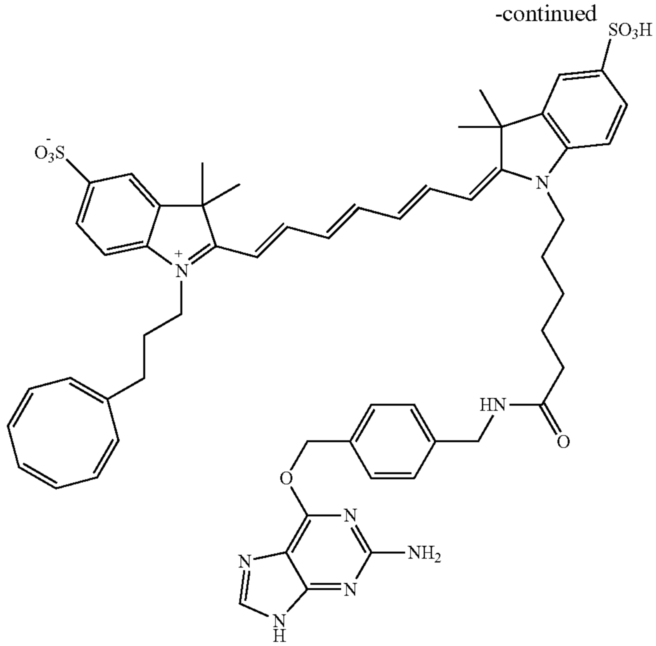
Cy7-3C-COT-BG
Follow Protocols 1,2,3,4,11,15
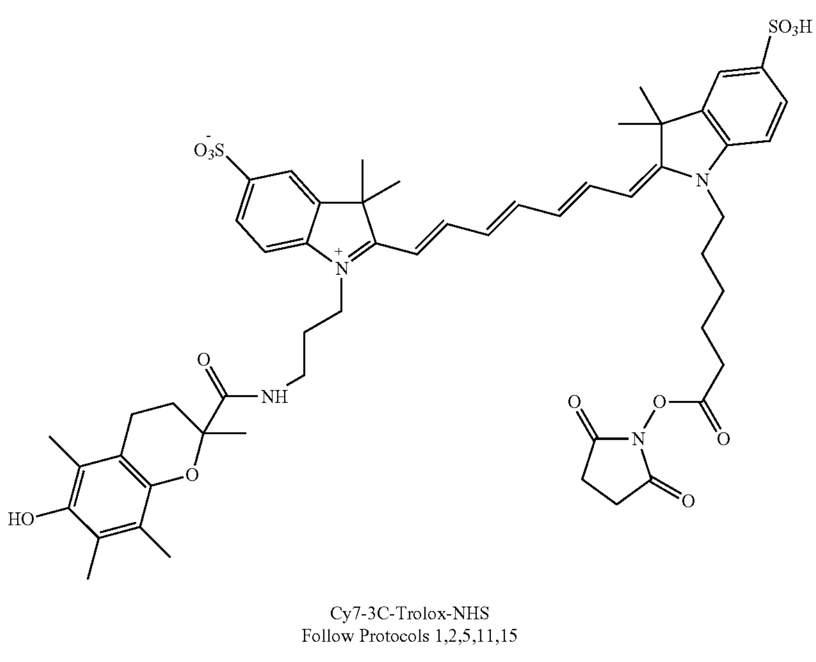
Cy7-3C-Trolox-NHS
Follow Protocols 1,2,5,11,15

-continued
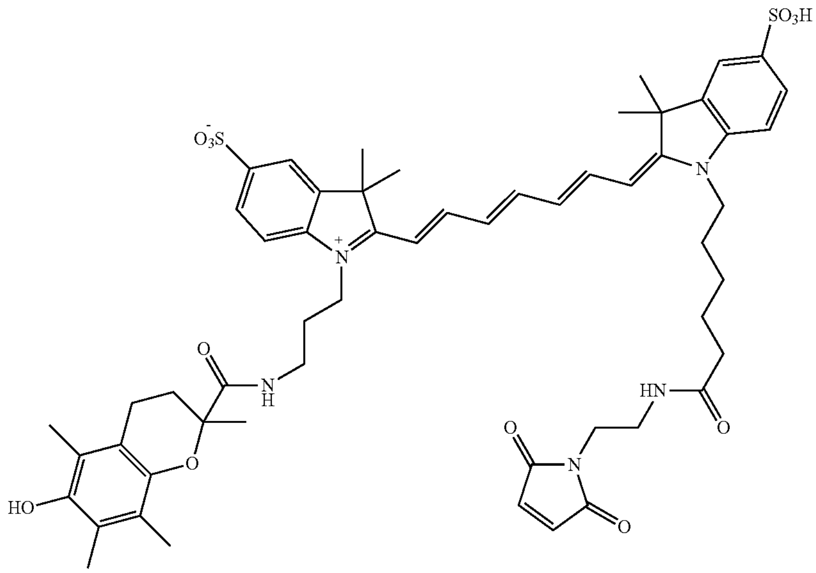
Cy7-3C-Trolox-MaI
Follow Protocols 1,2,5,11,13
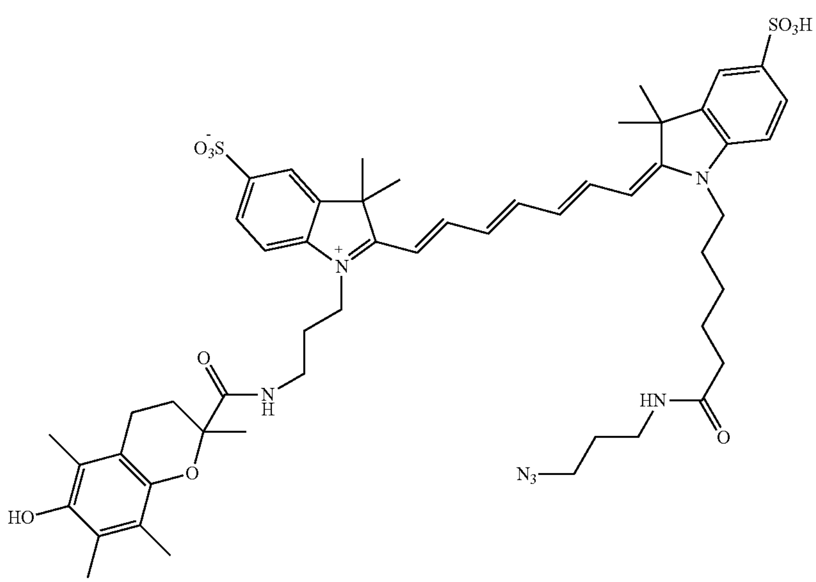
Cy7-3C-Trolox-$N_3$
Follow Protocols 1,2,5,11,14

-continued
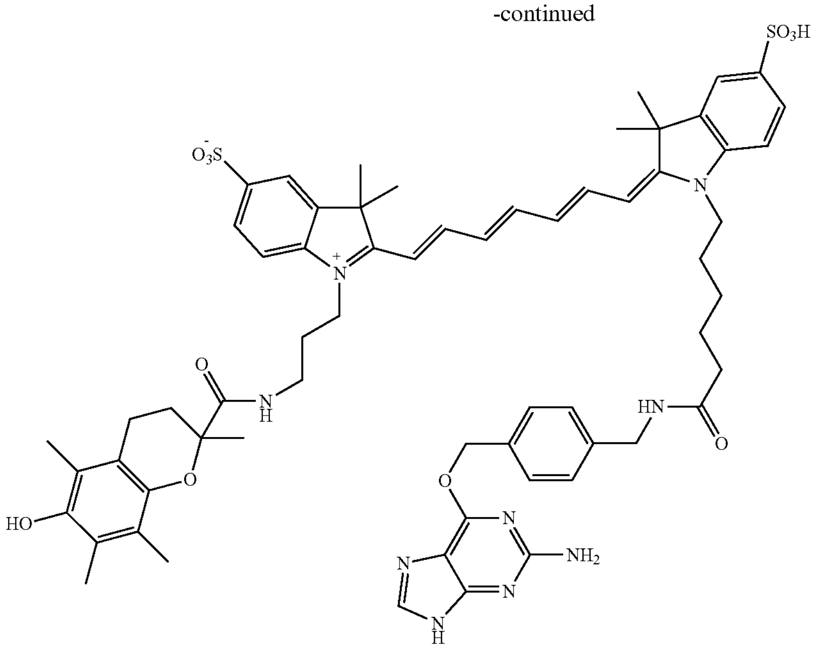
Cy7-3C-Trolox-BG
Follow Protocols 1,2,5,11,15
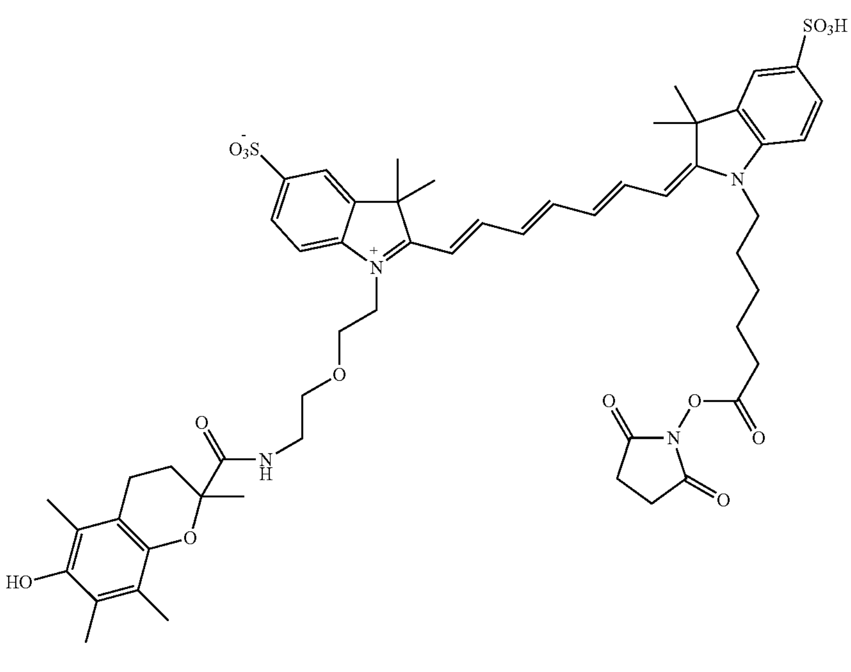
Cy7-diglycol-Trolox-NHS
Follow Protocols 1,2,6,11,12

-continued
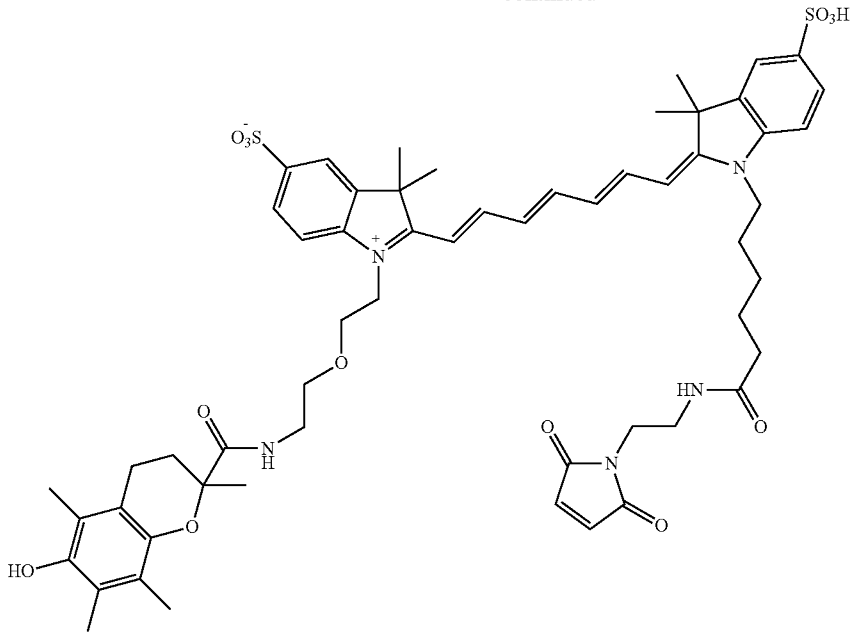
Cy7-diglycol-Trolox-MaI
Follow Protocols 1,2,6,11,13
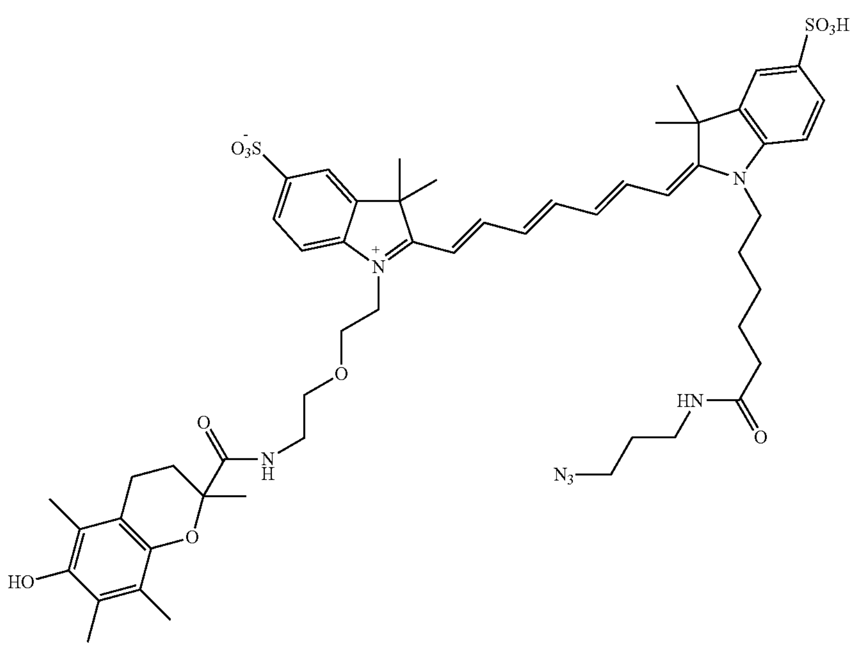
Cy7-diglycol-Trolox-$N_3$
Follow Protocols 1,2,6,11,14

-continued
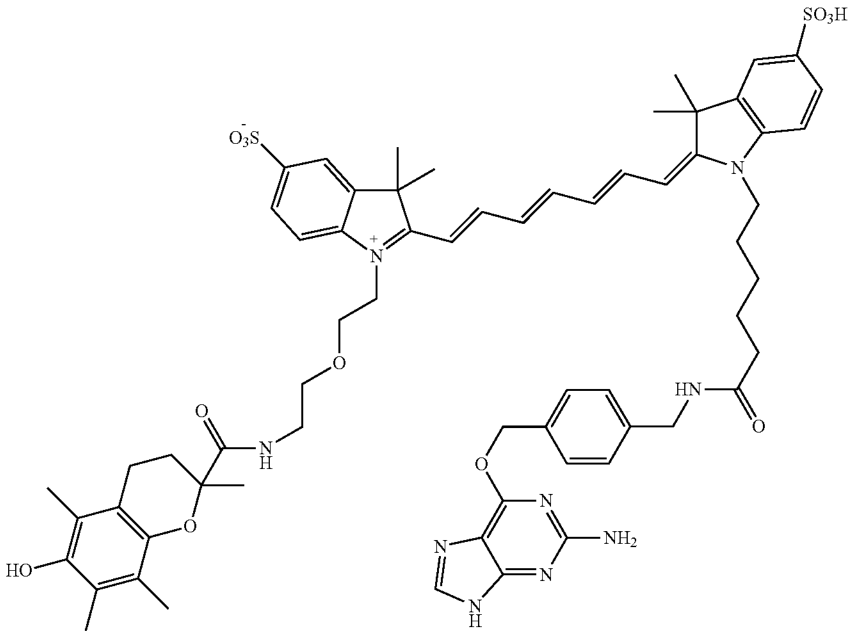
Cy7-diglycol-Trolox-BG
Follow Protocols 1,2,6,11,15
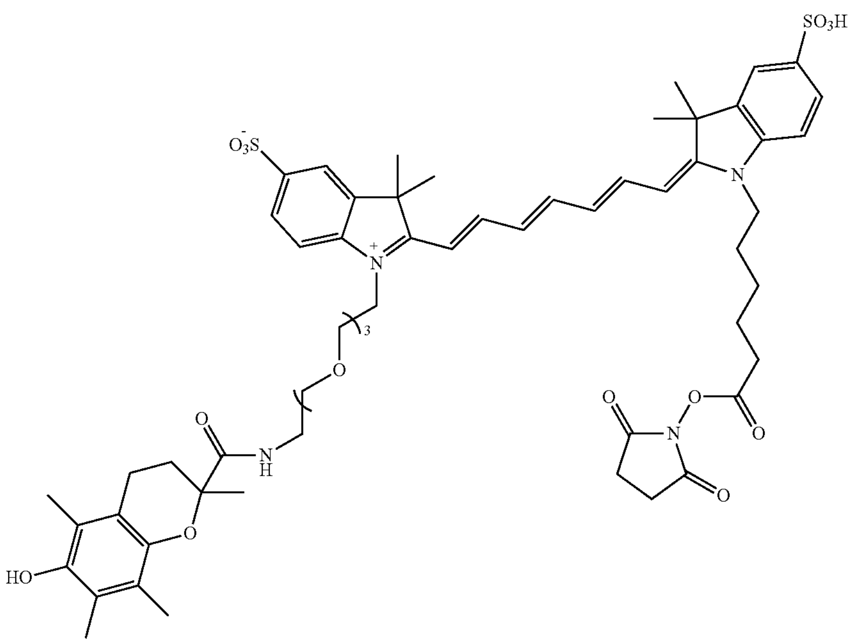
Cy7-tetraglycol-Trolox-NHS
Follow Protocols 1,2,7,11,12

-continued
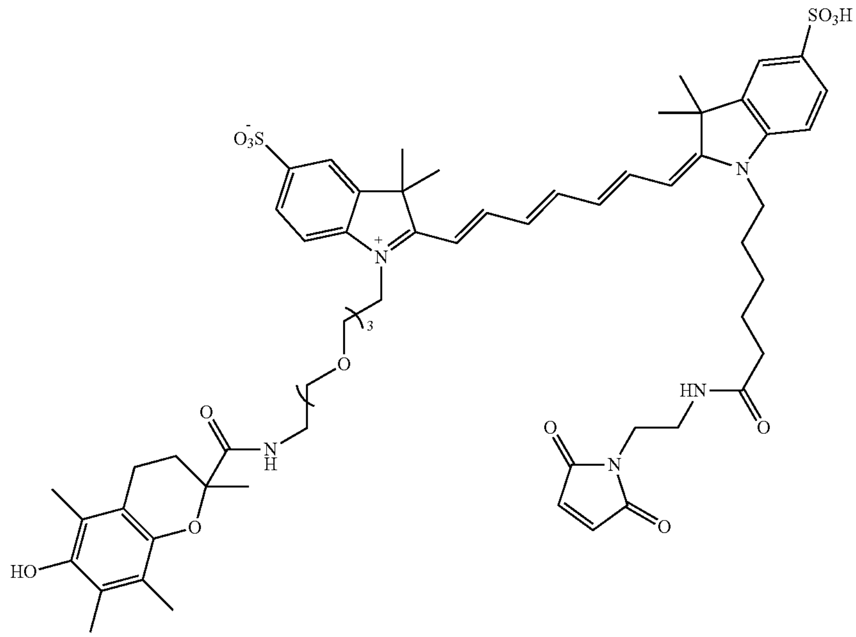
Cy7-tetraglycol-Trolox-MaI
Follow Protocols 1,2,7,11,13
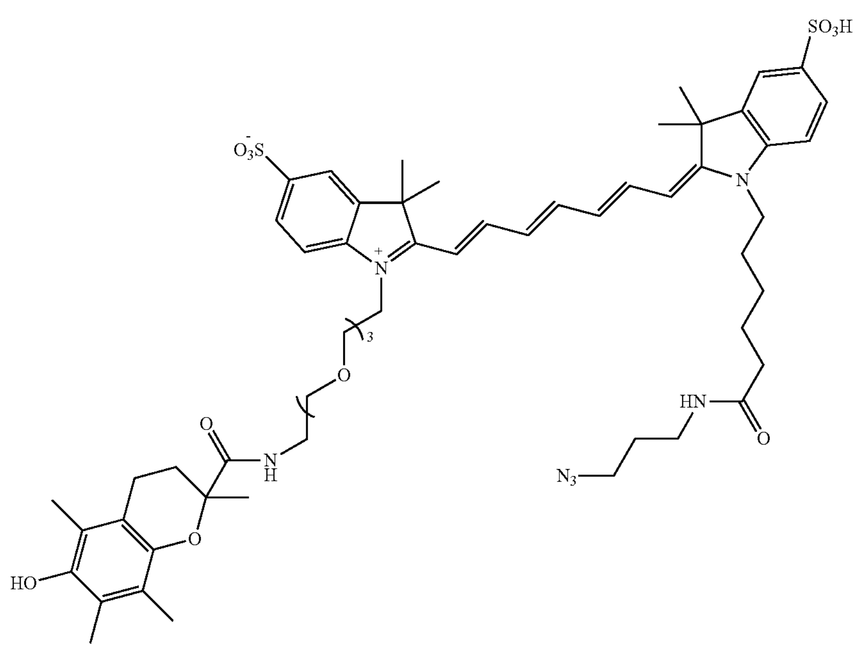
Cy7-tetraglycol-Trolox-$N_3$
Follow Protocols 1,2,7,11,14

-continued
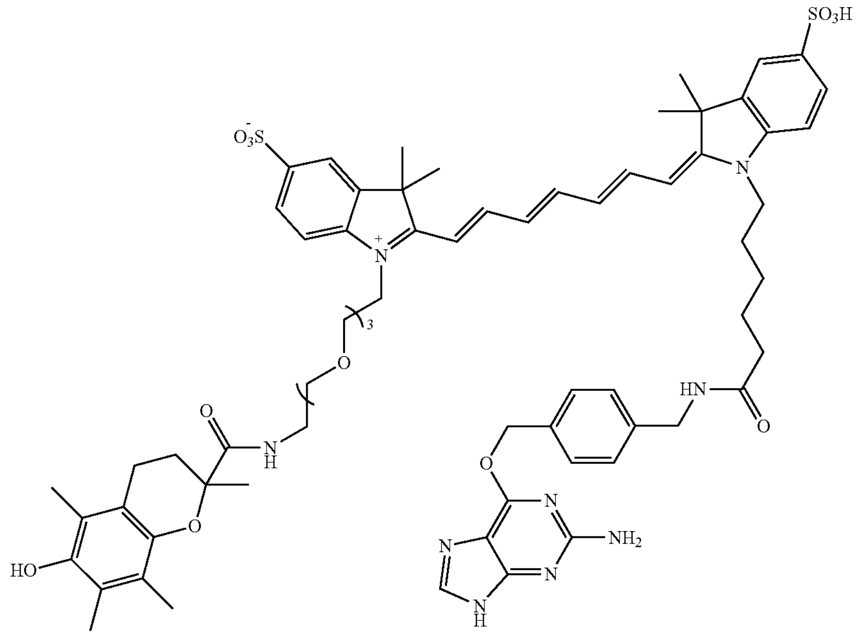
Cy7-tetraglycol-Trolox-BG
Follow Protocols 1,2,7,11,15
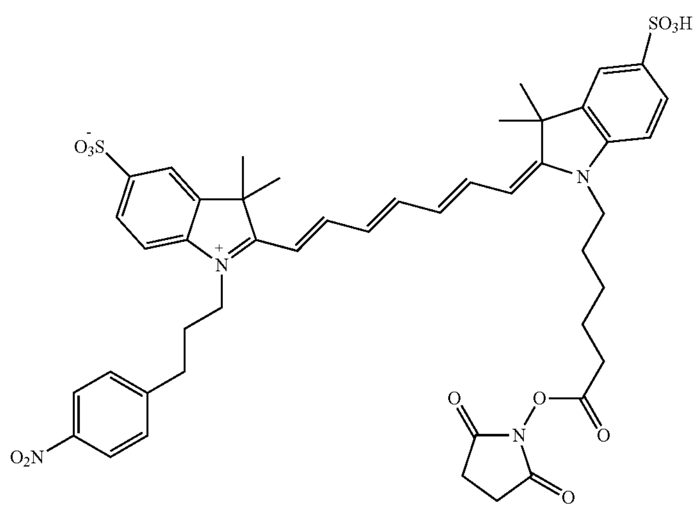
Cy7-3C-NBA-NHS
Follow Protocols 1,2,8,11,12

-continued
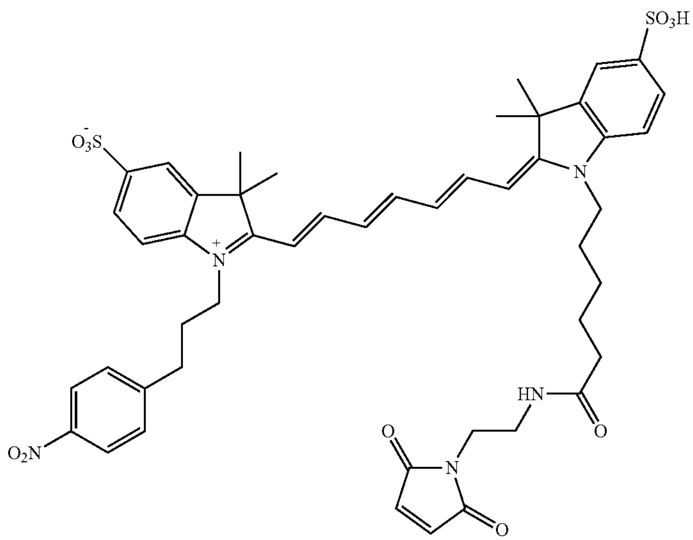
Cy7-3C-NBA-MaI
Follow Protocols 1,2,8,11,13
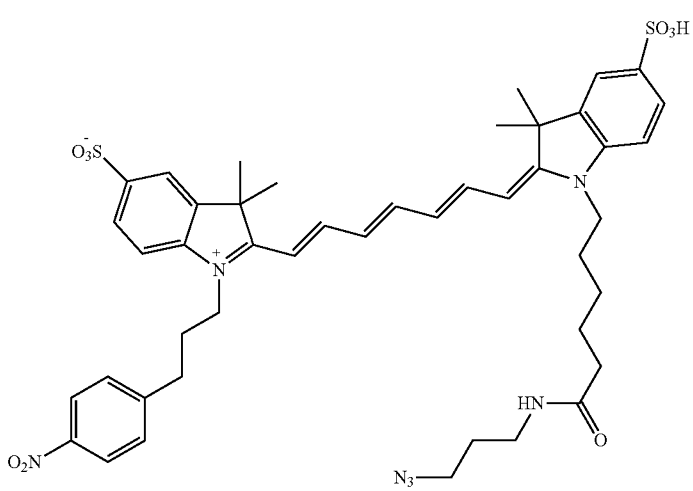
Cy7-3C-NBA-$N_3$
Follow Protocols 1,2,8,11,14

-continued
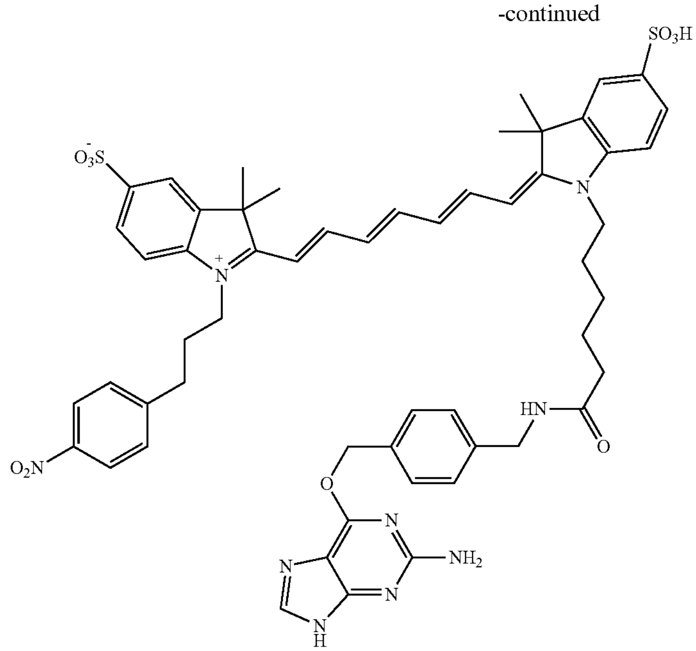
Cy7-NBA-BG
Follow Protocols 1,2,8,11,15
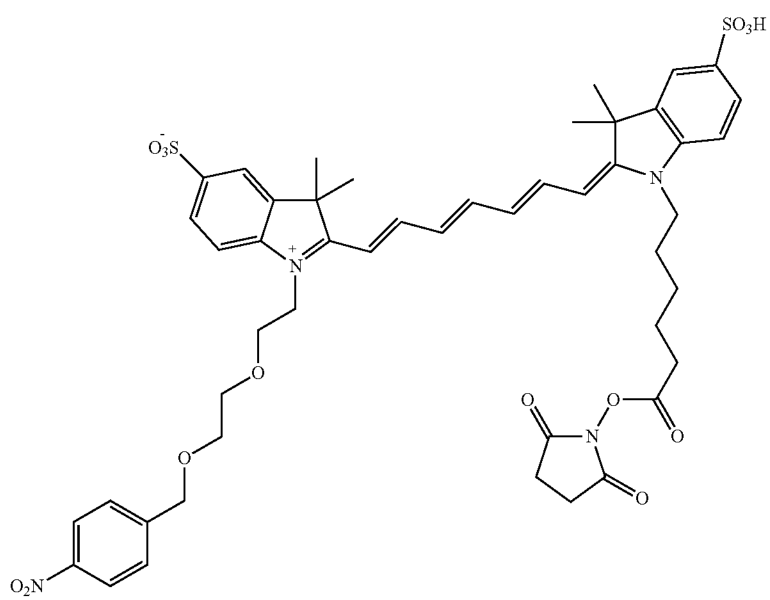
Cy7-diglycol-NBA-NHS
Follow Protocols 1,2,9,11,12

-continued
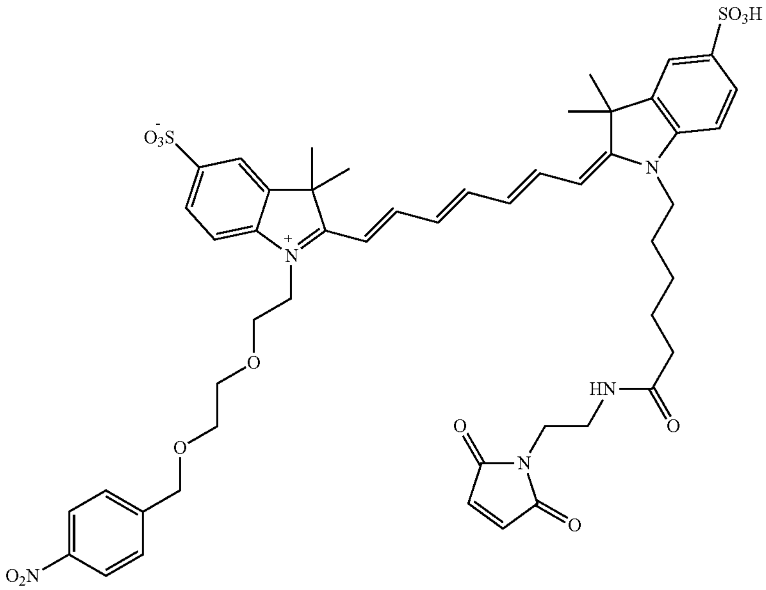
Cy7-diglycol-NBA-MaI
Follow Protocols 1,2,9,11,13
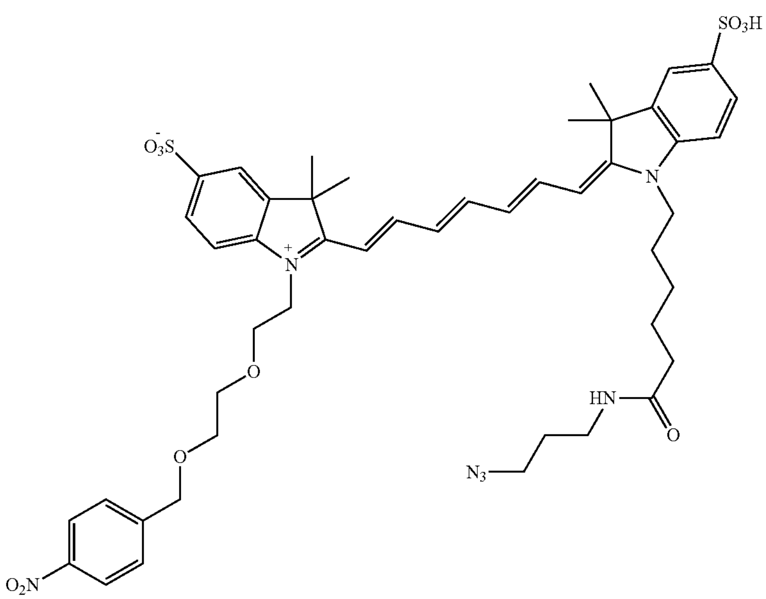
Cy7-diglycol-NBA-$N_3$
Follow Protocols 1,2,9,11,14

-continued
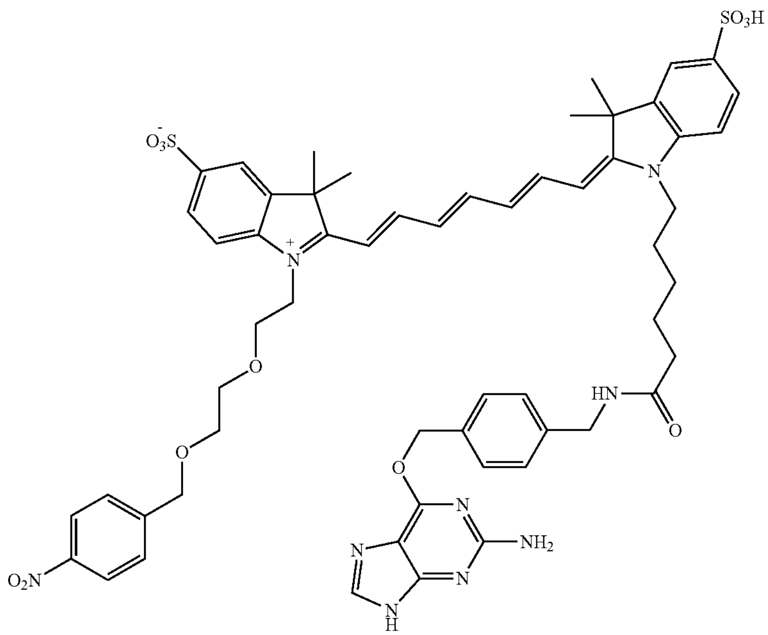
Cy7-diglycol-NBA-BG
Follow Protocols 1,2,9,11,15
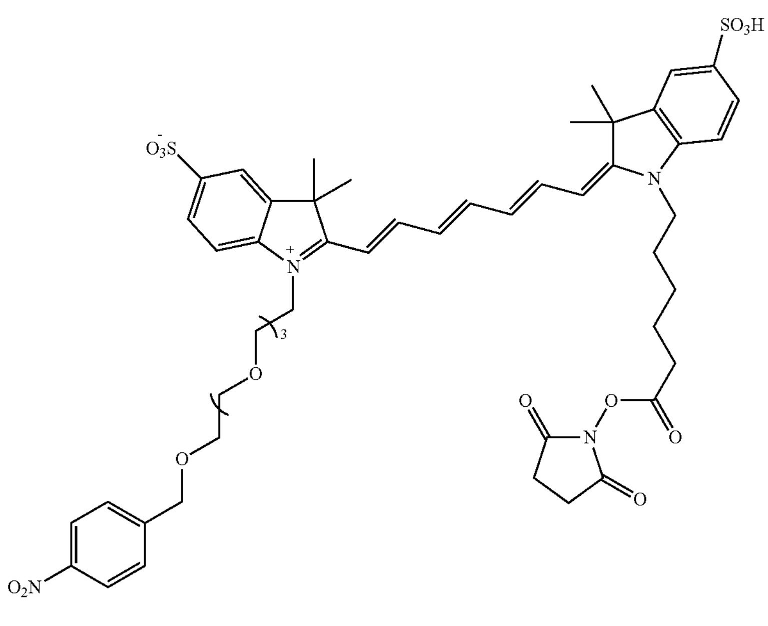
Cy7-tetraglycol-NBA-NHS
Follow Protocols 1,2,10,11,12

-continued
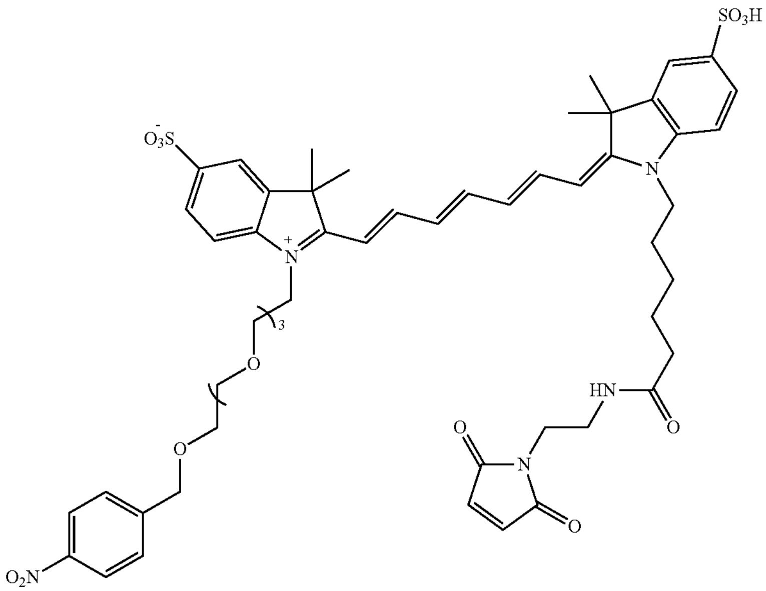
Cy7-tetraglycol-NBA-MaI
Follow Protocols 1,2,10,11,13
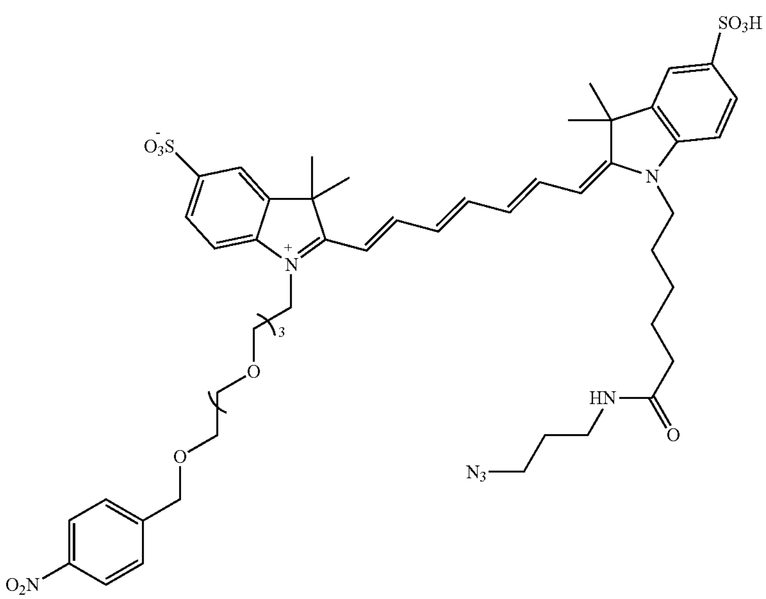
Cy7-tetraglycol-NBA-$N_3$
Follow Protocols 1,2,10,11,14

-continued

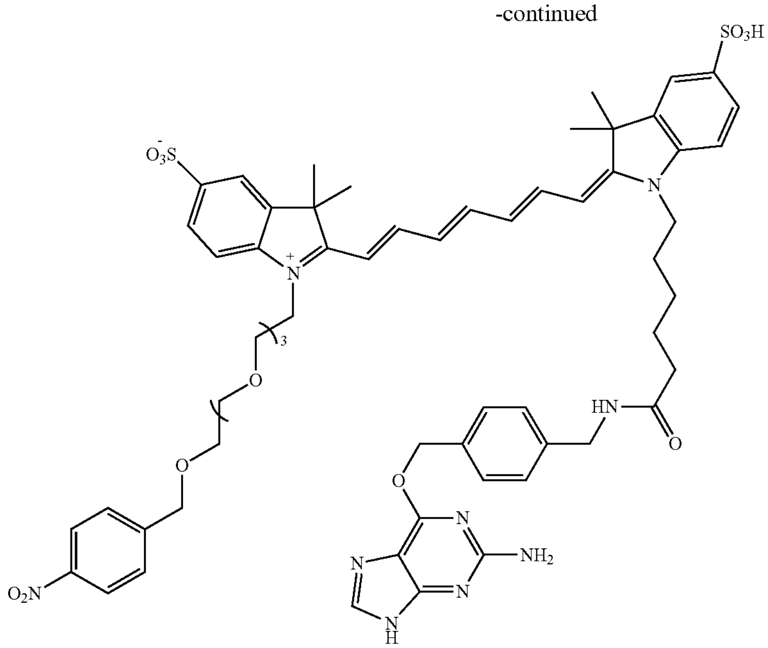

Cy7-tetraglycol-NBA-BG
Follow Protocols 1,2,10,11,15

SYNTHETIC PROCEDURES

Protocol 1

Synthesis of Cy3, Cy5, Cy7 Precursors

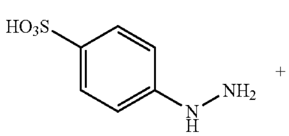

4-hydrazinylbenzenesulfonic acid
1

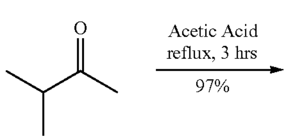

3-methylbutan-2-one
2

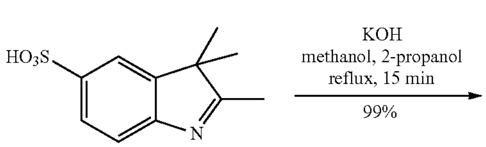

2,3,3-trimethyl-3H-indole-5-sulfonic acid
3

-continued

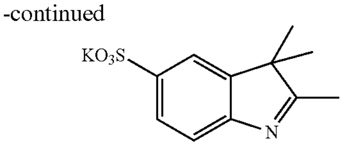

potassium 2,3,3-trimethyl-3H-indole-5-sulfonate
4

Detailed Procedures:

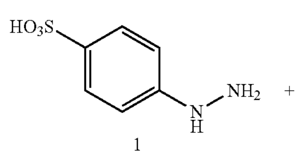

1

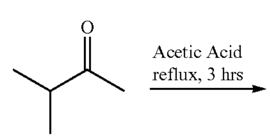

2

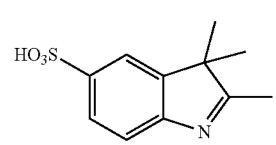

2,3,3-trimethyl-3H-indole-5-sulfonic acid
3

5 mL acetic acid, 1.67 mL of 3-methyl-2-butanone and 1 g of p-hydrazinobenzenesulfonic acid were added to a flask equipped with a magnetic stirrer and reflux condenser. The mixture was heated to reflux for 3 hours and then cooled until a pink solid precipitated as product. 1.24 g of compound 3 was obtained as a wine colored crystal with a yield of 97%.

$^1$H NMR (500 MHz, DMSO) δ 7.78 (1H, s), 7.64 (d, 1H), 7.48 (d, 1H), 2.5 (s, 3H), 1.37 (s, 6H)

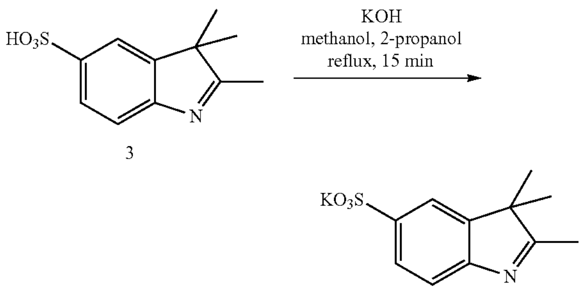

3 potassium 2,3,3-trimethyl-3H-indole-5-sulfonate
4

In a flask were added 1 g of compound 3, 234 mg of KOH, 1 mL MeOH and 1 mL 2-propanol. The mixture was stirred and heated to reflux for 15 minutes. Next the mixture turned from purple to yellow and the 2,3,3-trimethylindolenium-5-sulfonic potassium salt began to precipitate quantitatively as a yellow solid after the reaction mixture was cooled to RT. 1.14 g of compound 4 was obtained with a yield of 98%.

Protocol 2

Application of Cy5 Strategy to Cy3, Cy7 Synthesis

Cy3: To Apply the Cy5 Synthesis Method to Cy3 Synthesis

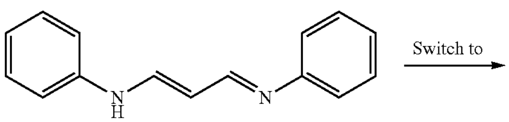

5
(E)-N-((E)-3-(phenylamino)allylidene)aniline

-continued

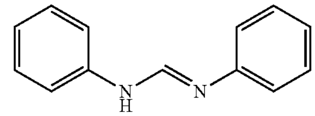

6
(E)-N,N′-diphenylformimidamide

Cy7: To Apply the Cy5 Synthesis Method to Cy7 Synthesis

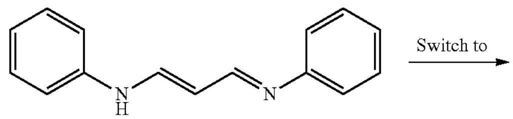

5
(E)-N-((E)-3-(phenylamino)allylidene)aniline

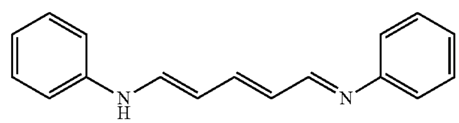

7
(E)-N-((2E,4E)-5-(phenylamino)penta-2,4-dien-1-ylidene)aniline

Protocol 3

Synthesis of COT Derivatives

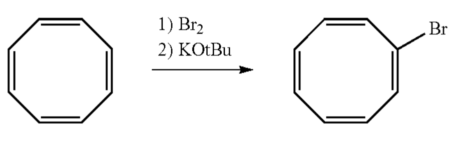

8
(1Z,3Z,5Z,7Z)-cycloocta-1,3,5,7-tetraene

9

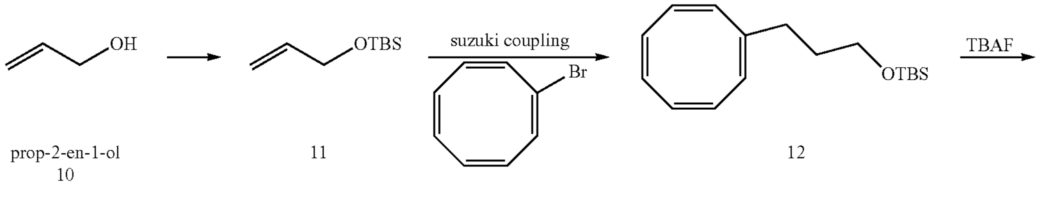

prop-2-en-1-ol
10

11

12

-continued

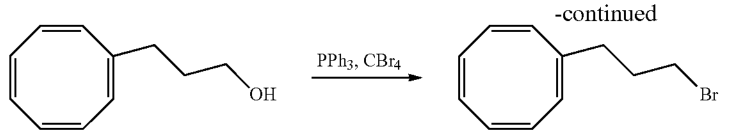

13

14
(1Z,3Z,5Z,7Z)-1-(3-bromopropyl)cycloocta-1,3,5,7-tetraene

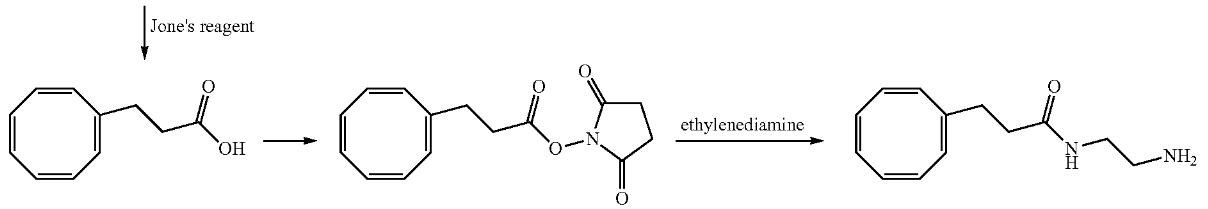

15

16
2,5-dioxopyrrolidin-1-yl 3-((1Z,3Z,5Z,7Z)-cycloocta-1,3,5,7-tetraen-1-yl)propanoate 17
N-(2-aminoethyl)-3-((1Z,3Z,5Z,7Z)-cycloocta-1,3,5,7-tetraen-1-yl)propanamide Detailed Procedures:

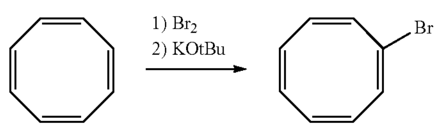 [SMILES: C1=C\C=C/C=C\C=C/1 ; BrC1=C/C=C\C=C/C=C\1]

A solution of $Br_2$ (4.6 g, 28.8 mmol) in DCM (20 mL) was slowly added to a stirred solution of cyclooctatetraene (3.0 g, 28.8 mmol) in DCM (30 ml) at −70° C. The resulting solution was stirred at −70° C. for 1 hour, at which point a solution of potassium tertbutoxide (4.5 g, 40 mmol) in THF (20 ml) was added dropwise. The reaction mixture was stirred at −60° C. for 4 hours, warmed to −10° C., and poured into ice water. Using a small amount of $MgSO_4$ to break up the emulsion, the organic layer was removed and the aqueous layer extracted with diethyl ether (3×20 mL). The combined extracts were dried over $MgSO_4$, filtered, and concentrated to give COT-Br as a light yellow oil (5.1 g, 97%) which was used without further purification. 1H NMR ($CDCl_3$): δ 6.22 (s, 1H), 5.74-5.98 (m, 5H), 5.62 (s, 1H); 13C NMR (CDCl3): δ 133.2, 133.1, 132.8, 132.4, 132.0, 130.9, 121.4.

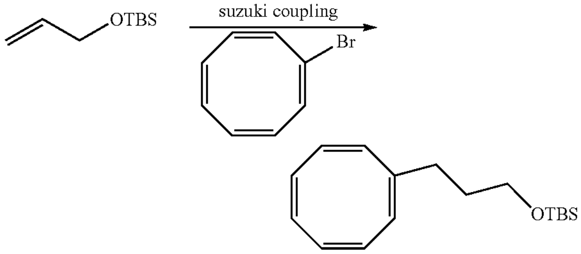

9-borabicyclo[3.3.0]nonane (0.5 M in THF, 13 mL, 6.5 mmol) was added to a stirred 0° C. solution of allyloxy-tert-butylsilane (1.0 g, 5.8 mmol) in THF (5 ml). The reaction solution was slowly warmed to RT and stirred for 3 hours. At that point, COT-Br (1.27 g, 6.9 mmol), NaOH (3 M solution, 5.7 ml, 17.1 mmol), and tetrakis(triphenylphosphine)palladium(0) (100 mg, 0.08 mmol) were added, and the mixture was heated at reflux overnight. Next, the reaction mixture was cooled, diluted with 1:1 hex/EtOAc, washed with water and brine, then dried over $MgSO_4$, filtered, and concentrated. The residue was purified by silica gel chromatography (1:20 EtOAc/hex) to provide the desired product as a light brown liquid (1.0 g, 3.62 mmol, 62%). 1H NMR (CDCl3): δ 5.85-5.72 (m, 6H), 5.61 (s, 1H), 3.72 (t, J=6.2 Hz, 2H), 2.15 (s, 2H), 1.73-1.61 (m, 2H), 0.90 (s, 9H), 0.06 (s, 6H); 13C NMR ($CDCl_3$): δ 143.9, 134.1, 132.2, 132.1, 131.8, 131.5, 131.0, 126.8, 62.4, 32.1, 31.3.

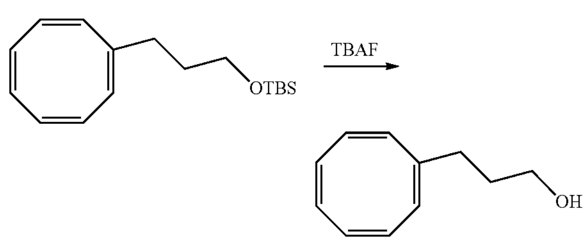

Tetrabutylammonium fluoride (1M in THF, 5 mL, 5 mmol) was added to a stirred room temperature solution of COT-OTBS (700 mg, 2.5 mmol) in THF (2 ml). The resulting solution was stirred for 2 h, at which point it was diluted with EtOAc (20 ml), washed water and brine, dried over $MgSO_4$, filtered, and concentrated. The residue was purified by silica gel chromatography (1:3 EtOAc/hex) to afford the target compound as a light yellow oil (300 mg, 73%). 1H NMR (CDCl3): δ 5.96-5.67 (m, 6H), 5.62 (s, 1H), 3.72 (t, J=6.2 Hz, 2H), 2.22 (s, 2H), 1.69 (t, J=6.2 Hz, 2H); 13C NMR (CDCl3): δ 143.9, 134.1, 132.2, 132.1, 131.8, 131.5, 131.0, 126.8, 62.4, 34.1, 31.3.

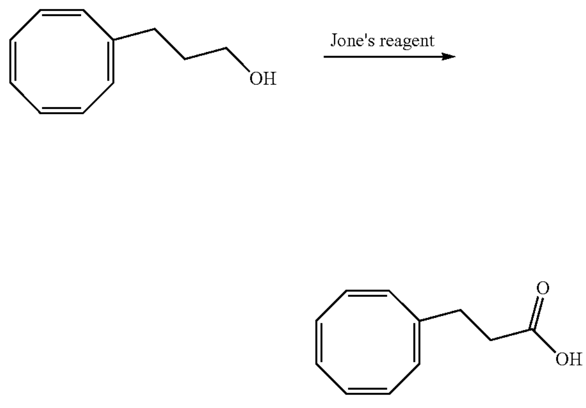

Freshly made Jones reagent (3 M, 576 μL, 1.7 mmol) was added to a stirred 0° C. solution of COT-OH (140 mg, 0.86 mmol) in acetone (3 ml). The reaction was stirred at 0° C. for 1 h, and then quenched by the addition of MeOH. The solvent was removed in vacuo and the resulting residue taken up in EtOAc and water, then extracted with EtOAc (3×20 ml). The combined organic layers were dried over $Na_2SO_4$ and concentrated. The resulting residue was passed through a short plug of silica gel using 2:1 EtOAc/hex to provide 40 mg of the crude acid (estimated yield 26%), which was taken on without further purification.

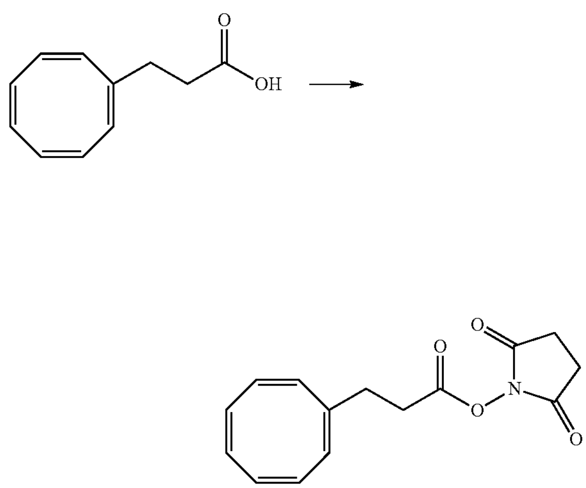

A solution of dicyclohexylcarbodiimide (56 mg, 0.25 mmol) in THF (3 mL) was added dropwise to a stirred 0° C. solution of COT-COOH (40 mg, 0.23 mmol) and NHS-OH (31 mg, 0.25 mmol) in THF (5 ml). The reaction mixture was slowly warmed to room temperature and stirred overnight. At that point, the resulting slurry was filtered and washed with THF. The combined filtrate and wash was then dried over $Na_2SO_4$ and concentrated. The resulting residue was purified by silica gel chromatography (1:5 acetone/DCM) to provide COT-NHS as a yellow oil (31 mg, 48%). 1H NMR (CDCl3): δ 5.96-5.72 (m, 7H), 5.68 (s, 1H), 2.87 (s, 4H), 2.77 (t, J=6.2 Hz, 2H), 2.48 (brs, 2H); 13C NMR (CDCl3): δ 169.0, 168.0, 141.3, 132.7, 132.0, 131.7, 131.5, 131.4, 128.0, 32.1, 39.5, 25.6.

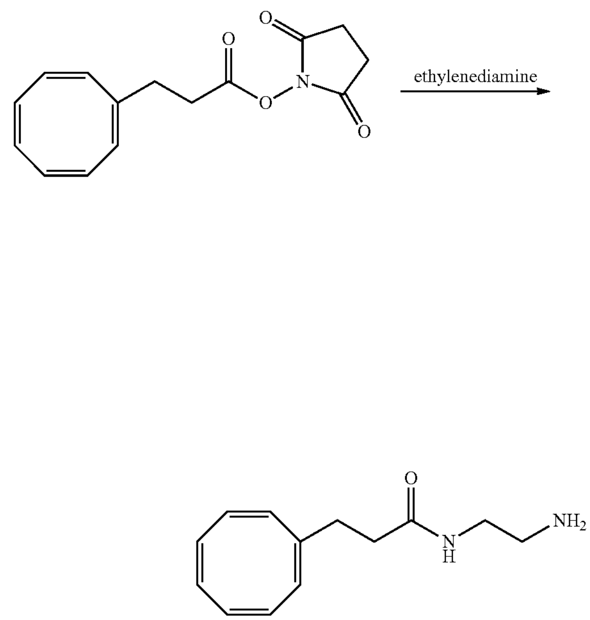

A solution of COT-NHS (27 mg, 0.1 mmol) in DCM (2 ml) was slowly added to a stirred 0° C. solution of ethylenediamine (60 mg, 1 mmol) in DCM (3 ml). The solution was warmed to RT and stirred for 1 h, then diluted with DCM (15 ml), washed with saturated aq. $Na_2CO_3$ solution and brine, then dried over $Na_2SO_4$, filtered, and finally concentrated to give 15 mg of a yellow oil (approximately 68%), which was carried on without further purification. ESI-MS: m/z calculated for C13H8N2O [M+H]+ 219.1, found: 219.1.

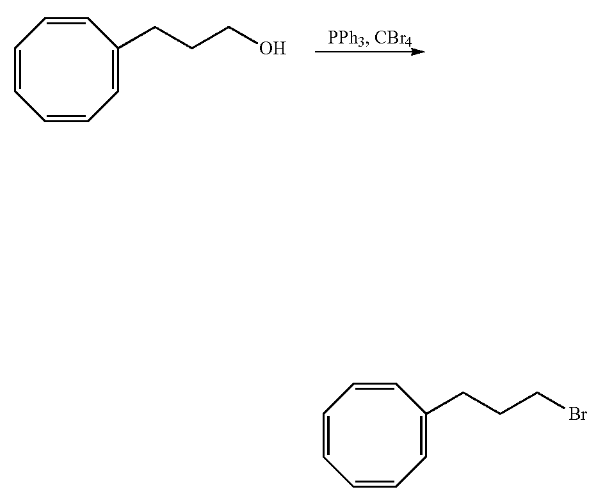

1.2 eq. of $PPh_3$ solution in DCM was slowly added to a stirred 0° C. solution of COT-OH and 1.1 eq. of $CBr_4$ in DCM. The reaction solution was stirred at RT for 2 hrs, monitored by TLC. When the reaction was complete, the solution was concentrated and the residue was column purified using 1:20 EtOAc:Hexanes.

Protocol 4
Synthesis of Cy5-3C-COT-COOH
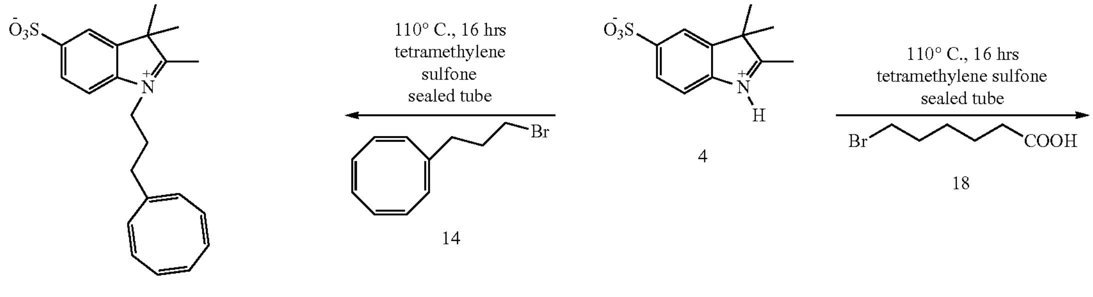
20
1-(3-((1Z,3Z,5Z,7 Z)-cycloocta-1,3,5,7-tetraen-1-yl)propyl)-2,3,3-trimethyl-3H-indol-1-ium-5-sulfonate
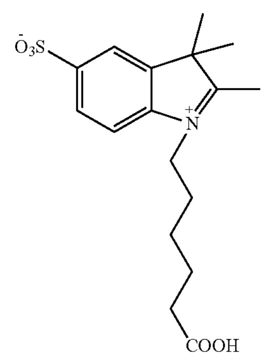
19
1-(5-carboxypentyl)-2,3,3-trimethyl-3H-indol-1-ium-5-sulfonate
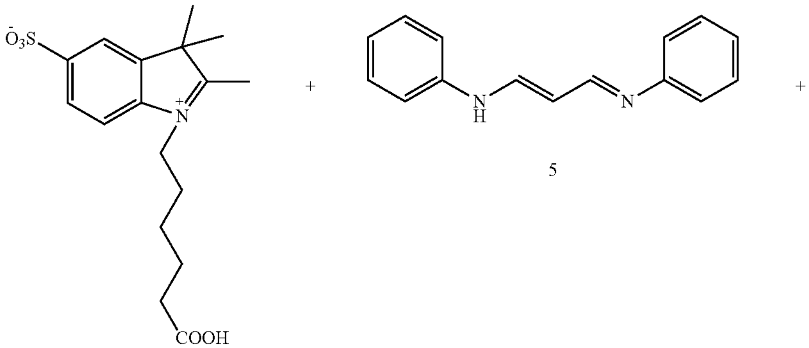
19

-continued

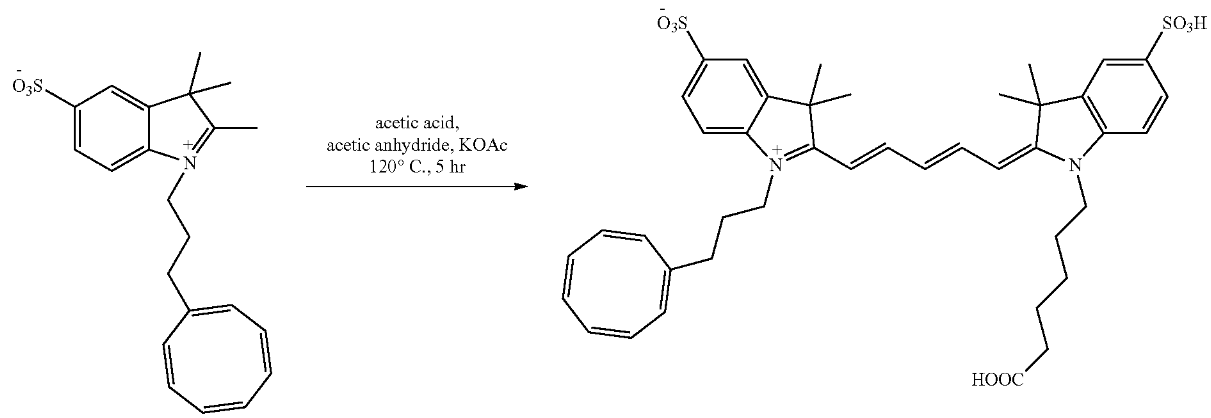

20

21
Cy5-3C-COT-COOH
2-((1E,3E,5E)-5-(1-(5-carboxypentyl)-3,3-dimethyl-5-sulfoindolin-2-ylidene)penta-1,3-dien-1-yl)-1-(3-((1Z,3Z,5Z,7Z)-cycloocta-1,3,5,7-tetraen-1-yl)propyl)-3,3-dimethyl-3H-indol-1-ium-5-sulfonate Detailed Procedures

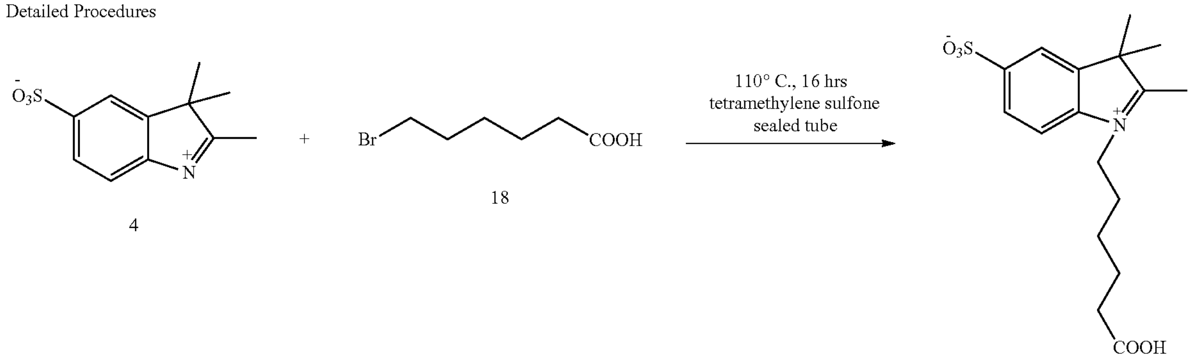

4

18

19

1 g of 2,3,3-trimethylindolenium-5-sulfonic potassium salt and 6-bromo-hexanoic acid were mixed with 2 mL of tetramethylene sulfone. The reaction mixture was added to a degassed sealed tube and heated up to 110° C. for 16 hrs. Next the reaction mixture was cooled to room temperature, the deep purple solution was poured into 15 mL EtOAc to precipitate the product. The purple solid product 19 was washed by 15 mL×3 EtOAc, and dried. Crude compound 19 was carried onto the next step without further purification.

MASS (ES+) m/z for C17H23NO5S, $[M+1]^+$, Calculated: 354.1, Found: 354.3.

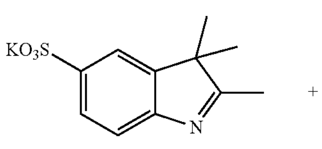

4

-continued

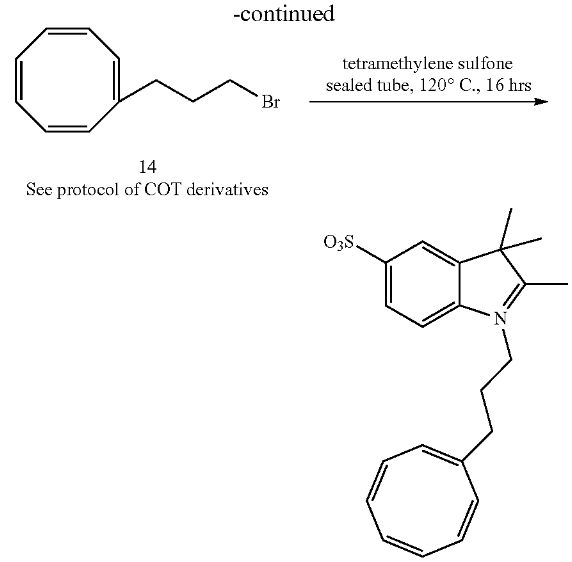

14
See protocol of COT derivatives

20

277 mg of 2,3,3-trimethylindolenium-5-sulfonic potassium salt and 400 mg of -1-(3-bromopropyl)cycloocta-1,3, 5,7-tetraene were mixed with 2 mL of tetramethylene sulfone. The reaction mixture was added into a degassed sealed tube and heated to 110° C. for 16 hrs. Next the reaction mixture was cooled to room temperature, the deep purple solution was poured into 15 mL EtOAc to precipitate the product. The purple solid product was washed by 15 mL×3 EtOAc, and dried. Crude compound 20 was carried onto the next step without further purification.

MASS (ES+) m/z for C22H25NO3S, [M+1]$^+$, Calculated: 383.2, Found: 383.1.

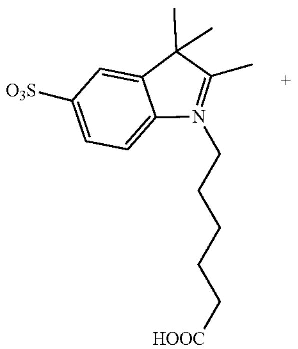

19

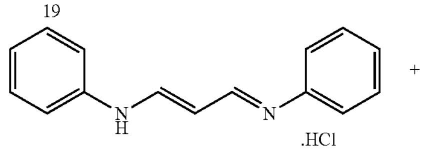

5

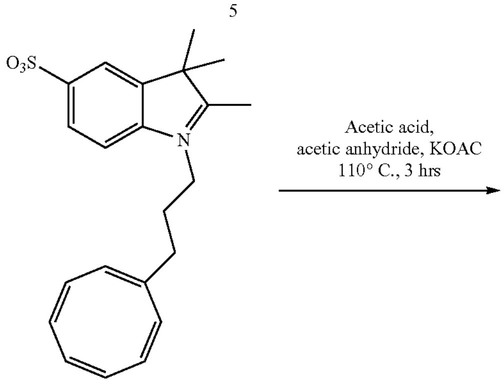

20

-continued

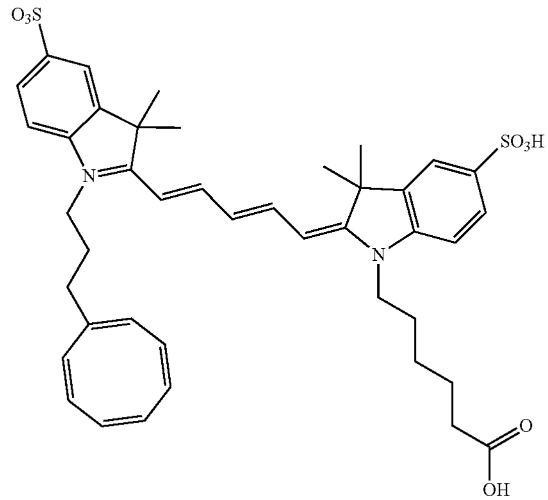

21

176 mg of compound 19, 129 mg of malonaldehyde dianilide hydrochloride(5), 5 mL acetic acid, and 0.5 mL acetic anhydride were combined in a round bottom flask. The resulting purple solution was heated to 120° C. for 2 hrs. Next, 192 mg of compound 20 was added to this solution followed by 500 mg of KOAc. This reaction mixture was heated to 120° C. and stirred for another 1.5 hrs. After the reaction was complete, the mixture was poured into 45 mL of EtOAc to precipitate the crude product as a dark green solid. The residue was washed 3 more times (40 mL each time) by EtOAc, and dried. The pure Cy5 dye compound 21 was isolated by semi-prep HPLC purification (25% acetonitrile in 0.1% formic acid aq. to 65% acetonitrile) as a blue solid.

MASS (ES−) m/z for C42H48N2O8S2, [M−1]$^-$ Calculated: 772.3, Found: 772.4.

Protocol 5

Synthesis of Cy5-3C-Trolox-COOH

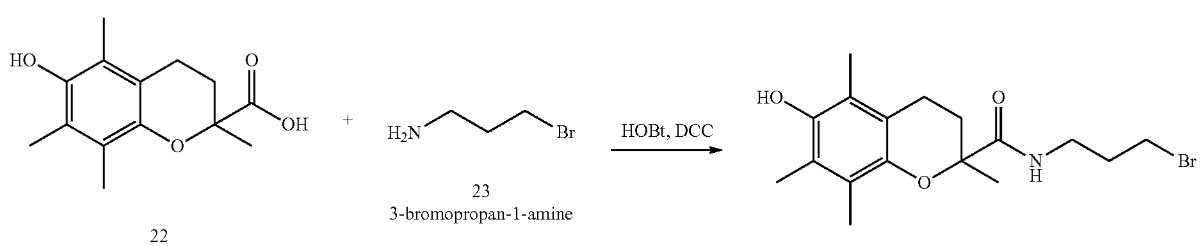

22
6-hydroxy-2,5,7,8-tetramethylchroman-2-carboxylic acid 23
3-bromopropan-1-amine 24
N-(3-bromopropyl)-6-hydroxy-2,5,7,8-tetramethylchroman-2-carboxamide -continued
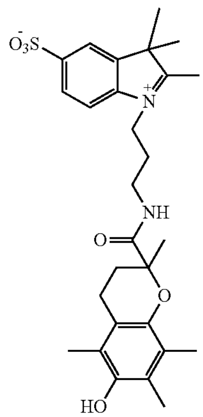
26
1-(3-(6-hydroxy-2,5,7,8-tertramethylchroman-2-carboxamido)propyl)-2,3,3-trimethyl-3H-indol-1-ium-5-sulfonate
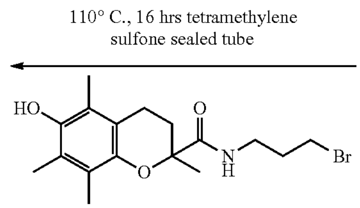
24
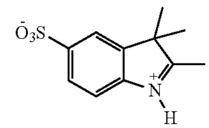
4
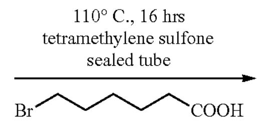
18
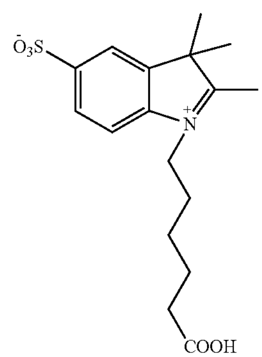
19
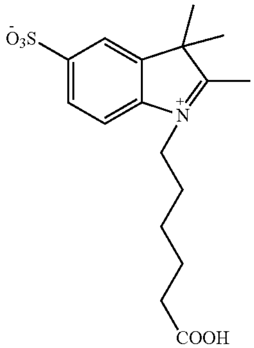
19
+
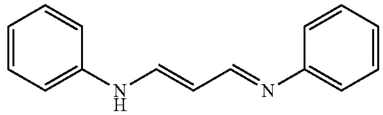
5
+

-continued

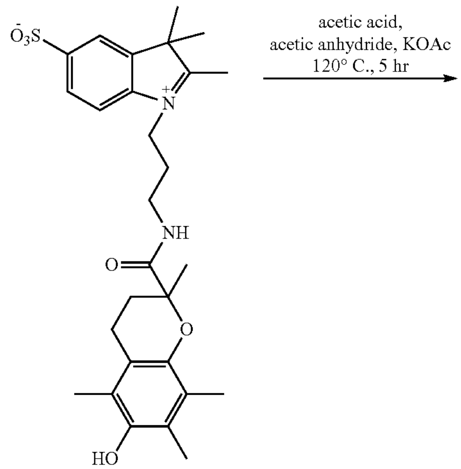

26

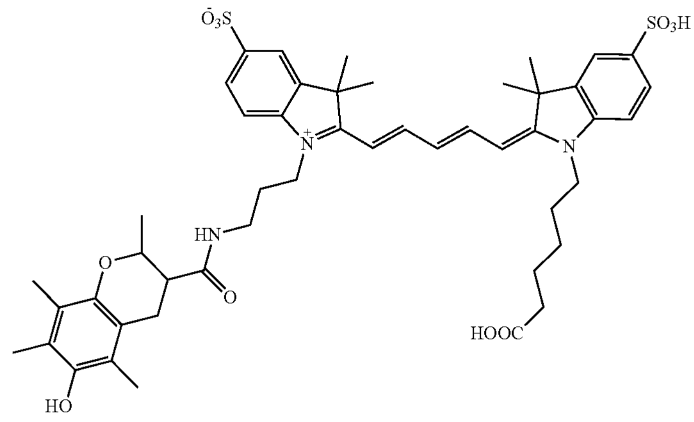

26
Cy5-3C-Trolox-COOH
2-((1E,3E,5E)-5-(1-(5-carboxypentyl)-3,3-dimethyl-5-sulfoindolin-2-ylidene)penta-1,3-dien-1-yl)-1-(3-(6-hydroxy-2,5,7,8-tetramethylchroman-2-carboxamido)propyl)-3,3-dimethyl-3H-indol-1-ium-5-sulfonate Detailed Procedures

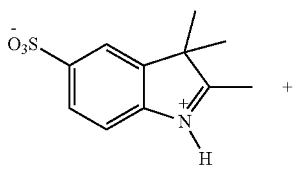

4

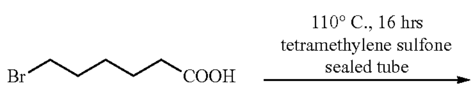

18

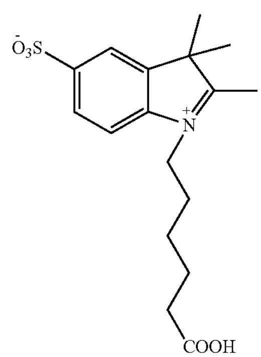

19

1 g of 2,3,3-trimethylindolenium-5-sulfonic potassium salt and 6-bromo-hexanoic acid were mixed with 2 mL of tetramethylene sulfone. The reaction mixture was added to a degassed sealed tube and heated to 110° C. for 16 hrs. Next the reaction mixture was cooled to room temperature and the deep purple solution was poured into 15 mL EtOAc to precipitate the product. The purple solid product 19 was washed by 15 mL×3 EtOAc, and dried. Crude compound 19 was carried onto the next step without further purification.

MASS (ES+) m/z for C17H23NO5S, $[M+1]^+$, Calculated: 354.1, Found: 354.3.

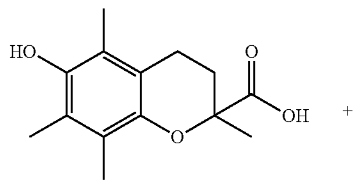

22

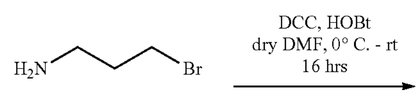

23

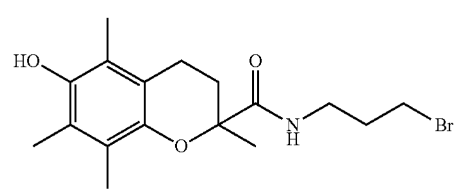

24

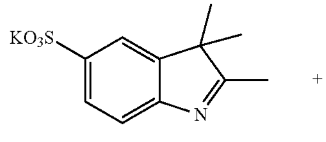

4

-continued

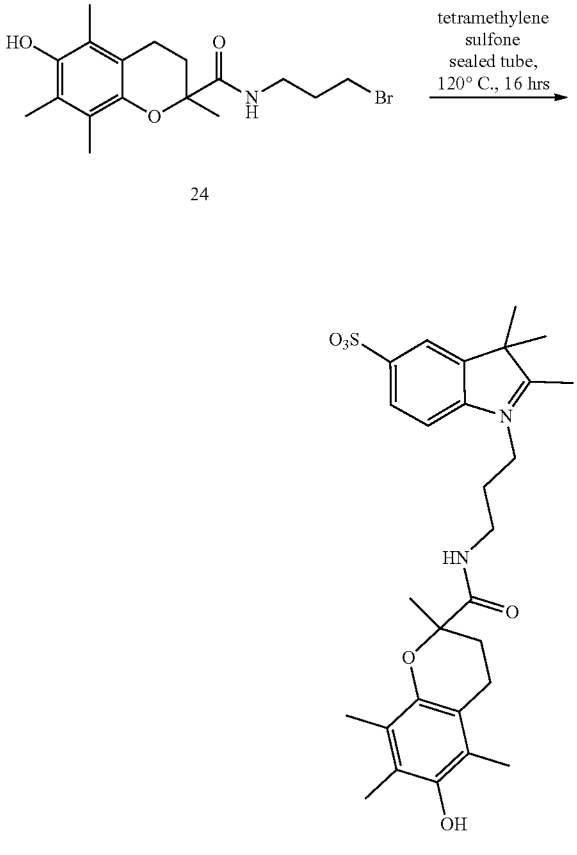

24

25

277 mg of 2,3,3-trimethylindolenium-5-sulfonic potassium salt and 560 mg of Trolox-3C-Br were mixed with 2 mL of tetramethylene sulfone. The reaction mixture was added to a degassed sealed tube and heated to 110° C. for 16 hrs. Next, the reaction mixture was cooled to room temperature and the deep purple solution was poured into 15 mL EtOAc to precipitate the product. The purple solid product was washed by 15 mL×3 EtOAc, and dried. Crude compound 25 was carried onto the next step without further purification.

MASS (ES+) m/z for C20H22N2O5S $[M+1]^+$, Calculated: 528.3, Found: 528.5.

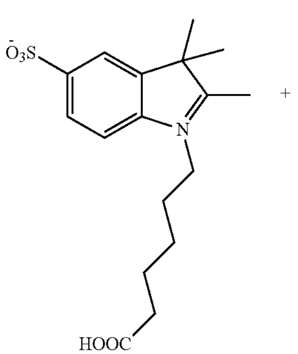

19

-continued

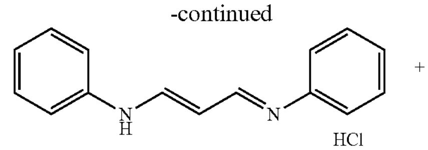

5

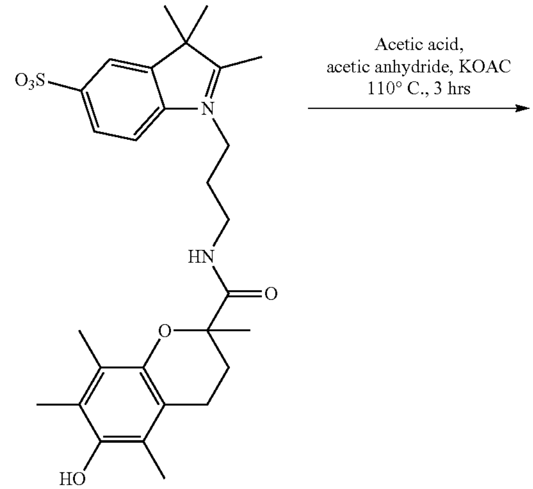

26

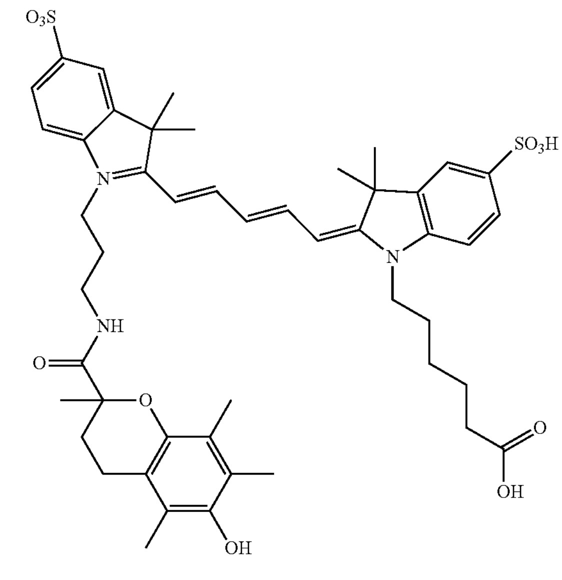

26

176 mg of compound 19, 129 mg of malonaldehyde dianilide hydrochloride, 5 mL acetic acid, and 0.5 mL acetic anhydride were combined in a round bottom flask. The resulting purple solution was heated to 120° C. for 2 hrs, then 264 mg of compound 25 was added to this solution followed by 500 mg of KOAc. The reaction mixture was heated to 120° C. and stirred for another 45 mins. After the reaction was complete, the reaction mixture was poured into 45 mL of EtOAc to precipitate the crude product as a dark green solid. The residue was washed 3 more times (40 mL each time) by EtOAc, and dried. The pure Cy5 dye compound 26 was isolated by semi-prep HPLC purification (15% acetonitrile in 0.1% formic acid aq. to 65% acetonitrile) as a blue solid.

MASS (ES−) m/z for C48H59N3O11S2, $[M-1]^-$ Calculated: 917.4, Found: 917.3.

Protocol 6
Synthesis of Cy5-diglycol-Trolox-COOH
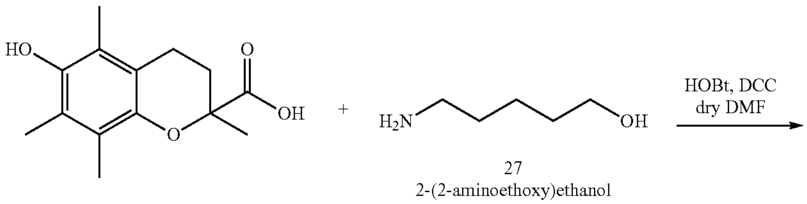
22
27
2-(2-aminoethoxy)ethanol
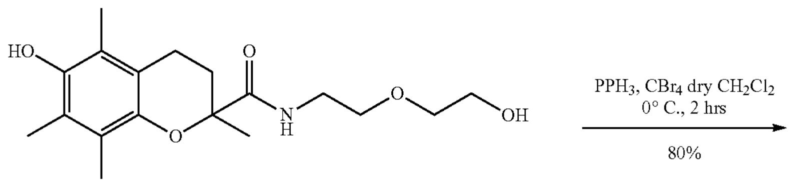
28
6-hydroxy-N-(2(2-hydroxyethoxyl)ethyl)-2,5,7,8-tetramethylchroman-2-carboxamide
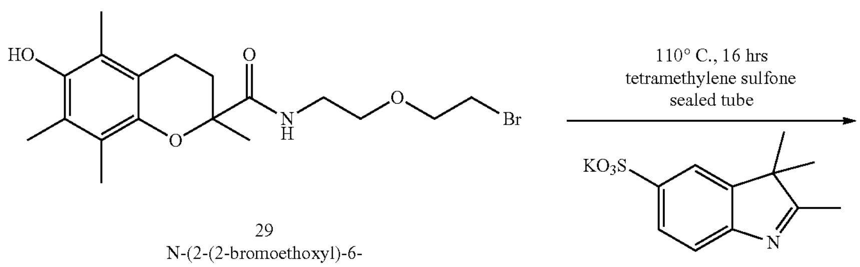
29
N-(2-(2-bromoethoxyl)-6-hydroxy-2,5,7,8-tetramethylchroman-2-carboxamide
4
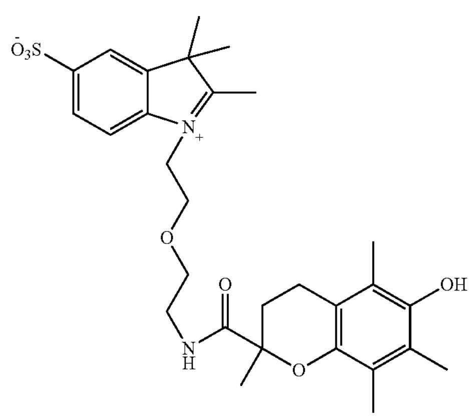
30
1-(2-(2-(6-hydroxy-2,5,7,8-tertramethylchroman-2-carboxamido)ethoxy)ethyl)-2,3,3-trimethyl-3H-indol-1-ium-5-sulfonate -continued

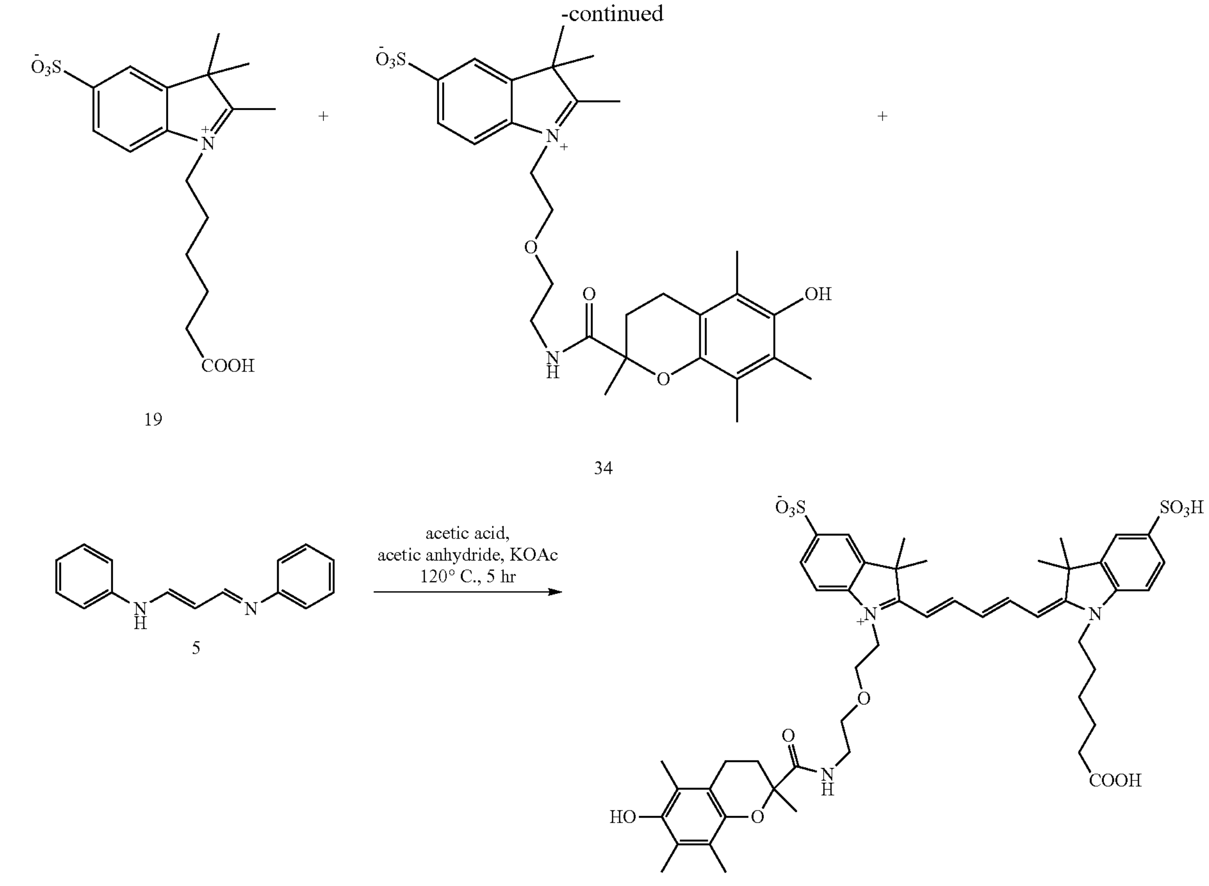

19 34 5

35
Cy5-diglycol-Trolox-COOH
2-((1E,3E,5E)-5-(1-(5-carboxypentyl)-3,3-dimethyl-5-sulfoindolin-2-ylidene)penta-1,3-dien-1-yl)-1-(2-(2 (6-hydroxy-2,5,7,8-tetramethylchroman-2-carboxamido)ethoxy)ethyl)-3,-3-dimethyl-3H-indol-1-ium-5-sulfonate Detailed Procedures

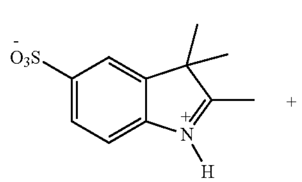

4

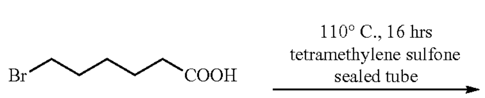

18

-continued

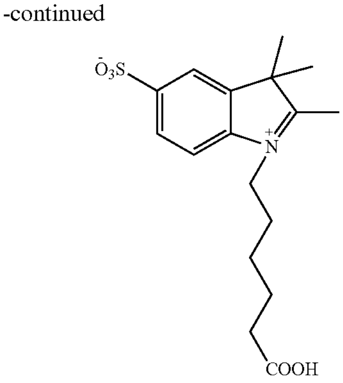

19

1 g of 2,3,3-trimethylindolenium-5-sulfonic potassium salt and 6-bromo-hexanoic acid were mixed with 2 mL of tetramethylene sulfone. The reaction mixture was added to a degassed sealed tube and heated to 110° C. for 16 hrs. Next the reaction mixture was cooled to room temperature and the deep purple solution was poured into 15 mL EtOAc to precipitate the product. The purple solid product 19 was washed by 15 mL×3 EtOAc, and dried. Crude compound 19 was carried onto the next step without further purification.

MASS (ES+) m/z for C17H23NO5S, $[M+1]^+$, Calculated: 354.1, Found: 354.3. m/z for C40H45N3O10S2, $[M-1]^1$ Calculated: 791.3, Found: 791.4.

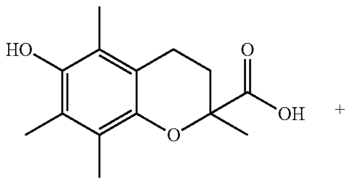

22

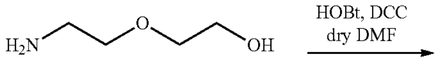

27

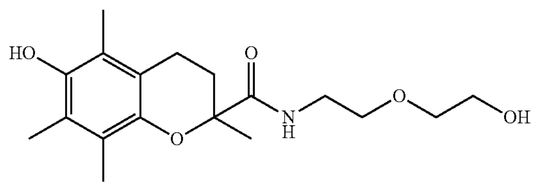

28

In a flask, 2 mL of dry DMF was cooled to 0° C., and 142 mg of Trolox, 60 mg 2-(2-aminoethoxy)ethanol, and 253 mg of HOBt were added. After stirring for 30 mins, 140 mg of DCC in 2 mL DMF was added to the reaction solution slowly. After stirring for 16 hr at RT, the reaction slurry was filtered and the filtrate was concentrated. The residue was purified by column. The product compound 28 after the column still had HOBt mixed, carried onto the next step without further purification.

MASS (ES−) m/z for C18H27NO5, $[M-1]^-$ Calculated: 336.2, Found: 336.4.

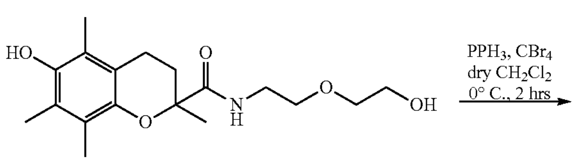

28

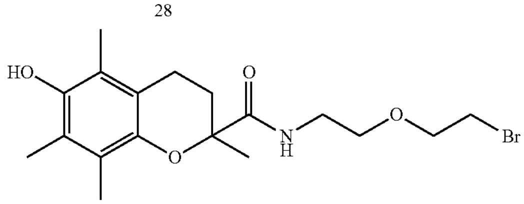

29

A solution of 179 mg of $Ph_3P$ in 20 mL of $CH_2Cl_2$ was added dropwise to an ice-cold solution of 250 mg (HOBt mixed) of compound 28 and 226 mg of carbon tetrabromide in 10 mL of $CH_2Cl_2$. The reaction was monitored by TLC and after 2 hrs the solvent was removed, and the residue was purified by column (1:3 EtOAc/Hexanes) to isolate the pure bromide substituted product 29. 181 mg of compound 29 was obtained as a light yellow oil with a yield of 80%.

MASS (ES+) m/z for C18H26BrNO4, $[M+1]^+$ Calculated: 400.1, Found: 400.3.

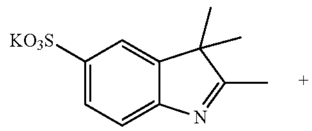

4

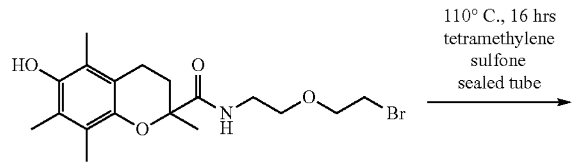

29

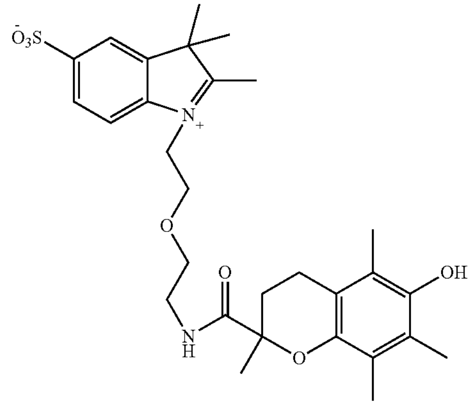

30

250 mg of 2,3,3-trimethylindolenium-5-sulfonic potassium salt and 700 mg of compound 29 were mixed with 2 mL of tetramethylene sulfone. The reaction mixture was added in a degassed sealed tube and heated to 110° C. for 16 hrs. Next the reaction mixture was cooled to room temperature and the deep purple solution was poured into 15 mL EtOAc to precipitate the product. The purple solid product was washed by 15 mL×3 EtOAc, and dried. Crude compound 30 was carried onto the next step without further purification.

MASS (ES+) m/z for C29H38N2O7S, $[M+1]^+$ Calculated: 559.2, Found: 559.7.

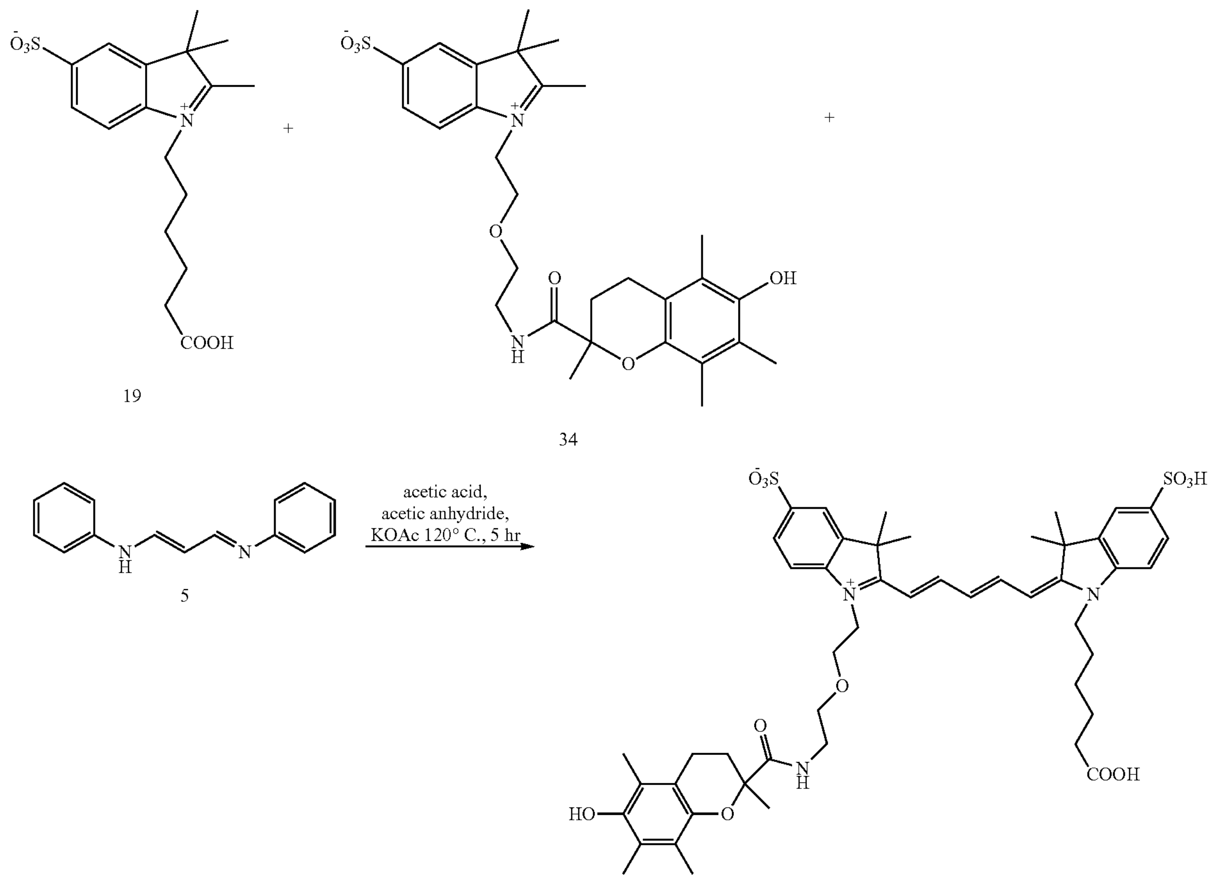

19

34

5

35

72 mg of compound 19, 52 mg of malonaldehyde dianilide hydrochloride, 5 mL acetic acid, and 0.5 mL acetic anhydride were combined in a round bottom flask. The resulting purple solution was heated to 120° C. for 2 hrs, then 100 mg of compound 34 was added to this solution followed by 198 mg of KOAc. The reaction mixture was heated to 120° C. and stirred for another 3 hrs. After the reaction was complete, the reaction mixture was poured into 45 mL of EtOAc to precipitate the crude product as a dark blue solid. The residue was washed 3 more times (40 mL each time) by EtOAc, and dried. The pure Cy5 dye compound 35 was isolated by semi-prep HPLC purification (0.1% formic acid and acetonitrile) as a dark blue solid.

MASS (ES−) m/z for C46H57N3O14S2, $[M-1]^-$ Calculated: 947.4, Found: 947.8.

Protocol 7

Synthesis of Cy5-tetraglycol-Trolox-COOH

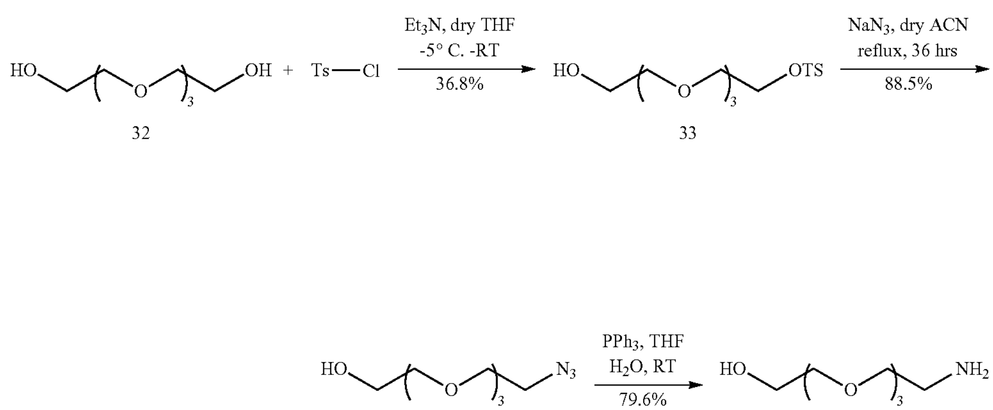

32

33

34

35

-continued
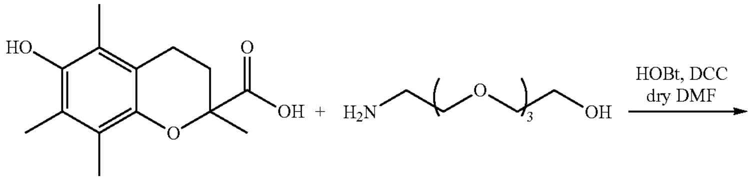
22 35
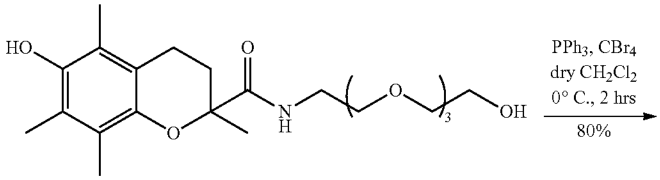
36
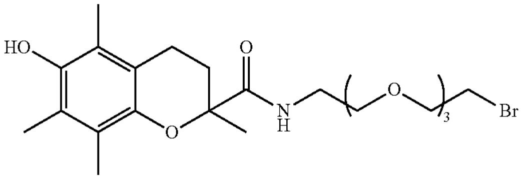
37
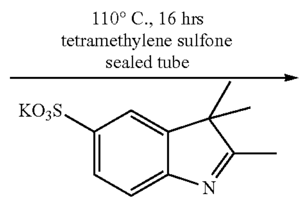
4
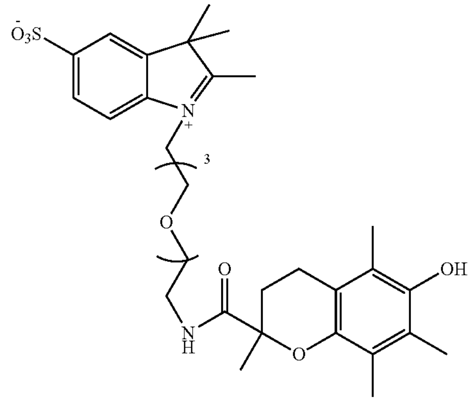
38
1-(1-(6-hydroxy-2,5,7,8-tetramethylchroman-2-yl)-1-oxo-5,8,11-trioxa-2-azatridecan-13-yl)-2,3,3-trimethyl-3H-indol-1-ium-5-sulfonate
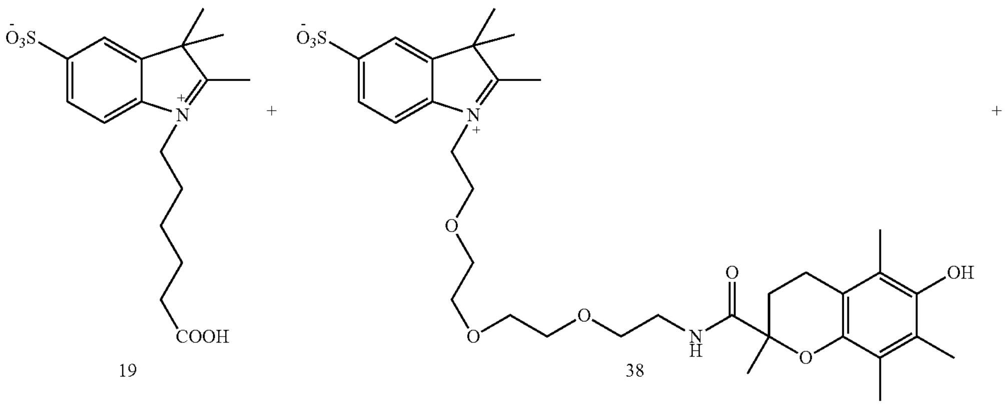
19 38

-continued

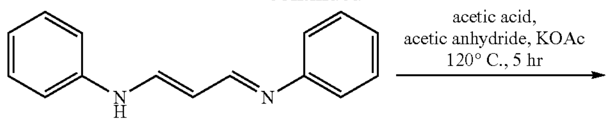

5

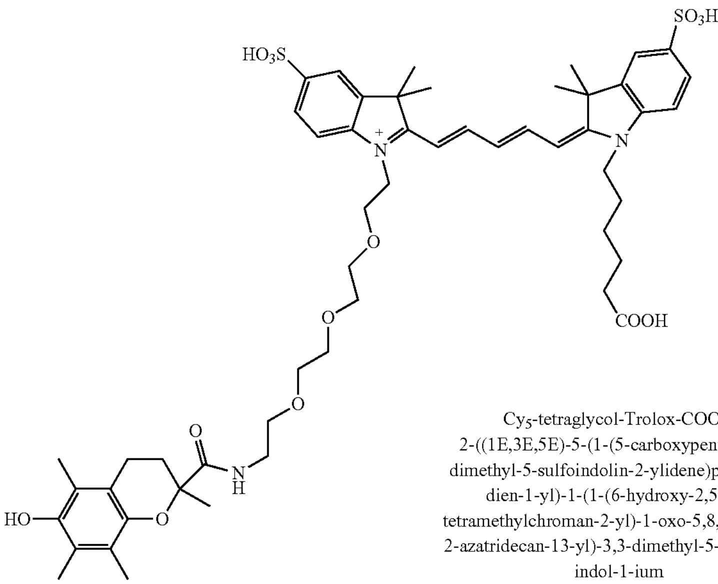

Cy5-tetraglycol-Trolox-COOH
2-((1E,3E,5E)-5-(1-(5-carboxypentyl)-3,3-dimethyl-5-sulfoindolin-2-ylidene)penta-1,3-dien-1-yl)-1-(1-(6-hydroxy-2,5,7,8-tetramethylchroman-2-yl)-1-oxo-5,8,11-trioxa-2-azatridecan-13-yl)-3,3-dimethyl-5-sulfo-3H-indol-1-ium

39

Detailed Procedures

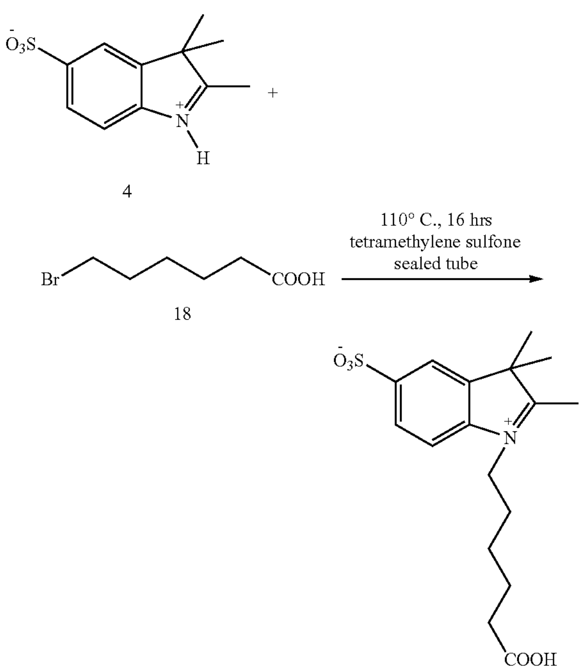

4

18

19

1 g of 2,3,3-trimethylindolenium-5-sulfonic potassium salt and 6-bromo-hexanoic acid were mixed with 2 mL of tetramethylene sulfone. The reaction mixture was added to a degassed sealed tube and heated to 110° C. for 16 hrs. Next the reaction mixture was cooled to room temperature and the deep purple solution was poured into 15 mL EtOAc to precipitate the product. The purple solid product 19 was washed by 15 mL×3 EtOAc, and dried. Crude compound 19 was carried onto the next step without further purification.

MASS (ES+) m/z for C17H23NO5S, $[M+1]^+$, Calculated: 354.1, Found: 354.3.

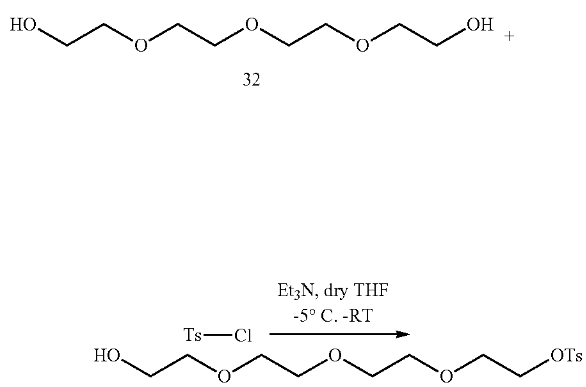

32

33

1.91 g Ts-Cl in 10 mL THF was slowly added to a THF solution of 1.94 g tetraglycol, and 1.01 g triethyl amine cooled to 0° C. The reaction was monitored by TLC. After 5 hrs, the reaction mixture was filtered, the filtrate was concentrated, and the residue was column purified. 1.25 g of compound 33 was obtained as a light yellow thick oil with a yield of 36.8%.

MASS (ES+) m/z for C15H24O7S, $[M+1]^+$ Calculated: 349.1, Found: 349.5.

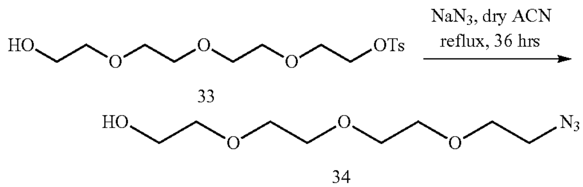

500 mg of Tetraglycol-Ts was dissolved in 15 ml dry acetonitrile and 140 mg of $NaN_3$ was added to the solution. The reaction solution was refluxed for 36 hr, cooled to RT, poured into 20 mL of water, and extracted by $CH_2Cl_2$. The organic layers were combined, concentrated and the residue was purified by silica column. 278 mg of compound 34 was obtained as light yellow oil with a yield of 88.5%.

MASS (ES+) m/z for C8H17N3O4, $[M+1]^+$ Calculated: 220.1, Found: 220.3.

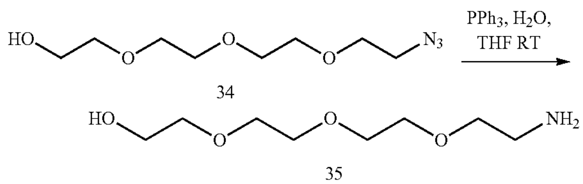

At RT, 278 mg of compound 34, 366 mg $PPh_3$, and 34 mg of water were added to 5 mL THF, and stirred for 4 hrs. Next the solvent was removed and residue was column purified (CHCl3/MeOH/Et3N 3:3:1). 195 mg of product 35 was obtained as light yellow oil, the yield is 79.6%.

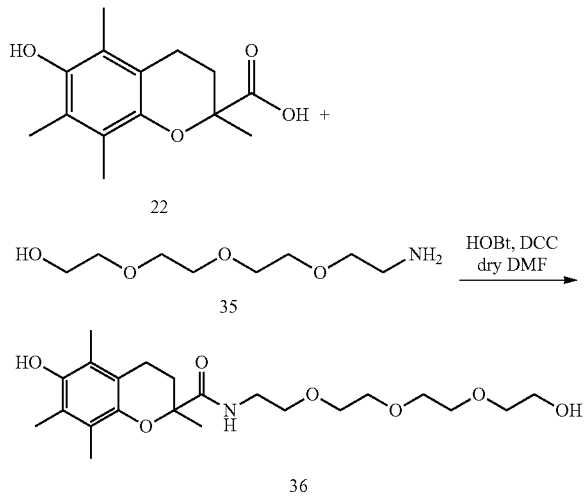

In a flask, 2 mL of dry DMF was cooled to 0° C. and 252 mg of Trolox, 195 mg tetraglycol-NH2, and 450 mg of HOBt were added to chilled DMF. After stirring for 30 mins, 250 mg of DCC in 2 mL DMF was added to the reaction solution slowly. After stirring for 16 hr at RT, the reaction slurry was filtered and the filtrate was concentrated. The residue was purified by column. After the column, the product compound 36 still had residual HOBt and was carried onto the next step without further purification.

MASS (ES+) m/z for C22H35NO7, $[M+1]^+$ Calculated: 426.2, Found: 426.0.

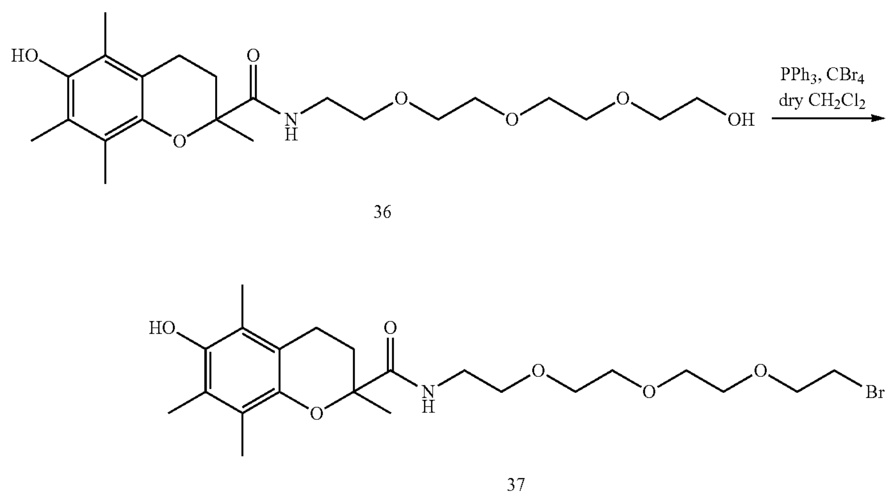

A solution of 260 mg of $Ph_3P$ in 10 mL $CH_2Cl_2$ was added dropwise to an ice-cold solution of 350 mg (with residual HOBt) of compound 36 and 330 mg of carbon tetrabromide in 10 mL of $CH_2Cl_2$. The reaction was monitored by TLC. After 2 hrs, the solvent was removed and the residue was column purified (1:1 EtOAc/Hexanes) to isolate the bromide substituted product 37. 505 mg of crude compound 37 was obtained as light yellow oil, with residual HOBt, and carried onto the next step without further purification.

MASS (ES+) m/z for C22H34BrNO6, $[M+1]^+$ Calculated: 488.2, Found: 488.5.

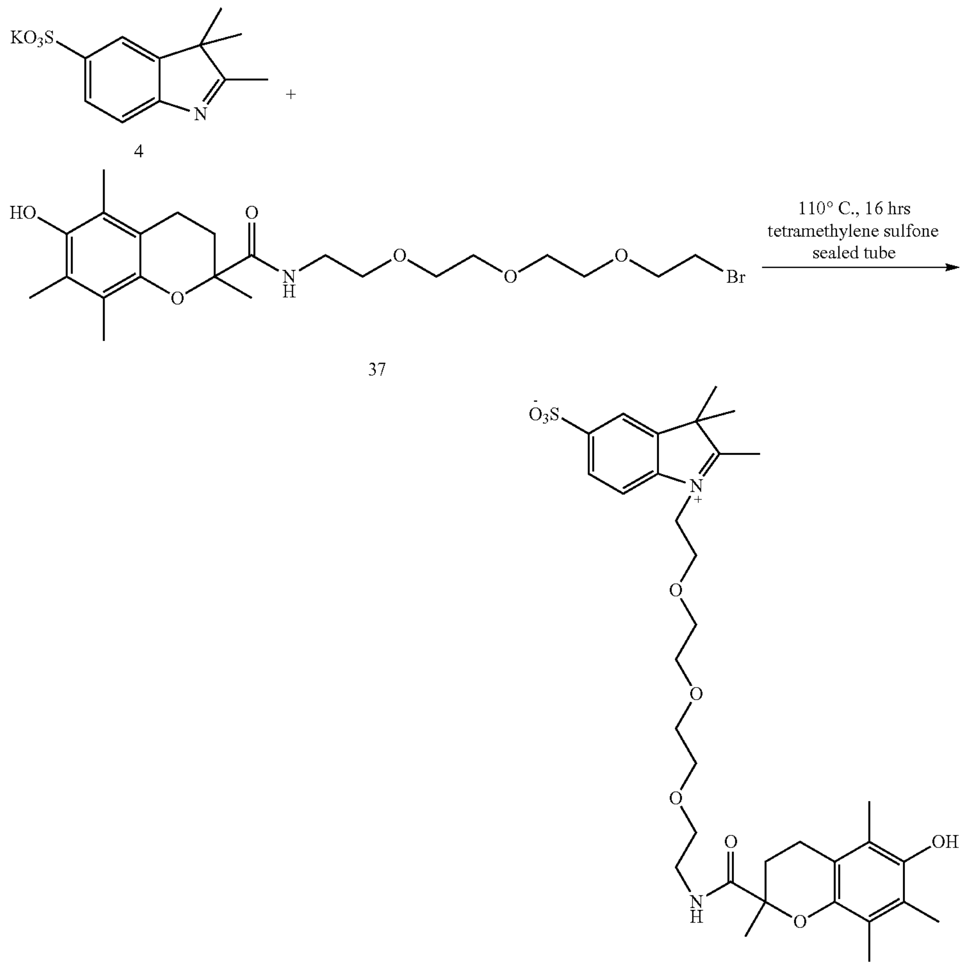

4

37

38

113 mg of 2,3,3-trimethylindolenium-5-sulfonic potassium salt and 300 mg of compound 37 were mixed with 2 mL of tetramethylene sulfone. The reaction mixture was added to a degassed sealed tube and heated to 110° C. for 16 hrs. Next the reaction mixture was cooled to room temperature and the deep purple solution was poured into 15 mL EtOAc to precipitate the product. The purple solid product was washed by 15 mL×3 EtOAc, and dried. Crude compound 38 was carried onto the next step without further purification.

MASS (ES+) m/z for C33H46N2O9S, $[M+1]^+$ Calculated: 647.3, Found: 647.6.

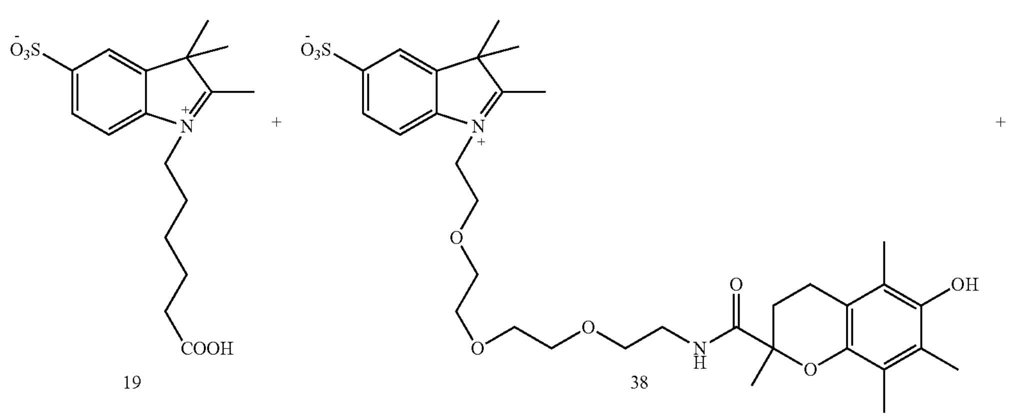

19 38

-continued

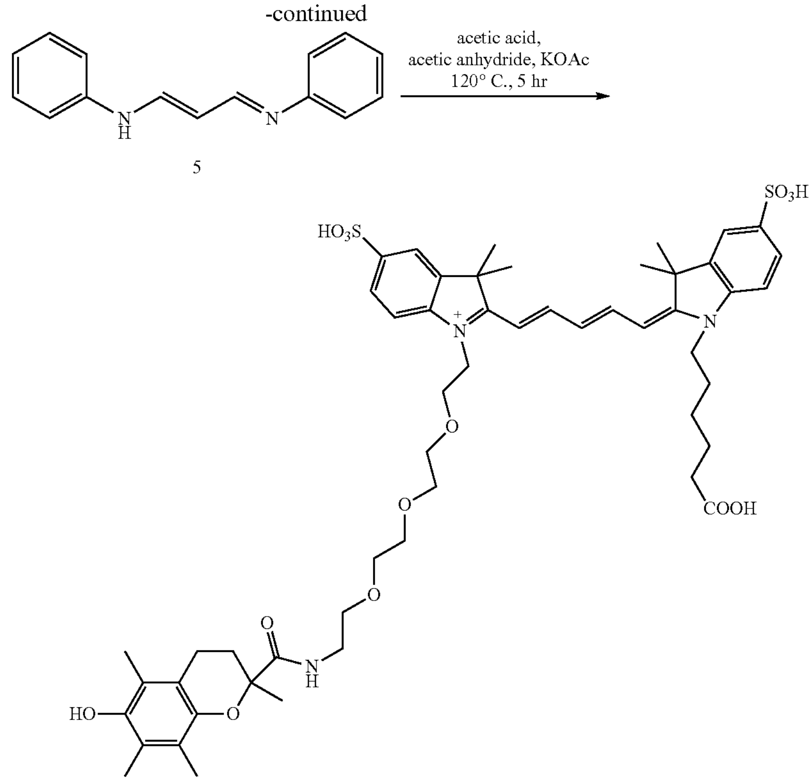

39

In a round bottom flask were added 192 mg of compound 19, 67 mg of malonaldehyde dianilide hydrochloride, 5 mL acetic acid, and 0.5 mL acetic anhydride. The resulting purple solution was heated to 120° C. for 2 hrs, then 157 mg of compound 38 was added to this solution followed by 350 mg of KOAc. The reaction mixture was heated to 120° C. and stirred for another 3 hrs. After the reaction was complete, the reaction mixture was poured into 45 mL of EtOAc to precipitate the crude product as a dark blue solid. The residue was washed 3 more times (40 mL each time) by EtOAc, and dried. The pure Cy5 dye compound 39 was isolated by semi-prep HPLC purification (0.1% formic acid aq. and acetonitrile) as a dark blue solid.

MASS (ES−) m/z for C53H69N3O14S2, $[M-1]^-$ Calculated: 1034.4, Found: 1034.9.

Protocol 8

Synthesis of Cy5-3C-NBA-COOH

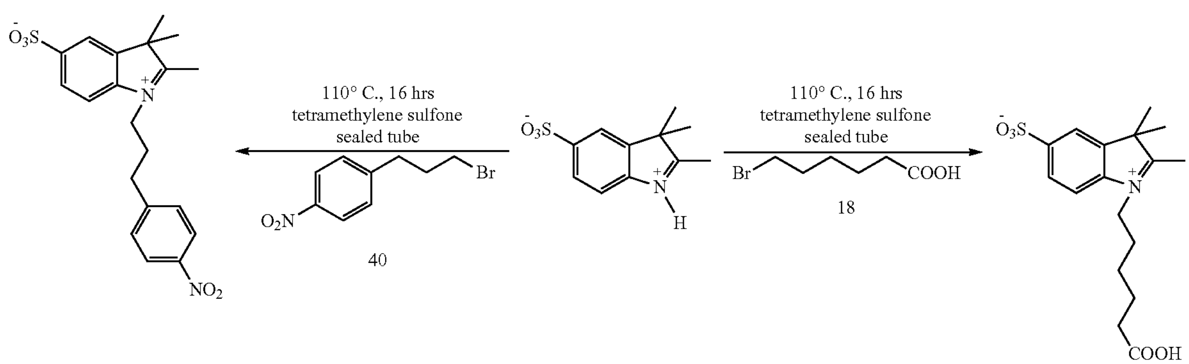

41 4 19

2,3,3-trimethyl-1-(3-(4-nitrophenyl)propyl)-3H-indol-1-ium-5-sulfonate

-continued

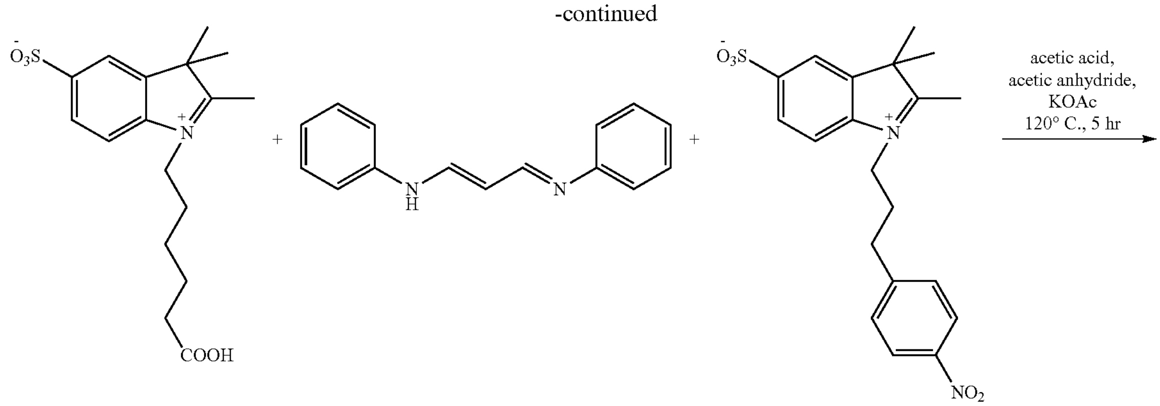

19 5 41

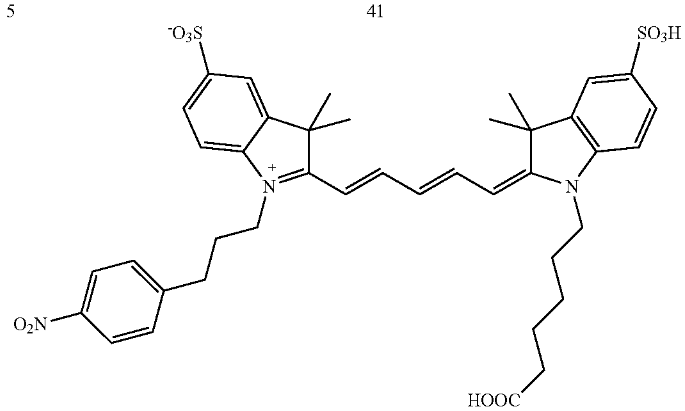

42

Cy5-3C-NBA-COOH
2-((1E,3E,5E)-5-(1-(5-carboxypentyl)-3,3-dimethyl-5-sulfoindolin-2-ylidene)penta-1,3-dien-1-yl)-3,3-dimethyl-1-(3-(4-nitrophenyl)propyl)-3H-indol-1-ium-5-sulfonate Detailed Procedures

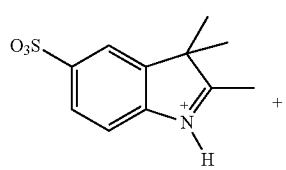

4

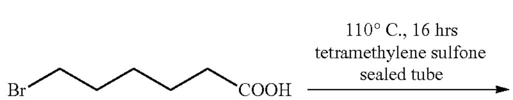

18

-continued

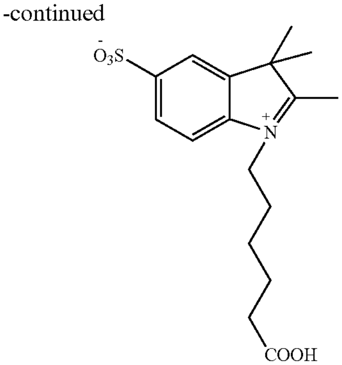

19

1 g of 2,3,3-trimethylindolenium-5-sulfonic potassium salt and 6-bromo-hexanoic acid were mixed with 2 mL of tetramethylene sulfone. The reaction mixture was added to a degassed sealed tube and heated to 110° C. for 16 hrs. Next the reaction mixture was cooled to room temperature and the deep purple solution was poured into 15 mL EtOAc to precipitate the product. The purple solid product 19 was washed by 15 mL×3 EtOAc, and dried. Crude compound 19 was carried onto the next step without further purification.

MASS (ES+) m/z for C17H23NO5S, $[M+1]^+$, Calculated: 354.1, Found: 354.3.

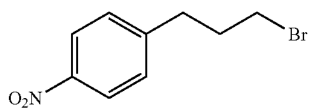

40

Compound was prepared by literature method
J. Org. Chem. 2002, 67(8), 2677-26781

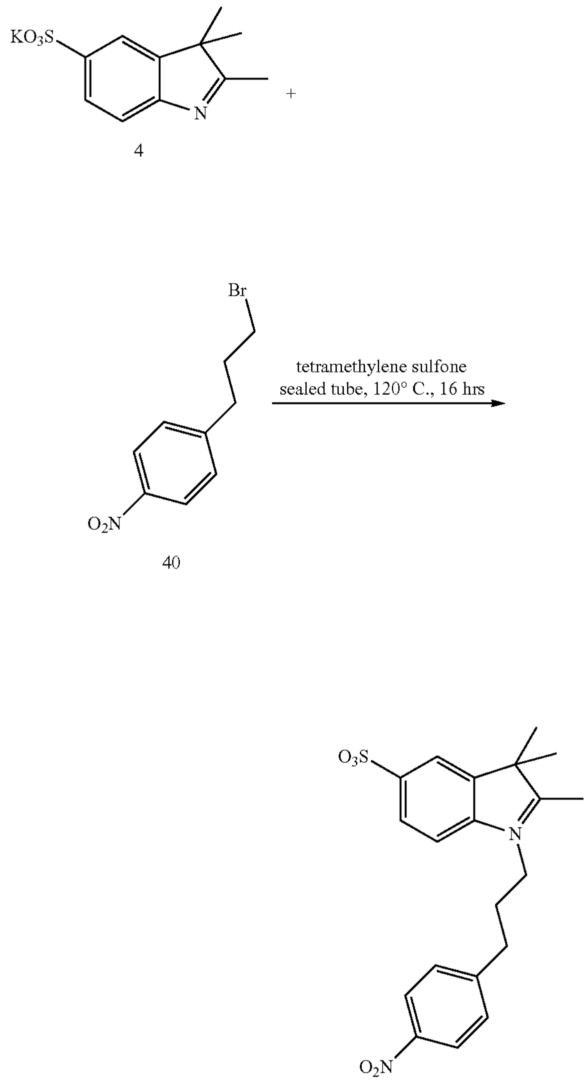

4

40

41

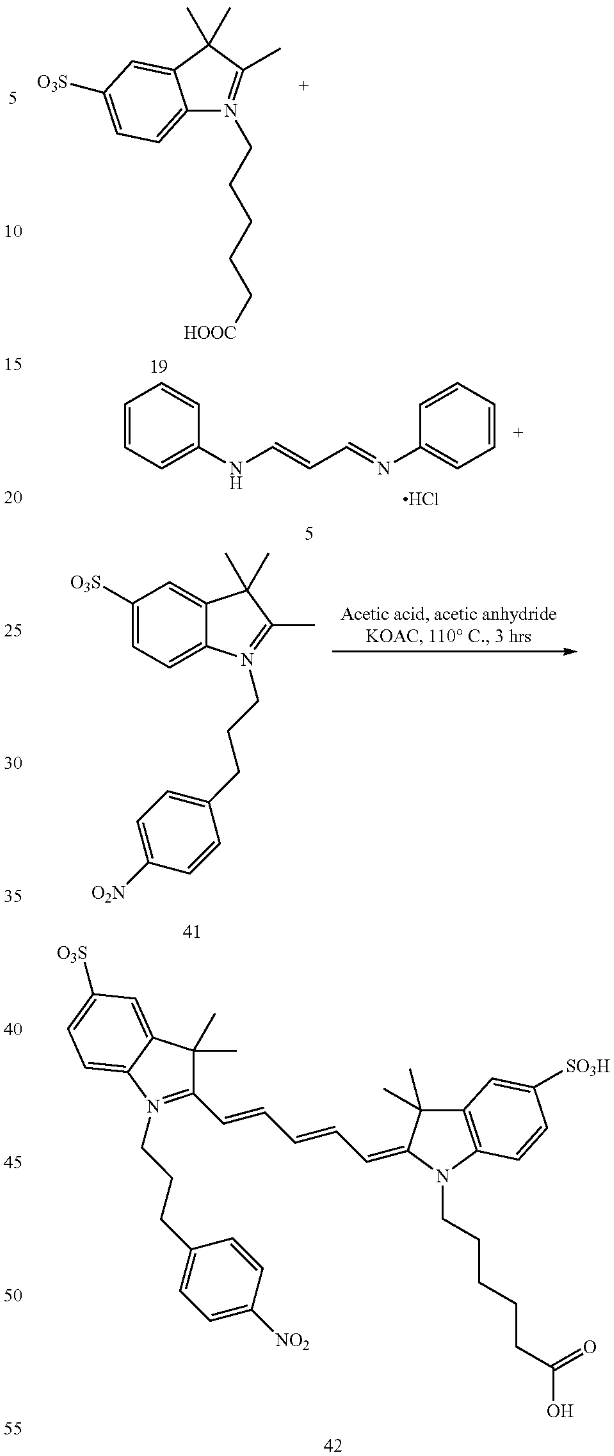

19

5

41

42

277 mg of 2,3,3-trimethylindolenium-5-sulfonic potassium salt and 600 mg of 1-(3-bromopropyl)-4-nitrobenzene were mixed with 2 mL of tetramethylene sulfone. The reaction mixture was added to a degassed sealed tube and heated to 110° C. for 16 hrs. Next the reaction mixture was cooled to room temperature and the deep purple solution was poured into 15 mL of EtOAc to precipitate the product. The purple solid product was washed by 15 mL×3 EtOAc, and dried. Crude compound 41 was carried onto the next step without further purification.

MASS (ES+) m/z for C20H22N2O5S, $[M+1]^+$, Calculated: 403.1, Found: 403.3.

176 mg of compound 19, 129 mg of malonaldehyde dianilide hydrochloride 5, 5 mL acetic acid, and 0.5 mL acetic anhydride were combined in a round bottom flask. The resulting purple solution was heated to 120° C. for 2 hrs, then 200 mg of compound 41 was added to this solution followed by 500 mg of KOAc. The reaction mixture was heated to 120° C. and stirred for another 1.5 hrs. After the reaction was complete, the reaction mixture was poured into 45 mL of EtOAc to precipitate the crude product as a dark green solid. The residue was washed 3 more times (40 mL each time) by EtOAc, and dried. The pure Cy5 dye compound 42 was isolated by semi-prep HPLC purification (25% acetonitrile in 0.1% formic acid aq. to 65% acetonitrile) as a blue solid.

MASS (ES−) m/z for C40H45N3O10S2, $[M-1]^{1}$ Calculated: 791.3, Found: 791.4.

Protocol 9

Synthesis of Cy5-diglycol-NBA-COOH

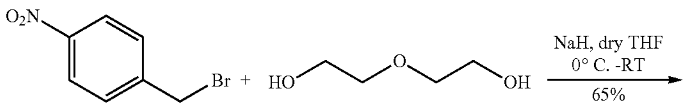

43

1-(bromomethyl)-4-nitrobenzene

44

2,2′-oxydiethanol

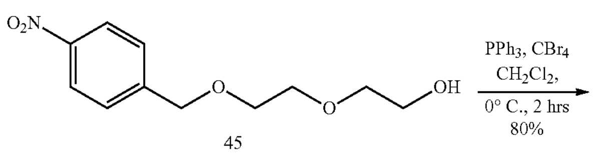

45

2-(2-((4-nitrobenzyl)oxy)ethoxy)ethanol

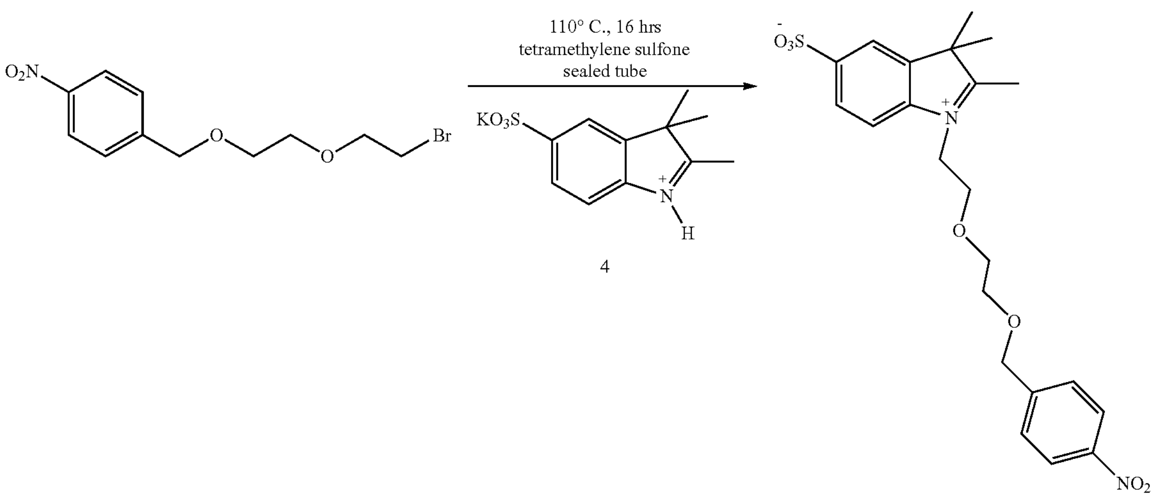

46

1-((2-(2-bromoethoxy)ethoxy)methyl)-4-nitrobenzene

47

2,3,3-trimethyl-1-(2-(2-((4-nitrobenzyl)oxy)ethoxy)ethyl)-3H-indol-1-ium-5-sulfonate -continued
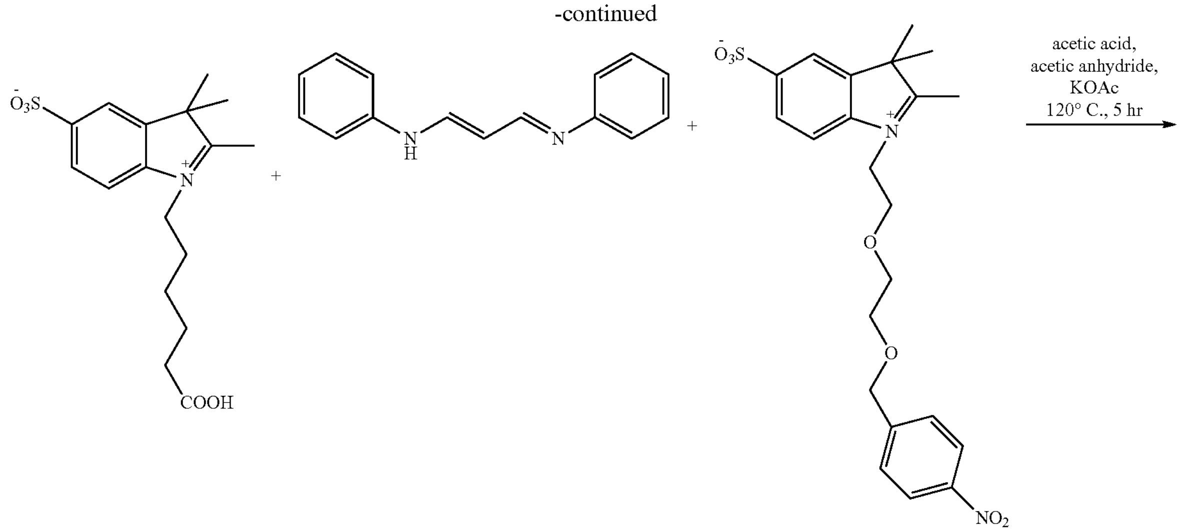
19 5 47
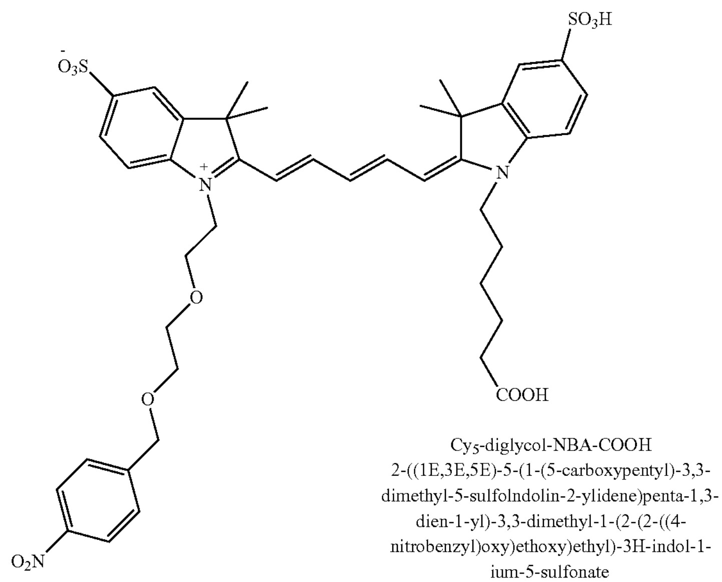
Cy5-diglycol-NBA-COOH
2-((1E,3E,5E)-5-(1-(5-carboxypentyl)-3,3-dimethyl-5-sulfolndolin-2-ylidene)penta-1,3-dien-1-yl)-3,3-dimethyl-1-(2-(2-((4-nitrobenzyl)oxy)ethoxy)ethyl)-3H-indol-1-ium-5-sulfonate
48
Detailed Procedures:
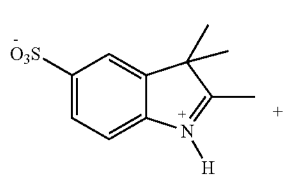
4
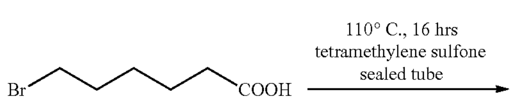
18
-continued
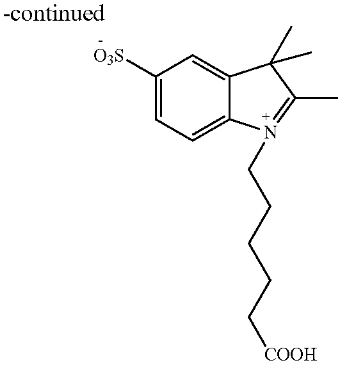
19
1 g of 2,3,3-trimethylindolenium-5-sulfonic potassium salt and 6-bromo-hexanoic acid were mixed with 2 mL of tetramethylene sulfone. The reaction mixture was added to a degassed sealed tube and heated to 110° C. for 16 hrs. Next the reaction mixture was cooled to room temperature and the deep purple solution was poured into 15 mL EtOAc to precipitate the product. The purple solid product 19 was washed by 15 mL×3 EtOAc, and dried. Crude compound 19 was carried onto the next step without further purification.

MASS (ES+) m/z for C17H23NO5S, [M+1]$^+$, Calculated: 354.1, Found: 354.3.

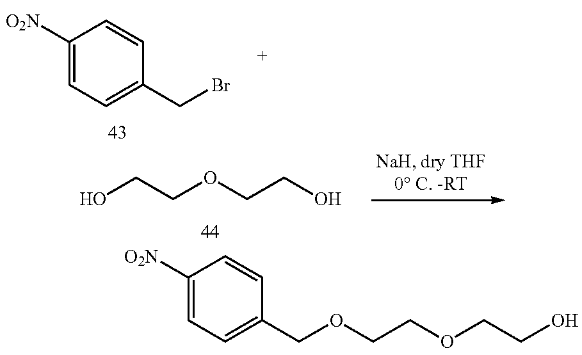

In an Ar protected round bottom flask was taken 288 mg of NaH (80% wt in oil) and 30 mL of dry THF, cooled to 0° C. 1.27 g of diglycol was added, and stirred at 0° C. for 1 hr. Next, 2.16 g of 4-nitrobenzylbromide in 10 mL THF was added slowly at this temperature. The reaction mixture was stirred and allowed to warm up to RT. The reaction was monitored by TLC. After 2 hrs, 1 mL of water was added to quench the reaction, the solvent was removed by vacuum, and the residue was column purified (1:1 EtoAC/Hexanes). 1.6 g of product 45 was isolated as thick light yellow oil with a yield of 65%.

MASS (ES+) m/z for C11H15NO5, [M+1]$^+$ Calculated: 242.1, Found: 242.

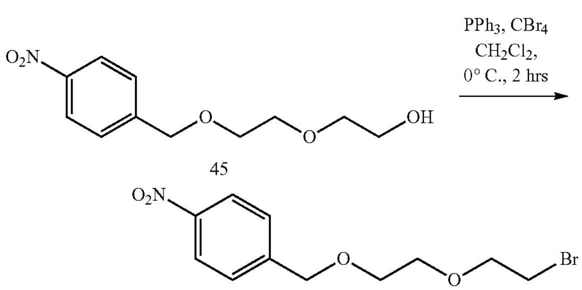

A solution of 2.1 g of $Ph_3P$ in 20 mL of $CH_2Cl_2$ was added dropwise to an ice-cold solution of 1.6 g of compound 45 and 2.6 g of carbon tetrabromide in 10 mL of $CH_2Cl_2$. The reaction was monitored by TLC. After 2 hrs, the solvent was removed, and the residue was column purified (1:1 EtOAc/Hexanes) to isolate the pure bromide substituted product 46. 1.6 g of compound 46 was obtained as a light yellow solid with a yield of 80%

MASS (ES+) m/z for C11H14BrNO4, [M+1]$^+$ Calculated: 304.0, Found: 304.2.

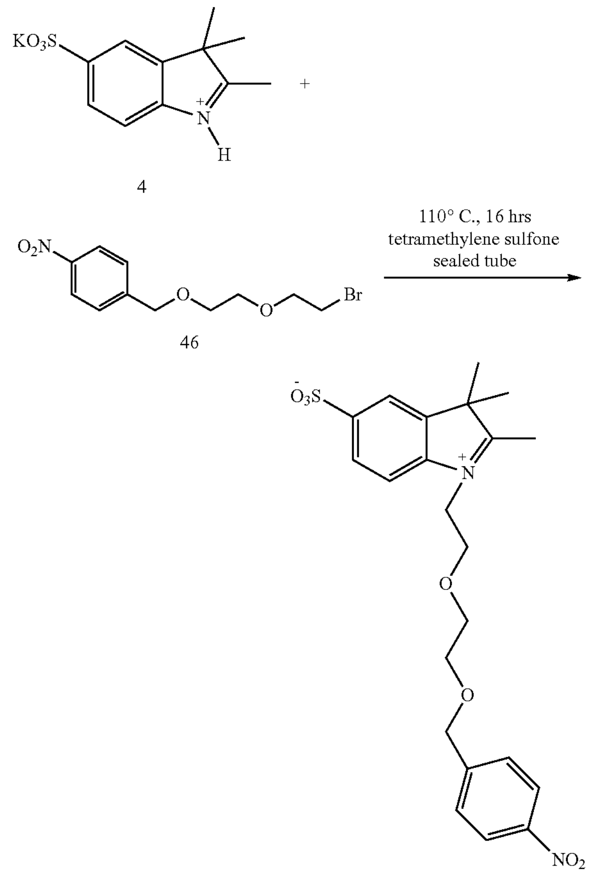

47

300 mg of 2,3,3-trimethylindolenium-5-sulfonic potassium salt and 600 mg of compound 46 were mixed with 2 mL of tetramethylene sulfone. The reaction mixture was added to a degassed sealed tube and heated to 110° C. for 16 hrs. Next the reaction mixture was cooled to room temperature and the deep purple solution was poured into 15 mL EtOAc to precipitate the product. The purple solid product was washed by 15 mL×3 EtOAc, and dried. Crude compound 47 was carried onto the next step without further purification.

MASS (ES+) m/z for C22H26N2O7S, [M+1]$^+$ Calculated: 463.2, Found: 463.5.

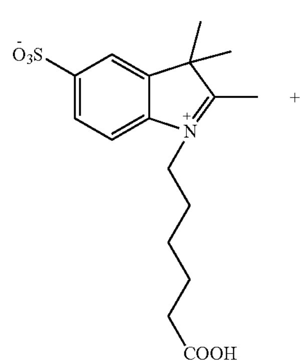

19

-continued

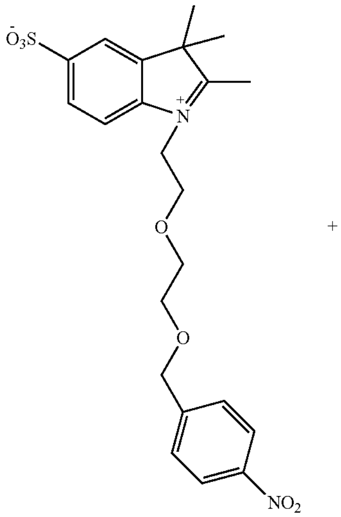

47

-continued

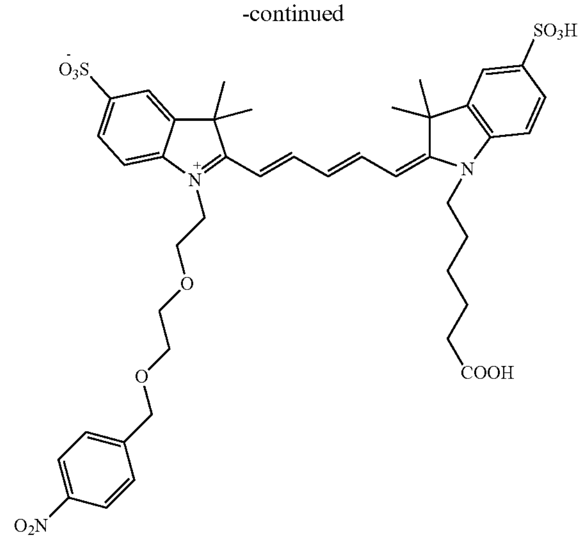

48

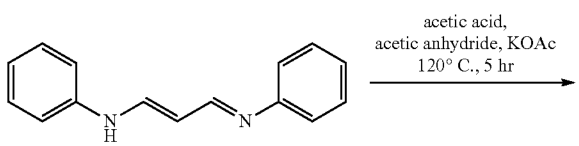

5

229 mg of compound 19, 167 mg of malonaldehyde dianilide hydrochloride, 5 mL acetic acid, and 0.5 mL acetic anhydride were combined in a round bottom flask. The resulting purple solution was heated to 120° C. for 2 hrs. Next, 300 mg of compound 47 was added to this solution followed by 636 mg of KOAc. The reaction mixture was heated to 120° C. and stirred for another 3 hrs. After the reaction was complete, the reaction mixture was poured into 45 mL of EtOAc to precipitate the crude product as a dark blue solid. The residue was washed 3 more times (40 mL each time) by EtOAc, and dried. The pure Cy5 dye compound 48 was isolated by semi-prep HPLC purification (0.1% formic acid aq. and acetonitrile) as a dark blue solid.

MASS (ES+) m/z for C42H49N3O12S2, $[M+1]^+$ Calculated: 852.3, Found: 852.5.

Protocol 10

Synthesis of Cy5-tetraglycol-NBA-COON

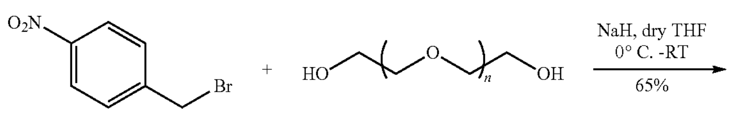

43 n =3
2,2′-((oxybis(ethane-2,1-diyl))bis(oxy))diethanol
49

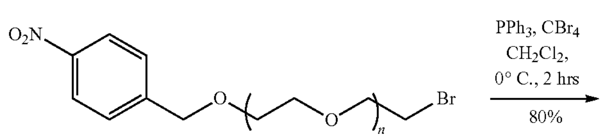

n =3
1-(4-nitrophenyl)-2,5,8,11-tetraoxatridecan-13-ol
50

-continued
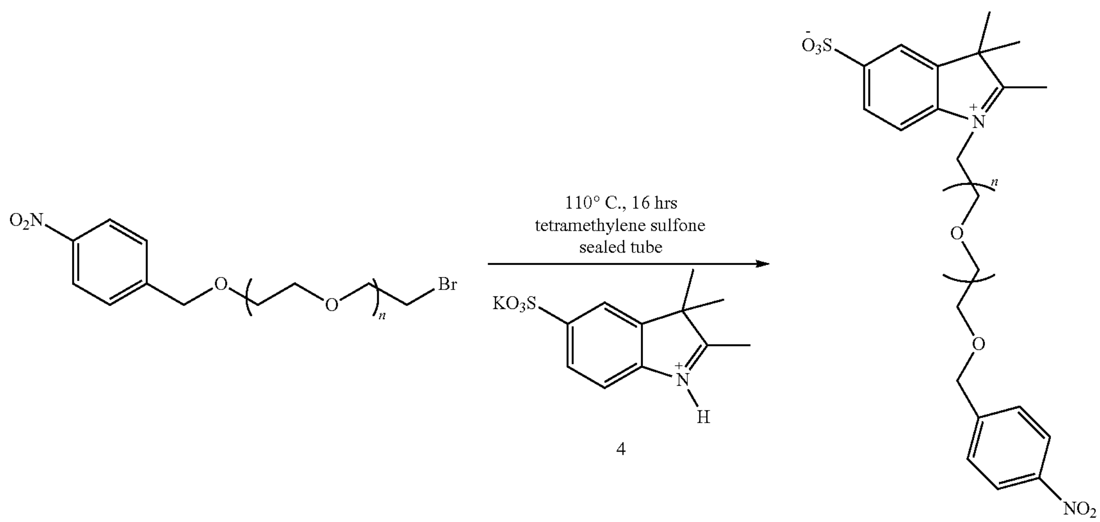
4
n = 3
13-bromo-1-(4-nitrophenyl)-2,5,8,11-tetraoxatridecane
51
n = 3
2,3,3-trimethyl-1-(1-(4-nitrophenyl)-2,5,8,11-tetraoxatridecan-13-yl)-3H-indol-1-ium-5-sulfonate
52
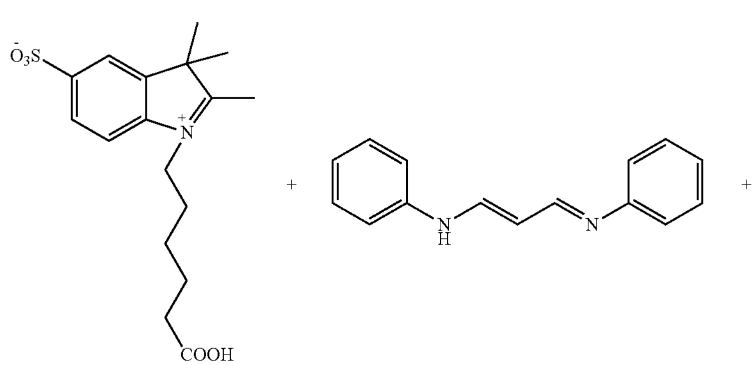
19
5

-continued

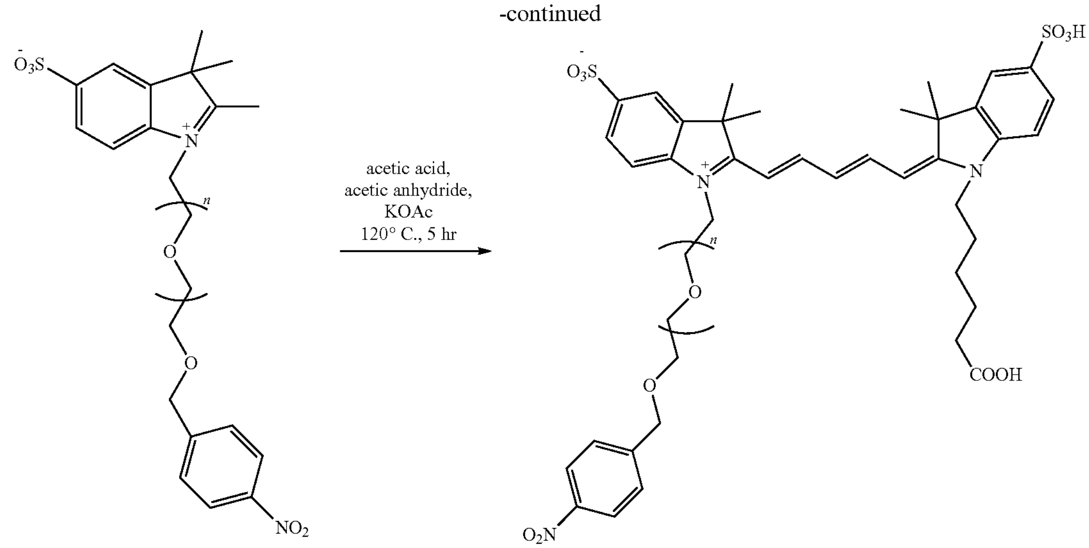

n =3
52 n =3
53
Cy5—NBA-tetraglycol-COOH
2-((1E,3E,5E)-5-(1-(5-carboxypentyl)-3-3-dimethyl-5-sulfoindolin-2-ylidene)penta-1,3-dien-1-yl)-3,3-dimethyl-1-(1-(4-nitrophenyl)-2,5,8,11-tetraoxatridecan-13-yl)-3H-indol-1-ium-5-sulfonate Detailed Procedures

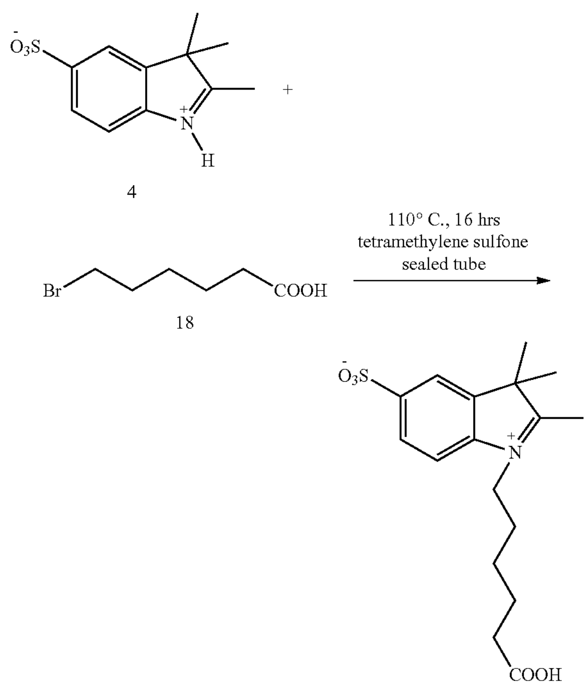

4

18

19

1 g of 2,3,3-trimethylindolenium-5-sulfonic potassium salt and 6-bromo-hexanoic acid were mixed with 2 mL of tetramethylene sulfone. The reaction mixture was added to a degassed sealed tube and heated to 110° C. for 16 hrs. Next the reaction mixture was cooled to room temperature and the deep purple solution was poured into 15 mL EtOAc to precipitate the product. The purple solid product 19 was washed by 15 mL×3 EtOAc, and dried. Crude compound 19 was carried onto the next step without further purification.

MASS (ES+) m/z for C17H23NO5S, $[M+1]^+$, Calculated: 354.1, Found: 354.3.

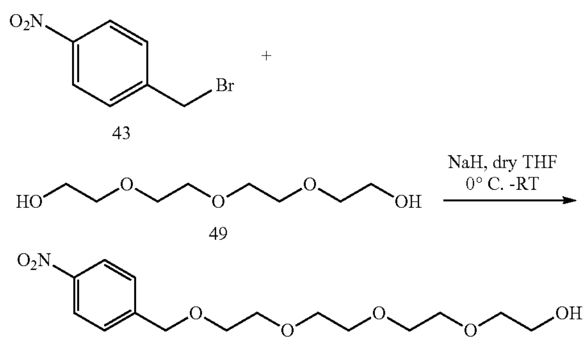

43

49

50

In an Ar protected round bottom flask was taken 360 mg of NaH (80% wt in oil) and 30 mL of dry THF and cooled to 0° C. 2.32 g of tetraglycol was added, and stirred at 0° C. for 1 hr. Next 2.16 g of 4-nitrobenzylbromide in 10 mL THF was added slowly at this temperature. The reaction mixture was stirred and allowed to warm up to RT; the reaction was monitored by TLC. After 2 hrs, 1 mL of water was added to quench the reaction, the solvent was removed by vacuum, and the residue was column purified (1:1 EtoAC/Hexanes). 1.0 g of product 50 was isolated as thick grey oil with a yield of 30.3%.

MASS (ES+) m/z for C15H23NO7, $[M+1]^+$ Calculated: 330.2, Found: 330.4.

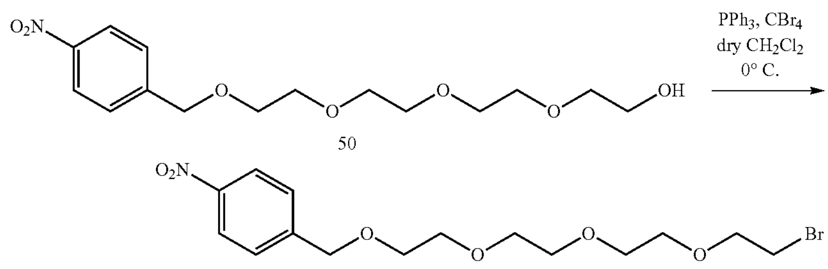

50

51

A solution of 1.1 g of $Ph_3P$ in 20 mL of $CH_2Cl_2$ was added dropwise to an ice-cold solution of 1.0 g of compound 50 and 1.4 g of carbon tetrabromide in 10 mL of $CH_2Cl_2$. The reaction was monitored by TLC. After 2 hrs, the solvent was removed, and the residue was column purified (1:3 EtOAc/Hexanes) to isolate the pure bromide substituted product 51. 1.6 g of compound 51 was obtained as a light yellow solid with a yield of 92%

MASS (ES+) m/z for C15H22BrNO6, $[M+1]^+$ Calculated: 392.1, Found: 392.4.

250 mg of 2,3,3-trimethylindolenium-5-sulfonic potassium salt and 700 mg of compound 51 were mixed with 2 mL of tetramethylene sulfone. The reaction mixture was added to a degassed sealed tube and heated to 110° C. for 16 hrs. Next the reaction mixture was cooled to room temperature and the deep purple solution was poured into 15 mL EtOAc to precipitate the product. The purple solid product was washed by 15 mL×3 EtOAc, and dried. Crude compound 52 was carried onto the next step without further purification.

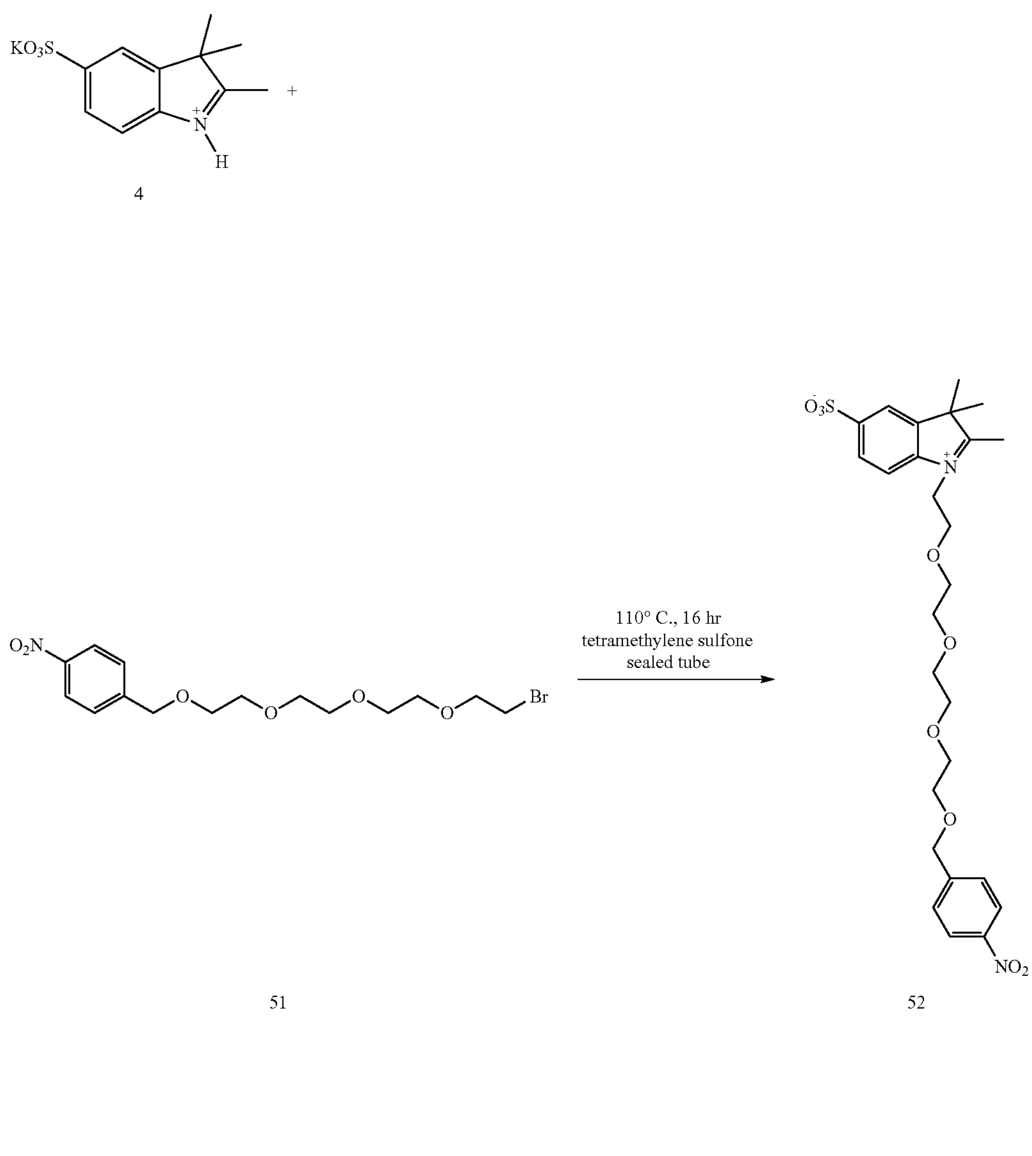

4

51

52

MASS (ES−) m/z for C26H34N2O9S, $[M-1]^-$ Calculated: 549.2, Found: 549.7.

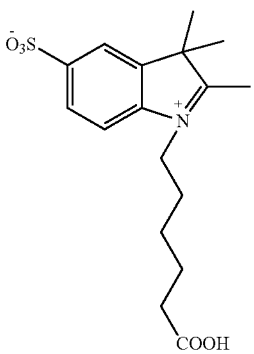

19

+

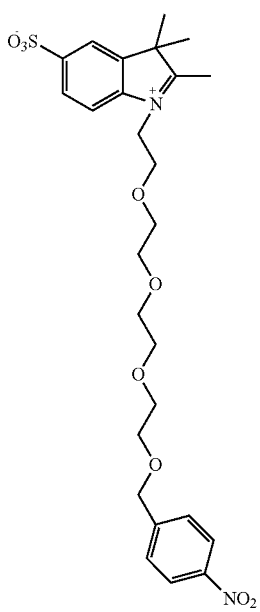

52

+

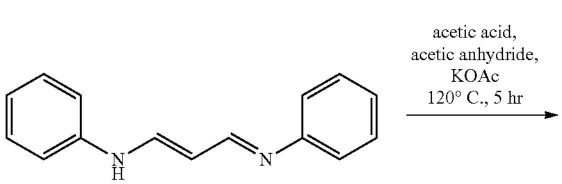

5

-continued

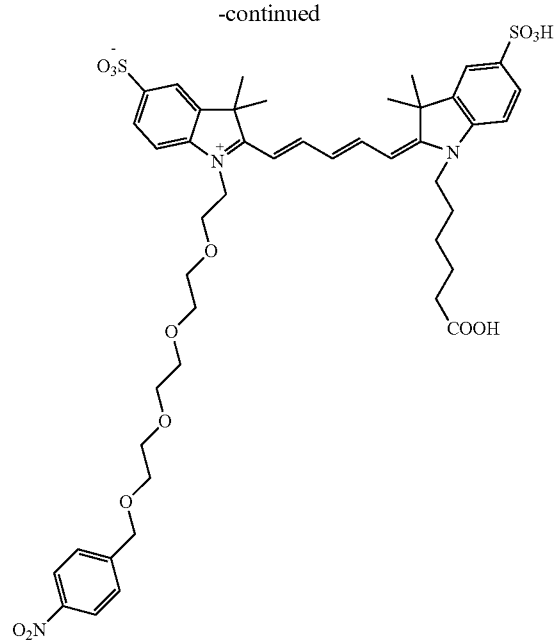

53

130 mg of compound 19, 94 mg of malonaldehyde dianilide hydrochloride, 5 mL acetic acid, 0.5 mL acetic anhydride were combined in a round bottom flask. The resulting purple solution was heated to 120° C. for 2 hrs. Next, 200 mg of compound 52 was added to this solution followed by 356 mg of KOAc. The reaction mixture was heated to 120° C. and stirred for another 3 hrs. After the reaction was complete, the reaction mixture was poured into 45 mL of EtOAc to precipitate the crude product as a dark blue solid. The residue was washed 3 more times (40 mL each time) by EtOAc, and dried. The pure Cy5 dye compound 53 was isolated by semi-prep HPLC purification (0.1% formic acid aq. And actonitrile) as a dark blue solid.

MASS (ES−) m/z for C46H57N3O14S2, $[M-1]^-$ Calculated: 938.3, Found: 938.1.

Protocol 11

General Procedure for Purification of Crude Dye

Crude fluorophore was purified using a semipreparative HPLC C18 T3 column (Waters) with a 0.1% formic acid mobile phase in a gradient from 25 (0 min) □65% (25 mins) acetonitrile, with a flow rate 20 mL/min.

1. For each individual HPLC run, 30 mg of dry crude dye material was dissolved in 1 mL of 25% acetonitrile aq. solution as the injection sample
2. Purified by T3 column, for Cy5 derivatives, the HPLC was monitored with 650 nm and 220 nm absorbance; (for Cy3: 550 nm, 250 nm, Cy7: 750 nm, 250 nm.)
3. During the first run, each dye peak was checked by LC-MS to locate the product
4. Product fractions were combined and rotary evaporated to get dry product (done in dim light).

Protocol 12

NHS Activated Dye Synthesis and Purification

Synthesis

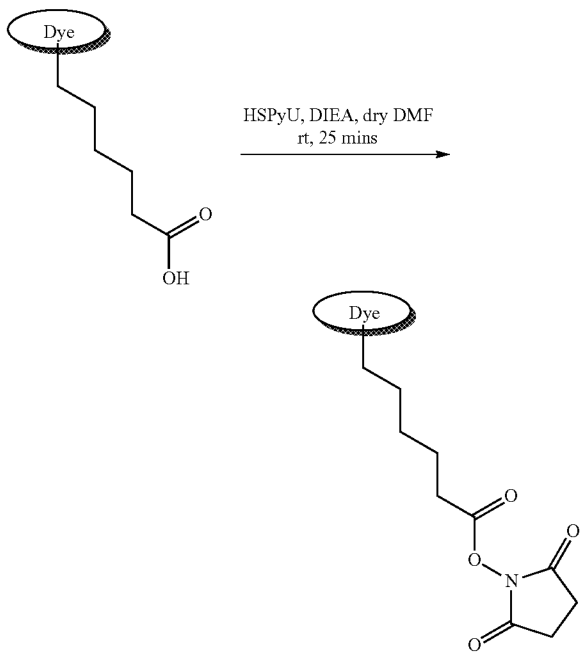

In a 5 mL flask, 1-5 mg of dye-COOH was dissolved in 1 mL of dry DMF, and then 5 eq. of HSPyU and 10 eq. of DIEA were added at RT. The reaction was monitored by LC-MS, which is complete in 25 mins. Next the reaction solution was poured into 15 mL EtOAc to precipitate the product and centrifuged. The crude solid product was washed 3 more times by EtOAc, centrifuged, and dried by vacuum.

Purification

Crude NHS activated fluorophore was purified using a semipreparative HPLC C18 T3 column (Waters) with a 0.1% formic acid mobile phase in a gradient from 25 (0 min)–65% (25 mins) acetonitrile with a flow rate 20 mL/min.

1. For each individual HPLC run, dry crude dye material was dissolved in 800 μL of 25% acetonitrile aq. solution and 200 μL of Formic Acid (to prevent hydrolysis) as the injection sample.
2. Purified by T3 column, for Cy5 derivatives, the HPLC was monitored at 650 nm and 220 nm absorbance.
3. During the first run, each dye peak was checked by LC-MS to locate the product
4. Product fractions were combined and rotary evaporated to remove acetonitrile
5. The resulting aq. solution was loaded onto a sep-pak to remove water and any remaining salt
6. The pure product was eluted from the sep-pak by MeOH
7. The product MeOH solution was then aliquoted into eppendorf tubes and speed-vaced to remove MeOH
8. After 20 mins, 50 μL of EtOH was added to each tube, then speed-vaced to yield dry product.

Protocol 13

Maleimide Activated Dye Synthesis and Purification

Synthesis

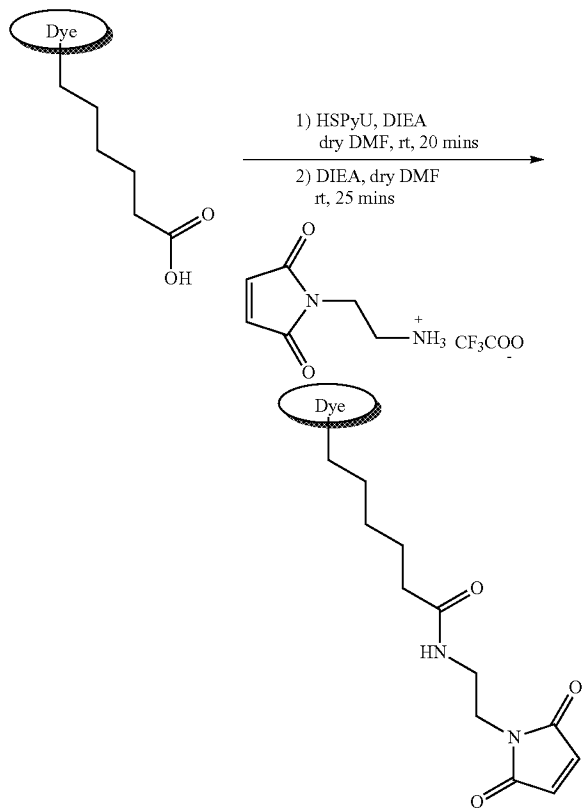

In a 5 mL flask, 1-5 mg of dye-COOH was dissolved in 1 mL of dry DMF, and then 5 eq. of HSPyU and 10 eq. of DIEA were added at RT. The reaction was monitored by LC-MS, which is complete in 25 mins. Then the reaction solution was quenched by 10 eq. of maleimide-NH2, 10 eq. of DIEA, monitored by LC-MS. The reaction solution was then poured into 15 mL EtOAc to precipitate the product and centrifuged. The crude solid product was washed 3 more times by EtOAc, centrifuged, and dried by vacuum.

Purification

Crude maleimide activated fluorophore was purified using a semipreparative HPLC C18 T3 column (Waters) with a 0.1% formic acid mobile phase in a gradient from 25 (0 min)-65% (25 mins) acetonitrile with a flow rate of 20 mL/min.

1. For each individual HPLC run, dry crude dye material was dissolved in 1 mL of 25% acetonitrile aq. solution as the injection sample
2. Purified by T3 column, for Cy5 derivatives, HPLC was monitored using 650 nm and 220 nm absorbance
3. During the first run, each dye peak was checked by LC-MS to locate the product
4. Product fractions were combined and rotary evaporated to remove acetonitrile
5. The resulting aq. solution was loaded onto a sep-pak to remove water and any remaining salt 6. The pure product was eluted from the sep-pak by MeOH
7. The product MeOH solution was then aliquot into eppendorf tubes and speed-vaced to remove MeOH
8. After 20 mins, 50 uL of EtOH was added to each tube, then speed-vaced to yield dry product.

Protocol 14

Azide Activated Dye Synthesis and Purification

Synthesis

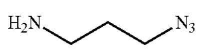

48 compound 48 was prepared by literature method JACS 2004, 126(30), 9152-9153

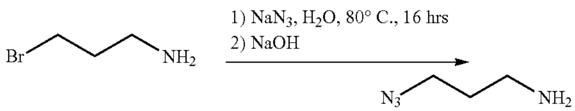

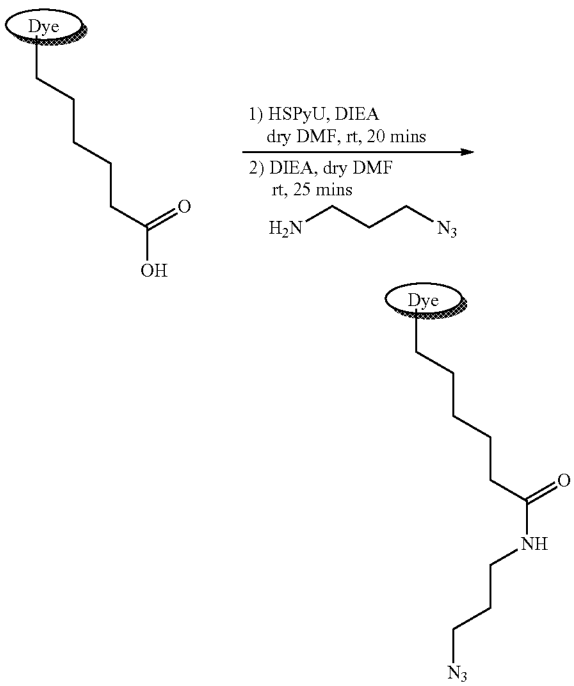

In a 5 mL flask, 1-5 mg of dye-COOH was dissolved in 1 mL of dry DMF, and then 5 eq. of HSPyU and 10 eq. of DIEA were added at RT. The reaction was monitored by LC-MS, which was complete in 25 mins. Next, the reaction solution was quenched by 10 eq. of $N_3$-3C—$NH_2$, 10 eq. of DIEA, and monitored by LC-MS. The reaction solution was then poured into 15 mL of EtOAc to precipitate the product and centrifuged. The crude solid product was washed 3 more times by EtOAc, centrifuged, and dried by vacuum.

Purification

Crude azide activated fluorophore was purified using a semipreparative HPLC C18 T3 column (Waters) with a 0.1% formic acid mobile phase in a gradient from 25 (0 min)-65% (25 mins) acetonitrile with a flow rate 20 mL/min.

1. For each individual HPLC run, dry crude dye material was dissolved in 1 mL of 25% acetonitrile aq. solution as the injection sample 2. Purified by T3 column, for Cy5 derivatives, HPLC was monitored at 650 nm and 220 nm absorbance
3. During the first run, each dye peak was checked by LC-MS to locate the product
4. Product fractions were combined and rotary evaporated to remove acetonitrile
5. The resulting aq. solution was loaded onto a sep-pak to remove water and any remaining salt
6. The pure product was eluted from the sep-pak by MeOH;
7. The product MeOH solution was then aliquoted into eppendorf tubes and speed-vaced to remove MeOH
8. After 20 mins, 50 μL of EtOH was added to each tube, then speed-vaced to yield dry product.

Protocol 15

BG Activated Dye Synthesis and Purification

Synthesis

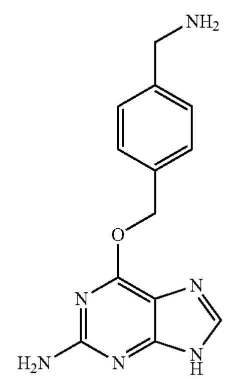

BG-NH2 was prepared by literature method Nature Biotechnol 2003, 21, 86-89

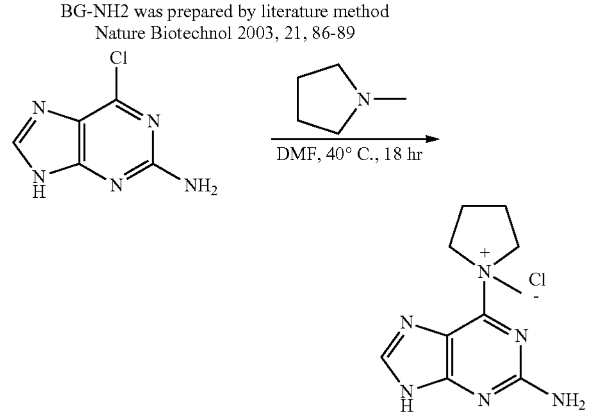

zz-5059
758 mg, 50.5%

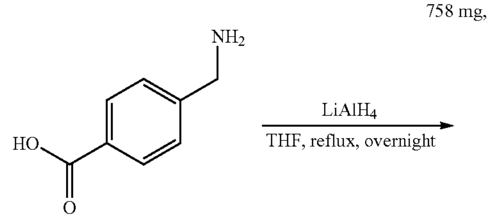

-continued

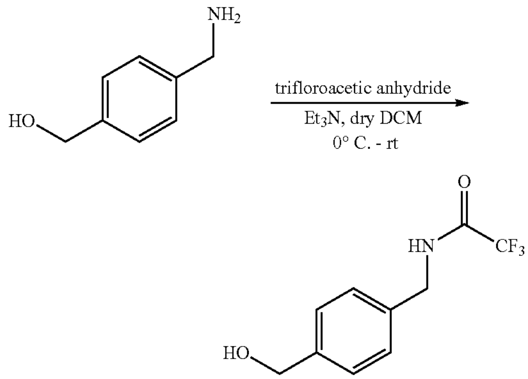

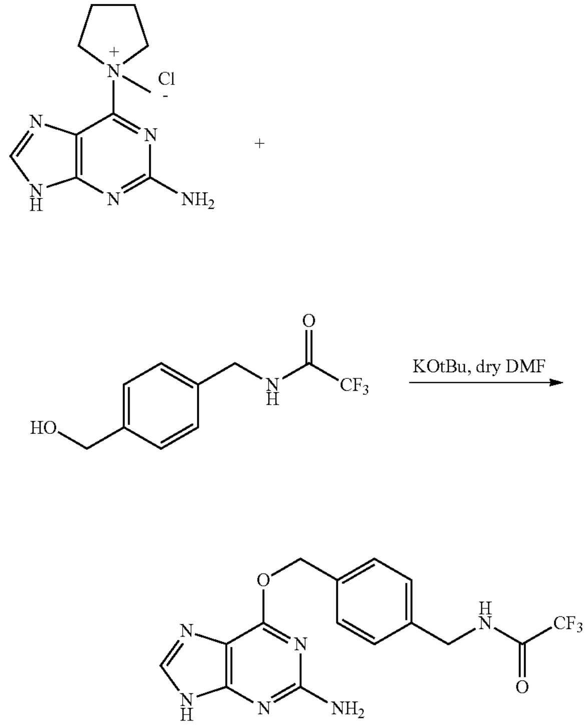

zz-6063
103 mg, 82%

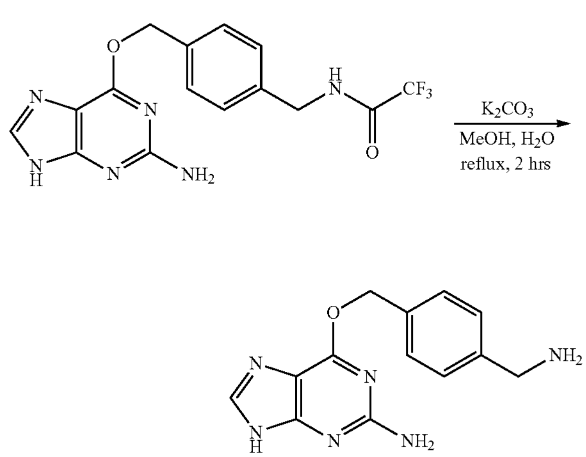

-continued

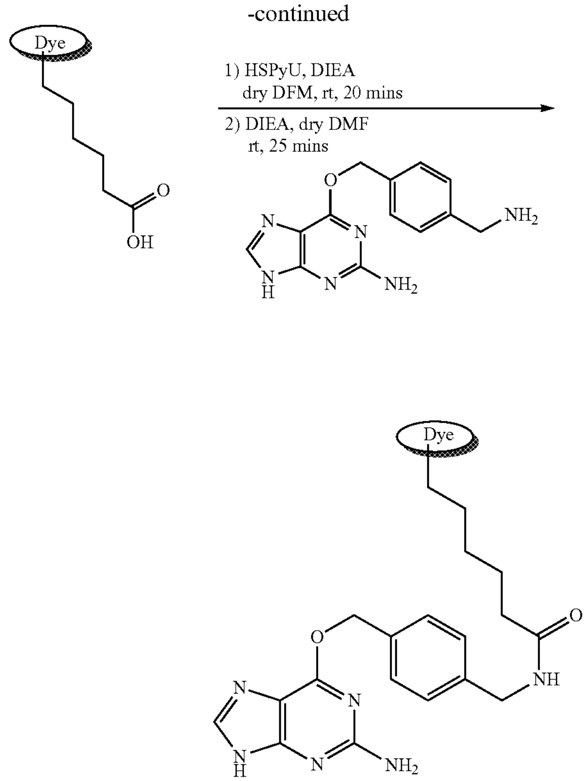

In a 5 mL flask, 1-5 mg of dye-COOH was dissolved in 1 mL of dry DMF, and then 5 eq. of HSPyU and 10 eq. of DIEA were added at RT. The reaction was monitored by LC-MS, which was complete in 25 mins. Next, the reaction solution was quenched by 10 eq. of BG-$NH_2$, 10 eq. of DIEA, and monitored by LC-MS. The reaction solution was then poured into 15 mL EtOAc to precipitate the product and centrifuged. The crude solid product was washed 3 more times by EtOAc, centrifuged, and dried by vacuum.

Purification

Crude BG activated fluorophore was purified using a semipreparative HPLC C18 T3 column (Waters) with a 0.1% formic acid mobile phase in a gradient from 25 (0 min)-65% (25 mins) acetonitrile, at a flow rate of 20 mL/min.

1. For each individual HPLC run, dry crude dye material was dissolved in 1 mL of 25% acetonitrile aq. solution as the injection sample
2. Purified by T3 column, for Cy5 derivatives, HPLC was monitored at 650 nm and 220 nm absorbance
3. During the first run, each dye peak was checked by LC-MS to locate the product
4. Product fractions were combined, and rotary evaporated to remove acetonitrile
5. The resulting aq. solution was loaded onto a sep-pak to remove water and any remaining salt
6. The pure product was eluted from the sep-pak by MeOH
7. The product MeOH solution was then aliquoted into eppendurf tubes and speed-vaced to remove MeOH
8. After 20 mins, 50 μL of EtOH was added to each tube, then speed-vaced to yield dry product.

Protocol 16
Adjusting Linker Length and Composition between Dye and Protective Agent
Some exemplary generic structures for the dyes:
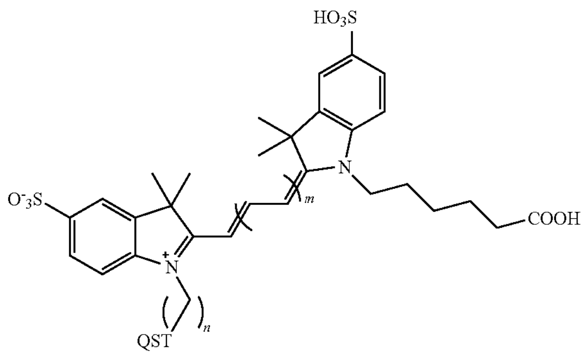
n=1, or n>1
Carbon Chain linker dyes
m=1: Cy3 series
m=2: Cy5 series
m=3: Cy7 series
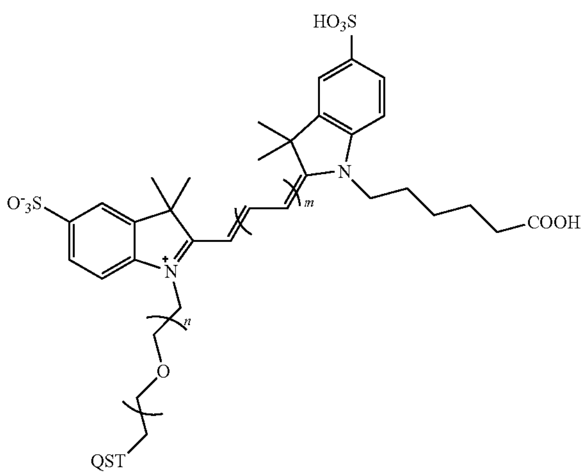
n=1, or n>1
polyglycol linker dyes
m=1: Cy3 series
m=2: Cy5 series
m=3: Cy7 series
Synthetic Route:
1. Carbon Chain linker
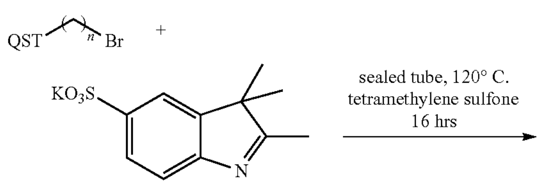
4
-continued
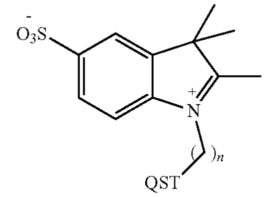
Precursor A
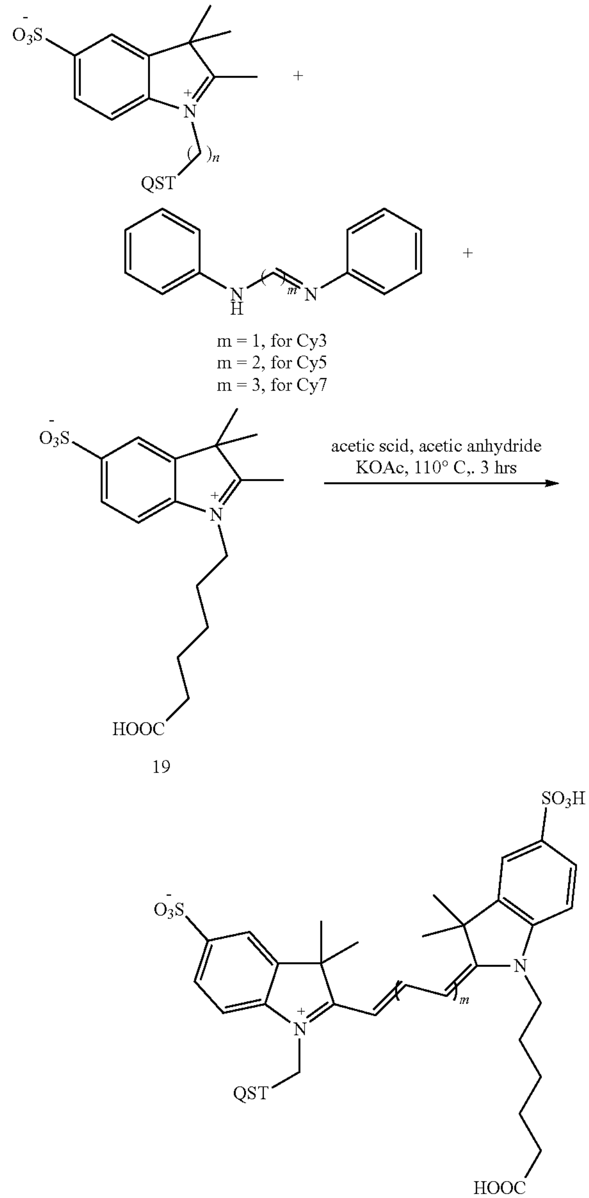
2. Polyglycol linker
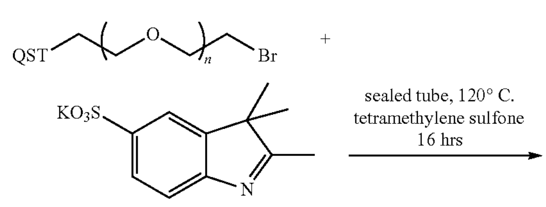
4

-continued

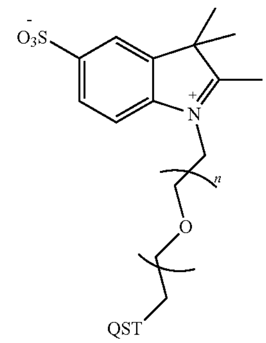

Precursor B

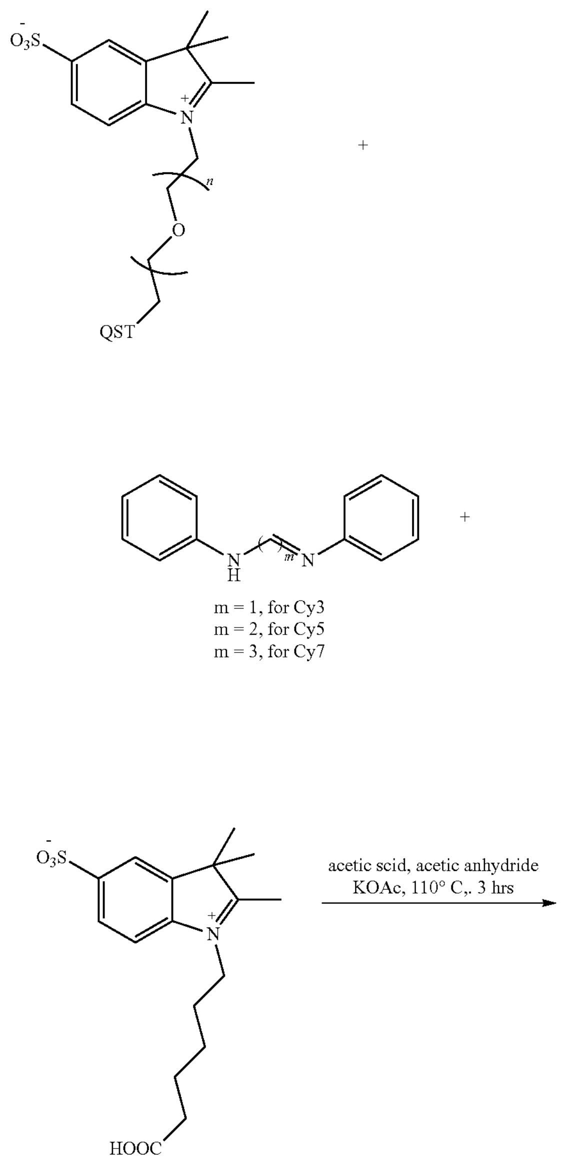

19

-continued

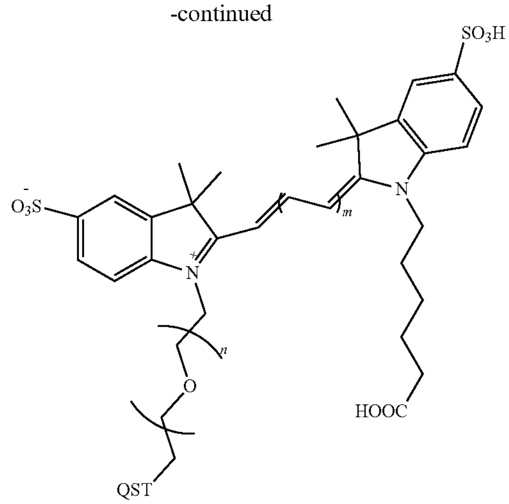

Experimental Data:

A 21-nucleotide DNA was chemically synthesized with a 5'-$C_6$-amino linker for fluorophore linkage and an additional 3'-biotin moiety attached. Each DNA strand was individually labeled with a single, NHS-activated "self-healing" fluorophore and hybridized to a complementary strand. Purified duplexes were used for single-molecule experiments.

All experiments were performed using a laboratory built, prism-based TIRE apparatus. Biotinylated DNA molecules were immobilized via a biotin-streptavidin interaction within microfluidic channels constructed on quartz slides. Fluorescence from surface-immobilized molecules, illuminated via the evanescent wave generated by total internal reflection of a 640 nm laser source, was collected using a water-immersion objective and imaged onto a EMCCD camera. Data were acquired using Metamorph software collecting at a frame rate of 100 $sec^{-1}$.

The photophysical properties of fluorophores were analyzed using automated software built in-house using Matlab. To extract kinetic parameters of blinking and photobleaching, the fluorescence traces were normalized to the mean fluorescence intensity of each dataset and idealized using the SKM algorithm and a 3-state model with one fluorescent (on) state, a transient dark state (blinking) and a permanent dark state (photobleaching). Time on ($\tau_{on}$) was calculated by fitting the cumulative distribution to an exponential function.

Figure 2A:
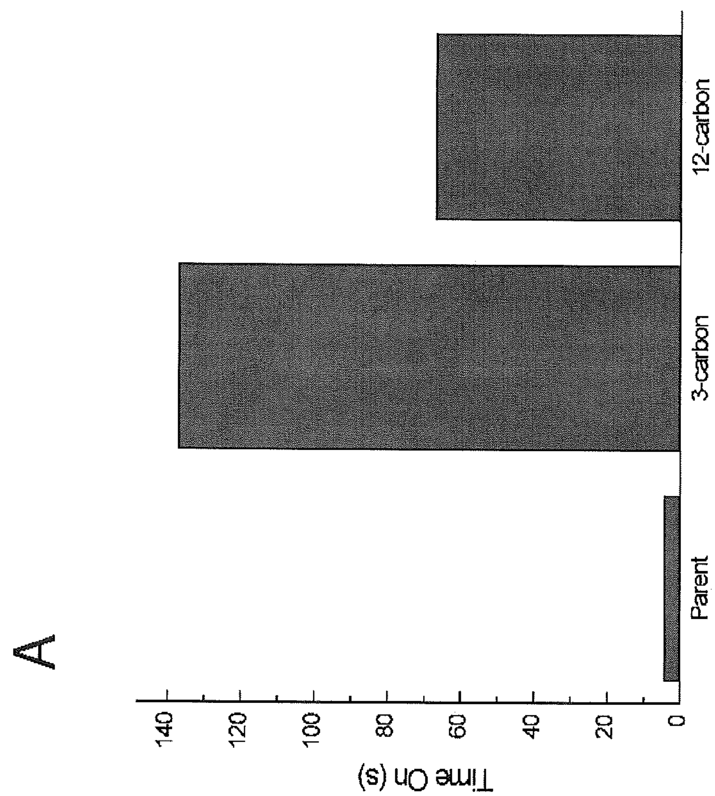
FIGS. 2A-2C. Bar charts showing enhancement of fluorophore photophysical properties for a subset of new compounds. The bar graphs represent average dwell times in the on state (Time On) for each fluorophore as a measurement of photostability. The "self-healing" dyes containing either (A) COT (B) NBA or (C) Trolox covalently linked to the cyanine core molecule exhibited trends in performance that principally varied with respect to linker length.
Figure 2B:
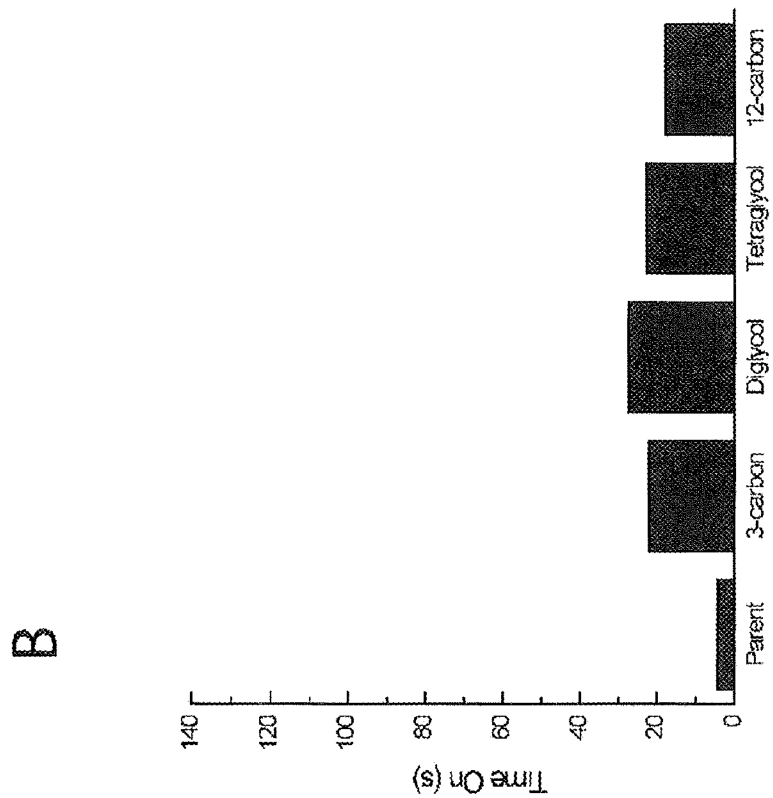
Figure 2C:
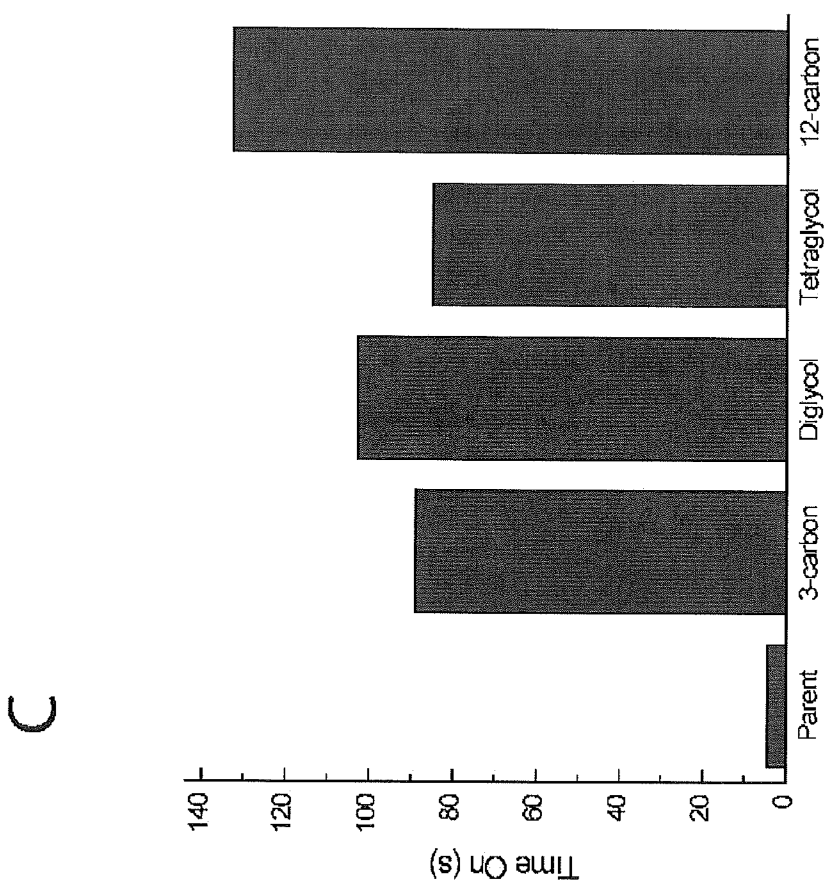

The data is shown in FIG. 2. These data demonstrate that the "self-healing" fluorophores described herein exhibit marked increases in photostability when compared to a commercially available parent compound and that the enhancements observed are distance dependent. Notably, clear and distinct trends can be discerned for each compound that were specific to each PA (COT (FIG. 2A), NBA (FIG. 2B) or Trolox (FIG. 2C)). For specific frequency of "self-healing" dye investigated (most closely matching that of the commercially available Cy5 or AlexaFluor647 dyes) containing COT, the data suggest that increased benefits are achieved the closer the PA is to the fluorogenic center. For "self-healing" dyes containing Trolox, the data suggest that longer distances exhibit the greatest benefits. For NBA, the data suggest that there is an optimum distance for the PA placement. Collectively, the data indicates: 1] COT principally operates through a distinct mechanism from NBA and Trolox in which close proximity is ideal —such findings are consistent with a mechanism in which COT enhances fluorophore performance by quenching the triplet fluorophore via a triplet-triplet energy transfer; 2] the mechanism by which NBA and Trolox enhance fluorophore performance likely has an "ideal" distance for a given fluorophore—such findings are consistent with both molecules operating through a reduction-oxidation type mechanism.

Single-Molecule Fluorescence Measurements Using the Above-Described Dye Compositions Structures of Cy5 derivatives used in this study:

Cy5

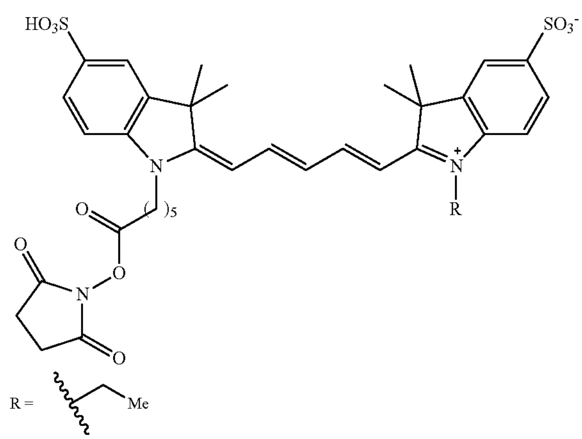

Cy5-COT(3)

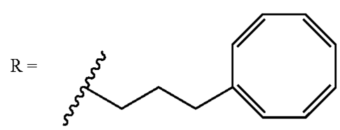

Cy5-COT(13)

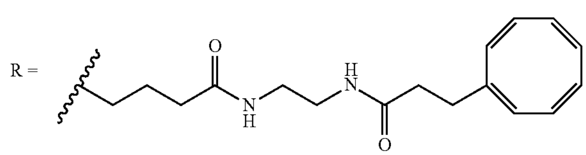

Cy5-NBA(3)

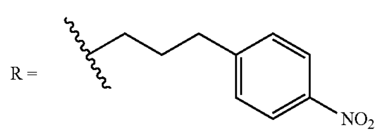

Cy5-Trolox(3)

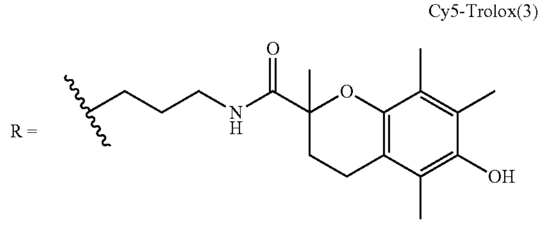

This experiment examined whether enhanced photostability of the Cy5 fluorophore, when covalently linked to protective agents (COT, NBA or Trolox) (Chart 1) can be specifically attributed to a triplet state quenching mechanism using laser flash photolysis (time-resolved transient absorption spectroscopy).

Because the formation of triplet states of Cy5 is inefficient (triplet quantum yield <0.003) upon direct excitation, a triplet sensitizer was employed to more efficiently populate the Cy5 triplet state ($^3$Cy5*) through an energy transfer mechanism (eq 1). Benzophenone (BP) was selected as a sensitizer, because of its high triplet quantum yield and higher triplet energy (289 kJ/mol) (Montalti, M. et al (2006) Handbook of Photochemistry, CRC Press LLC: Boca Raton) compared to Cy5 (154 kJ/mol) (Huang, Z., J. Am. Chem. Soc.: 127, 8064-8066). In addition, BP can be selectively excited at 355 nm, where Cy5 shows negligible absorption.

$$\text{BP} \xrightarrow[\text{(355 nm)}]{h\nu} {}^1\text{BP*} \longrightarrow {}^3\text{BP*} \xrightarrow[\text{-BP}]{+\text{Cy5}} {}^3\text{Cy5*} \tag{1}$$

Figure 3:
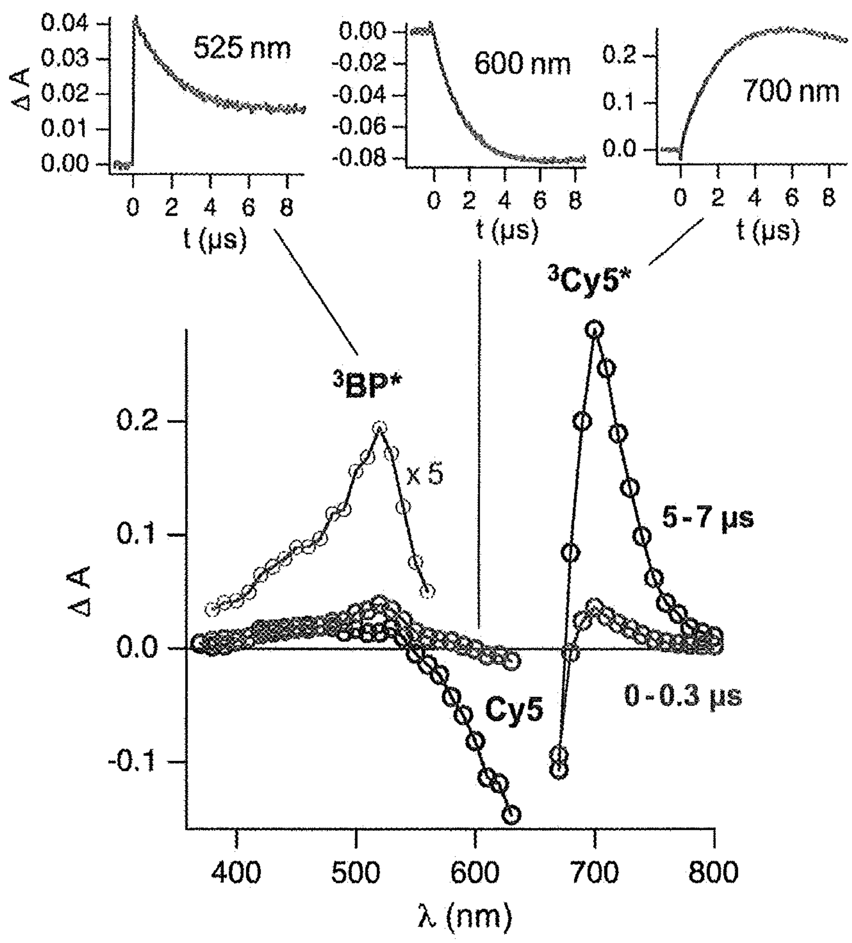
FIG. 3. Transient absorption spectra recorded at different delay times after the laser pulse (355 nm, 5 ns pulse width) of deoxygenated acetonitrile solutions of BP (5 mM) and Cy5 (22 μM). The insets show kinetic traces at different observation wavelength.
Figures 6A, 6B:
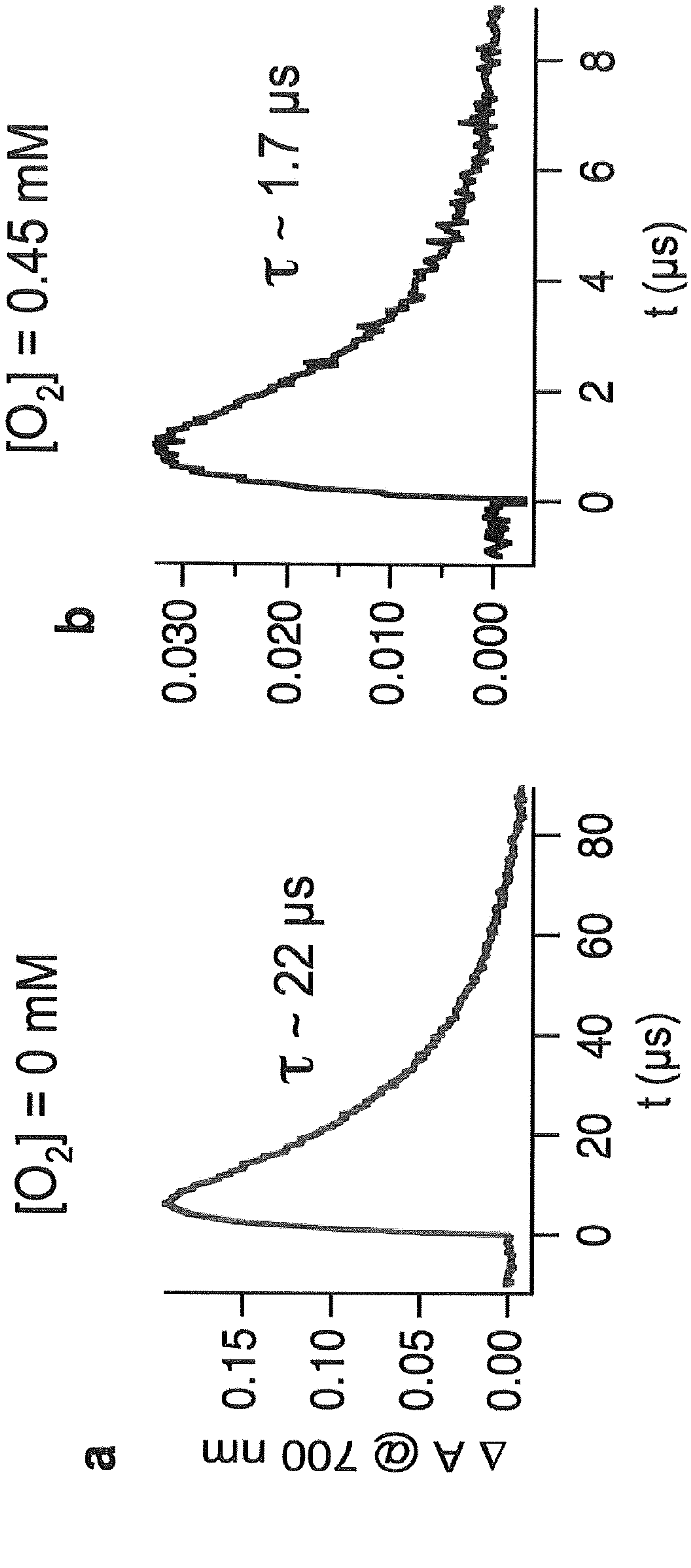
FIGS. 6A, 6B. Transient absorption traces recorded at 700 nm after pulsed laser excitation (355 nm, 5 ns pulse width) of acetonitrile solutions of BP (5 mM) and Cy5 (22 μM). The solutions were purged with argon (a) or a gas mixture of 95% $N_2$ and 5% $O_2$. Optical path length=6 mm FIG. 7A-7D. Transient absorption traces after pulsed laser excitation (355 nm, 5 ns pulse width) of deoxygenated acetonitrile solutions of BP (a, b: 3 mM; c, d: 10 mM) and Cy5 (a, b: 10 μM) or Cy5-3C-Cot (also called Cy5-COT(3)) (c, d: 82 μM). Optical path length 10 mm (a, b) or 2 mm (c, d). The transients were fitted (purple line) to a biexponential function, which accounts for the growth kinetics ($k_1$) and decay ($k_2$) of Cy5 triplets.

Deoxygenated acetonitrile solutions containing BP and Cy5 were irradiated with light pulses from a Nd-YAG laser at 355 nm (5 ns pulse width) to generate transient absorption kinetic traces across the visible spectrum. From these traces, transient absorption spectra at different times after the laser pulse were constructed (FIG. 3). Directly after the laser pulse the spectrum is dominated by the triplet absorption of BP, which is known to show a peak at 525 nm. (Montalti et al., 2006, Ibid.) After several microseconds, the BP triplet decayed under bleaching of Cy5 ground state absorption (~650 nm) and a new transient absorption at 700 nm appeared. As shown in the insets of FIG. 1, the three processes, decay of $^3$BP* (observed at 525 nm), bleaching of Cy5 (monitored at 600 nm) and growth of the new transient at 700 nm, occur with very similar kinetics. Assignment of this new transient at 700 nm as the triplet state absorption of Cy5 was subsequently confirmed by performing quenching studies in the presence of a small amount of oxygen (0.45 mM; generated by bubbling the acetonitrile solution with a gas mixture of 5% $O_2$ and 95% $N_2$). (Montalti et al., 2006, Ibid.) Consistent with its potent, triplet state quenching properties, in the presence of $O_2$ the lifetime of the 700 nm transient was reduced to 1.7 μs (FIG. 6B). compared to ~22 μs in the absence of $O_2$ (FIG. 6A). The quenching of the 700 nm transient was paralleled by recovery of Cy5 in the ground state (monitored at 600 nm). In line with this assignment, other cyanine dyes also show triplet state absorption at 700 nm. (Chibisov et al., 1996, J. Chem. Soc., Faraday Trans.: 92, 4917-4925; Chibisov et al. 2001, J. Photochem. Photobiol. A: 141, 39-45) Conversely, the cis-conformation of ground state Cy5 is also known to absorb in this spectral region. {Chibisov et al., 1996, Ibid.; Huang et al., J. Phys. Chem. A, 2005, 110, 45-50.; Chibisov et al 2001) Spectral identification of specific photophysics of Cy5 by means of ensemble and single molecule measurements.

However, the observed quantitative quenching of the transient by $O_2$ demonstrates that the contribution of the ground state cis-conformer (which is not quenched by $O_2$) to the transient absorption at 700 nm is negligible. Therefore, the transient at 700 nm observed under these experimental conditions using the BP sensitization strategy (eq 1) is correctly assigned to $^3$Cy5* and this transient can be used to investigate Cy5 triplet state quenching by the covalently linked protective agents. However, some minor contribution of the cis-conformer to the transient absorption at 700 nm cannot be excluded, especially at longer time scales.

Figure 4:
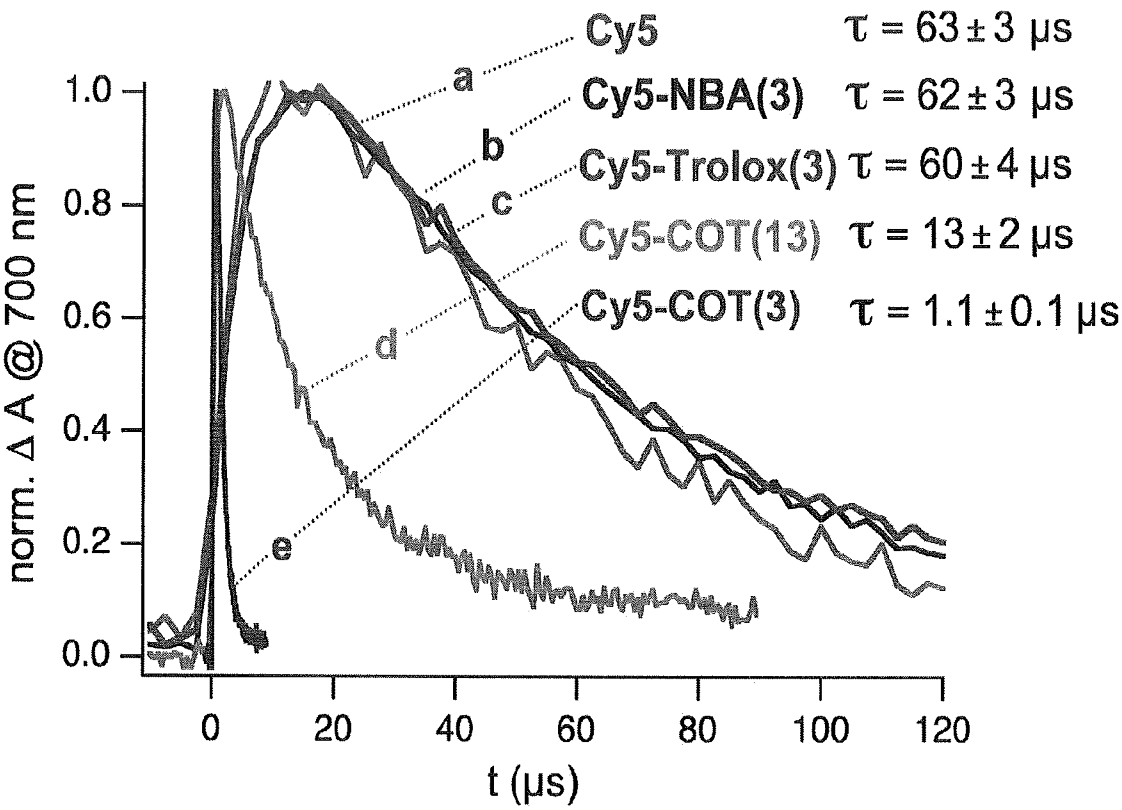
FIG. 4. Cy5 triplet absorption traces recorded at 700 nm after pulsed laser excitation (355 nm, 5 ns pulse width) of deoxygenated acetonitrile solutions of BP (a-d: 3 mM; e: 10 mM) and Cy5 derivatives (a-d: 10±1 μM; e: 82 μM). The triplet lifetimes (τ) derived from a kinetic fitting model considering the growth kinetics due to energy transfer from $^{3}BP^{*}$ to Cy5. Details and the fitted traces are shown in FIGS. 7 and 8.
Figures 7A, 7B, 7C, 7D:
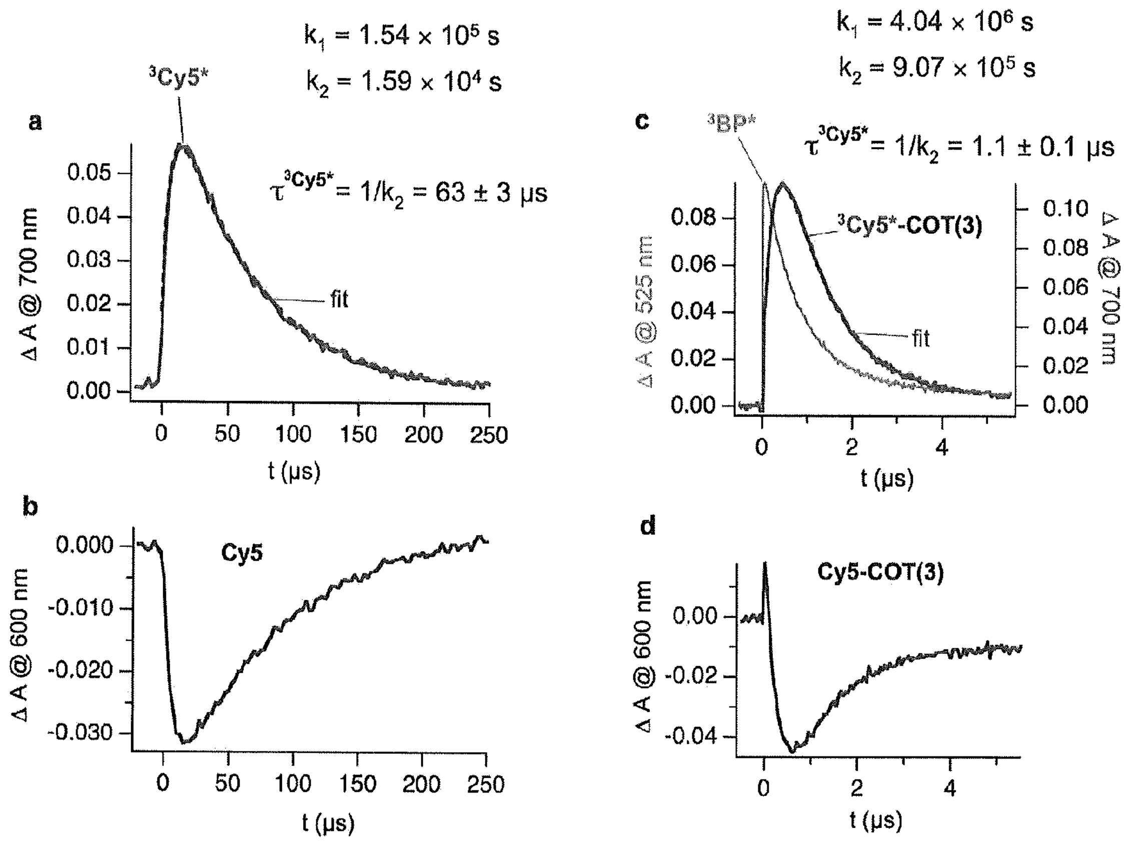
Figure 8:
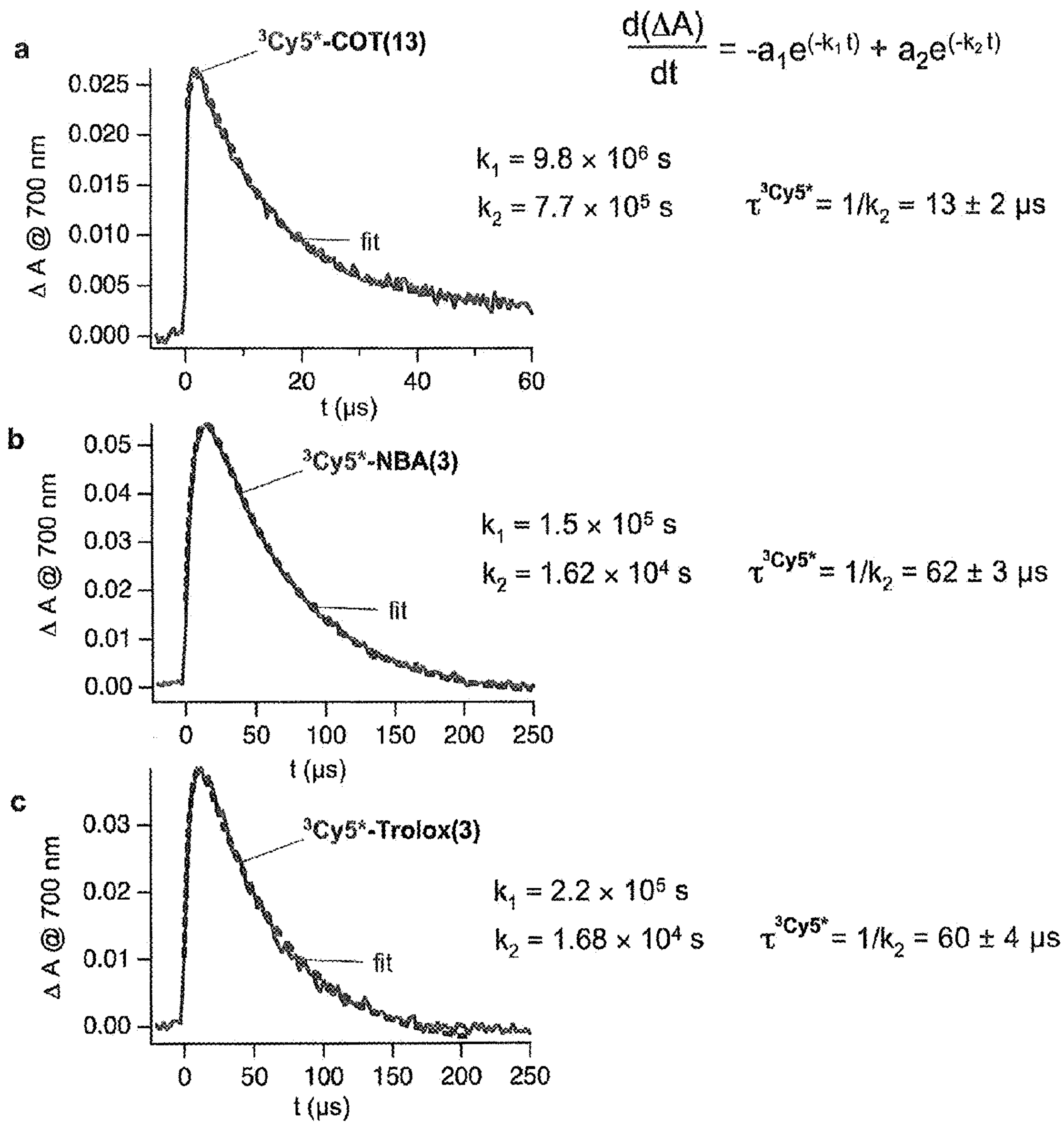
FIG. 8. Transient absorption traces at 700 nm after pulsed laser excitation (355 nm, 5 ns pulse width) of deoxygenated acetonitrile solutions of BP (3 mM) and Cy5-13C-COT (also called Cy5-COT(13)), Cy5-3C-NBA (also called Cy5-NBA (3)) and Cy5-3C-Trolox (also called Cy5-Trolox(3)) (10±1 μM). Optical path length 10 mm. The transients were fitted (purple line) to a biexponential function, which accounts for the growth kinetics ($k_1$) and decay ($k_2$) of Cy5 triplets.

A series of Cy5 derivatives with covalently linked protective agents (Chart 1) were synthesized following procedures described herein. In addition to different protective agents (COT, NBA and Trolox), the length of the spacer between Cy5 and the protective agent was also varied. Laser flash photolysis experiments in argon-saturated acetonitrile solutions using BP as the sensitizer were performed on each of the Cy5 derivatives. Transient absorption bands similar to unsubstituted Cy5 (FIG. 3) were observed. However, significant differences were seen in the kinetic features of their triplet absorption at 700 nm (FIG. 4). The initial growth in transient absorption is caused by the energy transfer process from $^3BP^*$ to the Cy5 chromophore analog in eq 1, which is then followed by the decay of the Cy5 triplet state. The concentrations of the Cy5 derivatives were optimized in order to ensure accurate triplet lifetime determination. High concentration, while advantageous by increasing the rate of triplet energy transfer (eq 1), had the negative effect of decreasing the Cy5 triplet lifetime due to self-quenching by ground state Cy5. Exceedingly low concentrations decreased the signal intensity at 700 nm and also substantially reduced the rate at which $^3Cy5^*$ was populated. In addition, a low enough laser power was used to eliminate the quenching of $^3Cy5^*$ by triplet-triplet annihilation. The growth kinetic was deconvoluted from the decay in order to accurately determine the triplet lifetimes of the Cy5 derivatives (FIG. 7 and FIG. 8). The triplet lifetimes obtained are listed in FIG. 4. Cy5-3C-NBA (also called Cy5-NBA(3)) (FIG. 4*b*) and Cy5-3C-Trolox (also called Cy5-Trolox(3)) (FIG. 4*c*) show triplet lifetimes that are indistinguishable from the lifetime of unsubstituted Cy5 (FIG. 4*a*) (60-63 μs). However, the COT-linked derivatives (FIG. 4*d*, FIG. 4*e*) showed significantly reduced triplet lifetimes. Cy5-3C-COT, the derivative with the shortest linker between the cyanine chromophore and COT has the shortest triplet lifetime (1.1 μs), and is approximately 60 times shorter than the triplet lifetime of the unsubstituted Cy5.

COT is known to have a low-energy ("relaxed") triplet state (puckered geometry) with an energy of ~92 kJ/mol whereas the triplet energy of Cy5 is significantly higher (154 kJ/mol). (Huang et al., 2005, Ibid.) Therefore, energy transfer from $^3Cy5^*$ to COT is energetically favorable. The energy transfer mechanism between triplet donors and COT has been investigated in detail {Frutos, L. M et al., 2004, J. Chem. Phys.: 120, 1208-1216). The energy transfer process generates COT triplet states and returns the cyanine chromophore to the ground state. The recovery of the cyanine fluorophore to the ground state was directly observable by laser flash photolysis as can be seen in FIG. 7. As shown in that figure, dyes with the protective moiety (FIG. 7C and FIG. 7D) have much shorter-lived triplets than commercial dyes (FIG. 7A and FIG. 7B).

Figure 5:
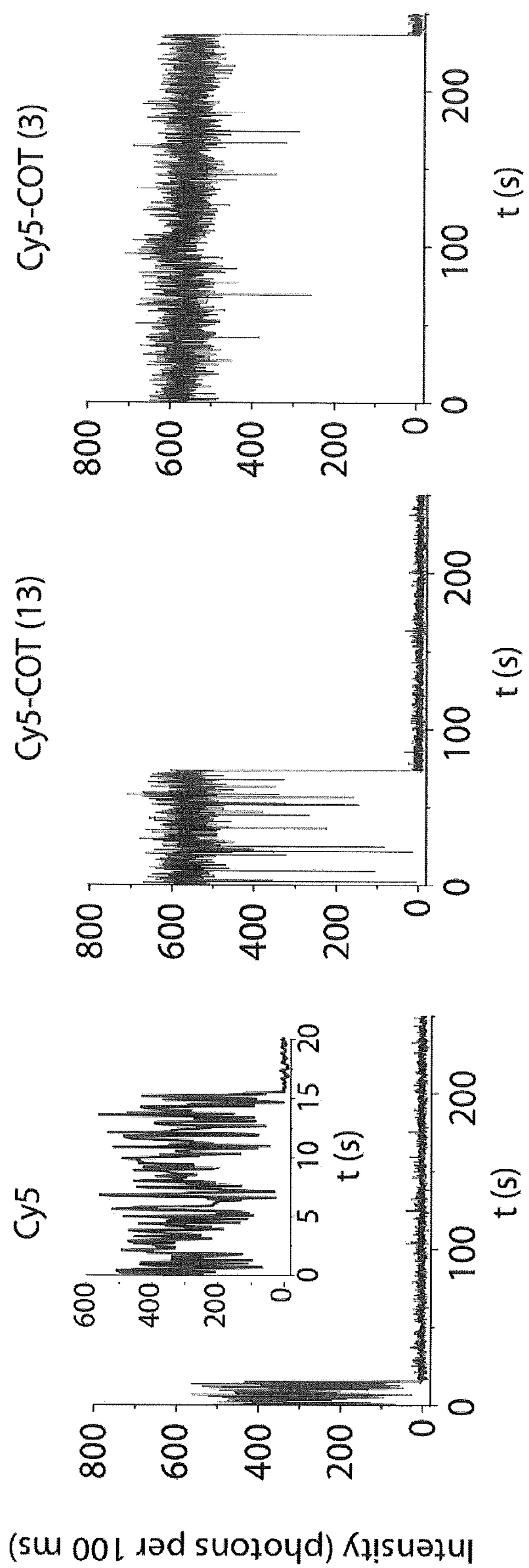
FIG. 5. Representative single-molecule fluorescence traces for Cy5, Cy5-COT(13) and Cy5-3C-COT (also called Cy5-COT-(3)) covalently linked to DNA oligonucleotides and imaged using a total internal reflection microscope under continuous laser excitation (641 nm).
Figure 9:
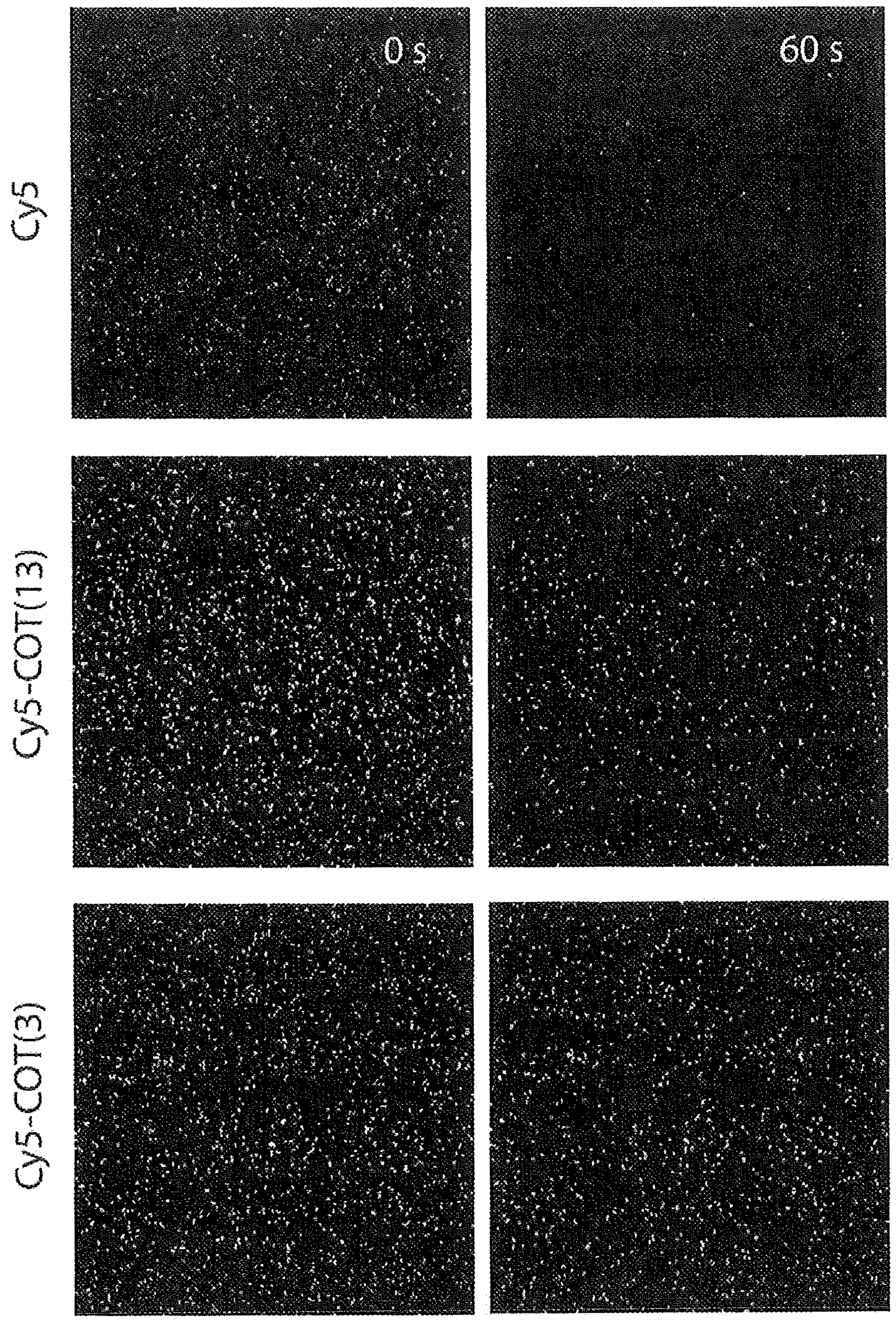
FIG. 9. Single-molecule images of duplex DNA oligonucleotide labeled with Cy5, Cy5-13C-COT and Cy5-3C-COT under deoxygenated solution conditions using a total internal reflection microscope with 641 nm illumination.
Figure 10:
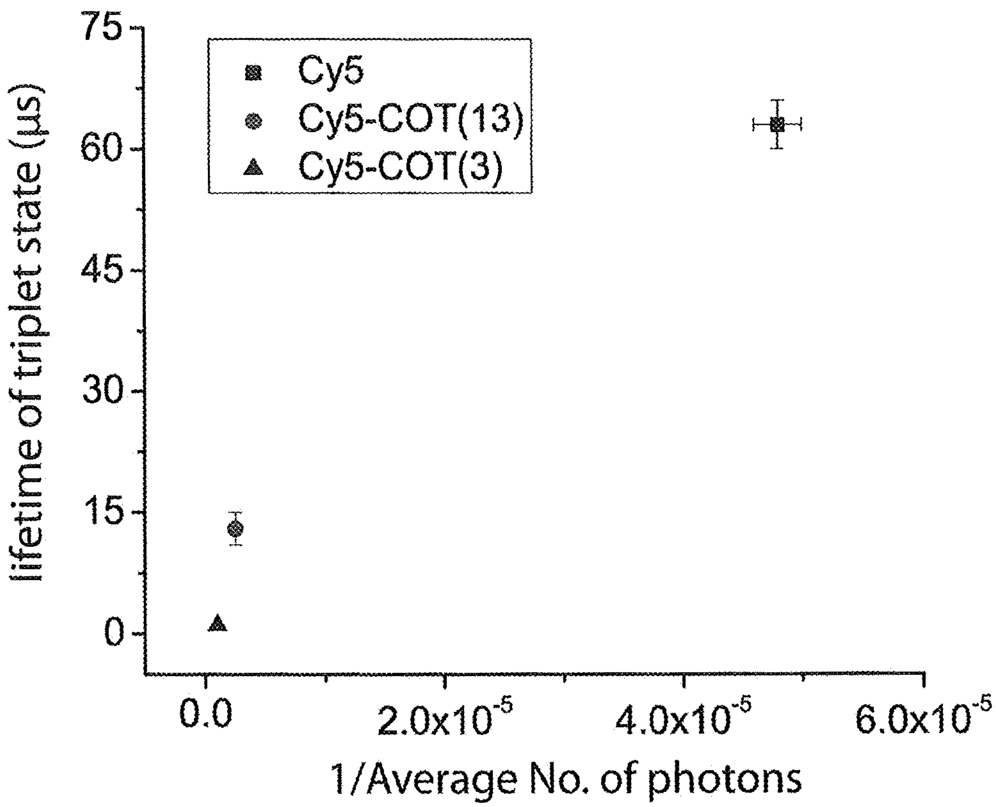
FIG. 10. Correlation between the triplet state lifetime of Cy5 and the inverse average number of photons detected before photobleaching or blinking in single-molecule fluorescence measurements using a total internal reflection microscope with 641 nm laser illumination.

To examine whether this COT-mediated triplet state quenching and rapid ground state recovery correlates with the observed photostability of the cyanine fluorophore, single-molecule fluorescence measurements were performed, as previously described, (Altman et al., 2012, Nat. Methods: 9, 68-71) where the Cy5 derivatives were conjugated to double stranded DNA, a model system to study fluorophore stability on biomolecules. FIG. 9 shows representative images of these systems using a total internal reflection fluorescence microscope with illumination at 641 nm. By tracking the fluorescence of individual molecules over time, the intensity and duration of fluorescence, as well as the kinetics of blinking and photobleaching could be quantified. Visual inspection of individual fluorescence traces revealed that the time period of fluorescence before blinking or photobleaching was longest for Cy5-3C-COT and shortest for the unsubstituted Cy5 (FIG. 5). By quantifying the number of photons detected for each ensemble of single molecules (>500 for each data set; Table 1), it was herein found that the average duration of fluorescence increased from Cy5 to Cy5-13C-COT to Cy5-3C-COT in a manner that was inversely correlated with the triplet lifetime (FIG. 10). This finding shows that the triplet state is a key intermediate for fluorophore blinking and photobleaching and that COT photostabilizes the cyanine fluorophore by reducing the duration that the fluorophore spends in the triplet state. A shortened triplet lifetime reduces the probability of fluorophore transformation reactions from the triplet state and reduces the probability of reactive oxygen species production, such as singlet oxygen, which is generated by interaction of triplet excited states with molecular oxygen. It is noted that the interaction of COT triplet states, which are generated by energy transfer quenching from $^3Cy5^*$ to COT, does not lead to singlet oxygen as the energy of the "relaxed" triplet state of COT (~92 kJ/mol) (Wenthold et al., 1996, Science: 272, 1456-1459) is slightly lower than the energy of singlet oxygen (94 kJ/mol).

TABLE 1

Average number of photons detected before photobleaching or blinking in single-molecule measurements and triplet lifetime ($\tau_{triplet}$) of Cy5 derivatives.

| | Average number of photons ($10^4$ photons) | $\tau_{triplet}$ (μs) |
|---|---|---|
| Cy5 | 2.1 ± 0.1 | 63 ± 3 |
| Cy5-13C-COT | 40 ± 4 | 13 ± 2 |
| Cy5-3C-COT | 99 ± 6 | 1.1 ± 0.1 |
| Cy5-3C-NBA | 10 ± 1 | 62 ± 3 |
| Cy5-3C-Trolox | 22 ± 2 | 60 ± 4 |

Figure 11:
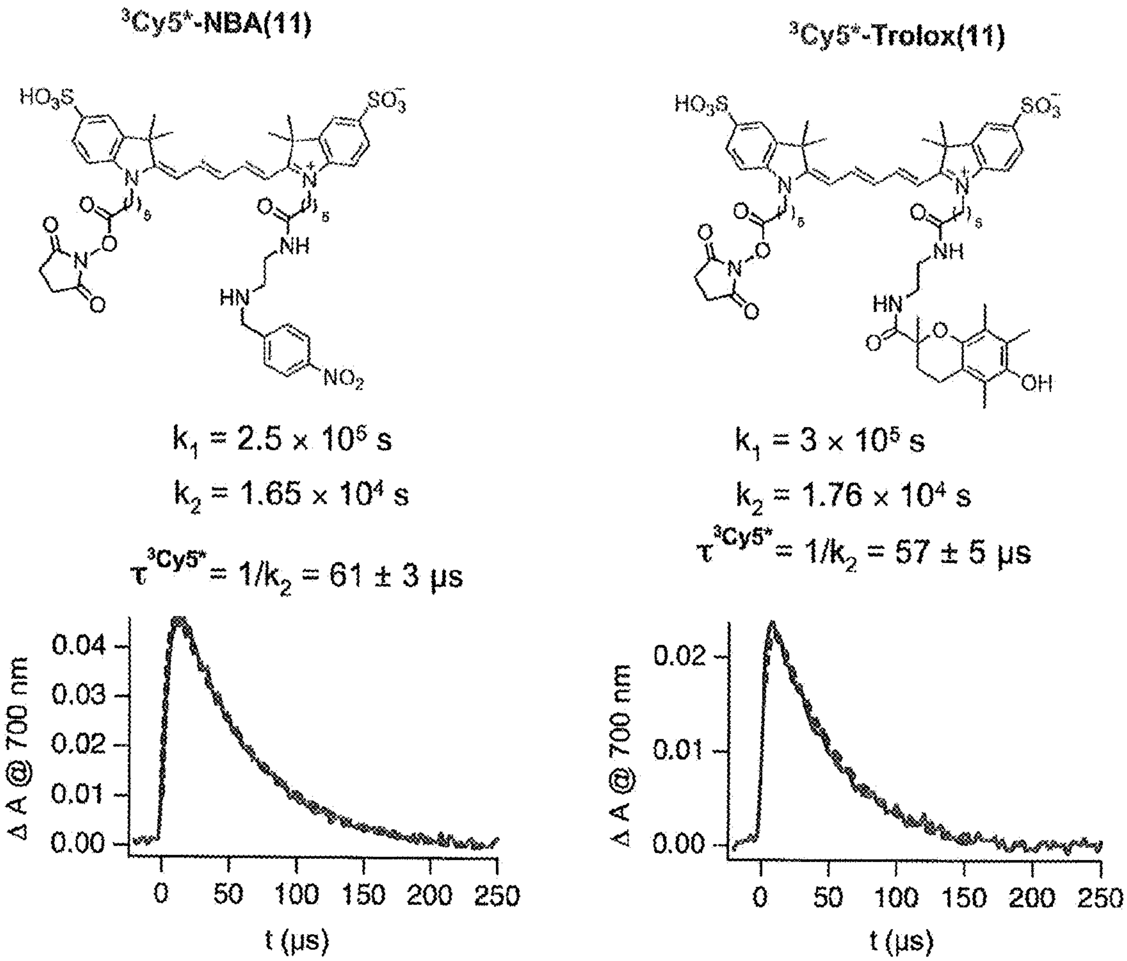
FIG. 11. Cy5 triplet absorption traces recorded at 700 nm after pulsed laser excitation (355 nm, 5 ns pulse width) of deoxygenated acetonitrile solutions of BP (3 mM) and Cy5 derivatives (10±1 μM). The transients were fitted (purple line) to a biexponential function, which accounts for the growth kinetics ($k_1$) and decay ($k_2$) of Cy5 triplets.

By contrast, shortening of the triplet lifetime was not observed for Cy5-3C-NBA and Cy5-3C-Trolox under the above-described experimental conditions, but both Cy5 derivatives showed increased photostability compared to unsubstituted Cy5 (FIG. 2 and Table 1). This finding suggests that NBA and Trolox operate to stabilize the cyanine fluorophore through different mechanisms, which do not target the Cy5 triplet state directly. Possible stabilization mechanisms of NBA and Trolox could involve passivation of reactive oxygen species and radicals, which can damage the fluorophore. However, a redox mechanism where $^3Cy5^*$ is deactivated by Trolox and NBA through a electron exchange mechanism ("ping-pong") (Tinnefeld and Cordes 2012, Nat. Methods: 9, 426-427) appears unlikely under the instant conditions, because no measurable reduction of the triplet lifetime was observed for Cy5-NBA(3) and Cy5-3C-Trolox. To test if the short linker between Cy5 and NBA or Trolox might sterically hinder the electron transfer, a larger more flexible 11-atom linker chain was also tested. However, no reduction of the Cy5 triplet lifetime was observed (FIG. 11).

In summary, it has herein been observed that Cy5 derivatives containing covalently linked COT have significantly reduced Cy5 triplet lifetimes due to intramolecular energy transfer quenching, which regenerates the Cy5 fluorophore ground state. The triplet lifetimes correlate well with the photostability in single-molecule fluorescence experiments, where Cy5-3C-COT, with the shortest triplet lifetime, showed the highest photostability. It also suggests that COT is a robust and potentially general agent that can be used to improve photostability of organic fluorophores especially when covalently linked in close proximity to the fluorogenic center. The central role of the triplet state suggests that reactive oxygen species, which can be generated from the triplet states, significantly reduce the photostability of the fluorophore. Such studies are in progress.

Laser Flash Photolysis Measurement for the Triplet State of the Fluorophores

Laser flash photolysis experiments employed pulses from a Spectra-Physics GCR 150-30 from a Nd:YAG laser (355 nm, ~5 mJ/pulse, 5 ns) and a computer-controlled system, which has been described previously (Yagci, Y. et al (2007) Macromolecules, 40, 4481-4485). Acetonitrile solutions containing the Cy5 derivatives and BP were prepared and deoxygenated by argon purging. The concentrations of the Cy5 derivatives and BP were selected for optimum signal kinetics to achieve efficient triplet energy transfer from BP triplets to Cy5, but minimize self-quenching of Cy5 triplets by Cy5 ground state molecules. To accommodate the different concentrations, quartz cells of different optical path length and different experimental geometry were selected (10×10 mm and 6×4 mm in right angel pump/probe geometry; 2×10 mm in front face pump/probe geometry).

Single-Molecule Fluorescence Imaging

All single-molecule measurements were performed using a laboratory built, prism-based total internal reflection fluorescence (TIRF) apparatus as previously described (Dave, R et al. (2009) Biophys. J.: 96, 2371-2381) at specified illumination intensities in T50 buffer (10 mM Tris-acetate (pH 7.5) and 50 mM KCl), containing 5 mM β-mercaptoethanol, 1 mM 3,4-dihydroxybenzoic acid (PCA) and 50 nM protocatechuate 3,4-deoxygenase (PCD) (Sigma-Aldrich). Biotinylated-DNA molecules were immobilized via a biotin-streptavidin interaction within microfluidic channels constructed on quartz slides (Dave et al., 2009, Ibid.). Fluorescence from surface-immobilized molecules, illuminated via the evanescent wave generated by total internal reflection of a 641 nm (Coherent) laser source, was collected using a 1.27 numerical aperture (NA), 60× water-immersion objective (Nikon) and imaged onto a Cascade Evolve 512 electron-multiplying charge-coupled device (EMCCD) camera (Photometrics). Data were acquired using Metamorph software (Universal Imaging Corporation) collecting at a frame rate of 10 $s^{-1}$.

The photophysical properties of fluorophores were investigated using automated software built in-house using Matlab (MathWorks) as previously described (Dave et al., 2009, Ibid.). Traces were extracted from wide-field TIRF movies by finding peaks of fluorescence intensity at least 8 standard deviations (s.d.) above background noise and summing the intensity of 4 total pixels encompassing each peak. Neighboring peaks closer than 3 pixels were removed.

To reduce analytical error, traces were only used for analysis if they passed the following criteria: signal-background noise ratio >8, single-step photobleaching and background noise levels within 2 s.d. from the mean. To extract kinetic parameters of blinking and photobleaching, fluorescence traces were idealized using the SKM algorithm and a 3-state model with one fluorescent ($t_{on}$) state, a transient dark state (blinking) and a permanent dark state (photobleaching). $t_{on}$ was calculated by fitting the cumulative distribution of the duration of each "on" state to a single exponential function. Photon counts were calculated by multiplying $t_{on}$ with photons detected per seconds.

FRET Experiments Comparing Commercial Cy3 and Cy5 Fluorophores with New Cy3-4S(COT) and Cy5-4S(COT) Dye Compounds of the Instant Invention In this study, donor and acceptor fluorophores are attached to two ribosomal proteins (S13 small subunit; L1 large subunit, respectively).

Generation of Site-specifically Labeled 30S Subunits and 50S Subunits.

Ribosomal protein S13 was PCR cloned from *E. coli* strain K12 genomic DNA into the pPROEX HTb vector with a TEV-protease-cleavable histidine (His)6 tag and a 12-residue peptide encoding the S6 epitope for the Sfp phosphopantetheinyl transferase reaction (amino acid sequence, GDSLSWLLRLLN) fused at the N terminus (N-Sfp). {Yin, J., Lin, A. J., Golan, D. E. & Walsh, C. T. Site-specific protein labeling by Sfp phosphopantetheinyl transferase. Nat. Protoc. 1, 280-285 (2006)} After transformation of this plasmid into an *E. coli* ΔS13 knockout strain, cells were cultured and ribosomes were harvested as previously described. {Wang, L., Altman, R. B. & Blanchard, S. C. Insights into the molecular determinants of EF-G catalyzed translocation. RNA 17, 2189-2200 (2011)} Pure 30S subunits were isolated by sucrose gradient centrifugation in a low-magnesium buffer (20 mM HEPES, pH 7.5, 50 mM KCl, 10 mM NH4C1, 0.5 mM EDTA, 6 mM β-mercaptoethanol (BME) and 1 mM MgCl2). 30S subunits containing Sfp-tagged S13 were isolated from this population by cobalt affinity chromatography (Clontech). Then, the Sfp tag was enzymatically labeled, and the His6 tag was enzymatically removed in a buffer containing 20 mM HEPES, pH 7.5, 100 mM KCl, 10 mM MgCl2 and 6 mM BME. Twenty micromolar N-Sfp-S13 30S subunits, 5 μM TEV protease, 250 μM Cy3-coenzyme A (CoA) and 25 μM Sfp enzyme were incubated for 24 h at 18° C. Sfp enzyme, TEV protease and unbound Cy3-CoA were then removed by filtration over a 100K membrane (Millipore). Before 70S complex formation, ribosomes were buffer exchanged into Tris-polymix buffer32. 50S subunits labeled with Cy5-L1 (T202C) were prepared and purified as previously described36.

Single-molecule FRET experiments were performed at room temperature in Tris-polymix with 5 mM Mg2+ buffer, as previously described {Wang, L., Altman, R. B. & Blanchard, S. C. Insights into the molecular determinants of EF-G catalyzed translocation. RNA 17, 2189-2200 (2011)}, and in which oxygen scavenging and triplet-state quenching systems {Dave, R., Terry, D. S., Munro, J. B. & Blanchard, S. C. Mitigating unwanted photophysical processes for improved single-molecule fluorescence imaging. Biophys. J. 96, 2371-2381 (2009)} were used, or not used. After surface immobilization, the ribosome-bound, P-site tRNA was deacylated by incubation with 2 mM puromycin for 10 min at room temperature. The smFRET data were acquired by directly exciting the Cy3 fluorophore at 532 nm (LaserQuantum) while the Cy3 and Cy5 intensities were simultaneously recorded in Metamorph (Molecular Devices) with a 40-ms integration time. The data were analyzed in MATLAB (MathWorks) and plotted in Origin (OriginLab), as previously described. {Munro, J. B., Altman, R. B., O'Connor, N. & Blanchard, S. C. Identification of two distinct hybrid state intermediates on the ribosome. Mol. Cell. 25, 505-517 (2007).}

Figure 12:
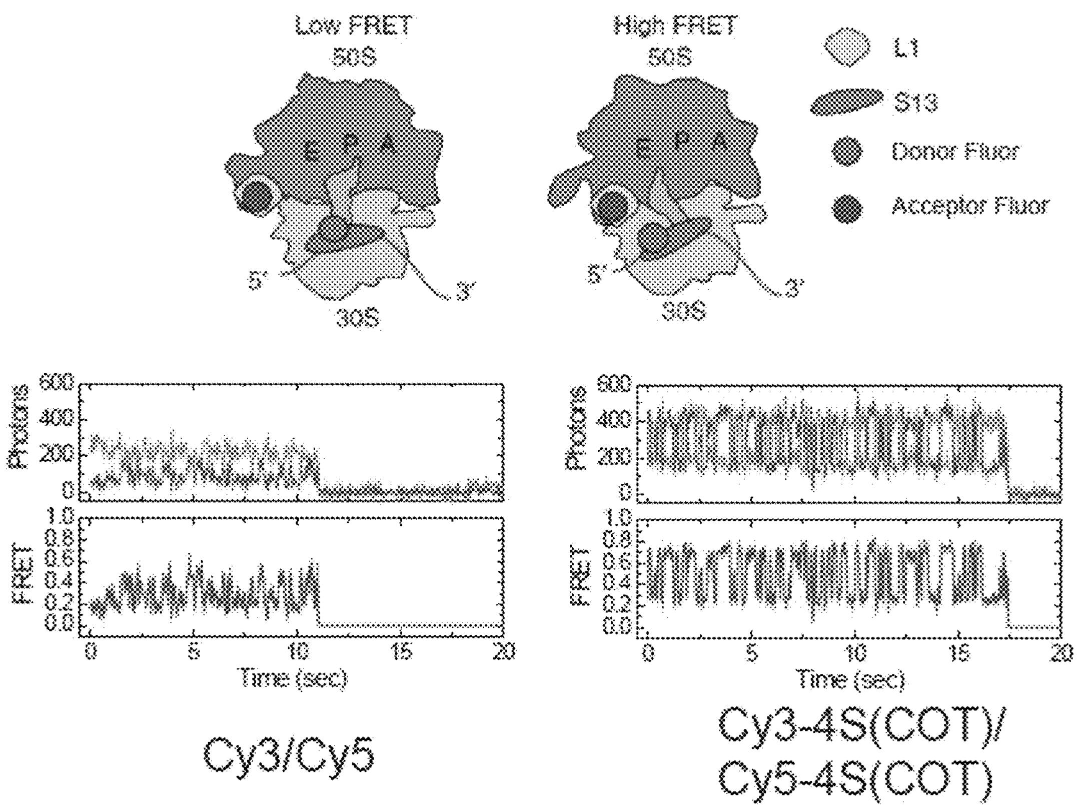
FIG. 12. Comparative FRET traces for dye molecules. Top panels: Cartoon rendering of the bacterial ribosome where donor (Cy3) and acceptor (Cy5) fluorophores are attached to two ribosomal proteins (S13 small subunit; L1 large subunit, respectively). The graphs on the lower left show results using the commercially available Cy3 and Cy5 fluorophores. The graphs on the lower right show results using new photostabilized dyes (Cy3-4S(COT) and Cy5-4S (COT) having enhanced solubilization properties.

Referring to FIG. 12, the graph on the lower left shows results using commercially available Cy3 and Cy5 fluorophores; the graph on the lower right shows results for the new dyes (Cy3-4S(COT) and Cy5-4S(COT) with three-atom linkers. Significantly, these data were generated on the same day at the same time under the same conditions. For the dyes with protective moieties and enhanced solubility, both donor and acceptor fluorophores are brighter and longer lived. The FRET data obtained with the new dyes correspondingly display clear transitions that can be readily analyzed for dynamics whereas the data obtained with the commercially available dyes are short-lived and are noisy and relatively difficult to analyze.

While there have been shown and described what are at present considered the preferred embodiments of the invention, those skilled in the art may make various changes and modifications which remain within the scope of the invention defined by the appended claims.

What is claimed is:

1. A dye compound of the formula:

(1)

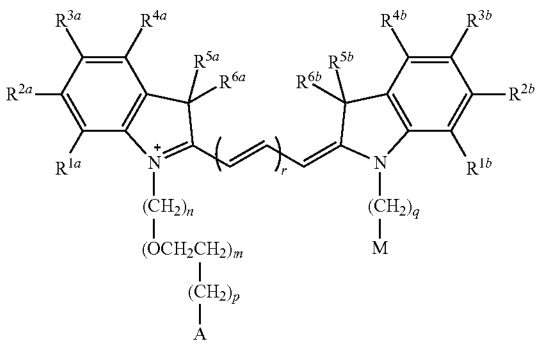

wherein:

$R^{1a}$, $R^{2a}$, $R^{3a}$, $R^{4a}$, $R^{5a}$, $R^{6a}$, $R^{1b}$, $R^{2b}$, $R^{3b}$, $R^{4b}$, $R^{5b}$, and $R^{6b}$ are independently selected from hydrogen atom, straight-chained or branched hydrocarbon groups having one to six carbon atoms, and hydrophilic groups, wherein said straight-chained or branched hydrocarbon group is optionally substituted with at least one hydrophilic group, and wherein at least one of $R^{5a}$ and $R^{6a}$ is a hydrocarbon group substituted with at least one hydrophilic group, and at least one of $R^{5b}$ and $R^{6b}$ is a hydrocarbon group substituted with at least one hydrophilic group, and wherein at least one of $R^{1a}$, $R^{2a}$, $R^{3a}$, and $R^{4a}$, is a hydrophilic group, and at least one of $R^{1b}$, $R^{2b}$, $R^{3b}$, and $R^{4b}$ is a hydrophilic group;

A is a cyclic polyene group containing more than three conjugated carbon-carbon double bonds and has a characteristic of modifying the singlet-triplet occupancy of the shown cyanine moiety, wherein A is optionally substituted with at least one hydrophilic group;

M is a reactive crosslinking group or a group that can be converted to a reactive crosslinking group;

n is an integer of at least 1 and up to 6;

m is 0 or an integer of 1 to 6;

p is 0 or an integer of 1 to 6;

q is an integer of at least 1 and up to 16; and r is an integer of 1 to 4;

any two adjacent groups selected from $R^{1a}$, $R^{2a}$, $R^{3a}$, and $R^{4a}$, and/or any two adjacent groups selected from $R^{1b}$, $R^{2b}$, $R^{3b}$, and $R^{4b}$, are optionally interconnected as an unsaturated hydrocarbon bridge; and any $CH_2$ group subtended by n, m, p, or q, and not connected to an oxygen atom or to the indolyl nitrogen atom, may independently be replaced with an amino linking group of the formula —NR—, where R is a hydrogen atom or hydrocarbon group having one to six carbon atoms; and any $CH_2$ group subtended by n, m, p, or q may independently be replaced with a carbonyl group; and any one or more $CH_2$ groups subtended by q may be replaced with an —O— linking atom;

the ring carbon atom bound to $R^{5a}$ and $R^{6a}$ groups, and/or the ring carbon atom bound to $R^{5b}$ and $R^{6b}$ groups, is optionally replaced with a ring oxygen atom.

2. The compound of claim 1, wherein M is comprised of a COOR' group, maleimide group, azide group, or guanine group bound by its 6-oxygen atom, wherein R' is H, a hydrocarbon group having 1 to 6 carbon atoms, or an activated organoester group.

3. The compound of claim 1, wherein m is an integer of 1 to 6.

4. The compound of claim 1, wherein one of $R^{5a}$ and $R^{6a}$ is a methyl group, and one of $R^{5b}$ and $R^{6b}$ is a methyl group.

5. A dye-molecule conjugate having the following formula:

(1-1)

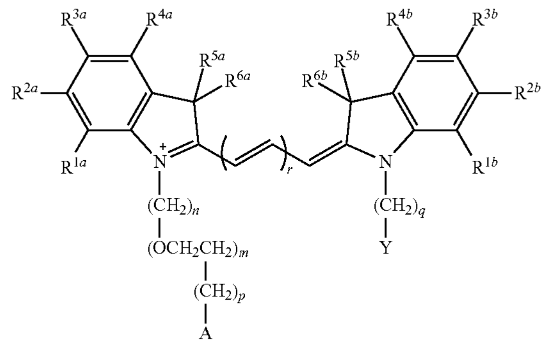

wherein:

$R^{1a}$, $R^{2a}$, $R^{3a}$, $R^{4a}$, $R^{5a}$, $R^{6a}$, $R^{1b}$, $R^{2b}$, $R^{3b}$, $R^{4b}$, $R^{5b}$, and $R^{6b}$ are independently selected from hydrogen atom, straight-chained or branched hydrocarbon groups having one to six carbon atoms, and hydrophilic groups, wherein said straight-chained or branched hydrocarbon group is optionally substituted with at least one hydrophilic group, and wherein at least one of $R^{5a}$ and $R^{6a}$ is a hydrocarbon group substituted with at least one hydrophilic group, and at least one of $R^{5b}$ and $R^{6b}$ is a hydrocarbon group substituted with at least one hydrophilic group, and wherein at least one of $R^{1a}$, $R^{2a}$, $R^{3a}$, and $R^{4a}$ is a hydrophilic group, and at least one of $R^{1b}$, $R^{2b}$, $R^{3b}$, and $R^{4b}$ is a hydrophilic group;

A is a cyclic polyene group containing more than three conjugated carbon-carbon double bonds and has a characteristic of modifying the singlet-triplet occupancy of the shown cyanine moiety, wherein A is optionally substituted with at least one hydrophilic group;

Y is a molecule of interest;

n is an integer of at least 1 and up to 6;

m is 0 or an integer of 1 to 6;

p is 0 or an integer of 1 to 6;

q is an integer of at least 1 and up to 16; and r is an integer of 1 to 4;

any two adjacent groups selected from $R^{1a}$, $R^{2a}$, $R^{3a}$, and $R^{4a}$, and/or any two adjacent groups selected from $R^{1b}$, $R^{2b}$, $R^{3b}$, and $R^{4b}$, are optionally interconnected as an unsaturated hydrocarbon bridge; and any $CH_2$ group subtended by n, m, p, or q, and not connected to an oxygen atom or to the indolyl nitrogen atom, may independently be replaced with an amino linking group of the formula —NR—, where R is a hydrogen atom or hydrocarbon group having one to six carbon atoms; and any $CH_2$ group subtended by n, m, p, or q may independently be replaced with a carbonyl group; and any one or more $CH_2$ groups subtended by q may be replaced with an —O— linking atom;

the ring carbon atom bound to $R^{5a}$ and $R^{6a}$ groups, and/or the ring carbon atom bound to $R^{5b}$ and $R^{6b}$ groups, is optionally replaced with a ring oxygen atom.

6. The dye-molecule conjugate of claim 5, wherein m is an integer of 1 to 6.

7. The dye-molecule conjugate of claim 5, wherein one of $R^{5a}$ and $R^{6a}$ is a methyl group, and one of $R^{5b}$ and $R^{6b}$ is a methyl group.

8. The dye-molecule conjugate of claim 5, wherein said molecule of interest Y is a biomolecule.

9. The dye-molecule conjugate of claim 8, wherein said biomolecule is a peptide-containing group.

10. The dye-molecule conjugate of claim 8, wherein said biomolecule is a nucleotide-containing group.

11. The compound of claim 1, wherein said hydrophilic group is a sulfonate group.

* * * * *